United States Patent
Midorikawa et al.

(10) Patent No.: US 6,485,057 B1
(45) Date of Patent: *Nov. 26, 2002

(54) AUTOMOTIVE PASSENGER RESTRAINT AND PROTECTION APPARATUS AND SEATBELT PROTRACTION AND RETRACTION AMOUNT-DETECTING DEVICE

(75) Inventors: Yukinori Midorikawa; Osamu Kawai; Kiyoshi Ogawa; Masuo Matsuki, all of Fujisawa (JP)

(73) Assignee: NSK Autoliv Co., Ltd., Fujisawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/578,464

(22) Filed: May 25, 2000

Related U.S. Application Data

(63) Continuation-in-part of application No. 09/207,908, filed on Dec. 9, 1998, now abandoned.

(30) Foreign Application Priority Data

| Dec. 16, 1997 | (JP) | 9-363275 |
| Jan. 8, 1998 | (JP) | 10-013153 |
| Mar. 24, 1998 | (JP) | 10-093895 |
| Mar. 26, 1998 | (JP) | 10-096937 |
| Mar. 30, 1998 | (JP) | 10-099954 |
| Apr. 17, 1998 | (JP) | 10-124324 |
| Apr. 24, 1998 | (JP) | 10-129675 |
| May 27, 1998 | (JP) | 10-161524 |
| May 29, 1998 | (JP) | 10-164425 |
| Jun. 16, 1998 | (JP) | 10-183291 |
| Jun. 22, 1998 | (JP) | 10-189632 |
| Jul. 3, 1998 | (JP) | 10-202873 |
| Jul. 8, 1998 | (JP) | 10-207116 |
| Jul. 24, 1998 | (JP) | 10-209153 |
| Aug. 18, 1998 | (JP) | 10-231605 |
| Aug. 26, 1998 | (JP) | 10-240008 |

(51) Int. Cl.⁷ .............................. B60R 22/343
(52) U.S. Cl. ................... 280/807; 280/801.1
(58) Field of Search .................. 280/806, 802, 280/801.1, 807, 805; 180/268; 701/36, 45

(56) References Cited

U.S. PATENT DOCUMENTS 3,986,093 A * 10/1976 Wakamatsu et al. ........ 318/484

(List continued on next page.)

FOREIGN PATENT DOCUMENTS

EP 218 911 A2 4/1987

(List continued on next page.)

Primary Examiner—Paul N. Dickson
Assistant Examiner—Tony Winner
(74) Attorney, Agent, or Firm—Frishauf, Holz, Goodman & Chick, P.C.

(57) ABSTRACT

An automotive passenger restraint and protection apparatus for an automotive vehicle has a seatbelt and operates to restrain an occupant of the automotive vehicle by the seatbelt to protect the occupant. An electric retractor has a DC motor for retracting and protracting the seatbelt. An MPU controls the DC motor. Protraction of the seatbelt by the occupant is detected. When the protraction of said belt is detected, the MPU controls the DC motor so as to protract the seatbelt. A seatbelt protraction and retraction amount-detecting device calculates an amount of protraction or retraction of the seatbelt, based upon at least one of a number of times pulsating components of detected terminal voltage across the DC motor rises above a first predetermined value from a value below a first predetermined value, a number of times the pulsating components drops below a second predetermined value from a value above the second predetermined value, a frequency component obtained by frequency analysis of the pulsating components, and results of time integration of the detected terminal voltage, and a detected rotational direction of the motor.

10 Claims, 82 Drawing Sheets

U.S. PATENT DOCUMENTS

| | | | | |
|---|---|---|---|---|
| 4,319,667 A | * | 3/1982 | Motonami et al. | 188/65.1 |
| 4,321,979 A | * | 3/1982 | Kurayama et al. | 180/368 |
| 4,534,441 A | * | 8/1985 | Kamijo et al. | 180/268 |
| 4,572,543 A | * | 2/1986 | Tsuge et al. | 280/807 |
| 4,790,561 A | * | 12/1988 | Brown | 280/806 |
| 4,972,129 A | * | 11/1990 | Kawai et al. | 318/285 |
| 5,014,810 A | * | 5/1991 | Mattes et al. | 180/268 |
| 5,244,231 A | * | 9/1993 | Bauer et al. | 280/807 |
| 5,301,772 A | * | 4/1994 | Honda | 180/268 |
| 5,387,819 A | * | 2/1995 | Ueno et al. | 307/10.1 |
| 5,413,378 A | * | 5/1995 | Steffens, Jr. et al. | 280/735 |
| 5,552,986 A | * | 9/1996 | Omura et al. | 364/424.05 |
| 5,670,853 A | * | 9/1997 | Bauer | 318/286 |
| 5,765,774 A | * | 6/1998 | Maekawa et al. | 242/390.9 |
| 5,788,281 A | * | 8/1998 | Yanagi et al. | 280/806 |
| 6,257,363 B1 | * | 7/2001 | Midorikawa et al. | 180/268 |

FOREIGN PATENT DOCUMENTS

| | | |
|---|---|---|
| EP | 800 970 A1 | 10/1997 |
| GB | 1537359 | 12/1978 |
| JP | 59-45240 | 3/1984 |
| JP | 61-134464 | 8/1986 |
| JP | 3-79212 | 12/1991 |
| JP | 6-71333 | 10/1994 |
| JP | 9-82171 | 3/1997 |

* cited by examiner

*FIG.37*

| TIME BEFORE COLLISION | LONG | LONG | SHORT | SHORT |
|---|---|---|---|---|
| POSSIBILITY OF DOZE | SMALL | LARGE | SMALL | LARGE |
| DEGREE OF DANGER | ZERO | LOW | LOW | HIGH |

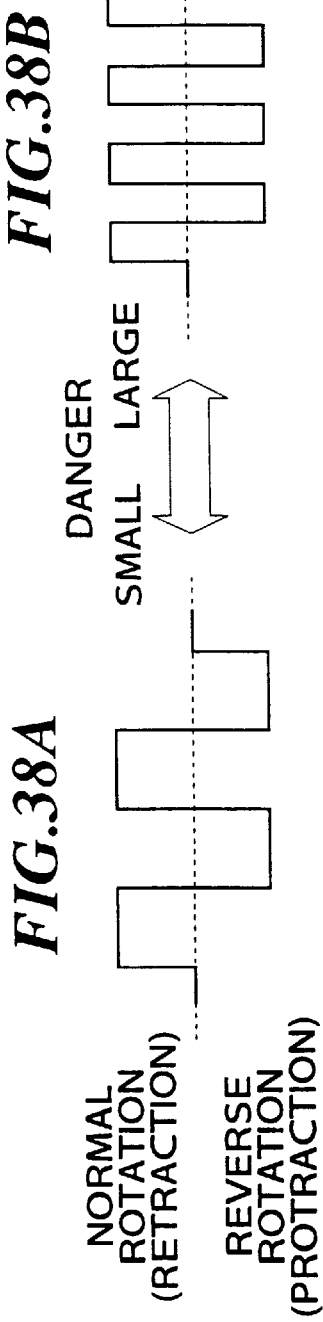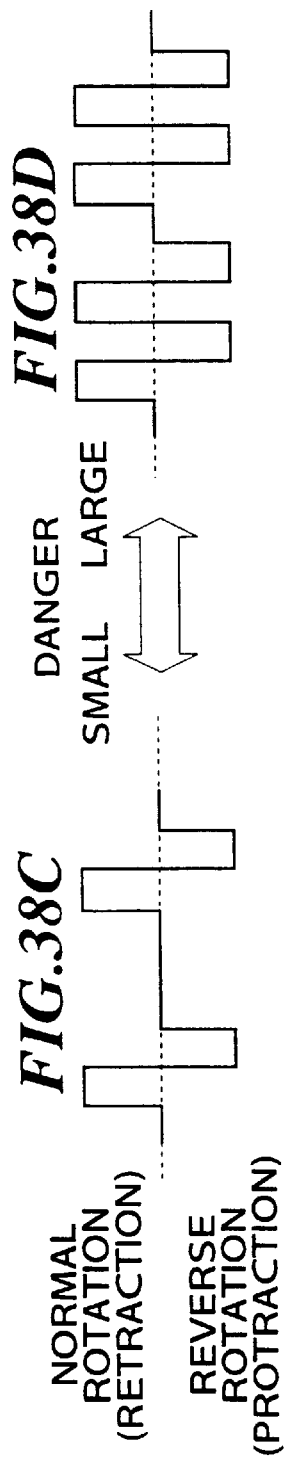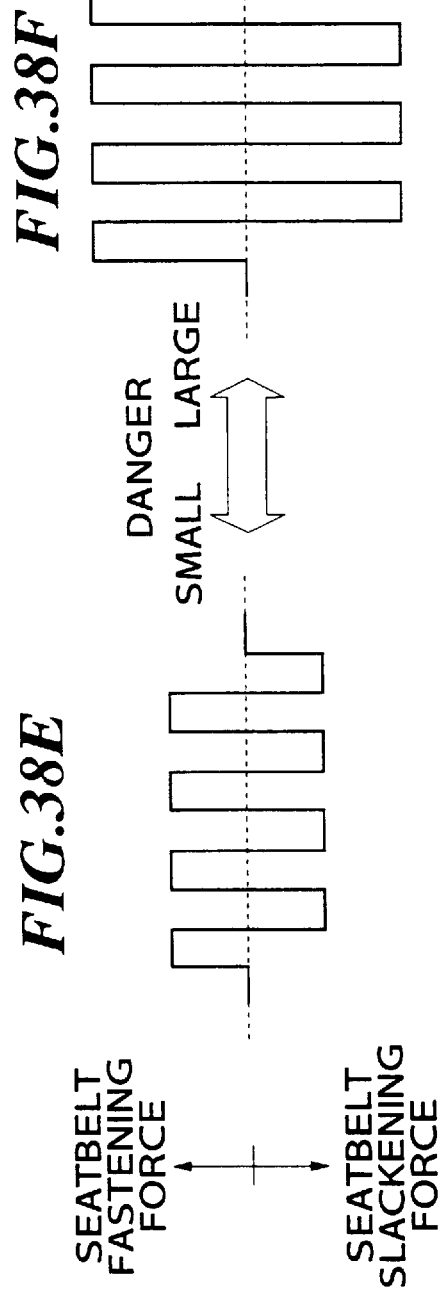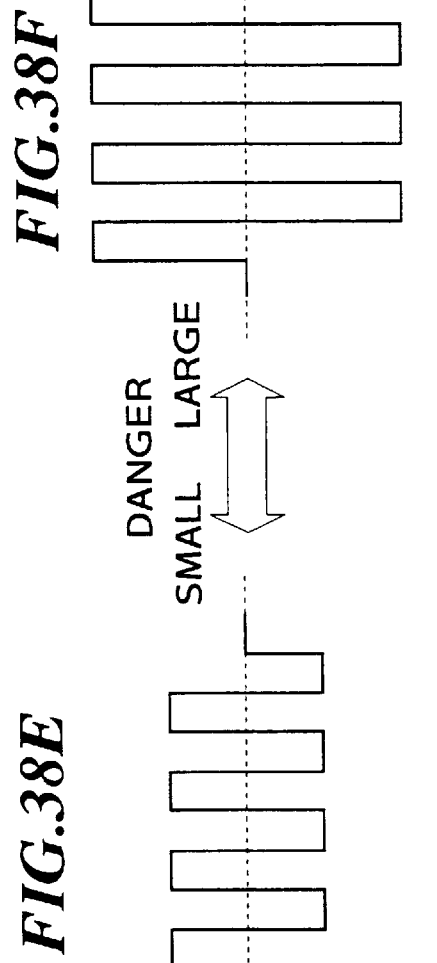

| ADDRESS | TERMINAL VOLTAGE V | ELECTRIC RETRACTOR CONTROL KIND |
|---------|--------------------|----------------------------------|
| FF00    | 0.500              | 0001                             |
| FF01    | 0.500              | 0001                             |
| FF02    | 0.501              | 0001                             |
| ⋮       | ⋮                  | ⋮                                |

AUTOMOTIVE PASSENGER RESTRAINT AND PROTECTION APPARATUS AND SEATBELT PROTRACTION AND RETRACTION AMOUNT-DETECTING DEVICE

CROSS-REFERENCE TO RELATED APPLICATION

The present invention is a continuation-in-part of U.S. application Ser. No. 09/207,908 filed on Dec. 9, 1998 now abandoned, for AUTOMOTIVE PASSENGER RESTRAINT AND PROTECTION APPARATUS AND SEATBELT PROTRACTION AND RETRACTION AMOUNT-DETECTING DEVICE. The disclosure of that application is specifically incorporated herein by reference.

BACKGROUND OF THE INVENTION

1. Field of the Invention

This invention relates to an automotive passenger restraint and protection apparatus for automotive vehicles such as automobiles, which uses an electric retractor for retracting and protracting a seatbelt for protection of an occupant (driver or passenger), and also relates to a seatbelt retraction and protraction amount-detecting device.

2. Prior Art

Conventional automotive passenger restraint and protection apparatuses are operable upon a large deceleration of the automotive vehicle such as a collision to restrain an occupant by means of a seatbelt to prevent him from being thrown out of his seat and hence protect him from danger.

The conventional automotive restraint and protection apparatuses include a type provided with a seatbelt retractor for retracting or winding a seatbelt. The seatbelt retractor is generally provided with bias force-imparting means such as a spiral spring which always biases a reel shaft (takeup shaft) on which the seatbelt is wound, in a retracting or winding direction. The seatbelt is wound up on the reel shaft due to the bias force given by the bias force-imparting means when it is not mounted on the occupant, and it is protracted or withdrawn against the bias force to fasten or restrain the occupant when it is mounted on the occupant.

The seatbelt retractor is provided with emergency locking means which is normally actuated upon a large deceleration of the vehicle as mentioned above, to impede rotation of the reel shaft in the seatbelt protracting direction, so as for the seatbelt to surely restrain and protect the occupant.

According to the conventional automotive passenger restraint and protection apparatus, however, to mount the seatbelt onto the occupant, he has to protract the seatbelt against the bias force of the bias force-imparting means, which requires the occupant to exert some force to protract the seatbelt. As a result, a weak occupant who has degraded physical ability such as an advanced-age occupant takes long to mount the seatbelt onto his body.

Further, there can be a case that the occupant feels uneasy while he wears the seatbelt since he feels a sense of oppression owing to the bias force of the bias force-imparting means.

Moreover, the conventional automotive passenger restraint and protection apparatus is not provided with means for warning the occupant of danger to be caused by a doze and a collision.

A further disadvantage with the conventional apparatus is that an alien substance can become attached to the seatbelt after a long term use, which causes an increased friction between the seatbelt and a through anchor associated therewith, leading to insufficient retraction of the seatbelt.

The conventional automotive passenger restraint and protection apparatus has another disadvantage that when the occupant has protracted the seatbelt without the intention of wearing the same, it can happen that the seatbelt cannot be retracted until a certain time period elapses. Thus, the seatbelt cannot be quickly retracted against the occupant's desire.

Further, in the conventional automotive passenger restraint and protection apparatus, in retracting the seatbelt into its extreme retracted position, if the occupant intentionally stops the seatbelt at a position apart from his body and then judges that the seatbelt has reached its extreme retracted position, the seatbelt can be set in position in an abnormally loosened state.

Further, in the conventional automotive passenger restraint and protection apparatus, when the occupant looks back for parking the vehicle while moving his body to protract the seatbelt, the seatbelt is wound back or retracted into the extreme re tracted position after the completion of protraction of the seatbelt, which gives a feeling of unnaturalness to the occupant.

Furthermore, when the occupant's-body is not in a proper position for driving the vehicle, that is, his body is not facing forwardly of the vehicle, the seatbelt can be wound up into the extreme retracted position, based upon which position the occupant is given a predetermined amount of looseness of the seatbelt, which can result in an inappropriate amount of looseness of the seatbelt being given to the occupant to make him feel uncomfortable.

In the conventional passenger restraint and protection apparatus, in the event that the seatbelt becomes locked when a motor for driving the seatbelt is rotated in the direction of the seatbelt being protracted, no force is acted upon the seatbelt to retract the same, so that the seatbelt is kept in the locked state, which can make it impossible to protract the seatbelt unless a condition is newly set for the seatbelt to be retracted.

The condition for the seatbelt to be retracted is set in the cases where the vehicle is suddenly braked, the seatbelt is taken off or disconnected from the occupant's body, and it is judged that the occupant's vehicle is about to collide with some object, by a collision prediction system, for example.

FIG. 83 is a timing chart showing another example of the relationship between driving forces of a reel shaft for retracting and protracting a seatbelt onto and from the reel shaft, an urging force which the occupant receives from the seatbelt, and the seatbelt retracting and protracting speeds of the reel shaft in the conventional automotive passenger restraint and protection apparatus.

First, when attaching of the seatbelt to the occupant's body is detected, retraction of the seatbelt onto the reel shaft is started by the reel shaft with a constant seatbelt retraction driving force, and this retraction is continued until the retraction of the seatbelt reaches its limit (time period t20). During this retraction, the urging force which the occupant receives from the seatbelt gradually increases while the retracting speed of the seatbelt onto the reel shaft gradually decreases.

Thereafter, when the retraction of the seatbelt has reached its limit (time point c), the retraction of the seatbelt by the reel shaft is stopped, and then protraction of the seatbelt can be effected due to a restitution force against the bias force of the spiral spring, etc., that is, a restitution force of the occupant's body and clothes urged by the seatbelt. During this protraction, the acceleration of protraction of the seatbelt from the reel shaft increases.

Since when the retraction of the seatbelt by the reel shaft reaches its limit after the attaching of the seatbelt and the retracting motion stops, however, the seatbelt is suddenly returned in the direction in which the urging force is weakened due to the restitution force of the occupant's body and clothes urged by the seatbelt, the acceleration of protraction of the seatbelt from the reel shaft suddenly increases and can exceed a threshold value required for locking the protracting motion of the seatbelt, so that the protracting motion of the seatbelt can be locked by a seatbelt locking mechanism. As a result, the urging force that the occupant receives from the seatbelt cannot be relieved after a time point when it assumes a large value (time point d) (time period t21).

An automotive passenger restraint and protection apparatus is also already known, which is provided with an airbag device for restraining an occupant through expansion of an airbag, a belt pretentioner for restraining the occupant by suddenly retracting a seatbelt, an airbag and pretensioner controller for controlling actuation time and expansion pressure of the airbag and actuation time and seatbelt-pulling force of the pretensioner, and a sensor for detecting negative acceleration acted upon the occupant upon a collision of the automotive vehicle.

When negative acceleration acted upon the occupant is detected by the sensor upon a collision of the automotive vehicle, a signal indicative of the negative acceleration from the sensor is-delivered to the airbag and pretensioner controller, which in turn controls the actuation time and expansion pressure of the airbag and actuation time and seatbelt-winding force of the pretensioner, whereby the airbag and the pretensioner are actuated.

In the known automotive passenger restraint and protection apparatus, however, the actuation time and expansion pressure of the airbag are controlled by the airbag and pretensioner controller upon a collision of the automotive vehicle, irrespective of the protracting speed of the seatbelt. Consequently, for example, when it is judged by the controller that the actuation times for actuating the airbag and the pretensioner should be set to longer values, the airbag and the pretensioner are actuated with the longer actuation times even in the event that the protracting speed of the seatbelt is so high that the occupant can collide against equipment within the compartment.

Further, when it is judged by the controller that the expansion pressure for actuating the airbag should be set to a higher value, the expansion pressure of the airbag cannot be changed according to the protracting speed of the airbag even in the event that the protracting speed of the seatbelt is so high and the occupant is restrained by the airbag expanded under such a higher expansion pressure that the occupant can directly receive a large impact applied to the vehicle.

Also, conventionally there is known a mechanism called "EA mechanism" (load limiter) which has a function of causing the reel shaft to rotate in the direction of protracting the seatbelt when a tension in excess of a prescribed value is applied to the seatbelt immediately after a collision of the automotive vehicle, so,as to control the tension to or below the prescribed value (hereinafter referred to as "the EA function"). The EA function is terminated when the seatbelt is protracted by a certain length after the EA function is made effective. That is, the EA function is carried out irrespective of the degree of magnitude of collision of the automotive vehicle. Consequently, in the event of a strong collision of the automotive vehicle, for example, the EA function can be terminated even at a time point when it is desired that the same function should be still exhibited, whereby a sudden impact can be applied to the occupant after termination of the EA function, which can result in insufficient effective absorption of an impact acted upon the occupant. On the other hand, in the event of a weak collision of the automotive vehicle, a tensile strength in excess of the prescribed value is not applied to the seatbelt, so that the EA function is not made effective, whereby impact absorption cannot be obtained.

Fault diagnosis of the seatbelt locking mechanism has conventionally been carried out through a determination by the occupant or the like as to whether the seatbelt can be actually retracted and protracted, or as to whether the seatbelt can be locked in position by suddenly protracting the same.

This manner of fault diagnosis, however, cannot always achieve accurate fault determination of the seatbelt locking mechanism.

Further, in the conventional automotive passenger restraint and protection apparatus, when the occupant with the seatbelt not mounted on his body pulls out the seatbelt without the intention of attaching the same to his body, immediately then gets off the vehicle and closes the door, the seatbelt is not retracted within a short time period, so that the seatbelt can be caught in the door to be damaged. Also, when during parking of the automotive vehicle, the seatbelt is pulled out and attached to a baggage or the like (into the mounted state of the seatbelt) and then, in this state the door is closed, the seatbelt can be also caught in the door if the seatbelt is then unnecessarily loosened.

An automotive passenger restraint and protection apparatus is also already known, which detects a possibility of collision of the automotive vehicle based upon the distance between the occupant's vehicle and a preceding vehicle, and gives an alarm to alert the occupant to the danger of collision based upon the detection result, so as to prevent a traffic accident.

An example of the apparatus having such a warning function is disclosed by Japanese Laid-Open Utility Model Publication (Kokai) No. 6-71333, which is adapted to intermittently increase or decrease the fastening force of the seatbelt when it is detected that the distance between vehicles becomes shorter than a predetermined safety distance.

In the known automotive passenger restraint and protection apparatus, however, the control of intermittent increase or decrease of the fastening force is carried out in a monotonous manner irrespective of the degree of possibility of expected danger so long as the distance between vehicles is less than the safety distance. Consequently, when the degree of possibility of expected danger is low, the above control can be annoying to the occupant, whereas when the degree is high, the same control is insufficient and unsatisfactory to him. Thus, the above control is not fully effective to warn the occupant of expected danger.

There is also conventionally known an automotive vehicle having a function of storing, upon a collision of the automotive vehicle, the value of acceleration caused by the collision and the collision speed, in order to utilize the stored data in clearing up the cause of the accident, for example.

In the known automotive vehicle, however, it is the value of acceleration caused by the collision and the collision speed that are stored, but not information (parameters)

related to the automotive passenger restraint and protection apparatus. Therefore, it is not easy to judge whether the automotive passenger restraint and protection apparatus properly operated upon the collision, and how the occupant behaved just before and/or after the collision, for example.

An automotive passenger restraint and protection apparatus is also known, which is provided with an electric retractor which rotates a reel shaft by means of a driving force of an electric motor to protract and retract a seatbelt.

An example of the automotive passenger restraint and protection apparatus provided with such an electric retractor is disclosed by Japanese Laid-Open Patent Publication (Kokai) No. 59-45240, which is adapted to control the driving of the electric motor based upon an output from a displacement detecting device which detects displacement of the seatbelt in retracting and protracting directions as well as an output from an attaching detecting device which detects attaching of the seatbelt to the occupant's body.

The electric retractor, however, requires the displacement detecting device which is expensive, and therefore has an increased manufacturing cost and a complicated construction.

Further, the rotation control of the electric motor of the electric retractor is carried out by applying constant voltage of negative and positive signs to the motor to cause normal rotation and reverse rotation of the motor, as disclosed by Japanese Laid-Open Utility Model. Publication (Kokai) No. 61-134464.

According to the known electric retractor, however, since the motor is rotated in the normal direction or in the reverse direction depending upon the application of the constant voltage, there is a possibility that in retracting the seatbelt, the seatbelt is suddenly wound up by the motor so that a tongue of the seatbelt hits against a side window pane.

Another electric retractor is disclosed by Japanese Laid-Open Patent Publication (Kokoku) No. 3-79212, in which a retracting force is stored in a return spring (second retracting force generating device) utilizing the protracting motion of the seatbelt, and when the motor output drops below a predetermined value such that the motor cannot retract the seatbelt, for example, due to failure of an electrical system for driving the motor (first retracting force generating device), or a drop in the motor torque due to a drop in the electromotive force of a battery installed in the automotive vehicle, a rotative force transmission device transmits the retracting force stored in the return spring to a takeup shaft of the seatbelt. This assures retraction of the seatbelt even when the seatbelt cannot be wound up by the motor.

According to this retractor, however, the motor (first retracting force generating device) or the return spring (second retracting force generating device) is selected to retract the seatbelt by the rotative force transmission device, that is, the two devices are not simultaneously used for retraction of the seatbelt. which requires designing each of the motor and the return spring so as to produce a strong retracting force by itself.

Besides, in the retractor, if the retracting force of the motor becomes weakened due to aging change, etc. so that the motor cannot fully retract the seatbelt, the motor is switched to the return spring for retracting the seatbelt. However, in fact the retracting force of the motor is merely weakened but not reduced to zero. Therefore, if the motor is switched to the return spring for retracting the seatbelt, the retracting force remaining in the motor cannot be fully utilized.

An automotive passenger restraint and protection apparatus is also known from Japanese Laid-Open Patent Publication (Kokai) No. 9-82171, which turns on or off a switch for detecting an amount of retraction of a seatbelt on a reel shaft, depending upon the thickness of a portion of the seatbelt wound on the reel shaft, to thereby detect an amount of protracting of the seatbelt or the amount of retraction of the same, to use the detected value in controlling an electric circuit for warning the occupant of failure to fasten the seatbelt or in controlling a seatbelt locking mechanism provided in a seatbelt retractor.

In the seatbelt retraction detecting switch, however, since the amount of protraction or amount of retraction of the seatbelt is detected by turning-on or turning-off of the seatbelt retraction amount detecting switch, only information as to whether the seatbelt has been wound up or pulled out by a predetermined amount or more can be obtained, and a specific value of the protracting amount or retraction amount cannot be obtained.

SUMMARY OF THE INVENTION

It is a first object of the invention to provide an automotive passenger restraint and protection apparatus which is capable of providing a comfortable seatbelt attaching environment.

A second object of the invention is to provide an automotive passenger restraint and protection apparatus which permits slow retraction of a seatbelt.

A third object of the invention is to provide an automotive passenger restraint and protection apparatus which is capable of performing accurate fault diagnosis of seatbelt locking means.

A fourth object of the invention is to provide an automotive passenger restraint and protection apparatus which is capable of protecting an occupant in a more reliable manner than in the conventional passenger restraint and protection apparatuses.

A fifth object of the invention is to provide an automotive passenger restraint and protection apparatus which is capable of preventing damage to the seat belt.

A sixth an automotive passenger restraint and protection apparatus which is capable of avoiding occurrence of a fault due to retraction of the seatbelt.

A seventh object of the invention is to provide an automotive passenger restraint and protection apparatus which is capable of giving warning to the occupant in a manner dependent upon the degree of expected danger to thereby fully alert him to the danger.

An eighth object of the invention is to provide an automotive passenger restraint and protection apparatus which is capable of accurately determining the operative state of the apparatus, the state of the occupant, and others upon a collision of the automotive vehicle.

A ninth object of the invention is to provide an automotive passenger restraint and protection apparatus which can be manufactured at reduced costs and can be simplified in construction.

A tenth object of the invention is to provide an automotive passenger restraint and protection apparatus which is capable of quickly and accurately controlling an electric motor for driving the seatbelt.

An eleventh object of the invention is to provide an automotive passenger restraint and protection apparatus which is capable of accurately determining the stoppage of driving of the electric motor irrespective of environmental conditions under which the motor is operated.

A twelfth object of the invention is to provide an automotive passenger restraint and protection apparatus which is capable of accurately determining shifting of the driving force of the electric motor from a present state to a state in which the driving force is progressively decreased.

A thirteenth object of the invention is to provide an automotive passenger restraint and protection apparatus which is capable of fully utilizing the driving force for retraction of the seatbelt.

A fourteenth object of the invention is to provide an automotive passenger restraint and protection apparatus which is capable of accurately performing fault diagnosis of driving means for the seatbelt.

A fifteenth object of the invention is to provide a seatbelt protraction and retraction amount-detecting device which is capable of detecting the amount of protraction and amount of retraction of the seatbelt in a simple manner and with high accuracy.

To attain the first object, according to a first aspect of the present invention, there is provided an automotive passenger restraint and protection apparatus for an automotive vehicle, having a seatbelt, for restraining an occupant of the automotive vehicle by the seatbelt to protect the occupant, comprising an electric retractor having driving means for retracting and, protracting the seatbelt, control means for controlling the driving means, and detecting means for detecting protraction of the seatbelt by the occupant, wherein when the protraction of the seatbelt is detected by the detecting means, the control means controls the driving means so as to protract the seatbelt.

With the arrangement according to the first aspect, when protraction of the seatbelt is detected by the protraction detecting means, the driving means is controlled to protract the seatbelt. As a result, a large force as required in the conventional automotive passenger restraint and protection apparatus is not required for protracting the seatbelt, and therefore even a weak occupant who has degraded physical ability such as an advanced-age occupant can easily mount the seatbelt onto his body.

To attain the second object, according to a second aspect of the invention, the automotive passenger restraint and protection apparatus according to the first aspect includes a power supply, and supply means for supplying supply voltage from the power supply to the driving means, and the control means controls driving operation of the driving means by controlling magnitude of,the supply voltage or degree of modulation of pulse width thereof.

With the arrangement. according to the second aspect, the magnitude of the supply voltage supplied to the driving means or the degree of modulation of pulse width thereof is controlled to control the driving operation of the driving means. As a result, the seatbelt can be slowly retracted, and therefore it is possible to eliminate the disadvantage with the conventional apparatus that since supply voltage of a predetermined value continues to be applied to the driving means, in storing the seatbelt, the seatbelt is suddenly retracted by the driving means, which can result in that the seatbelt tongue is hit against the side window pane.

To attain the first object, according to a third aspect of the invention, the automotive passenger restraint and protection apparatus according to the first aspect includes seatbelt locking means for locking the seatbelt from being protracted when the seatbelt is protracted at a predetermined or high degree of acceleration, and the control means controls the driving means to thereby control speed of protraction or retraction of the seatbelt at least one of conditions is satisfied that the driving means stops retracting driving of the seatbelt, the driving means starts protracting driving of the seatbelt from a stopped state of the seatbelt, and the driving means shifts from the retracting driving of the seatbelt to protracting driving of the seatbelt.

With the arrangement according to the third aspect, the speed of protraction or retraction of the seatbelt is controlled when the protraction or retraction of the seatbelt is carried out by the driving means. As a result, the seatbelt can never be locked during protraction, and therefore the occupant can be released from a state where he receives a large force of oppression, providing a comfortable seatbelt attaching environment.

To attain the first and fourth objects, according to a fourth aspect of the invention, the automotive passenger restraint and protection apparatus according to the first aspect includes seatbelt locking means for locking the seatbelt from being protracted when the seatbelt is protracted at a predetermined or high degree of acceleration, and wherein when the seatbelt is locked from being protected by the seatbelt locking means, the control means controls the driving means to retract the seatbelt to a limit thereof and then protract the seatbelt for a predetermined time period.

With the arrangement according to the fourth aspect, when the seatbelt is locked from being protected, the driving means is controlled to retract the seatbelt to a limit thereof and then protract the seatbelt for a predetermined time period. As a result, the seatbelt can be given a predetermined amount of looseness without fail, whereby a comfortable seatbelt attaching environment is provided.

To attain the first and fourth objects, according to a fifth aspect of the invention, in the automotive passenger restraint and protection apparatus according to the fourth aspect, when the seatbelt has been retracted to the limit thereof by the driving means, the control means controls the driving means to protract the seatbelt by a first predetermined amount and then again retract the seatbelt by a second predetermined amount smaller than the first predetermined amount.

With the arrangement according to the fifth aspect, after protraction of the seatbelt which is a condition for locking of the seatbelt, the seatbelt is retracted. As a result, the locking of the seatbelt is released without fail. Further, a predetermined amount of looseness corresponding to the difference between the first and second predetermined amounts is given to the seatbelt or the occupant, whereby a comfortable seatbelt attaching environment is provided and the occupant can be properly protected.

To attain the third object, according to a sixth aspect of the invention, the automotive passenger restraint and protection apparatus according to the fourth aspect includes acceleration detecting means for detecting acceleration of protraction of the seatbelt when the seatbelt is protracted, and abnormality diagnosis means for carrying out diagnosis as to abnormality of the seatbelt locking means by making a determination as to whether the seatbelt locking means has operated in response to the acceleration detected by the acceleration detecting means, and determining abnormality of the seatbelt locking means, based upon results of the determination.

With the arrangement according to the sixth aspect, abnormality of the seatbelt locking means can be determined with accuracy.

To attain the first object, according to a seventh aspect of the invention, there is provided an automotive passenger restraint and protection apparatus for an automotive vehicle, having a seatbelt, for restraining an occupant of the automotive vehicle by the seatbelt to protect the occupant, comprising an electric retractor having driving means for retracting and protracting the seatbelt control means for controlling the driving means, seatbelt attaching detecting means for detecting whether the seatbelt is attached to the occupant or disconnected from the occupant, and retraction limit detecting means for detecting whether the seatbelt has been retracted to a limit thereof, wherein the control means controls the driving means in a manner such that when the seatbelt attaching detecting means detects that the seatbelt has become attached to the occupant from a state in which it is disconnected from the occupant, the seatbelt is retracted, and when the retraction limit detecting means subsequently detects that the seatbelt has been retracted to the limit thereof, the seatbelt is stopped from being retracted, and then the seatbelt is protracted for a predetermined time period.

According to the seventh aspect. when the limit of retraction of the seatbelt has been detected, the retraction of the seatbelt is stopped from being retracted by the driving means, and then the seatbelt is protracted for a predetermined time period by the driving means. As a result, the seatbelt is give a predetermined amount of looseness without fail, eliminating the disadvantage with the conventional automotive passenger restraint and protection apparatus that the occupant is given a feeling of oppression by the seatbelt mounted on his body and feels uncomfortable, whereby a comfortable seatbelt attaching environment is provided.

To attain the fifth object, according to an eight aspect of the invention, there is provided an automotive passenger restraint and protection apparatus for an automotive vehicle, having a seatbelt, for restraining an occupant of the automotive vehicle by the seatbelt to protect the occupant, comprising an electric retractor having driving means for retracting and protracting the seatbelt, control means for controlling the driving means, seatbelt attaching detecting means for detecting whether the seatbelt is attached to the occupant or disconnected from the occupant, retraction limit detecting means for detecting whether the seatbelt has been retracted to a limit thereof, wherein the control means controls the driving means in a manner such that when the seatbelt attaching detecting means detects that the seatbelt has become attached to the occupant from a state in which it is disconnected from the occupant, the seatbelt is retracted, and when the retraction limit detecting means subsequently detects that the seatbelt has been retracted to the limit thereof, the seatbelt is stopped from being retracted.

With the arrangement according to the eighth aspect, after the attaching of the seatbelt is released, the seatbelt is retracted without fail, it can be prevented that the tongue of the seatbelt is caught in the door.

To attain the fourth object, according to a ninth aspect of the invention, there is provided an automotive passenger restraint and protection apparatus for an automotive vehicle, having a seatbelt, for restraining an occupant of the automotive vehicle by the seatbelt to protect the occupant, comprising, an electric retractor having driving means for retracting and protracting the seatbelt, control means for controlling the driving means, seatbelt protraction detecting means for detecting protraction of the seatbelt by the occupant, seatbelt attaching detecting means for detecting attaching of the seatbelt to the occupant or disconnection of the seatbelt from the occupant, bias force-imparting means for imparting a bias force to the seatbelt in a retracting direction, seatbelt retraction detecting means for detecting retraction of the seatbelt by the bias force-imparting means, and retraction limit detecting means for detecting whether the seatbelt has been retracted to a limit thereof, wherein the control means controls the driving means in a manner such that when said seatbelt protraction means detects the protraction of the seatbelt by the occupant after the seatbelt attaching detecting means detects the attaching of the seatbelt to the occupant, the seatbelt is protracted, when the seatbelt retraction detecting means subsequently detects the retraction of the seatbelt by the bias force-imparting means, the seatbelt is retracted, and when the retraction limit detecting means detects that the seatbelt has been retracted to the limit thereof, the seatbelt is stopped from being retracted and then protracted for a predetermined time period.

With the arrangement according to the ninth aspect, even when the occupant moves after attaching the seatbelt to his body to protract the seatbelt, the seatbelt is given a predetermined amount of looseness without fail, whereby a comfortable seatbelt attaching environment is provided and the occupant can be properly protected.

To attain the fourth object, according to a tenth aspect of the invention, there is provided an automotive passenger restraint and protection apparatus for an automotive vehicle, having a seatbelt, for restraining an occupant of the automotive vehicle by the seatbelt to protect the occupant, comprising an electric retractor having driving means for retracting and protracting the seatbelt, control means for controlling the driving means, seatbelt protraction detecting means for detecting protraction of the seatbelt; and seatbelt attaching detecting means for detecting whether the seatbelt is attached to the occupant or disconnected from the occupant, wherein the control means controls the driving means in a manner such that when the seatbelt attaching detecting means detects that the seatbelt has become attached to the occupant from a state in which it is disconnected from the occupant or the seatbelt is held attached to the occupant, and then the seatbelt protraction detecting means detects the protraction of the seatbelt, followed by the seatbelt becoming possible to retract, the seatbelt is retracted to a limit thereof and then protracted for a first predetermined time period, and then, after lapse of a second predetermined time period, the seatbelt is retracted to the limit thereof, the protraction of the seatbelt for the first predetermined time period and the retraction and protraction after the lapse of the second predetermined time period being carried out at least one time.

With the arrangement according to the tenth aspect, an extra amount of looseness of the seatbelt is removed and an appropriate amount of looseness is given to the occupant. Then, even if the seatbelt is protracted by movement of the occupant during the subsequent second time period, an extra amount of looseness of the seatbelt is removed at least one time so as to given an appropriate amount of looseness to the occupant. As a result, the occupant is given an appropriate amount of looseness and can also be properly protected.

To attain the sixth object, according to an eleventh aspect of the invention, there is provided an automotive passenger restraint and protection apparatus for an automotive vehicle, having a seatbelt, for restraining an occupant of the automotive vehicle by the seatbelt to protect the occupant, comprising an electric retractor having driving means for retracting and protracting the seatbelt, control means for controlling the driving means, and retraction failure detecting means for detecting retraction failure of the seatbelt, wherein the control means controls the driving means to stop retracting the seatbelt when the retraction failure detecting means detects the retraction failure of the seatbelt.

With the arrangement according to the eleventh aspect, when retraction failure of the seatbelt is detected, the driving means is controlled to stop retracting the seatbelt. As a result, the occurrence of a fault due to the retraction of the seatbelt can be prevented.

To attain the fourth object, according to a twelfth aspect of the invention, there is provided an automotive passenger restraint and protection apparatus for an automotive vehicle, having a seatbelt, for restraining an occupant of the automotive vehicle by the seatbelt to protect the occupant, comprising an electric retractor having driving means for retracting and protracting the seatbelt, control means for controlling the driving means, and doze indication detecting means for detecting an indication of doze of the occupant during driving of the automotive vehicle, wherein the control means controls the driving means to carry out alternately retraction and protraction of the seatbelt for a predetermined time period when the doze indication detecting means detects the indication of doze of the occupant during driving of the automotive vehicle.

With the arrangement according to the twelfth aspect, when an indication of doze of the occupant during driving of the automotive vehicle is detected, the driving means is controlled to carry out alternately retraction and protraction of the seatbelt for a predetermined time period to warn the occupant. As a result, the occupant can be warned of danger of doze while driving the automotive vehicle and therefore can be surely protected.

To attain the fourth object, according to a thirteenth aspect of the invention, there is provided an automotive passenger restraint and protection apparatus for an automotive vehicle, having a seatbelt, for restraining an occupant of the automotive vehicle by the seatbelt to protect the occupant, comprising an electric retractor having driving means for retracting and protracting the seatbelt, control means for controlling the driving means, and rough road traveling notifying means for notifying the control means of traveling of the automotive vehicle on a rough road, wherein the control means is responsive to notifying from the rough road traveling notifying means of traveling of the automotive vehicle on the rough road, for controlling the driving means to retract the seatbelt.

With the arrangement according to the thirteenth aspect, when the rough road traveling notifying means notifies that the automotive vehicle is traveling on a rough road, the driving means is controlled to retract the seatbelt. As a result, the occupant can be positively protected even during traveling of the automotive vehicle on a rough road.

To attain the fourth object, according to a fourteenth aspect of the invention, there is provided an automotive passenger restraint and protection apparatus for an automotive vehicle, having a seatbelt, for restraining an occupant of the automotive vehicle by the seatbelt to protect the occupant, comprising an electric retractor having driving means for retracting and protracting the seatbelt, control means for controlling the driving means, and doze prevention commanding means for commanding the control means to prevent dozing of the occupant during driving the automotive vehicle, wherein the control means is responsive to commanding from the doze prevention commanding means to prevent dozing of the occupant during driving of the automotive vehicle, for controlling the driving means to carry out alternately retraction and protraction of the seatbelt at irregular time intervals.

With the arrangement according to the fourteenth aspect, when a command is issued from the doze prevention commanding means to prevent dozing of the occupant during driving the automotive vehicle, the driving means is controlled to carry out alternately retraction and protraction of the seatbelt at irregular time intervals. As a result, the occupant can be prevented from dozing while driving the automotive vehicle and therefore can be surely protected.

To attain the first object, according to a fifteenth aspect of the invention, there is provided an automotive passenger restraint and protection apparatus for an automotive vehicle, having a seatbelt, for restraining an occupant of the automotive vehicle by the seatbelt to protect the occupant, comprising an electric retractor having driving means for retracting and protracting the seatbelt, control means for controlling the driving means, seatbelt attaching detecting means for detecting attaching of the seatbelt to the occupant or disconnection of the seatbelt from the occupant, and protraction stoppage detecting means for detecting stoppage of protraction of the seatbelt, wherein when the protraction stoppage detecting means detects the stoppage of protraction of the seatbelt, the control means causes the seatbelt attaching detecting means to repeatedly carry out detection of attaching of the seatbelt to the occupant or disconnection of the seatbelt from the occupant, causes the protraction stoppage detecting means to repeatedly carry out detection of stoppage of protraction of the seatbelt, and when the stoppage of protraction of the seatbelt is detected by the protraction stoppage detecting means while the attaching of the seatbelt to the occupant is not detected by the seatbelt attaching detecting means, the control means controls the driving means to retract the seatbelt.

With the arrangement according to the fifteenth aspect, when the occupant has protracted the seatbelt without the intention of attaching it to his body, the seatbelt can be quickly retracted, whereby a comfortable seatbelt attaching environment is provided.

To attain the fourth object, according to a sixteenth aspect of the invention, the automotive passenger restraint and protection apparatus according to the fifteenth aspect includes vehicle speed detecting means for detecting traveling speed of the automotive vehicle, and wherein the control means inhibits the driving means from retracting the seatbelt if the traveling speed of the automotive vehicle detected by the vehicle speed detecting means is lower than a predetermined value when the stoppage of protraction of the seatbelt is detected by the protraction stoppage detecting means after the attaching of the seatbelt to the occupant is detected by the seatbelt attaching detecting means.

With the arrangement according to the sixteenth aspect, when the occupant is slowing reversing the automotive vehicle for parking, the seatbelt is inhibited from being retracted. As a result, it can be prevented that the seatbelt is retracted to the limit while the occupant is looking backward, to thereby properly restrain the occupant to protect him. Further, when protraction of the seatbelt has been carried out due to movement of the occupant with the seatbelt mounted on his body, which takes place, for example, when the occupant once stops the vehicle and then slouches to look right and left ways for safety, retraction of the seatbelt is inhibited. As a result, it is possible to prevent the occupant from being given a feeling of unnaturalness while looking right and left ways for safety to thereby assure the safety ascertainment.

To attain the fifth object, according to a seventeenth aspect of the invention, there is provided an automotive passenger restraint and protection apparatus for an automotive vehicle having doors, and a seatbelt, for restraining an occupant of the automotive vehicle by the seatbelt to protect the occupant, comprising an electric retractor having driving means for retracting and protracting the seatbelt, control means for controlling the driving means, and door opening/closing detecting means for detecting opening and closing of a predetermined one of the doors, wherein when the door opening/closing means detects the opening of the predetermined one of the doors, the control means controls the driving means to carry out retraction of the seatbelt at a higher speed than when the door opening/closing means detects the closing of the predetermined one of the doors.

With the arrangement according to the seventeenth aspect, when it is detected that the door is open, the driving means is controlled to carry out retraction of the seatbelt at a higher speed than when the door is closed. As a result, it is possible to prevent the seatbelt from being caught in the door.

To attain the first object, according to an eighteenth aspect of the invention, the automotive passenger restraint and protection apparatus according to the seventeenth aspect includes vehicle reverse detecting means for detecting a reverse of the automotive vehicle, and seatbelt attaching detecting means for detecting attaching of the seatbelt to the occupant or disconnection of the seatbelt from the occupant, and wherein the control means inhibits the driving means from retracting the seatbelt when the attaching of the seatbelt to the occupant is detected by the seatbelt attaching detecting means, the opening of the predetermined one of the doors is detected by the door opening/closing detecting means and at the same time the reverse of the automotive vehicle is detected by the vehicle reverse detecting means.

With the arrangement according to the eighteenth aspect, when it is detected that the seatbelt is attached to the occupant, the door is open, and at the same time the automotive vehicle is reversing, the driving means is controlled to inhibit retraction of the seatbelt. As a result, the seatbelt is not retracted when the occupant is reversing the automotive vehicle for parking with the door being open, thereby preventing the occupant from being given a feeling of unnaturalness, and providing a comfortable seatbelt attaching environment.

To attain the fourth object, according to a nineteenth aspect of the invention, there is provided an automotive passenger restraint and protection apparatus for an automotive vehicle, having a seatbelt, for restraining an occupant of the automotive vehicle by the seatbelt to protect the occupant, comprising an electric retractor having driving means for retracting and protracting the seatbelt, control means for controlling the driving means, collision danger detecting means for detecting danger of collision of the automotive vehicle, wherein the control means controls the driving means to carry out alternately retraction and protraction of the seatbelt for a predetermined time period, based upon results of detection of the danger of collision by the collision danger detecting means when the collision danger detecting means detects the danger of collision of the automotive vehicle.

With the arrangement according to the nineteenth aspect, when danger of collision of the automotive vehicle is detected, the driving means is controlled to carry out alternately retraction and protraction of the seatbelt for a predetermined time period, based upon results of detection by the collision danger detecting means. As a result, the occupant can be given a warning of danger of collision of the automotive vehicle and hence can be positively protected in the event of a collision of the automotive vehicle.

To attain the seventh object, according to a twentieth aspect of the invention, in the automotive passenger restraint and protection apparatus according to the nineteenth aspect, the control means controls a force of the driving means for retracting the seatbelt and a force of the driving means for protracting the seatbelt by controlling the driving means based upon the results of detection of the danger of collision by the collision danger detecting means.

With the arrangement according to the twentieth aspect, the seatbelt retracting force and the seatbelt protracting force are controlled based upon the results of detection of the danger of collision by the collision danger detecting means. As a result, the occupant can be given a warning in a manner dependent upon the degree of danger and can therefore be fully alerted to the danger of collision.

To attain the seventh object, according to a twenty-first aspect of the invention, in the automotive passenger restraint and protection apparatus according to the nineteenth aspect, the control means controls a period of retraction of the seatbelt by the driving means and a period of protraction of the seatbelt by the driving means by controlling the driving means based upon the results of detection of the danger of collision by the collision danger detecting means.

With the arrangement according to the twenty-first aspect, the period of retraction and period of protraction by the driving means are controlled based upon the results of detection of the danger of collision by the collision danger detecting means. As a result, the occupant can be given a warning in a manner dependent upon the degree of danger and can therefore be fully alerted to the danger of collision.

To attain the eighth object, according to a twenty-second aspect of the invention, the automotive passenger restraint and protection apparatus according to the nineteenth aspect includes storage means for storing a state of use of the seatbelt, and wherein the control means stores at least one of the state of use of the seatbelt before a collision of the automotive vehicle and the state of use of the seatbelt after the collision of the automotive vehicle, when the collision danger detecting means detects the danger of collision of the automotive vehicle.

With the arrangement according to the twenty-second aspect, when danger of collision of the automotive vehicle is detected, a state of use of the seatbelt before and/or after a collision of the automotive vehicle is stored in the storage means. As a result, by reading out contents stored in the storage means after a collision of the automotive vehicle, it is possible to accurately determinate the operative state of the automotive passenger restraint and protection apparatus and the occupant state in the event of a collision of the vehicle or a like accident, for use of the same in investigating the cause of the accident.

Preferably, the automotive passenger restraint and protection apparatus according to the according to the twenty-second aspect includes a power supply, and auxiliary power supply means for supplying power from the power supply to the control means for a predetermined time period after a collision of the automotive vehicle, and wherein the storage means comprises a non-volatile ROM.

With this arrangement, in addition to the possibility of accurate determination of the operative state of the automotive passenger restraint and protection apparatus and the occupant state in the event of a collision of the vehicle or a like accident, power from the power supply can be supplied to the control means even after a collision of the automotive vehicle, whereby the operative state of the automotive passenger restraint and protection apparatus and the occupant state in the event of a collision of the vehicle or a like accident can be stored for use in investigating the cause of the accident.

To attain the fourth object, according to a twenty-third aspect of the invention, there is provided an automotive passenger restraint and protection apparatus for an automotive vehicle having an airbag, the apparatus having a seatbelt, for restraining an occupant of the automotive vehicle by the seatbelt to protect the occupant, comprising an electric retractor having seatbelt driving means for retracting and protracting the seatbelt, airbag driving means for causing expansion of the airbag to restrain the occupant, a pretensioner for rapidly retracting the seatbelt to restrain the occupant, speed detecting means for detecting a speed of protraction of the seatbelt, and control means for controlling at least one of actuation time or expansion pressure of the airbag by the airbag driving means, actuation time of the pretensioner, a force of the pretensioner for retracting the seatbelt, and a force of the seatbelt driving means for retracting the seatbelt, based upon the speed of protraction of the seatbelt detected by the speed detecting means.

With the arrangement according to the twenty-third aspect, at least one of the actuation time or expansion pressure of the airbag by the airbag driving means, the actuation time of the pretensioner, the force of the pretensioner for retracting the seatbelt, the force of the pretensioner for retracting the seatbelt, and the force of the seatbelt driving means for retracting the seatbelt is controlled based upon the speed of protraction of the seatbelt detected by the speed detecting means. As a result, the occupant can be properly protected upon a collision of the automotive vehicle.

Preferably, in the automotive passenger restraint and protection apparatus according to the twenty-third aspect, the control means controls the airbag driving means to shorten the actuation time of the airbag when the speed of protraction of the seatbelt detected by the speed detecting means is higher than a predetermined value, and prolong the actuation time of the airbag when the detected speed of protraction of the seatbelt is lower than the predetermined value.

With this arrangement, when the detected speed of protraction of the seatbelt is higher than a predetermined value, the actuation time of the airbag is shortened, while when the detected speed of protraction of the seatbelt is lower than the predetermined value, the actuation time of the airbag is prolonged. Therefore, when the protracting speed of the seatbelt is high such as upon a strong collision of the automotive vehicle, the actuation time of the airbag is set to a relatively short value such that the airbag quickly operates, while when the protracting speed of the seatbelt is low such as upon a weak collision of the automotive vehicle, the actuation time of the airbag is set to a relatively long value such that the airbag slowly operates. As a result, the occupant can be properly protected in the event of a collision of the automotive vehicle.

Also preferably, in the automotive passenger restraint and protection apparatus according to the twenty-third aspect, the control means controls the airbag driving means to decrease the expansion pressure of the airbag when the speed of protraction of the seatbelt detected by the speed detecting means is higher than a predetermined value, and increase the expansion pressure of the airbag when the detected speed of protraction of the seatbelt is lower than the predetermined value.

With this arrangement, when the protracting speed of the seatbelt is higher than a predetermined, the expansion pressure of the airbag is set to a relatively small value so as to reduce impact applied to the occupant, to thereby more properly protect the occupant in the event of a strong collision of the automotive vehicle. On the other hand, when the protracting speed of the seatbelt is lower than the predetermined value, the expansion pressure of the airbag is set to a relatively large value, i.e. a moderate expansion pressure to thereby more properly protect the occupant in the event of a weak collision of the automotive vehicle.

Preferably, in the automotive passenger restraint and protection apparatus according to the twenty-third aspect, the control means controls the pretensioner to shorten the actuation time of the pretensioner when the speed of protraction of the seatbelt detected by the speed detecting means is higher than a predetermined value, and prolong the actuation time of the pretensioner when the detected speed of protraction of the seatbelt is lower than the predetermined value.

With this arrangement, when the protracting speed of the seatbelt is higher than a predetermined value, the actuation time of the pretensioner is set to a relatively short value so as to quickly actuate the pretensioner, to thereby more properly protect the occupant in the event of a strong collision of the automotive vehicle. On the other hand, when the protracting speed of the seatbelt is lower than the predetermined value, the actuation time of the pretensioner is set to a relatively long value so as to slowly actuate the pretensioner, to thereby more properly protect the occupant in the event of a weak collision of the automotive vehicle.

Also preferably, in the automotive passenger restraint and protection apparatus according to the twenty-third aspect, the control means controls the pretensioner to decrease the force of the pretensioner for retracting the seatbelt when the speed of protraction of the seatbelt detected by the speed detecting means is higher than a predetermined value, and increase the force of the pretensioner for retracting the seatbelt when the detected speed of protraction of the seatbelt is lower than the predetermined value.

With this arrangement, when the protracting speed of the seatbelt is higher than the predetermined value, the seatbelt retracting force of the pretensioner is set to a relatively small value so as to reduce impact applied to the occupant, to thereby more properly protect the occupant in the event of a strong collision of the automotive vehicle. On the other hand, when the protracting speed of the seatbelt is lower than the predetermined value, the seatbelt retracting force of the pretensioner is set to a relatively large value so as to apply an appropriate magnitude of impart to the occupant, to thereby more properly protect the occupant in the event of a weak collision of the automotive vehicle.

Preferably, in the automotive passenger restraint and protection apparatus according to the twenty-third aspect, the control means controls the seatbelt driving means to increase the force of the seatbelt driving means for retracting the seatbelt when the speed of protraction of the seatbelt detected by the speed detecting means is higher than a predetermined value, and decrease the force of the seatbelt driving means for retracting the seatbelt when the detected speed of protraction of the seatbelt is lower than the predetermined value.

With this arrangement, when the protracting speed of the seatbelt is higher than the predetermined value, the force of the electric retractor for retracting the seatbelt is set to a relatively large value such that protraction of the seatbelt requires a relatively large force, while when the protracting speed of the seatbelt is lower than the predetermined value, the force of the electric retractor for retracting the seatbelt is set to a relatively small value such that protraction of the seatbelt requires a relatively small force. Thus, the protraction of the seatbelt is controlled so as to absorb impact applied to the occupant in the event of a collision of the automotive vehicle.

To attain the ninth object, according to a twenty-fourth aspect of the invention, there is provided an automotive passenger restraint and protection apparatus for an automotive vehicle, having a seatbelt, for restraining an occupant of the automotive vehicle by the seatbelt to protect the occupant, comprising a reel shaft having the seatbelt wound thereon, a motor for rotating the reel shaft in a direction of protracting or retracting the seatbelt, change amount detecting means for detecting an amount of change in at least one of terminal voltage across the motor and current flowing to the motor, seatbelt attaching detecting means for detecting attaching of the seatbelt to the occupant or disconnection of the seatbelt from the occupant, and control means for controlling the motor, based upon results of detections by the change amount detecting means and the seatbelt attaching detecting means.

With the arrangement according to the twenty-fourth aspect, the motor is controlled based upon results of detections of an amount of change in at least one of terminal voltage across the motor and current flowing to the motor and attaching or disconnection of the seatbelt to or from the occupant. As a result, an expensive displacement detecting device is not required for controlling the motor, and therefore, the present apparatus can be manufactured at a reduced cost and simplified in construction.

To attain the tenth object, according to a twenty-fifth aspect of the invention, there is provided an automotive passenger restraint and protection apparatus for an automotive vehicle, having a seatbelt, for restraining an occupant of the automotive vehicle by the seatbelt to protect the occupant, comprising PWM signal generating means for generating a PWM signal, a motor for retracting and protracting the seatbelt, the motor having operation thereof controlled by the PWM signal generated by the PWM signal generating means, and determining means for detecting at least one of current flowing to the motor and terminal voltage across the motor and for determining a state of the operation of the motor, based upon the detected at least one of the current and the terminal voltage, the determining means having low-pass filter means having a predetermined cutoff frequency lower than a frequency of the PWM signal, wherein the determining means causes the filter means to reduce higher frequency components than the predetermined cutoff frequency, contained in the at least one of the current and the terminal voltage, and determines the state of the operation of the motor, based upon the at least one of the current and the terminal voltage having the higher frequency components reduced.

With the arrangement according to the twenty-fifth aspect, the low-pass filter means having a predetermined cutoff frequency lower than a frequency of the PWM signal reduces higher frequency components than the predetermined cutoff frequency, contained in the at least one of current flowing to the motor and terminal voltage across the motor, and the state of the operation of the motor is determined, based upon the at least one of the current and the terminal voltage having the higher frequency components reduced. As a result, the burden on the determining means (MPU) is greatly reduced as compared with the conventional apparatus, making it possible to quickly control the motor by the use of an inexpensive MPU.

To attain the eleventh object, according to a twenty-sixth aspect of the invention, there is provided an automotive passenger restraint and protection apparatus for an automotive vehicle, having a seatbelt, for restraining an occupant of the automotive vehicle by the seatbelt to protect the occupant, comprising a reel shaft having the seatbelt wound thereon, a motor for rotating the reel shaft in a direction of protracting or retracting the seatbelt, motor stoppage detecting means for detecting stoppage of the motor, based upon results of a comparison between a value of current flowing to the motor and a threshold value, and control means for controlling the threshold value according to environmental conditions under which the motor is operated.

With the arrangement according to the twenty sixth aspect, the threshold value of current flowing to the motor for detecting stoppage of the motor is controlled according to environmental conditions under which the motor is operated. As a result, the stoppage of the motor can be detected with accuracy irrespective of the environmental conditions under which the motor is operated.

Preferably, in the automotive passenger restraint and protection apparatus according to the twenty-sixth aspect, the threshold value is set to a value of the current flowing to the motor to be assumed when the motor has shifted from a rotatively driven state to a stopped state, the threshold value being calculated based upon supply voltage applied to the motor. As a result, the stoppage of the motor can be detected with higher accuracy irrespective of the environmental conditions under which the motor is operated.

To attain the twelfth object, according to a twenty-seventh aspect of the invention, in the automotive passenger restraint and protection apparatus according to the twenty-sixth aspect, the threshold value is set to a value of the current flowing to the motor to be assumed when a driving force of the motor is to be progressively decreased from a rotatively driven state, the threshold value being calculated based upon supply voltage applied to the motor, the control means progressively decreasing the driving force of the motor from a current value, based upon the results of the comparison between the value of the current flowing to the motor and the threshold value.

With the arrangement according to the twenty-seventh aspect, it is possible to accurately determine timing for progressively decreasing the driving force of the motor from a current value irrespective of the environmental conditions under which the motor is operated.

To attain the thirteenth object, according to a twenty-eighth aspect of the invention, there is provided an automotive passenger restraint and protection apparatus for an automotive vehicle, having a seatbelt, for restraining an occupant of the automotive vehicle by the seatbelt to protect the occupant, comprising a reel shaft having the seatbelt wound thereon, a plurality of driving means for rotatively driving the reel shaft, and driving force ratio determining means for determining a ratio of driving force between the plurality of driving means.

With the arrangement according to the twenty-eighth aspect, the ratio of driving force between the plurality of driving means is variably set, for example, such that when one of the plurality of driving means has a degraded driving force, the ratio of driving force of the other driving means is set to an increased value. As a result, the driving force of the one driving means can be utilized to the fullest extent, to thereby enable exhibiting the driving force for retracting the seatbelt to the maximum possible extent.

Preferably, in the automotive passenger restraint and protection apparatus according to the twenty-eighth aspect, the driving force ratio determining means includes pulse width adjusting means for adjusting a PWM signal delivered to the plurality of driving means, the ratio of driving force being determined by the pulse width adjusting means.

With this arrangement, the ratio of driving force between the plurality of driving means can be accurately determined in an electrical manner, while exhibiting the driving force for retracting the seatbelt to the maximum possible extent.

To attain the fourteenth object, according to a twenty-ninth aspect of the invention, the automotive passenger restraint and protection apparatus according to the twenty-eighth aspect includes comparison means for driving one of the plurality of driving means and other driving means thereof with an equal driving force, and for comparing at least one of terminal voltage and pulsating components thereof between the one driving means and the other driving means, and abnormality diagnosis means for carrying out abnormality diagnosis based upon results of comparison by the comparison means.

With the arrangement according to the twenty-ninth aspect, one of the plurality of driving means and other driving means thereof are driven with the same driving force, and at least one of the terminal voltage and pulsating components thereof is compared between the one driving means and the other driving means, to carry out abnormality diagnosis based upon results of the comparison. As a result, abnormality of the driving means can be carried out in an electrical manner with accuracy.

Preferably, in the automotive passenger restraint and protection apparatus according to the twenty-ninth aspect, the abnormality diagnosis means comprises determining means for driving the one driving means with a predetermined driving force and for determining whether the terminal voltage across the other driving means or the pulsating components thereof show a value corresponding to the predetermined driving force.

With this arrangement, the one driving means is driven with a predetermined driving force, and it is determined whether the terminal voltage across the other driving means or the pulsating components thereof show a value corresponding to the predetermined driving force. As a result, abnormality of the driving means can be carried out in an electrical manner with higher accuracy.

To attain the fifteenth object, according to a thirtieth aspect of the invention, there is provided a seatbelt protraction and retraction amount-detecting device for an automotive passenger restraint and protection apparatus having a seatbelt, and a motor for rotating protracting or retracting the seatbelt, comprising motor rotational direction detecting means for detecting rotational direction of the motor, voltage detecting means for detecting terminal voltage across the motor, and protraction/retraction amount calculating means for calculating an amount of protraction or an amount of retraction of the seatbelt, based upon at least one of a number of times pulsating components of the terminal voltage detected by the voltage detecting means rises above a first predetermined value from a value below the first predetermined value, a number of times the pulsating components drops below a second predetermined value from a value above the second predetermined value, a frequency component obtained by frequency analysis of the pulsating components, and results of time integration of the detected terminal voltage, and the rotational direction of the motor detected by the motor rotational direction detecting means.

With the arrangement according to the thirtieth aspect, the rotational direction of the motor is detected, and the amount of protraction or the amount of retraction of the seatbelt is calculated, based upon at least one of a number of times pulsating components of the terminal voltage across the motor rises above a first predetermined value from a value below the first predetermined value, a number of times the pulsating components drops below a second predetermined value from a value above the second predetermined value, a frequency component obtained by frequency analysis of the pulsating components, and results of time integration of the detected terminal voltage, and the detected rotational direction of the motor. As a result, the amount of protraction or the amount of retraction of the seatbelt can be obtained in a simple manner and with high accuracy.

The above and other objects, features, and advantages of the invention will become more apparent from the following detailed description taken in conjunction with the accompanying drawings.

BRIEF DESCRIPTION OF THE DRAWINGS

FIG. 37 is a view showing an example of a determination reference referred to by a danger degree determining device 43 in FIG. 35;

FIGS. 38A, 38C and 38E are views showing how the DC motor 10 is driven when the degree of danger is determined to be "low" at the danger degree determining device 43;

FIGS. 38B, 38D and 38F are views showing how the DC motor 10 is driven when the degree of danger is determined to be "high" at the degree of danger determining device 43;

DETAILED DESCRIPTION

The invention will now be described in detail with reference to drawings showing embodiments thereof.

First Embodiment

Figure 1:
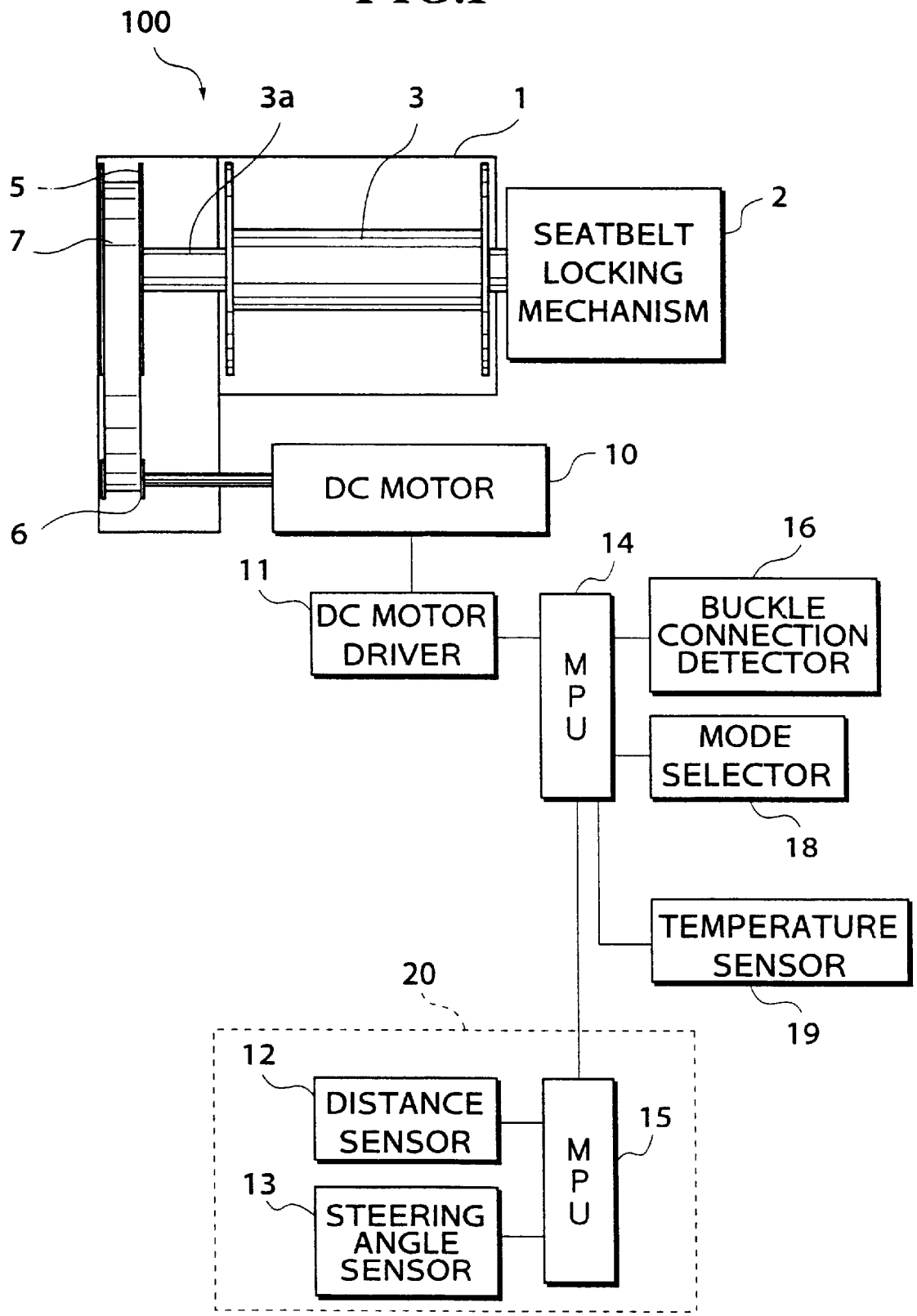
FIG. 1 is a block diagram schematically showing the arrangement of an automotive passenger restraint and protection apparatus according to a first embodiment of the invention.

Referring first to FIG. 1, there is shown the arrangement of an automotive passenger restraint and protection apparatus according to a first embodiment of the invention. The apparatus according to the first embodiment is provided with a seatbelt retractor 100.

The seatbelt retractor 100 has a frame 1 in which is rotatably mounted a reel shaft (takeup shaft) 3 for retracting and protracting a seatbelt. Secured to an end of the reel shaft 3 is a known seatbelt locking mechanism 2 which is adapted to lock or stop the seatbelt from being protracted when a predetermined or higher degree of deceleration is applied to an automotive vehicle in which the present apparatus is installed or when the seatbelt is protracted at a predetermined or higher degree of acceleration.

The reel shaft 3 has a central shaft 3a coupled to a central shaft of a reel shaft pulley 5, which is in turn coupled to a DC motor pulley 6 via a power transmission belt 7. Provided inside the reel shaft pulley 5 is bias force-imparting means formed e.g. of a spiral spring, not shown, which always applies a bias force to the pulley 5 in a direction of retraction of the seatbelt.

The reel shaft pulley 5 and the DC motor pulley 6 each have an outer periphery thereof formed with a predetermined number of outer teeth, while the power transmission belt 7 has an inner periphery thereof formed with a predetermined number of inner teeth which are in mesh with the outer teeth of the reel shaft pulley 5 and the DC motor pulley 6.

The DC motor pulley 6 has a central shaft thereof coupled to a DC motor 10 such that the rotation of the DC motor 10 is transmitted to the reel shaft 3 via the DC motor pulley 6.

The DC motor 10 is fixed to the frame 1 at at least two points thereof, and is connected to an MPU (Micro Processing Unit) 14 via a DC motor driver 11.

The MPU 14 controls the operative state of the DC motor 10 by changing the duty factor of a PWM (Pulse Width Modulation) signal for use in the control, for example. The MPU 14 detects current flowing to the DC motor 10 or terminal voltage across the DC motor 10 for the control of the DC motor 10. The duty factor of the PWM signal is determined based upon detected current flowing to the DC motor 10 or detected terminal voltage across the DC motor 10.

If the current flowing to the motor DC 10 or the terminal voltage across the DC motor 10 is directly detected, however, the following operative state of the DC motor 10 cannot be accurately determined based upon such detected current or voltage, because the detected current or voltage contains fluctuations or pulsations due to high frequency components contained in the PWM signal.

Therefore, in FIG. 2 as described hereinbelow, the MPI 14 detects the current flowing to the DC motor 10 and the terminal voltage across the DC motor 10 based on the voltage signals obtained by low-pass filters.

Figure 2:
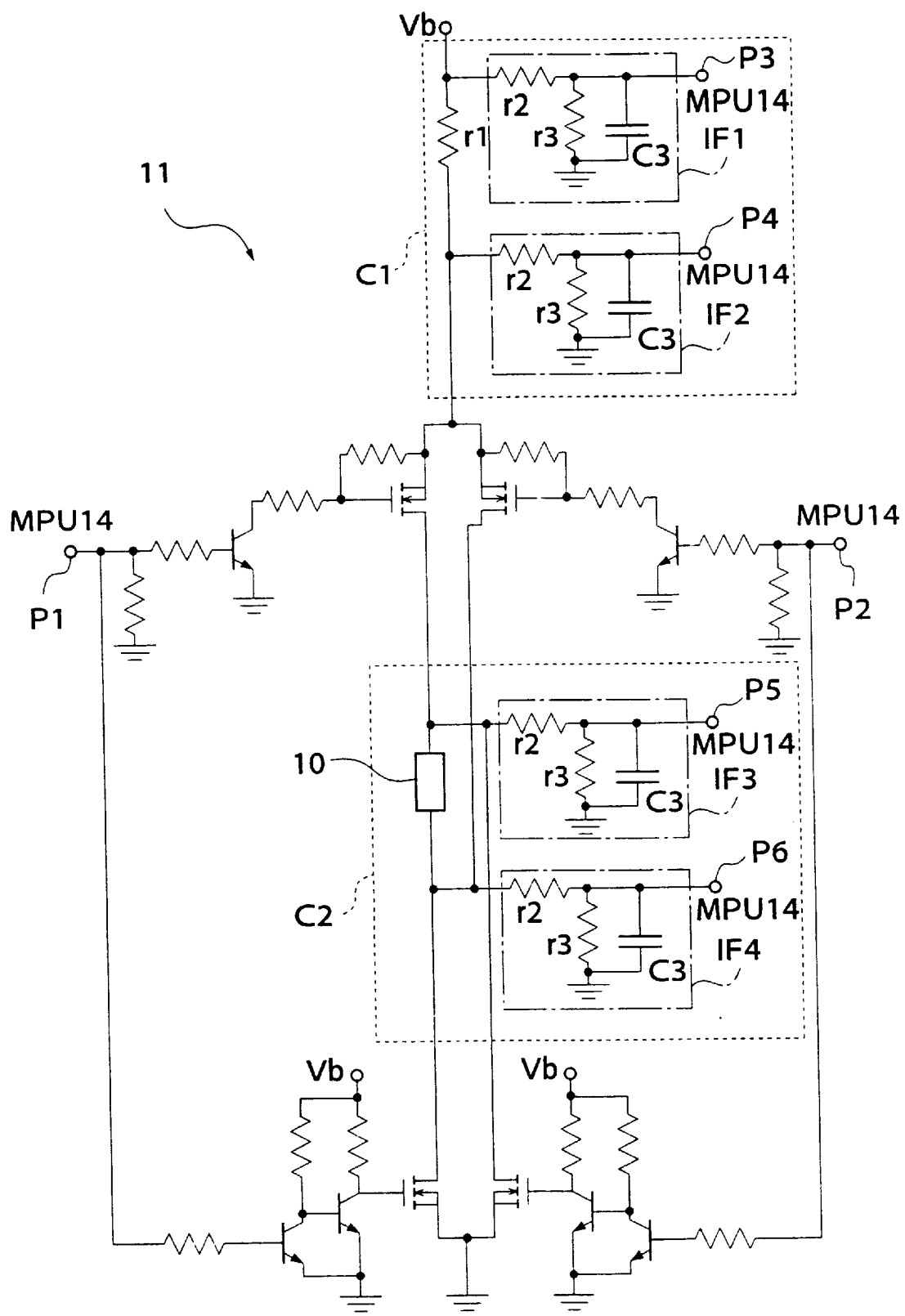
FIG. 2 is a circuit diagram showing the configuration of a DC motor driver 11 appearing in FIG.

FIG. 2 is a circuit diagram showing the construction of the DC motor driver 11. In FIG. 2, reference numerals P1 and P2 designate input terminals for a PWM (Pulse Width Modulation) signal output from the MPU 14, which has a frequency of 20 kHz, for example. Reference numerals P3 and P4 designate output terminals for detecting current, and P5 and P6 output terminals for detecting voltage, the terminals P1 to P6 being connected to the MPU 14. Supply voltage from a battery Vb shown in FIG. 2 is supplied to the DC motor 10. A plurality of transistors and FETs appearing in FIG. 2 are for selectively causing the DC motor 10 to be normally rotated or reversely rotated in response to the PWM signal from the MPU 14. More specifically, the DC motor driver 11 is constructed such that if a high-level control signal is delivered through the terminal P1 from the MPU 14, the DC motor 10 is rotate( in the normal direction, whereby the seatbelt is retracted by the reel shaft 3, while if a high-level control signal delivered through the terminal P2 from the MPU 14, the DC motor 10 is rotated in the reverse direction, whereby the seatbelt is protracted by the reel shaft 3. The MPU 14 controls such that the high-level control signal is not applied to the terminals P1 and P2 at the same time.

In FIG. 2, reference numeral C1 designates a current detecting circuit which detects current i flowing to the DC motor 10, based upon current flowing through a resistance r1. The current detecting circuit C1 is comprised of interface circuits (hereinafter abbreviated as "IFs") IF1 and IF2 which operate to remove current fluctuations or variations due to the influence of the PWM signal. The MPU 14 receives voltage signals from the IFs IF1 and IF2 and detects current i flowing to the DC motor 10 from these voltage signals.

In FIG. 2, reference numeral C2 designates a voltage measuring circuit 2 which measures terminal voltage across the DC motor 10, and is comprised of IFs IF3 and IF4 which operate to remove fluctuations or variations in the terminal voltage due to the influence of the PWM signal. The MPU 14 receives voltage signals from the IFs IF3 and IF4 and measures the terminal voltage across the DC motor 10 from these voltage signals.

The IFs IF1 to IF4 are each formed by a low-pass filter formed of a resistance r2, a resistance r3 smaller in resistance value than the resistance r2, and a capacitor c3, all the IFs having a cutoff frequency of 20 Hz, for example. By virtue of these IFs, the influence of the PWM signal output from the MPU 14 upon the current detecting circuit C1 and the voltage measuring circuit C2 is reduced to −60 dB, which is almost negligible for detection of current by the current detecting circuit C1 and detection of terminal voltage by the voltage measuring circuit C2.

Moreover, the MPU 14 conducts averaging filtering or the like on the detected current or voltage by means of software, to remove fluctuations or pulsations attributed to the PWM signal.

Figure 3A:
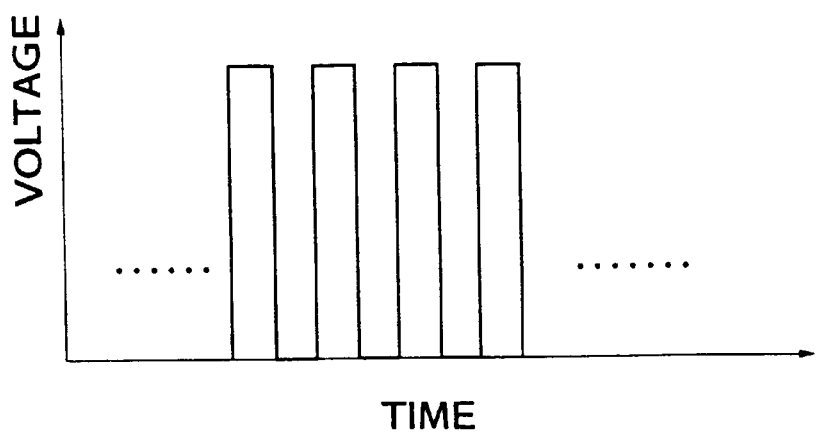
FIG. 3A is a graph showing an example of the waveform of a PWM signal input through a terminal P1 or P2.
Figure 3B:
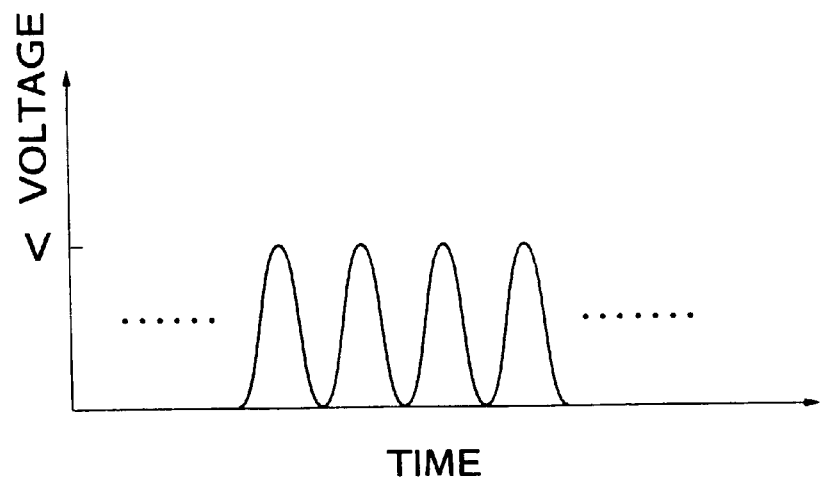
FIG. 3B is a graph showing an example of the waveform of a voltage signal output through a terminal P5.
Figure 3C:
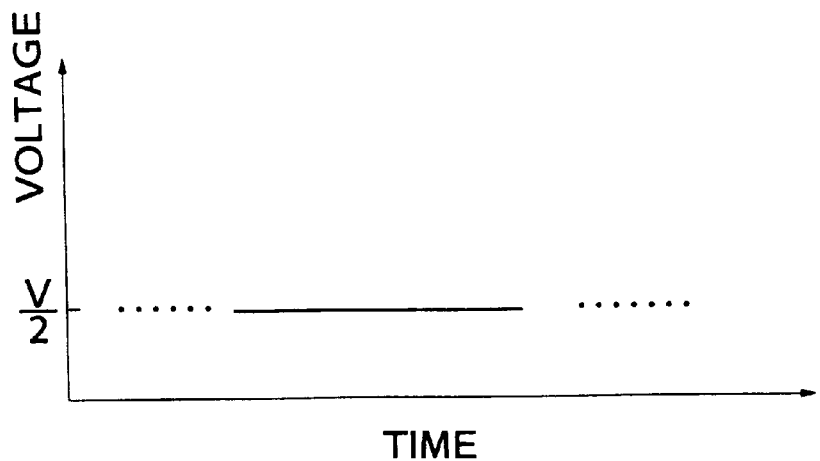
FIG. 3C is a graph showing another example of the waveform of the voltage signal.

FIG. 3A shows an example of the waveform of the PWM signal input through the terminal P1 or P2, and FIGS. 3B and 3C show examples of the waveform of the voltage signal output through the terminal PS.

First, when the PWM signal having a duty factor of 50% and a frequency of 20 kHz as shown in FIG. 3A is input through the terminal P1 or P2, the voltage signal output through the terminal P5 has high maximal voltage v due to the influence of the PWM signal input through the terminal P1 or P2, as shown in FIG. 3B, if the low-pass filter IF3 is not provided.

On the other hand, if the low-pass filter IF3 is provided as in the present embodiment, the voltage signal output through the terminal P5 has low constant voltage v/2 which is free of the influence of the PWM signal input through the terminal P1 or P2, as shown in FIG. 3C.

As described above, according to the present embodiment, the current i flowing to the DC motor 10 and the terminal voltage across the DC motor 10 are detected based on the voltage signals obtained by the low-pass filters. As a result, the current flowing to the DC motor and the terminal voltage across the DC motor have much reduced fluctuations caused by the influence of the PWM signal. Further, the use of the low-pass filters greatly reduces the burden upon the MPU 14, making it possible to quickly and accurately control the motor using a low-cost MPU.

Referring back to FIG. 1, connected to the MPU 14 are a buckle connection detector 16 which detects whether a tongue of the seatbelt has been attached to or mounted on the buckle and whether the tongue of the seatbelt has been disconnected from the buckle, a mode selector 18 which selects a mode of rotation control of the reel shaft 3, and a temperature sensor 19 which detects temperature in the vicinity of the DC motor 10 or the temperature of the DC motor 10 itself.

Further connected to the MPU 14 is an MPU 15 provided in a traveling condition detector 20 which detects a traveling condition of the automotive during driving of the vehicle. Connected to the MPU 15 are a distance sensor 12 which detects the distance between the present vehicle (occupant's vehicle) and an object lying ahead of the vehicle, and a steering angle sensor 13 which senses the steering angle of a steering arm of the vehicle. The MPU 14 has a built-in timer 21 for measuring time.

The mode selector 18 can select a default mode for holding the degree of slackness or looseness of the seatbelt at a level comfortable to the occupant based upon a control signal from the traveling condition detector 20, and further, if required, forcibly removing the slackness or forcibly imparting oppression to the occupant, or alternately forcibly removing the slackness and forcibly imparting oppression to the occupant. Further, the mode selector 18 can select a doze preventing function adding mode for additionally providing a function of imparting alternately oppression and slackness at irregular time intervals, and a rough road traveling function adding mode for additionally providing a function of removing the slackness or looseness of the seatbelt so as to make the seatbelt difficult to protract in addition to the default mode. These modes can be selected by the occupant. Initially, the mode selector 18 selects the default mode.

Next, the flow of control signals at various components of the automotive passenger restraint and protection apparatus according to the present embodiment will be described.

The distance sensor 12 delivers an output signal indicative of results of detection of the distance between the present vehicle and an object lying ahead of the vehicle to the MPU 15. The MPU 15 calculates a safety distance ds (m) between the present vehicle and an object lying ahead by the use of the following formula (1), and when the calculated safety distance ds is larger than a value indicated by the output signal from the distance sensor 12, the MPU 15 delivers a control signal for collision danger warning to the MPU 14. Further, the MPU 15 calculates a collision unavoidable distance dd (m) by the use of the following formula (2), and when the calculated collision unavoidable distance dd is larger than a value indicated by the output signal from the distance sensor 12, the MPU 15 delivers a signal indicative of a collision being unavoidable, to the MPU 14.

$$ds = Vr \times (td + \beta) \quad (1)$$

$$dd = Vr \times td \quad (2)$$

where Vr represents relative speed (m/sec), td response delay of the driver (e.g. 0.5 to 2 sec), and β a value determined by the braking characteristic of the vehicle (e.g. 0.5 to 2 sec).

The steering angle sensor 13 delivers an output signal indicative of the sensed steering angle to the MPU 15, and when the maximum value of change amount in the detected steering angle within a prescribed time period (e.g. 2 sec) is less than a predetermined value (e.g. 8 degrees), the MPU 15 judges that the driver might be dozing and delivers a control signal for doze warning to the MPU 14.

The buckle connection detector 16 detects whether the tongue of the seatbelt has been connected to the buckle, and delivers an output signal indicative of results of the detection to the MPU 14. The DC motor driver 11 controls the rotation of the DC motor 10, based upon a control signal from the MPU 14.

The mode selector 18 delivers an output signal indicative of the selected mode to the MPU 14, which in turn delivers a control signal corresponding to the selected mode to the DC motor driver 11 to control the seatbelt retractor 100.

The temperature sensor 19 delivers an output signal indicative of the temperature in the vicinity of the DC motor 10 or the temperature of the DC motor itself to the MPU 14.

Figure 4:
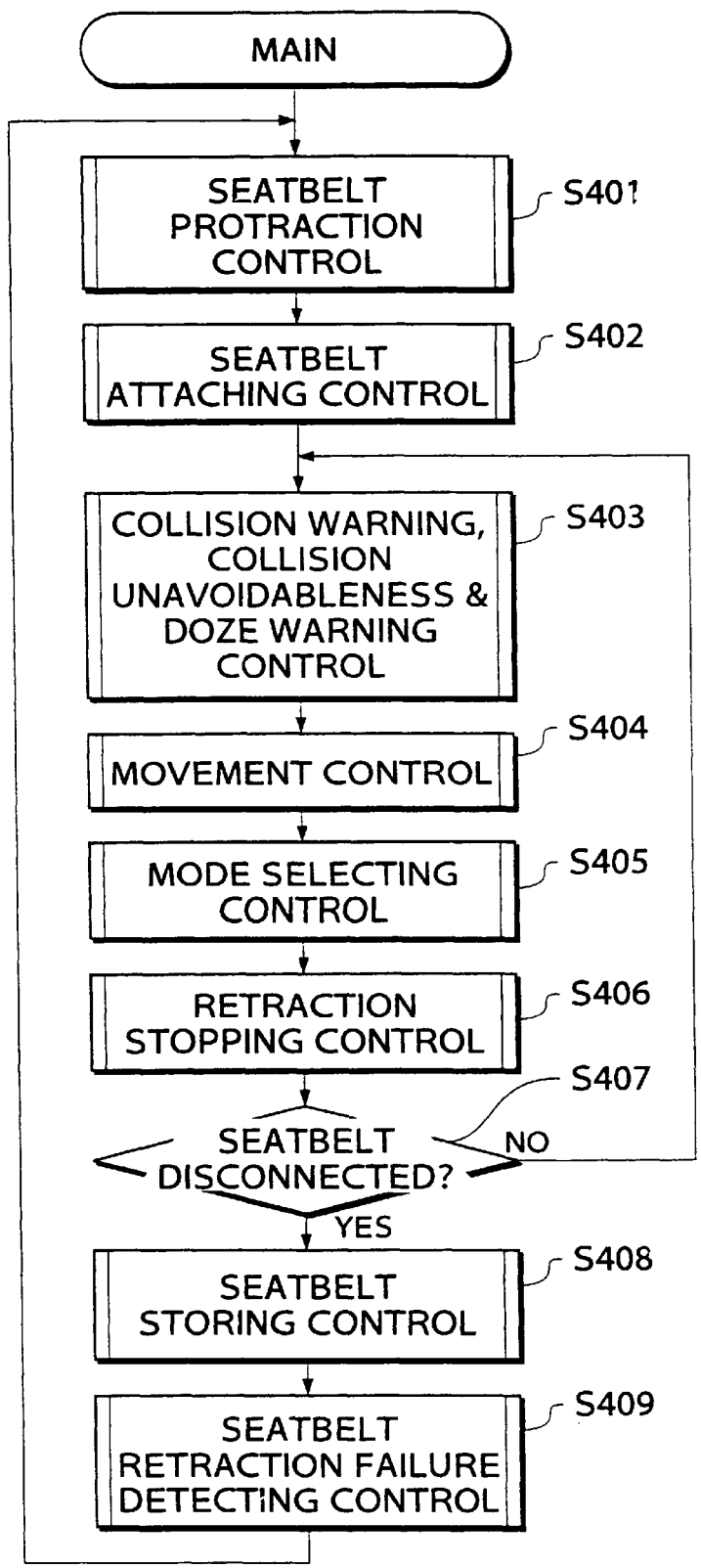
FIG. 4 is a flowchart showing a control program executed by an MPU 14 appearing in FIG. 1.

FIG. 4 is a flowchart showing a control program executed by the MPU 14.

First, the MPU 14 executes seatbelt protraction control for protracting the seatbelt at a step S401. Details of the seatbelt protraction control will be described hereinafter with reference to FIG. 5.

Then, the MPU 14 executes buckle attaching control at a step S402. The buckle attaching control is executed when attaching of the tongue of the seatbelt to the buckle has been detected by the buckle connection detector 16, as described hereinafter with reference to FIG. 6.

Then, when the MPU 15 detects that the present vehicle is about to collide against an object lying ahead, that collision of the present vehicle with an object lying ahead is unavoidable or that the driver is dozing, the MPU 14 carries out collision warning, collision unavoidableness and doze warning control at a step S403. Details of this control will be described hereinafter with reference to FIG. 7.

Then, the MPU 14 carries out movement control at a step S404. The movement control is executed when protraction of the seatbelt has been detected while the rotation of the reel shaft 3 is in stoppage, as described hereinafter with reference to FIGS. 8 and 9.

Then, the MPU 14 executes mode selecting control according to the mode selected by the mode selector 18 at a step S405. Details of the mode selecting control will be described hereinafter with reference to FIG. 10.

Further, the MPU 14 executes retraction stopping control for preventing excessive retraction of the seatbelt at a step S406. Details of the retraction stopping control will be described hereinafter with reference to FIG. 11.

Then, it is determined at a step S407 whether the tongue of the seatbelt has been disconnected from the buckle has been detected by the buckle connection detector 16. If the disconnection has not been detected, the processing returns to the step S403, whereas if the disconnection has been detected, the MPU 14 executes seatbelt storing control at a step S408. Details of the seatbelt storing control will be described hereinafter with reference to FIG. 12.

Then, the MPU 14 executes seatbelt retraction failure detecting control at a step S409, followed by the processing returning to the step S401. The seatbelt retraction failure detecting control is carried out when the tongue of the seatbelt is disconnected from the buckle and retracted, as described hereinafter with reference to FIG. 13. In this connection, when the seatbelt retraction failure detecting control has been started, the built-in timer of the MPU 14 starts measuring time t elapsed after the start of the control.

Figure 5:
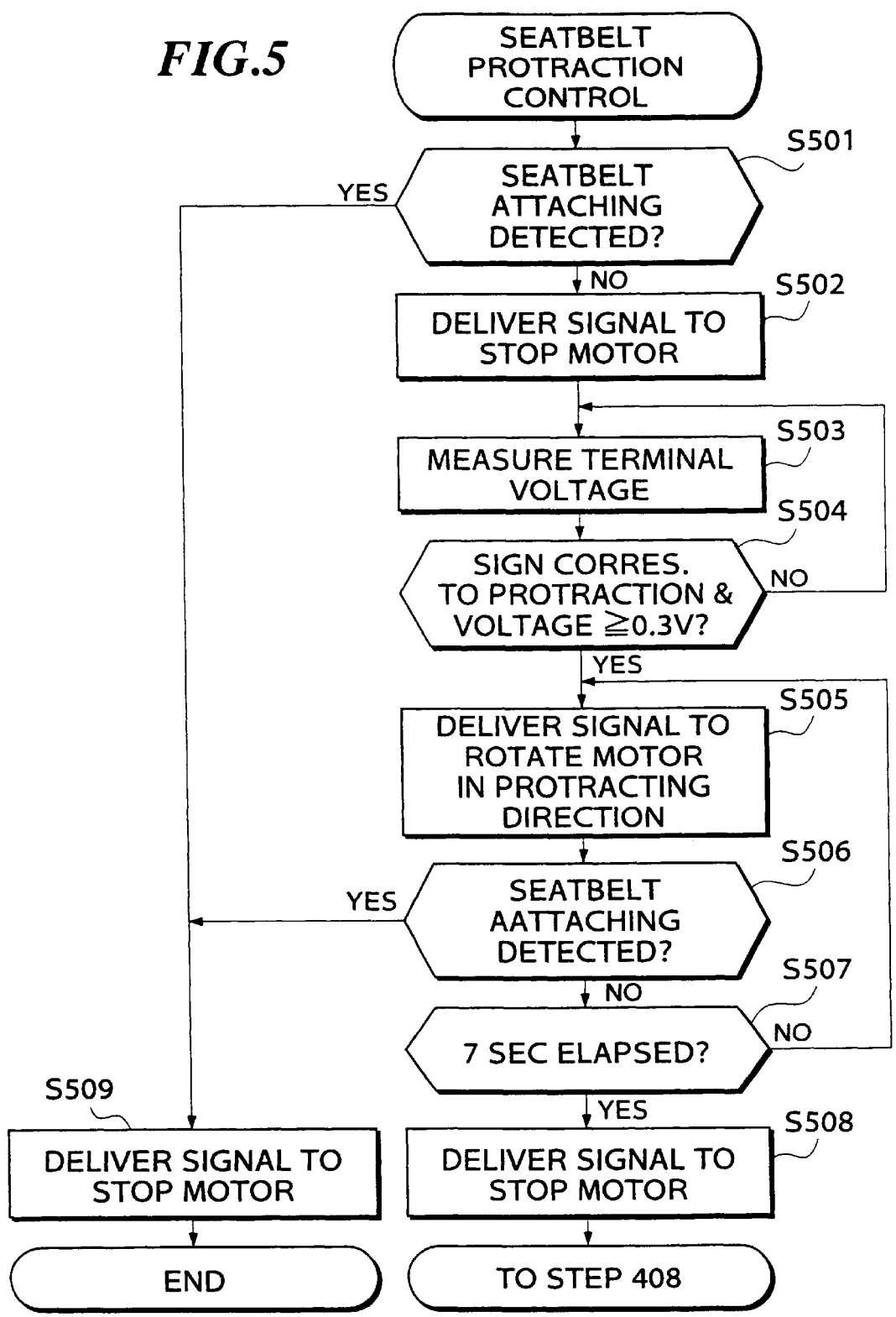
FIG. 5 is a flowchart showing seatbelt protraction control executed at a step S401 in FIG. 4.

FIG. 5 is a flowchart showing the seatbelt protraction control executed at the S401.

First, it is determined at a step S501 whether attaching of the tongue of the seatbelt to the buckle has been detected by the buckle connection detector 16. If attaching of the seatbelt has been detected, the MPU 14 judges that protraction of the seatbelt has been completed, and delivers a control signal commanding to stop the rotation of the reel shaft 13 to the DC motor driver 11 at a step S509, followed by terminating the present processing. On the other hand, if attaching of the seatbelt has not been detected, the MPU 14 delivers a control signal commanding to temporarily stop the rotation of the reel shaft 3 to the DC motor driver 11 in order to assist protraction of the seatbelt at a step S502.

Then, the terminal voltage across the DC motor 10 and the sign thereof are measured by the circuit C2 of the DC motor driver 11 at a step S503. It is determined whether the measured terminal voltage exceeds 0.3 volts and at the same time the sign of the terminal voltage corresponds to the direction of protracting the seatbelt at a step S504. The answer to this question becomes affirmative (YES) if the occupant lightly protracts the seatbelt.

If it is determined at the step S504 that the terminal voltage does not exceed 0.3 volts or the sign does not correspond to the direction of protracting the seatbelt, the processing returns to the step S503, whereas if the terminal voltage exceeds 0.3 volts and at the same time the sign of the terminal voltage corresponds to the direction of protracting the seatbelt, the MPU 14 delivers a control signal commanding to rotate the reel shaft 3 in the seatbelt protracting direction, to the DC motor driver 11 at a step S505, whereby the seatbelt can be easily protracted.

According to the control of the steps S501 to S505 described above, when the measured terminal voltage exceeds 0.3 volts and at the same time the sign of the terminal voltage corresponds to the direction of protracting the seatbelt, the seatbelt can be brought into a state where it can be easily protracted. As a result, a large force as required in the conventional apparatus is not needed, and therefore even a weak occupant who has degraded physical ability such as an advanced-age occupant can easily mount the seatbelt onto his body.

Then, it is determined at a step S506 whether attaching of the tongue of the seatbelt has been detected by the buckle connection detector 16. If attaching of the seatbelt has been detected, the processing proceeds to the step S509, On the other hand, if attaching of the seatbelt has not been detected, it is determined at a step S507 whether a predetermined time period (e.g. 7 sec) has elapsed after the control signal commanding to rotate the reel shaft 3 was delivered to the DC motor driver 11.

If the predetermined time period has not elapsed, the processing returns to the step S505, whereas if it has elapsed, which means that the seatbelt has been protracted but the tongue of the seatbelt has not been connected to the buckle such that the seatbelt is in a slackened state, a control signal commanding to stop the rotation of the reel shaft 3 is delivered to the DC motor driver 11 at a step S508, and then the processing proceeds to the step S408 to carry out the seatbelt storing control.

Figure 6:
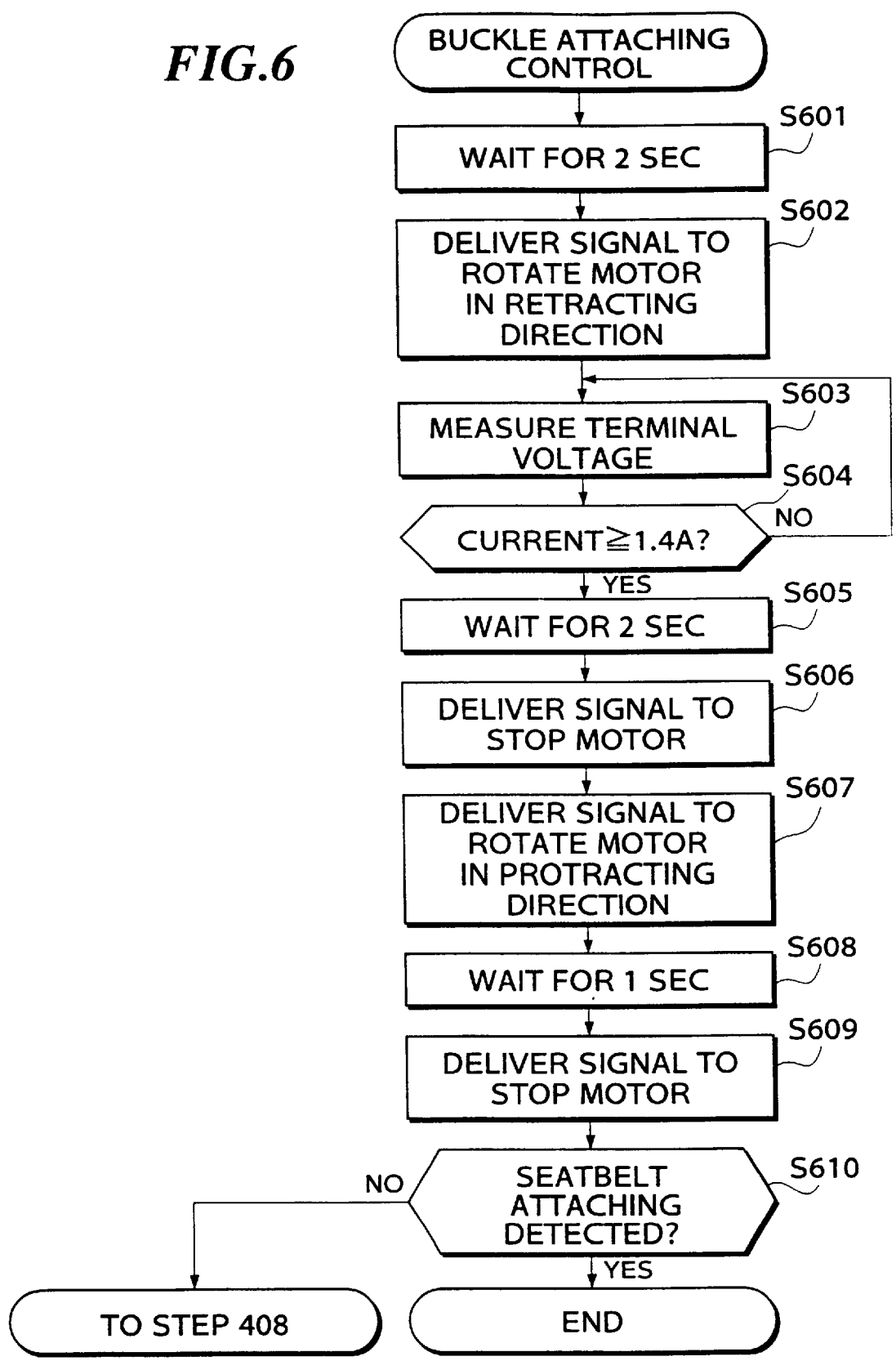
FIG. 6 is a flowchart showing buckle attaching control executed at a step S402 in FIG. 4.

FIG. 6 is a flowchart showing the buck attaching control executed at the step S402, which is executed after attaching of the tongue of the seatbelt to the buckle.

First, the MPU 14 waits for a predetermined time period (e.g. 2 sec) at a step S601, to give the occupant a time period for the occupant to correct torsion of the seatbelt or the like after the attaching of the tongue to the buckle. Upon the lapse of the predetermined time period, the MPU 14 delivers a control signal commanding to rotate the reel shaft 3 in the seatbelt retracting direction to the DC motor driver 11 at a step S602, whereby the seatbelt is retracted. Then, current flowing to the DC motor is measured by the circuit C1 of the DC motor driver 11 at a step S603. It is determined at a step S604 whether the measured current exceeds a predetermined value (e.g. 1.4 amperes).

If the measured current does not exceed the predetermined value, the processing returns to the step S603, whereas if the former exceeds the latter, the MPU 14 judges that the retraction of the seatbelt has almost reached its limit, and then waits for a predetermined time period (e.g. 2 sec) to allow the occupant to fit the seatbelt to his body at a step S605. Upon the lapse of the predetermined time period, the MPU 14 delivers to the DC motor driver 11 a control signal commanding to stop the rotation of the reel shaft 3 after the retraction of the seatbelt has reached its limit, at a step S606.

Then, the MPU 14 delivers a control signal commanding to rotate the reel shaft 3 in the seatbelt protracting direction to the DC motor driver 11 at a step S607. Accordingly, the seatbelt starts to be protracted and after the lapse of a predetermined time period (e.g. 1 sec) (step S608) when the seatbelt should be already given a predetermined amount of looseness, the MPU 14 delivers a control signal commanding to stop the rotation of the reel shaft 3 to the DC motor driver 11 at a step S609.

Then, it is determined at a step S610 whether attaching of the tongue of the seatbelt to the buckle has been detected by the buckle connection detector 16. If attaching of the seatbelt has been detected, the present processing is terminated, whereas if attaching of the seatbelt has not been detected, the processing proceeds to the step S408 to carry out the seatbelt storing control.

According to the seatbelt attaching control described above, after the attaching of the seatbelt tongue to the buckle, the seatbelt is retracted, and after the retraction of the seatbelt has reached its limit, the seatbelt starts to be protracted to be given a predetermined amount of looseness. As a result, the inconvenience with the conventional automotive passenger restraint and protection apparatus can be eliminated that the seatbelt mounted on the occupant's body always gives the occupant a feeling of oppression owing to the bias force of the bias force-imparting means and makes him uncomfortable.

Figure 7:
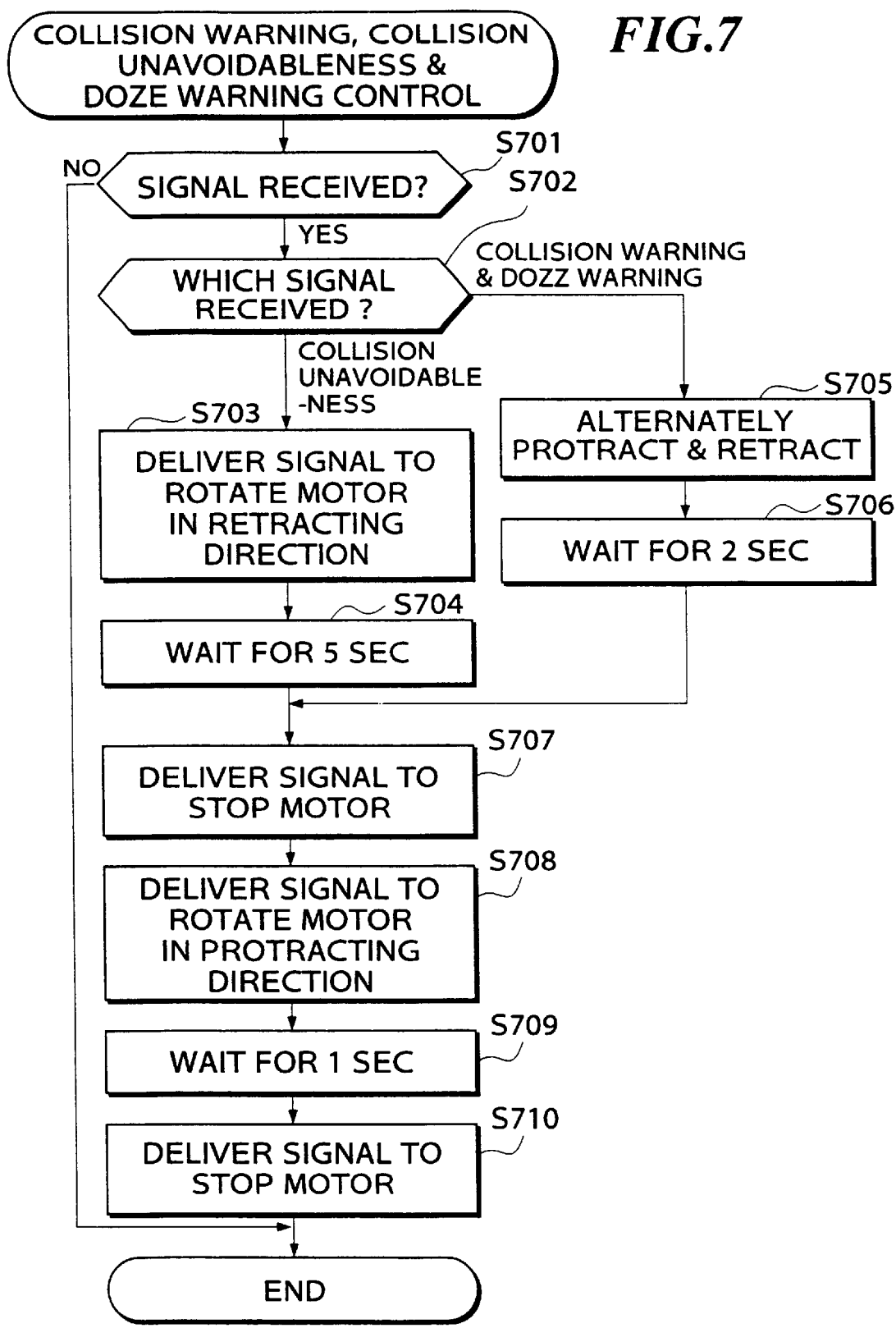
FIG. 7 is a flowchart showing collision warning, collision unavoidableness and doze warning control executed at a step S403 in FIG. 4.

FIG. 7 is a flowchart showing the collision warning, collision unavoidableness and doze warning control executed at the step S403 in FIG. 4.

First, it is determined at a step S701 whether any one of a first signal giving warning of danger of collision, a second signal indicative of unavoidableness of collision, and a third signal giving warning against dozing has been received. If none of the signals has been received, the present processing is immediately terminated, whereas if any one of the signals has been received, the kind of the received signal is determined at a step S702.

If it is determined that the received signal is the second signal indicative of unavoidableness of collision, the MPU 14 delivers a control signal commanding to rotate the reel shaft 3 in the seatbelt retracting direction to the DC motor driver 11 at a step S703. Thus, the seatbelt is retracted. Then, the MPU 14 waits for a predetermined time period (e.g. 5 sec) within which the restraint of the occupant immediately after collision should become unnecessary after the determination that a collision is unavoidable, at a step S704. Upon the lapse of the predetermined time period, the MPU 14 delivers a control signal commanding to stop the rotation of the reel shaft 3 to the DC motor driver 11 at a step S707.

On the other hand, if it is determined at the step S702 that the received signal is the first signal giving warning of danger of collision or the third signal giving warning against dozing, the MPU 14 delivers a control signal having a frequency of 20 Hz and commanding to rotate the reel shaft 3 alternately in the seatbelt retracting direction and in the seatbelt protracting direction at a step S705. Accordingly, the retraction of the seatbelt and the protraction of the same start to be alternately carried out, and then the MPU 14 waits for a predetermined time period (e.g. 2 sec) as a warning time during which the alternate retraction and protraction is continued, at a step S706, followed by the program proceeding to the step S707.

Then, the MPU 14 delivers a control signal commanding to rotate the reel shaft 3 in the seatbelt protracting direction to the DC motor driver 11 at a step S708, and then waits for a predetermined time period (e.g. 1 sec) at a step S709. Upon the lapse of the predetermined time period when the seatbelt should be already given a predetermined amount of looseness, the MPU 14 delivers a control signal commanding to stop the rotation of the reel shaft 3 to the DC motor driver 11 at a step S710, followed by terminating the present processing.

According to the collision warning, collision unavoidableness and doze warning control described above, when the received signal is a signal indicative of unavoidableness of a collision, the seatbelt is retracted, to thereby positively protect the occupant upon a collision of the vehicle, and on the other hand, when the received signal is a signal giving warning of danger of collision or a signal giving warning the occupant against dozing, the seatbelt is alternately retracted and protracted, to thereby enable warning the occupant of danger of collision or against dozing.

Figure 8:
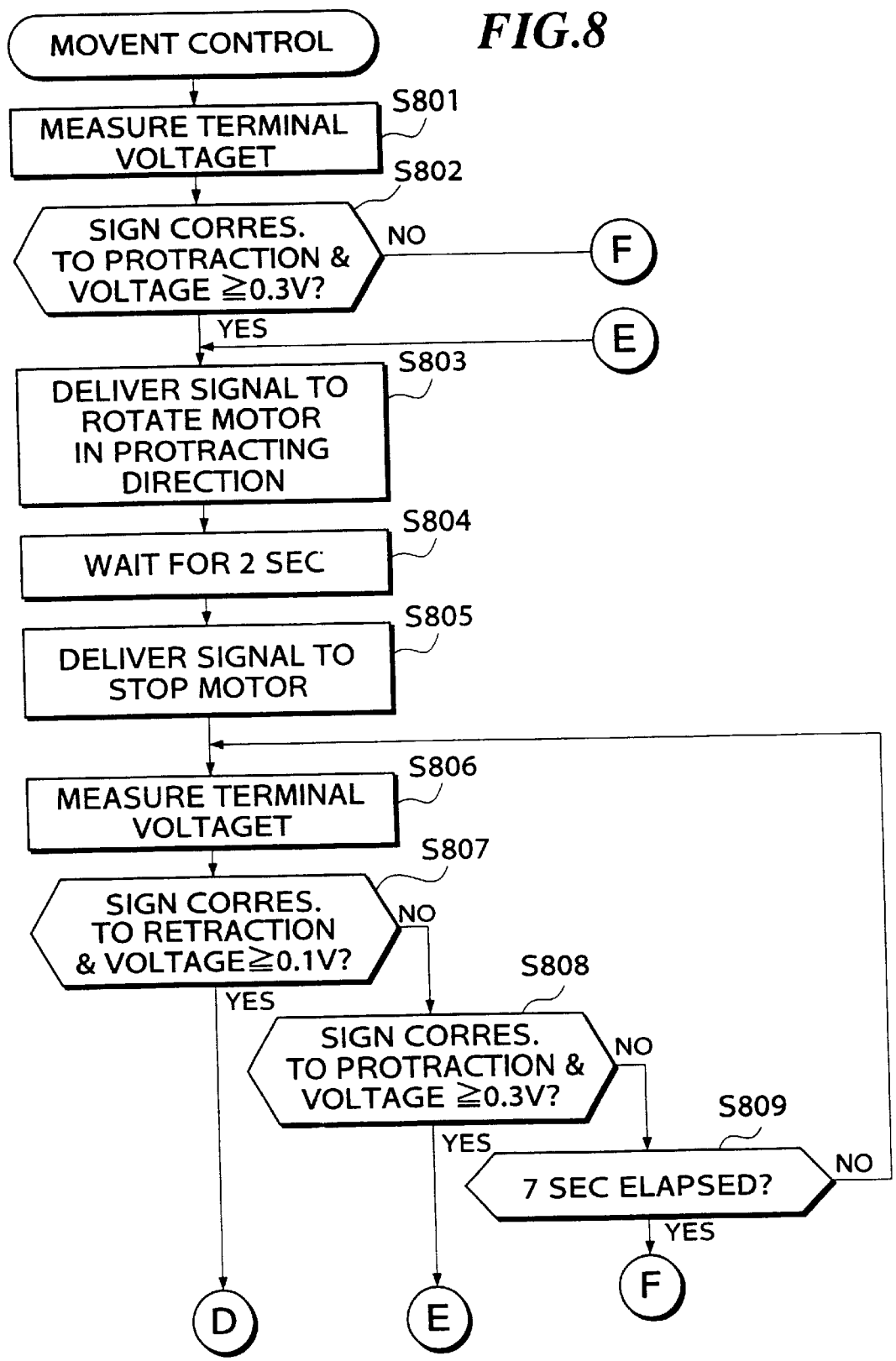
FIG. 8 is a flowchart showing movement control executed at a step S404 in FIG. 4.
Figure 9:
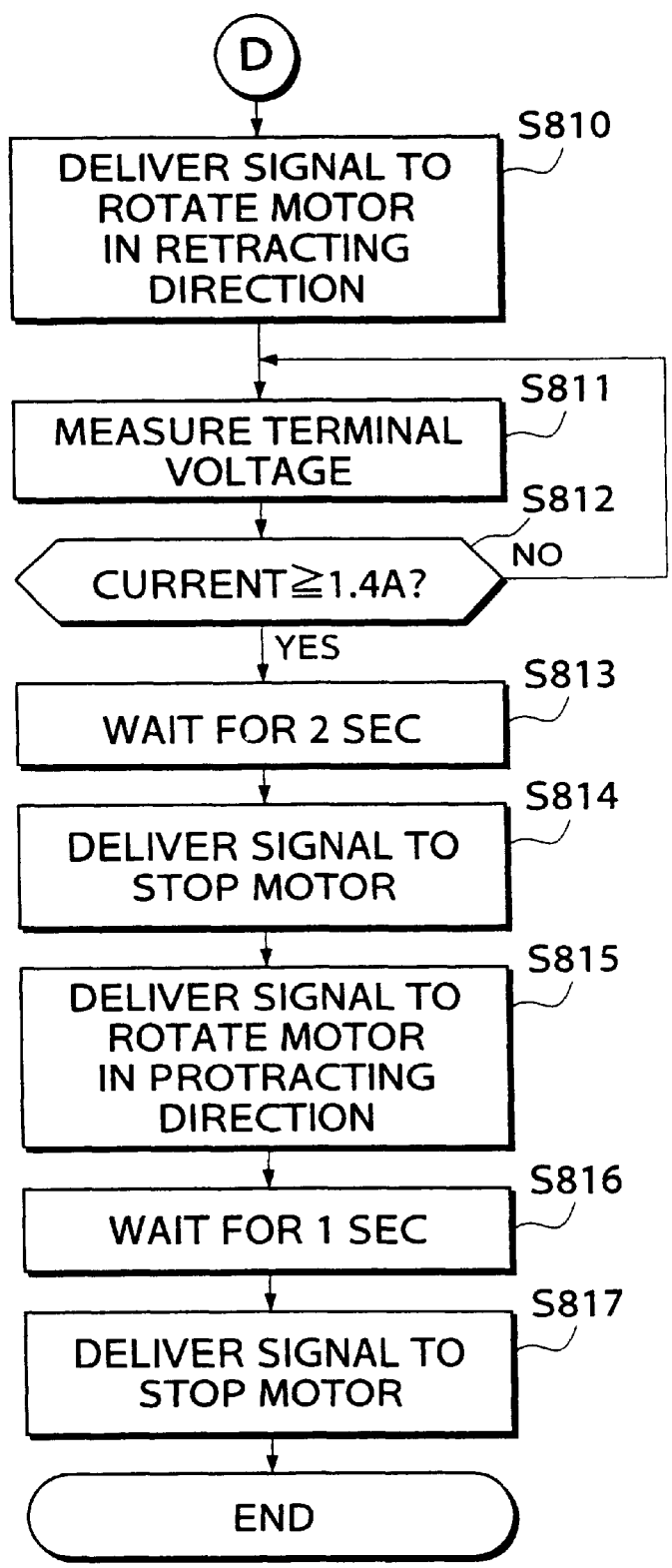
FIG. 9 is a flowchart showing a continued part of the FIG. 8 control.

FIGS. 8 and 9 are flowcharts showing the movement control executed at the step S404 in FIG. 4.

First, the terminal voltage across the DC motor 10 and the sign of the same are measured by the circuit C2 of the DC motor driver 11 at a step S801. It is determined at a step S802 whether the measured terminal voltage exceeds a predetermined value (e.g. 0.3 volts) and at the same time the sign corresponds to the direction of protracting the seatbelt. The answer to this question is affirmative (YES) if the seatbelt is protracted due to a motion of the occupant with the seatbelt mounted on his body, for example.

If the terminal voltage does not exceed the predetermined value or the sign of the terminal voltage does not correspond to the seatbelt protracting direction, the present processing is immediately terminated, whereas if the terminal voltage exceeds the predetermined value and at the same time the sign corresponds to the seatbelt protracting direction, the MPU 14 delivers a control signal commanding to rotate the reel shaft 3 in the seatbelt protracting direction to the DC motor driver 11 at a step S803. By this control, the seatbelt can be made easy to protract.

Then, the MPU 14 waits for a predetermined time period (e.g. 2 sec) within which the occupant should stop moving after starting moving, at a step S804, and upon the lapse of the predetermined time period, the MPU 14 delivers a control signal commanding to stop the rotation of the reel shaft 3 to the DC motor driver 11 at a step S805.

Then, the terminal voltage across the DC motor 10 and the sign of the same are measured by the circuit C2 of the DC motor driver 11 are at a step S806, and it is determined at a step S807 whether the measured terminal voltage exceeds a predetermined value (e.g. 0.1 volts) and the sign corresponds to the direction of retracting the seatbelt. The answer to this question is affirmative (YES) if the occupant has returned to his original position after moving and accordingly the seatbelt has been retracted by the bias force-imparting means formed of a spiral spring or the like.

If the answer to the question of the step S807 is affirmative (YES), the MPU 14 delivers a control signal commanding to rotate the reel shaft 3 in the seatbelt retracting direction to the DC motor driver 1 at a step S810). Thus, the seatbelt is retracted.

Then, the current flowing to the DC motor 10 is measured by the circuit C1 of the DC motor driver at a step S811, and then it is determined at a step S812 whether the measured current exceeds a predetermined value (e.g. 1.4 amperes).

If the measured current does not exceed the predetermined value, the processing returns to the step S811, whereas if the former exceeds the latter, the MPU 14 judges that the retraction of the seatbelt has almost reached its limit, and then waits for a predetermined time period (e.g. 2 sec) to allow the occupant to fit the seatbelt to his body. Upon the lapse of the predetermined time period after the retraction has reached its limit, the MPU 14 delivers a control signal commanding to stop the rotation of the reel shaft 3 at a step S814.

Then, the MPU 14 delivers a control signal commanding to rotate the reel shaft 3 in the seatbelt protracting direction to the DC motor driver 11 at a step S815. The MPU 14 then waits for a predetermined time period (e.g. 1 sec) after the seatbelt starts to be protracted, and upon the lapse of the same when the seatbelt should be already given a predetermined amount of looseness, the MPU 14 delivers a control signal commanding to stop the rotation of the reel shaft 3 to the DC motor driver 11 at a step S817, followed by terminating the present processing.

If it is determined at the step S807 that the terminal voltage does not exceed the predetermined value or the sign of the same does not correspond to the seatbelt retracting direction, it is determined at a step S808 whether the terminal voltage exceeds a second predetermined value (e.g. 0.3 volts) and at the same time the sign corresponds to the seatbelt protracting direction. The answer to this question is affirmative (YES) if the occupant again starts to move so that the seatbelt is protracted, for example.

If it is determined at the step S808 that the terminal voltage exceeds the second predetermined value and at the same time the sign corresponds to the seatbelt protracting direction, the processing returns to the step S803, whereas if the terminal voltage does not exceed the second predetermined value or if the sign does not correspond to the seatbelt protracting direction, which means that the occupant remains stationary without moving again, it is determined at a step S809 whether a predetermined time period (e.g. 7 sec) has elapsed after the control signal commanding to stop the reel shaft 3 started to be delivered to the DC motor driver 11.

If the predetermined time period has not elapsed, the processing returns to the step S806, whereas if the same has elapsed, the MPU 14 judges that the occupant remains stationary without moving, that is, the occupant stays in the proper position, and then the processing proceeds to the step S810.

According to the movement control described above, in the event that the occupant starts to move after the seatbelt has been attached to his body to cause the seatbelt to be protracted, the protracting motion is assisted to facilitate the occupant's movement. Further, when the occupant remains stationary for a predetermined time period (e.g. 7 sec) or longer after he moved, it is judged that the occupant stays in the proper position, and then retraction of the seatbelt is carried out. Still further, when the occupant starts to return to his original position after he moved, retraction of the seatbelt is carried out. Thus, the occupant can be always protected with reliability.

Figure 10:
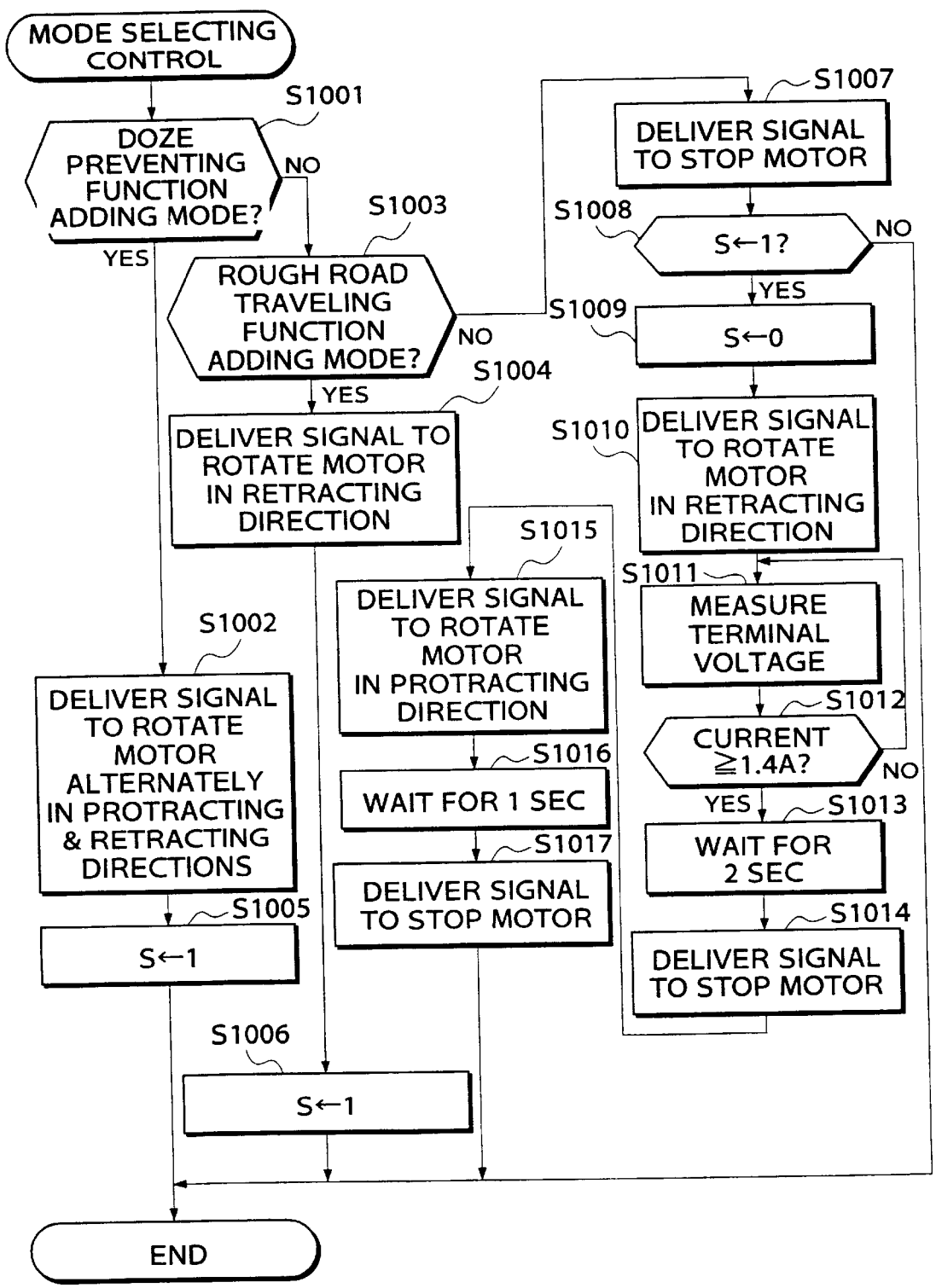
FIG. 10 is a flowchart showing a mode selecting control executed at a step S405 in FIG. 4.

FIG. 10 is a flowchart showing the mode selecting control executed at the step S405 in FIG. 4.

First, it is determined at a step S1001 whether the mode selector 18 has been caused by the occupant to select the doze preventing function adding mode. If this mode has been selected, the MPU 14 continuously delivers a control signal having a frequency of 20 Hz commanding to rotate the reel shaft 3 alternately in the seatbelt retracting direction and in the seatbelt protracting direction at random time intervals of 30 to 300 sec to the DC motor driver 11 for a predetermined time period (e.g. 2 sec) at a step S1002. Thus, retraction and protraction of the seatbelt are carried out alternately at irregular time intervals.

Then, a flag S, which, when set to "1", indicates that the doze preventing function adding mode or the rough road traveling function adding mode has been selected, is set to "1" at a step S1005, followed by terminating the present processing. In this connection, if the doze preventing function adding mode is selected, the timer 21 is started to measure the above random time intervals of 30 to 300 seconds. So long as the doze preventing function adding mode is not selected, the timer is cleared.

On the other hand, if it is determined at the step S1001 that the doze preventing function adding mode has not been selected, it is determined at a step S1003 whether the occupant has caused the mode selector 18 to select the rough road traveling function adding mode. If this mode has been selected, the MPU 14 delivers a control signal commanding to rotate the reel shaft 3 in the seatbelt retracting direction to the DC motor driver at a step S1004. Thus, the seatbelt is retracted to fixedly hold the occupant to his seat.

Then, the flag S is set to "1" at a step S1006, followed by terminating the present processing.

If it is determined at the step S1003 that the rough road traveling function adding mode has not been selected, the MPU 14 delivers a control signal commanding to stop the rotation of the reel shaft 3 to the DC motor driver 11 at a step S1001, and then determines at a step S1008 whether the doze preventing function adding mode or the rough road traveling function adding mode was selected in the last time of mode selecting control, that is, whether the flag S was set to "1" in the last time of mode selecting control.

If it is determined at the step S1008 that the flag S was not set to "1", the default mode continues to be selected, followed by terminating the program. On the other hand, if the flag S was set to "1", the flag S is reset to "0" at a step Step 1009, and the MPU 14 delivers a control signal commanding to rotate the reel shaft 3 in the seatbelt retracting direction to the DC motor driver 11 at a step S1010. Thus, the seatbelt is retracted.

Then, the current flowing to the DC motor 10 is measured by the circuit C1 of the DC motor driver 11 at a step S1011, and it is determined at a step S1012 whether the measured current exceeds a predetermined value (e.g. 1.4 amperes).

If the measured current does not exceed the predetermined value, the processing returns to the step S1011, whereas if the former exceeds the latter, the MPU 14 judges that the retraction of the seatbelt has reached its limit, and waits for a predetermined time period (e.g. 2 sec) within which the occupant should fit the seatbelt to his body, at a step S1013, and upon the lapse of the predetermined time period, delivers a control signal commanding to stop the rotation of the reel shaft 3 to the DC motor driver 11 at a step S1014.

Then, the MPU 14 delivers a control signal commanding to rotate the reel shaft 3 in the seatbelt protracting direction to the DC motor driver 11 at a step S1015. Thus, upon the lapse of the predetermined time period (step S1016) when a predetermined amount of looseness should be already given to the seatbelt after the seatbelt starts to be protracted, the MPU 14 delivers a control signal to the DC motor driver 11 to stop the rotation of the reel shaft 3 (step S1017), followed by termination of the program.

According to the mode selecting control described above, when the doze preventing function adding mode is selected, the retraction and protraction of the seatbelt are alternately carried out at irregular time intervals, to thereby enable preventing the occupant from dozing while driving the vehicle. Further, when the rough road traveling function adding mode is selected, the seatbelt is retracted to fix the occupant to his seat to thereby enable preventing the occupant from shaking even in traveling on a rough road and provide a safe driving condition.

Figure 11:
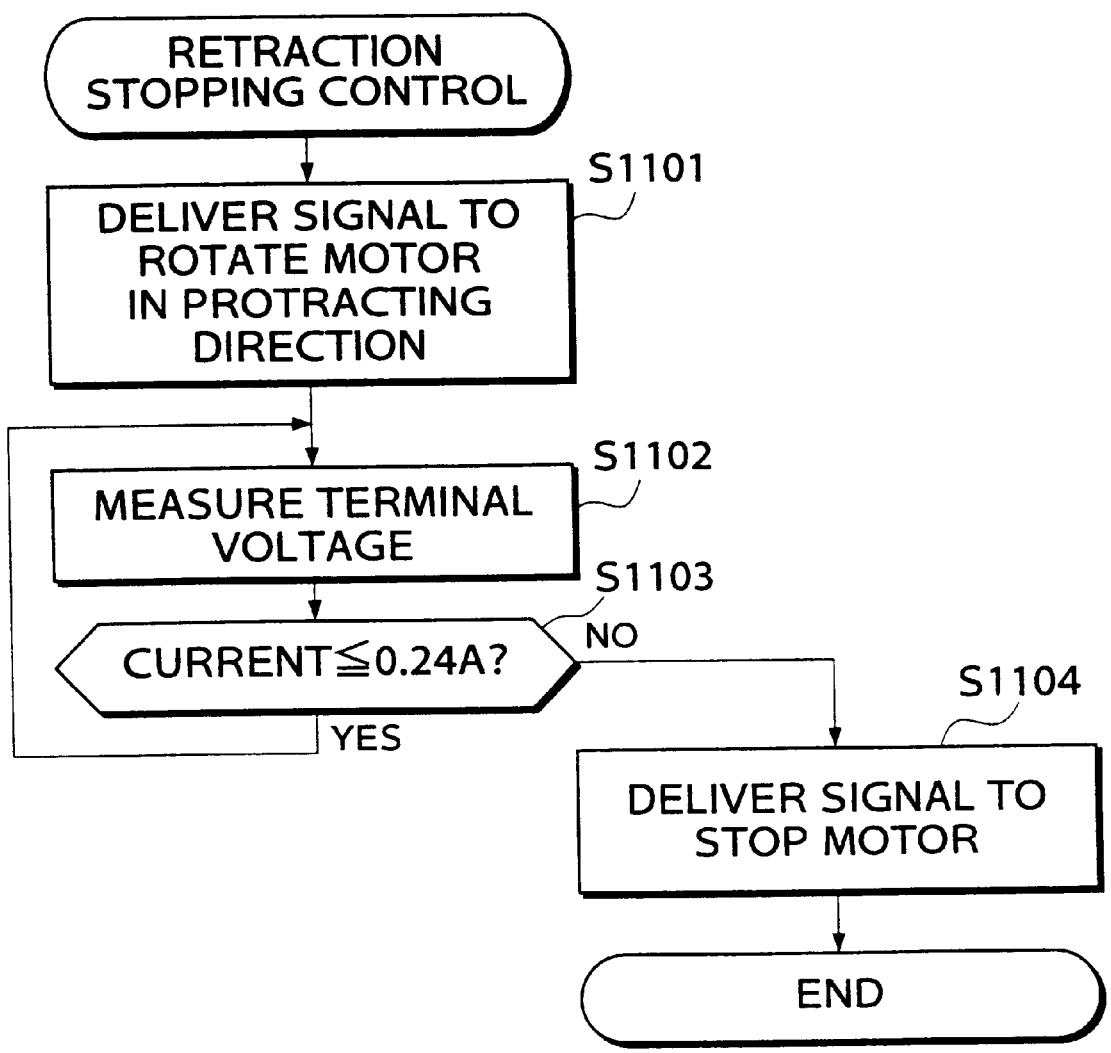
FIG. 11 is a flowchart showing retraction stopping control executed at a step S406 in FIG. 4.

FIG. 11 is a flowchart showing the retraction stopping control executed at the step S406 in FIG. 4.

First, the MPU 14 delivers a control signal commanding to rotate the reel shaft 3 in the seatbelt protracting direction to the DC motor driver 11 at a step S1101. Thus, the seatbelt is protracted to be slackened.

Then, the current flowing to the DC motor 10 is measured by the circuit C1 of the DC motor driver 11 at a step S1102, and it is determined at a step S1103 whether the measured current is not smaller than a predetermined amount (e.g. 0.24 amperes).

If the measured current is smaller than the predetermined amount, the processing returns to the step S1102, whereas if the former is not smaller than the latter, the MPU 14 delivers a control signal commanding to stop the rotation of the reel shaft 3 to the DC motor driver 11 at a step S1104, to thereby secure loosening of the seatbelt and inhibit retraction of the seatbelt due to the bias force of the bias force-imparting means. Then, the program is terminated.

According to the retraction stopping control, when the current flowing to the DC motor 10 is not smaller than the predetermined amount, the rotation of the reel shaft 3 is stopped, to thereby secure loosening of the seatbelt and inhibit retraction of the seatbelt due to the bias force of the bias force-imparting means.

Figure 12:
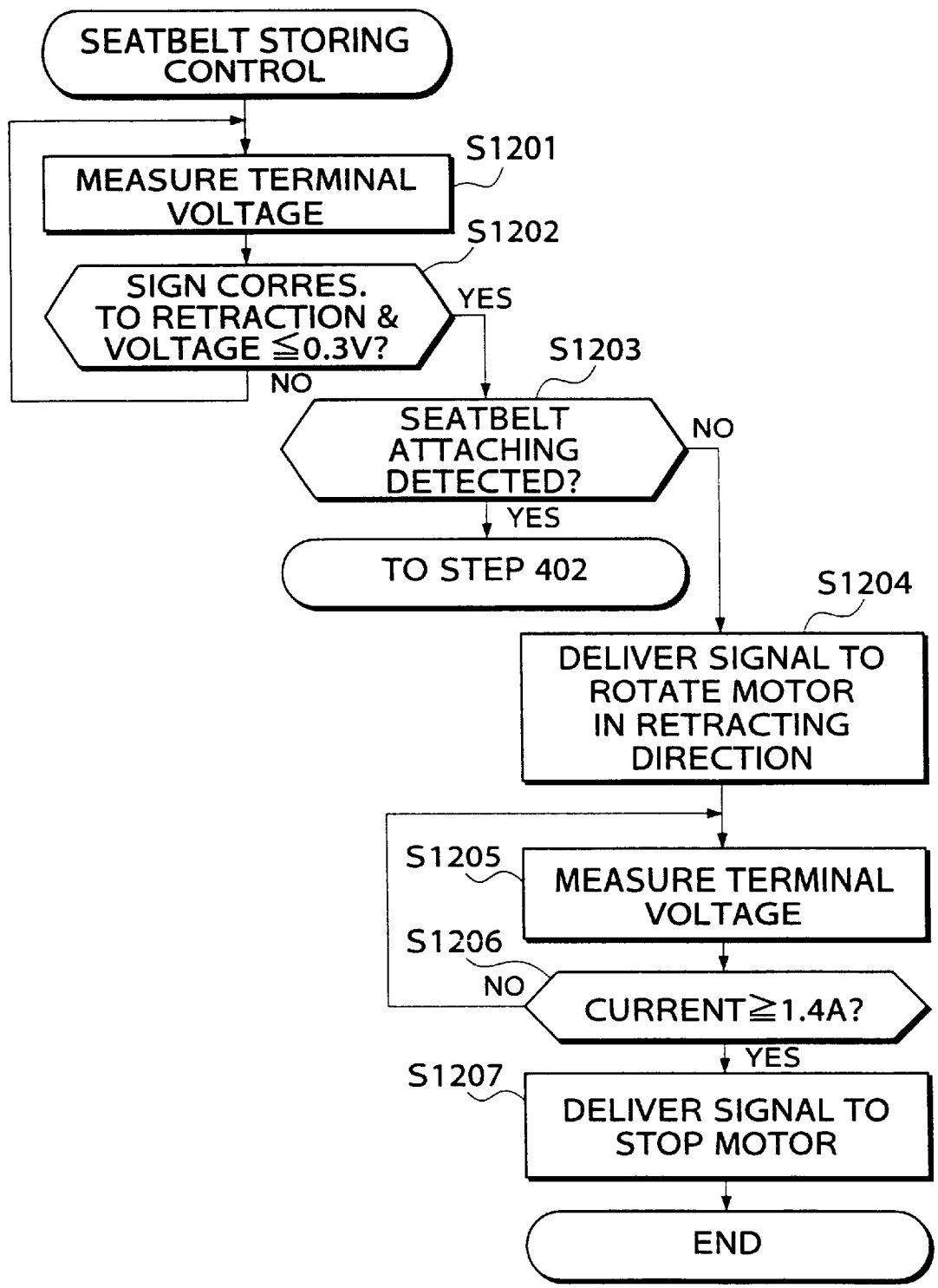
FIG. 12 is a flowchart showing seatbelt storing control executed at a step S408 in FIG. 4.

FIG. 12 is a flowchart showing the seatbelt storing control executed at the step S408 in FIG. 4.

First, when the occupant has disconnected the tongue of the seatbelt from the buckle, the terminal voltage across the DC motor 10 and the sign of the same are measured by the circuit 2 of the DC motor driver 11 at a step S2101, and it is determined at a step S1202 whether the measured terminal voltage exceeds a predetermined value (e.g. 0.3.volts) and at the same time the sign corresponds to the seatbelt retracting direction. The answer to this question is affirmative (YES) if the seatbelt has been retracted due to the bias force of the bias force-imparting means, and therefore retraction of the seatbelt through driving by the DC motor 10 is not needed.

If the measured terminal voltage exceeds the predetermined value and at the same time the sign corresponds to the seatbelt retracting direction, the processing returns to the step S1201, whereas if the measured terminal voltage does not exceed the predetermined value or if the sign does not correspond to the seatbelt retracting direction, that is, if the seatbelt is no longer retracted due to the bias force of the bias force-imparting means but retraction of the seatbelt by the driving force of the DC motor 10 is needed, it is determined at a step S1203 whether attaching of the tongue of the seatbelt to the buckle has been detected by the buckle connection detector 16.

If attaching of the seatbelt has been detected, it is judged that although the tongue was once disconnected from the buckle, the tongue has again been mounted onto the buckle, and then the above described buckle attaching control (step S402) is carried out, whereas if attaching of the seatbelt has not been detected, the MPU 14 delivers a control signal commanding to rotate the reel shaft 3 in the seatbelt retracting direction to the DC motor driver 11 at a step S1204. Thus, the seatbelt is retracted.

Then, the current flowing to the DC motor 10 is measured by the circuit C2 of the DC motor driver 11 at a step S1205, and it is determined at a step S1206 whether the measured current exceeds a predetermined =amount (e.g. 1.4 amperes).

If the measured current does not exceed the predetermined amount, the processing returns to the step S1205, whereas if the former exceeds the latter, the MPU 14 judges that the retraction of the seatbelt has reached its limit, and delivers a control signal commanding to stop the rotation of the reel shaft 3 to the DC motor driver 11 at a step S1207.

According to the seatbelt storing control described above, when the seatbelt is no longer retracted by the bias force of the bias force-imparting means but retraction of the seatbelt by the driving force of the DC motor 10 is needed (the answer is NO at the step S1202), and at the same time the attaching of the seatbelt tongue to the buckle has not been detected (the answer is NO at the step S1203), the seatbelt is retracted by the driving force of the DC motor 10. Therefore, after the seatbelt tongue has been disconnected from the buckle, the seatbelt can be retracted without fail. As a result, it can be avoided that the seatbelt tongue is caught in the door.

Although in the above seatbelt storing control, if retraction of the seatbelt has reached its limit such that the current flowing to the DC motor 10 exceeds the predetermined value (step S1204), the control signal is delivered to the DC motor driver 11 to stop the rotation of the seatbelt (step S1207), alternatively the seatbelt may be protracted by the driving force of the DC motor for a predetermined time period so as to give a predetermined amount of slackness to the occupant, and irrespective of whether the occupant thereafter protracts the seatbelt, the seatbelt is again retracted to its limit and then protracted by the motor driving force so as to give a predetermined amount of slackness to the occupant, to thereby eliminate an extra amount of looseness of the seatbelt and hence properly protect the occupant.

Figure 13:
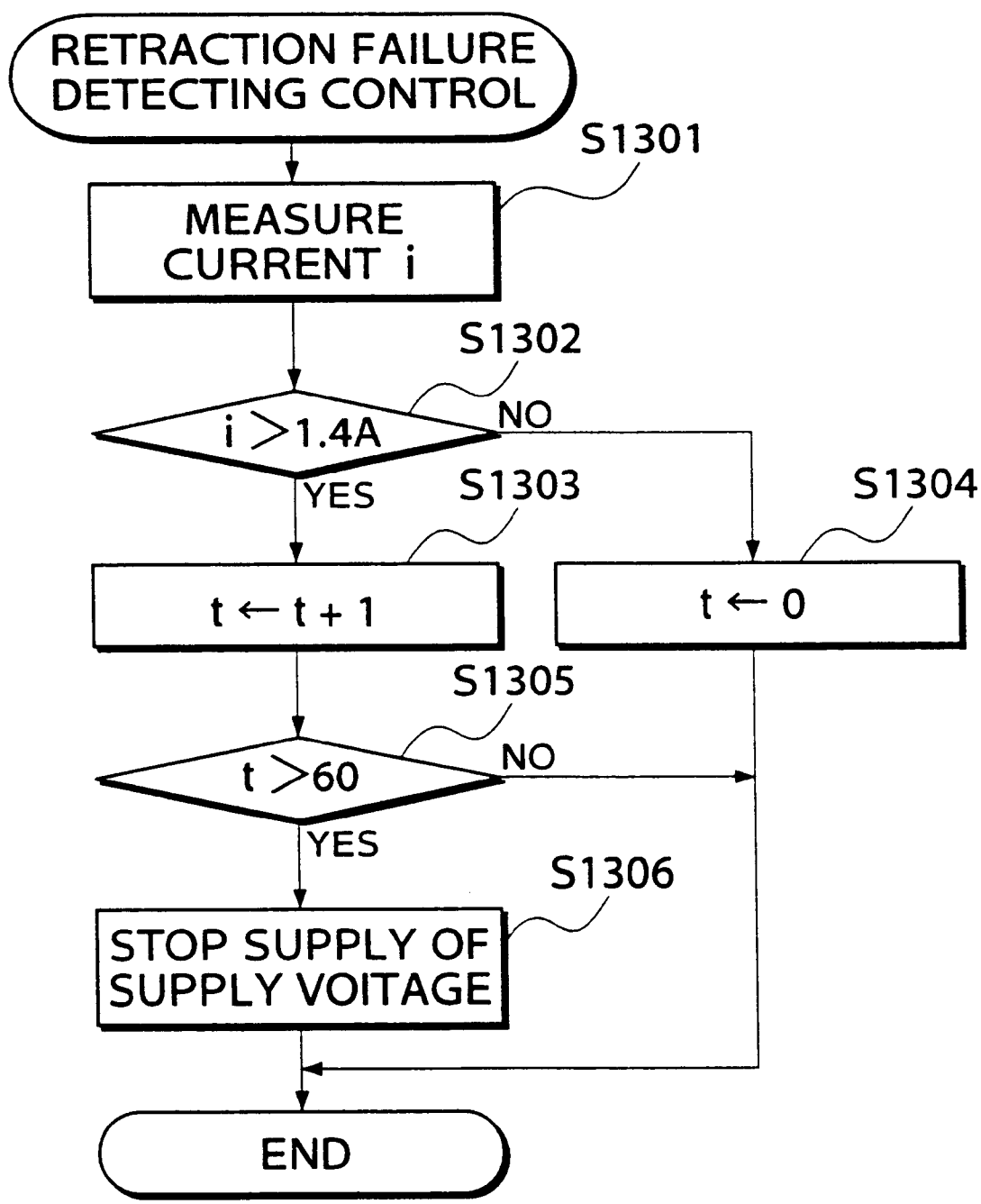
FIG. 13 is a flowchart showing seatbelt retraction failure detecting control executed at a step S409 in FIG. 4.

FIG. 13 is a flowchart showing the seatbelt retraction failure detecting control executed at the step S4098 in FIG. 4.

First, the current i flowing to the DC motor 10 is detected by the circuit C1 at a step S1301, and it is determined at a step S1302 whether the detected current i exceeds a predetermined amount (e.g. 1.4 amperes).

If the detected current i does not exceed the predetermined amount, it is judged that the retraction of the seatbelt is being carried out normally, and a time t elapsed after the start of the present control is reset to "0" at a step S1304, followed by terminating the present processing. On the other hand, if the detected current i exceeds the predetermined amount, the elapsed time t is incremented by 1 at a step S1303.

Then, it is determined at a step S1305 whether the elapsed time t exceeds a predetermined time period (e.g. 60 sec).

If the elapsed time t does not exceed the predetermined time period, it is judged that the retraction of the seatbelt is being carried out normally, followed by terminating the present processing, whereas if the former exceeds the latter, it is judged that the retraction of the seatbelt is being carried out abnormally, and the supply of supply voltage to the DC motor from the battery Vb is stopped at a step S1200, to stop the retraction of the seatbelt, followed by terminating the present processing.

According to the seatbelt retraction failure detecting control described above, when the current i flowing to the DC motor 10 continuously exceeds the predetermined amount over the predetermined time period (the answers are YES at the steps S1302 and S1305), it is judged that the retraction of the seatbelt is being carried out abnormally, and then the supply of supply voltage to the DC motor 10 is stopped (step S1306) to stop the retraction of the seatbelt, whereby the occurrence of a fault due to the retraction of the seatbelt can be prevented.

As described above, according to the first embodiment, the MPU 14 carries out the seatbelt protraction control, buckle attaching control, collision warning, collision unavoidableness and doze warning control, movement control, mode selecting control, retraction stopping control, seatbelt storing control, and seatbelt retraction failure control. As a result, a comfortable seatbelt attaching environment can be provided, and the occupant can be warned of danger to thereby positively protect the occupant.

The above kinds of control carried out by the MPU 14 are executed at least one time after the occupant mounts the seatbelt onto his body and until he dismounts the seatbelt from his body.

The automotive passenger restraint and protection apparatus according to the present embodiment may be provided at any of the driving seat, the assistant driving seat, and the back seats.

The values of the waiting time by the MPU 14, terminal voltage across the DC motor 10 and current flowing to the DC motor 10 used in the present embodiment as described above are given by way of example and not limitative.

Second to thirtieth embodiments of the invention will be described hereinbelow. In the description of these embodiments, elements and parts as well as steps corresponding to those in the first embodiment described above are designated by identical reference numerals, detailed description of which is omitted. In the following, only those which differ from the first embodiment will be described.

Second Embodiment

The second embodiment is distinguished from the above described first embodiment only in that it is provided with a mechanism for stopping the retraction of the seatbelt (304, 308, 309 and 317).

Figure 14:
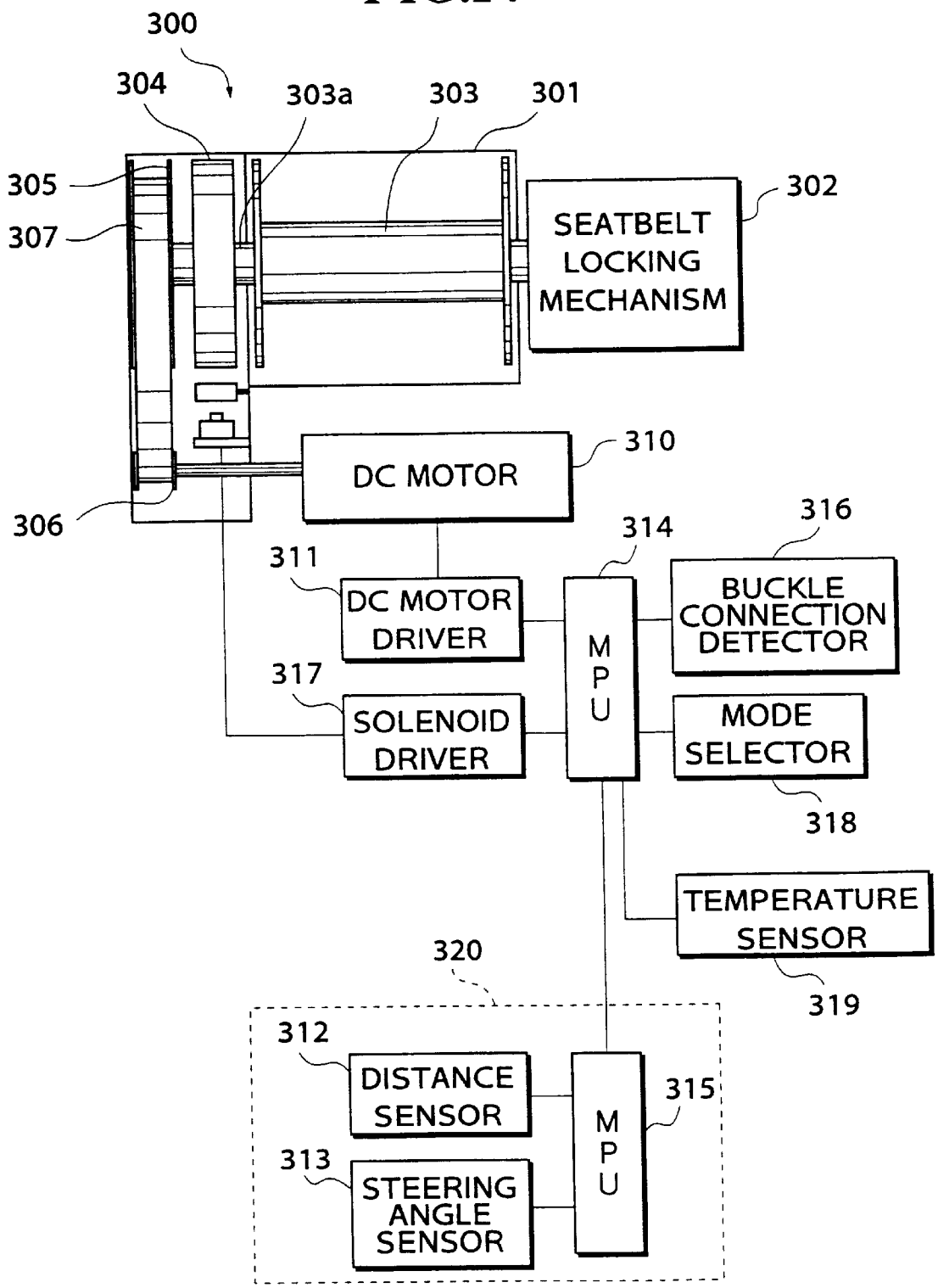
FIG. 14 is a flowchart showing a block diagram showing the arrangement of an automotive passenger restraint and protection apparatus according to a second embodiment of the invention.

FIG. 14 is a block diagram showing the arrangement of an automotive passenger restraint and protection apparatus according to the second embodiment. The apparatus according to the present embodiment is provided with a seatbelt retractor 300.

The reel shaft 3 has a central shaft 3a coupled to a central shaft of a retraction stopping gear 304, which is rotatable in the same direction as the reel shaft 3, and has an outer periphery thereof formed with a predetermined number of outer teeth. The gear 304 has a teeth surface facing in the seatbelt retracting direction which extends almost normally to the seat belt, and a teeth surface facing in the seatbelt protracting direction which extends at a gentle inclination relative to the seatbelt.

The gear 304 has a stopper arm 308 for stopping retraction of the seatbelt, which is normally biased by a coiled spring or the like in such a direction that retraction of the seatbelt cannot be stopped by the stopper arm 308, and lifted by the action of a stopper arm driving solenoid 309 when retraction of the seatbelt is to be stopped. In the lifted position, the stopper arm 308 is in mesh with the outer teeth of the gear 304 to stop the retraction of the seatbelt.

When the gear 304 is rotated in the seatbelt protracting direction, the seatbelt can be protracted by virtue of the above-mentioned teeth profile of the gear 304 even when the gear 304 is in mesh with the stopper arm 308.

The solenoid driver 317 actuates the stopper arm driving solenoid 309 in response to a control signal from the MPU 14 to lift up the stopper arm 308 into mesh with the outer teeth of the retraction stopping gear 304 to thereby stop the retraction stopping gear 304.

The mode selector 18 delivers an output signal corresponding to the selected mode to the MPU 14, which in turn delivers a control signal corresponding to the selected mode to the DC motor driver 11 and the solenoid driver 317 to control the seatbelt retractor 300.

In the present embodiment, the MPU 14 controls the electric retractor 300 based upon a main control program which is basically identical with the control program of FIG. 4 employed the first embodiment, except for the buckle attaching control, collision warning, collision unavoidableness and doze warning control, movement control, mode selecting control, and seatbelt storing control. In the following description, only different points of these controls from the first embodiment will be described.

Figure 15:
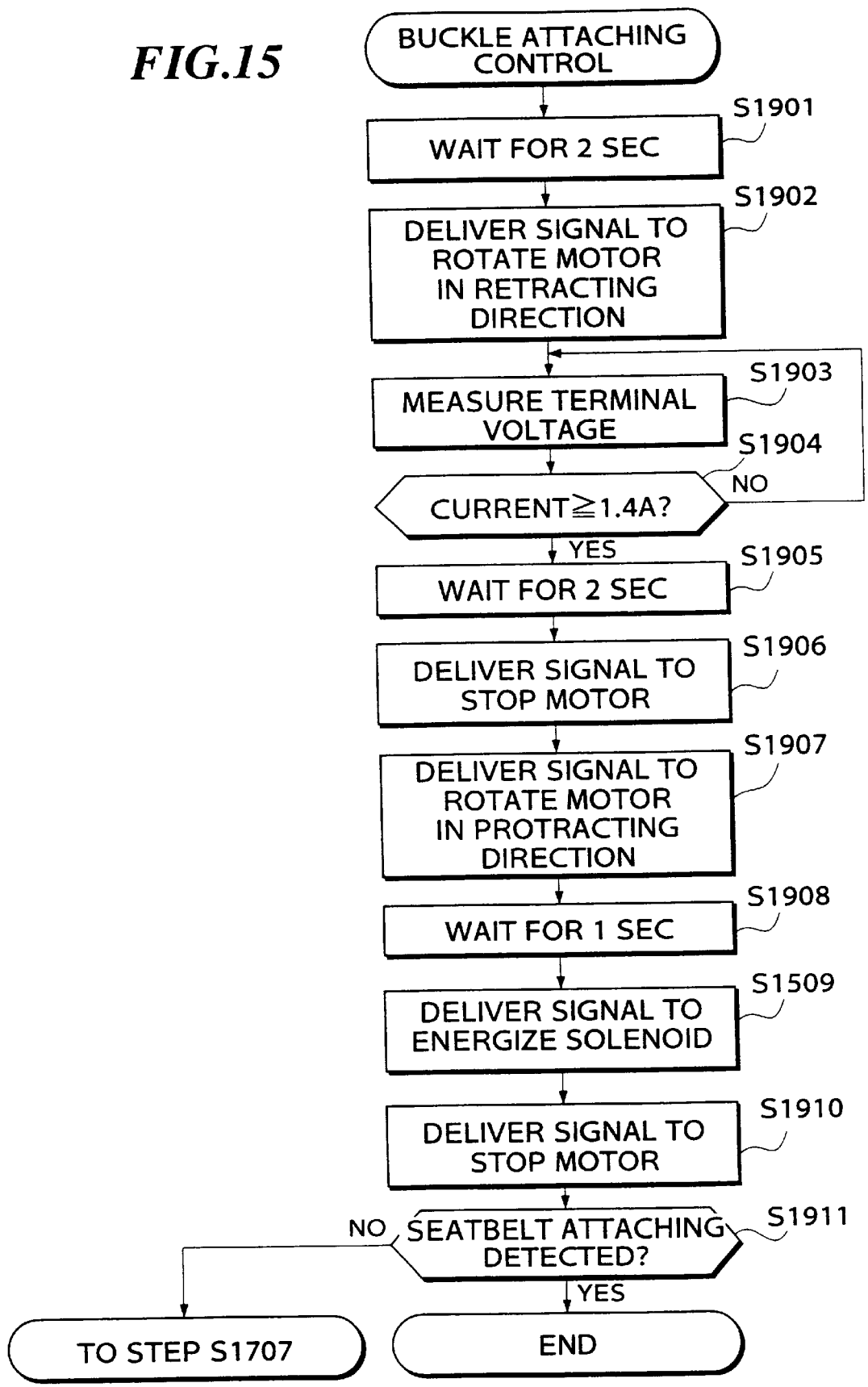
FIG. 15 is a flowchart showing buckle attaching control executed at a step S1702 in FIG. 7.

FIG. 15 is a flowchart of buckle attaching control according to the present embodiment executed at the step S402 in FIG. 4. The buckle attaching control according to the present embodiment is distinguished from the one (FIG. 6) according to the first embodiment only in that a step S1511 is added.

After waiting for the predetermined time period (e.g. 1 sec) at the step S608, the MPU 14 delivers a control signal commanding to drive the stopper arm driving solenoid 309 to the solenoid driver 317 to thereby stop the rotation of the gear 304 at the step S1511, followed by the program proceeding to the step S609.

Even by the above described buckle attaching control according to the present invention, similar results to those obtained by the buckle attaching control of FIG. 6 according to the first embodiment can be obtained.

Figure 16:
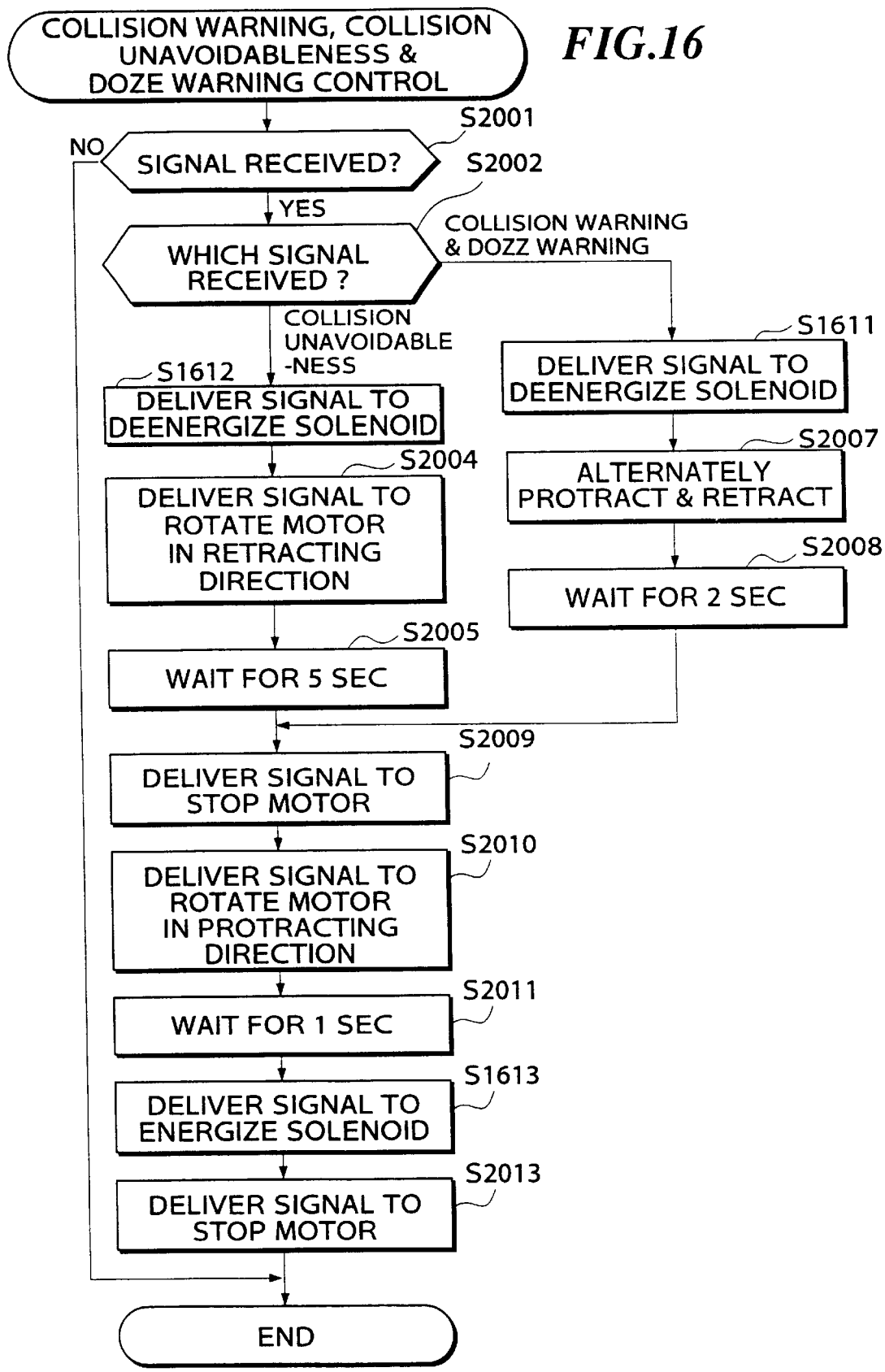
FIG. 16 is a flowchart showing control of warning of collision and determination of unavoidableness of collision, and warning of doze executed at a step S1703 in FIG. 7.

FIG. 16 is a flowchart showing the collision warning, collision unavoidableness and doze warning control according to the present embodiment executed at the step S403 in FIG. 4. This control is distinguished from the above described control of FIG. 7 only in that steps S1611 to S1613 are added.

If it is determined at the step S702 that the received signal is the second signal indicative of a collision being unavoidable, the MPU 14 delivers to the solenoid driver 317 a control signal commanding to deenergize the stopper arm driving solenoid 309 so as not to lift up the stopper arm 308 and hence allow the retraction stopping gear 304 to be rotatively driven at the step S1612, followed by the program proceeding to the step S703.

On the other hand, if it is determined at the step S702 that the received signal is the first signal giving warning of danger of collision or the third signal giving warning against doze, the MPU 14 delivers to the solenoid driver 317 a control signal commanding to deenergize the stopper arm driving solenoid 309 so as not to lift up the stopper arm 308 and hence allow the retraction stopping gear 304 to be rotatively driven at the step S1611, followed by the program proceeding to the step S705.

After waiting for the predetermined time period (e.g. 1 sec) at the step S709, the MPU 14 delivers a control signal commanding to energize the stopper arm driving solenoid 309 to the solenoid driver 307 to thereby stop the rotation of the retraction stopping gear 304 at the step S1613, followed by the program proceeding to the step S710.

Even by the above described collision warning, collision unavoidableness and doze warning control according to the present embodiment, similar results to those obtained by the control of FIG. 7 according to the first embodiment can be obtained.

Figure 17:
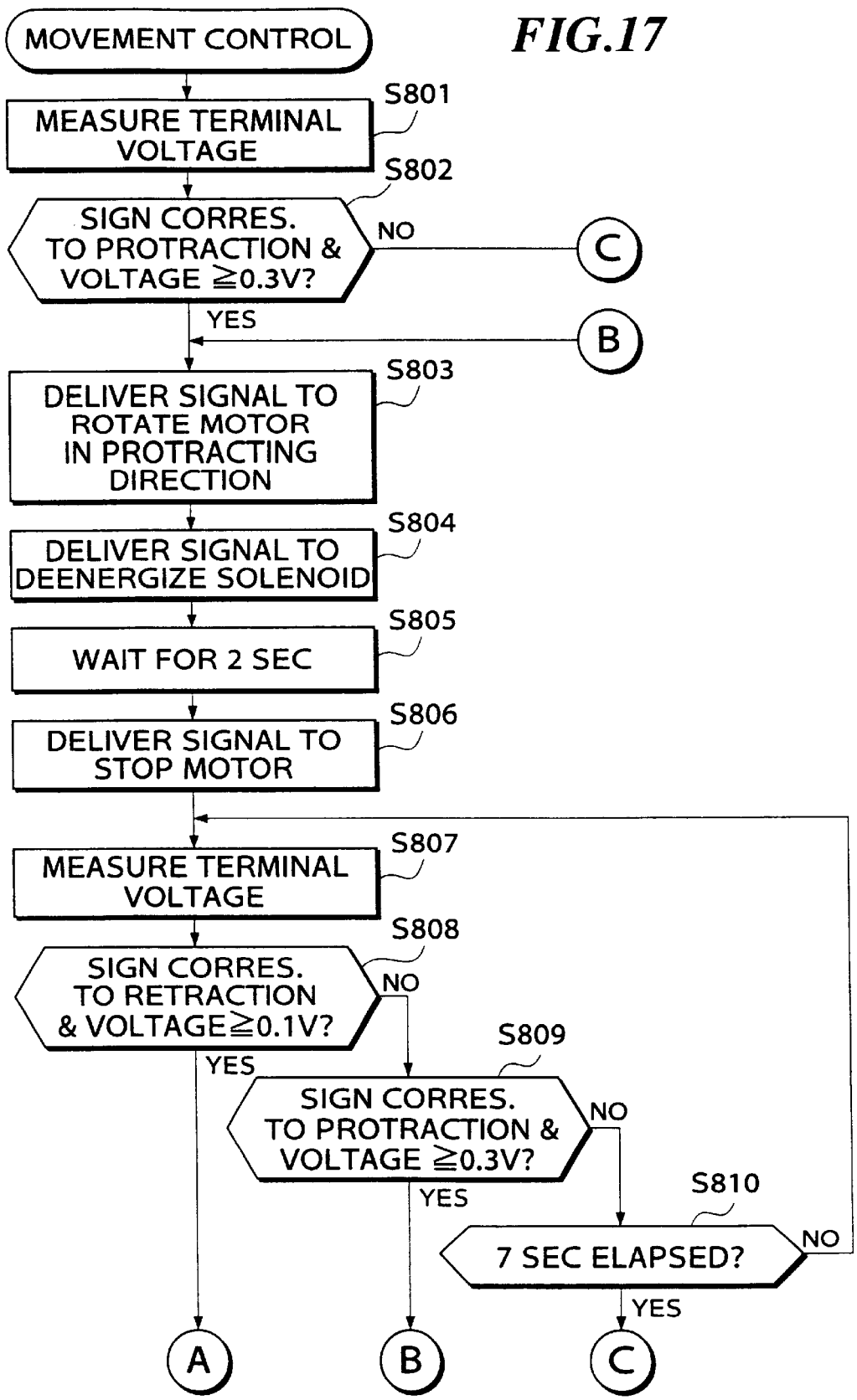
FIG. 17 is a flowchart showing movement control executed at a step S1704 in FIG. 7.
Figure 18:
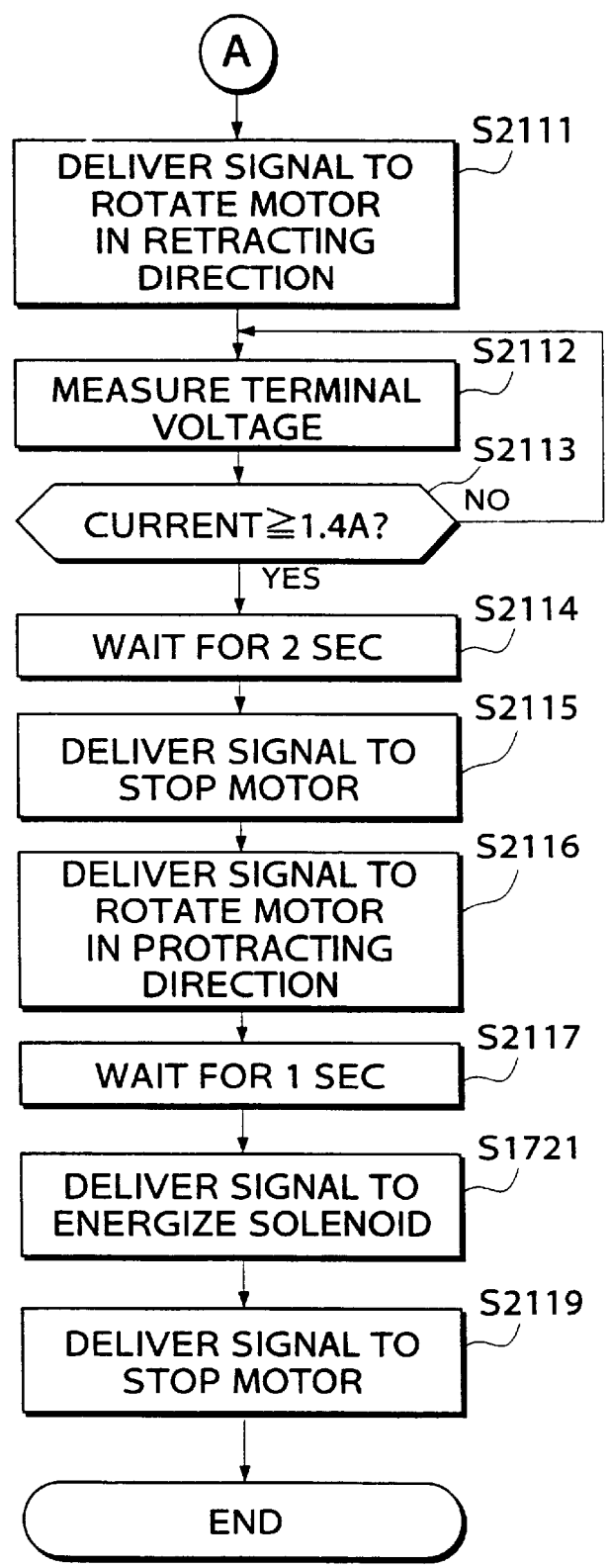
FIG. 18 is a flowchart showing a continued part of the FIG. 21 control.

FIGS. 17 and 18 are flowcharts showing the movement control according to the present invention executed at the step S404 in FIG. 4. The movement control according to the present embodiment is distinguished from the movement control of FIGS. 8 and 9 according to the first embodiment only in that steps S1720 and S1721 are added.

After executing the step S803, the MPU 14 delivers to the solenoid driver 317 a control signal commanding to deenergize the stopper arm driving solenoid 309 so as not to lift up the stopper arm 308 and hence allow the retraction stopping gear 304 to be rotatively driven at the step S1720, followed by the program proceeding to the step S804.

After waiting for the predetermined time period (e.g. 1 sec) at the step S816, the MPU 14 delivers a control signal commanding to energize the stopper arm driving solenoid 309 to the solenoid driver 307 to thereby stop the rotation of the retraction stopping gear 304 at the step S1721, followed by the program proceeding to the step S817.

Even by the movement control according to the present embodiment, similar results to those obtained by the above described movement control (FIGS. 8 and 9) according to the first embodiment can be obtained.

Figure 19:
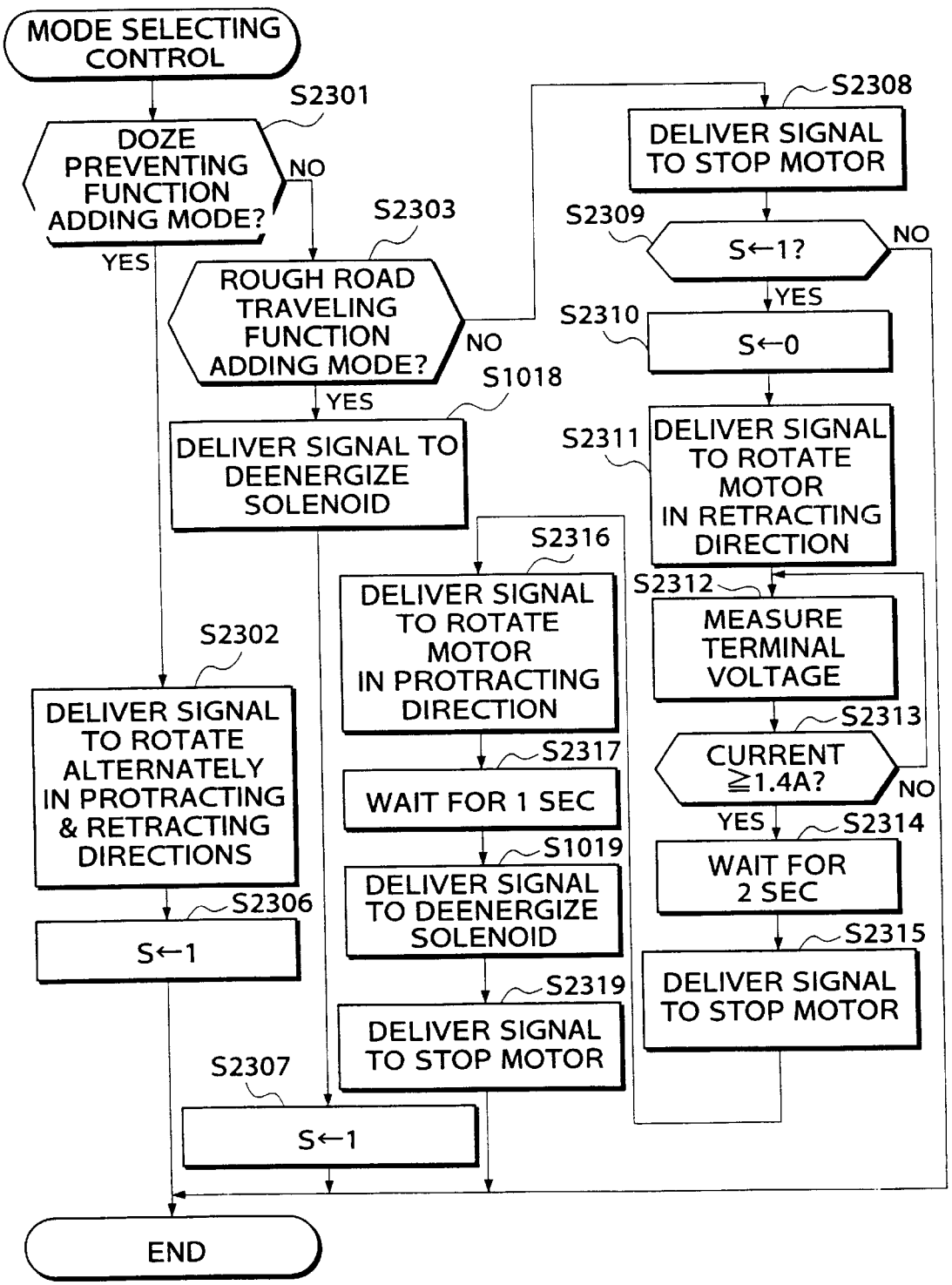
FIG. 19 is a flowchart showing a mode selecting control executed at a step S1705 in FIG. 7.

FIG. 19 is a flowchart showing the mode selecting control according to the present embodiment executed at the step S405 in FIG. 4. This control is distinguished from the mode selecting control of FIG. 10 according to the first embodiment only in that steps S1018 and S1019 are added.

If it is determined at the step S1003 that the rough road traveling function adding mode has been selected, the MPU 14 delivers to the solenoid driver 317 a control signal commanding to deenergize the stopper arm driving solenoid 309 so as not to lift up the stopper arm 308 and hence allow the retraction stopping gear 304 to be rotatively driven at the step S1018, followed by the program proceeding to the step S1004.

After waiting for the predetermined time period (e.g. 1 sec) at the step S1016, the MPU 14 delivers a control signal commanding to energize the stopper arm driving solenoid 309 to the solenoid driver 307 to thereby stop the rotation of the retraction stopping gear 304 at the step S1019, followed by the program proceeding to the step S1017.

Even by the mode selecting control according to the present invention, results similar to those obtained by the mode selecting control (FIG. 10) according to the first embodiment can be obtained.

Figure 20:
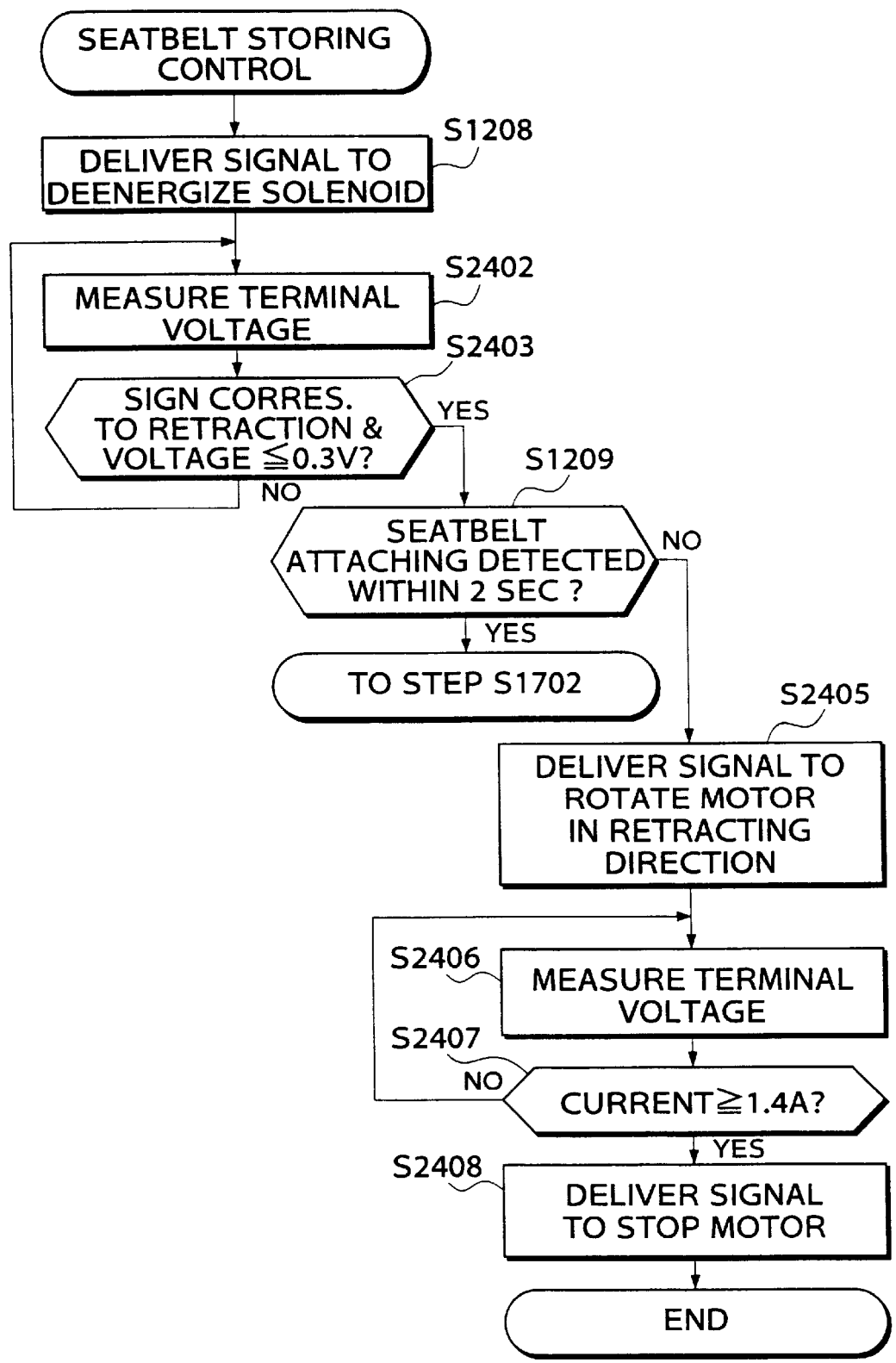
FIG. 20 is a flowchart showing seatbelt storing control executed at a step S1707 in FIG. 7.

FIG. 20 is a flowchart showing the seatbelt storing control according to the present embodiment executed at the step S408 in FIG. 4. This control is distinguished from the seatbelt storing control of FIG. 12 according to the first embodiment only in that a step S1208 is added and the step S1203 in FIG. 12 is replaced by a step S1209.

First, after the seatbelt tongue has been disconnected from the buckle, the MPU 14 delivers to the solenoid driver 317 a control signal commanding to deenergize the stopper arm driving solenoid 309 so as not to lift up the stopper arm 308 and hence allow the retraction stopping gear 304 to be rotatively driven at the step S1208, followed by the program proceeding to the step S1201.

If it is determined at the step S1202 that the measured terminal voltage exceeds the predetermined value and at the same time the sign corresponds to the seatbelt retracting direction, it is determined at the step S1209 whether attaching of the the seatbelt tongue to the buckle has been detected by the buckle connection detector 16 within a predetermined time period (e.g. 2 sec) after the MPU 14 delivered to the solenoid driver 317 the control signal commanding to deenergize the stopper arm driving solenoid 309 so as not to lift up the stopper arm 308 and hence allow the retraction stopping gear 304 to be rotatively driven at the step S1208.

If it is determined that the attaching has been detected, the aforedescribed buckle attaching control (step S402) is executed, whereas if attaching of the seatbelt has not been detected, the processing proceeds to the step S1204.

Even by the seatbelt storing control according to the present embodiment, similar results to those obtained by the seatbelt storing control (FIG. 12) according to the first embodiment can be obtained.

As described above, according to the second embodiment, similarly to the first embodiment, the MPU 14 carries out the seatbelt protraction control, buckle attaching control, collision warning, collision unavoidableness and doze warning control, movement control, mode selecting control, retraction stopping control, seatbelt storing control, and seatbelt retraction failure control. As a result, a comfortable seatbelt attaching environment can be provided, and the occupant can be warned of danger to thereby positively protect the occupant.

Third Embodiment

An automotive passenger restraint and protection apparatus according to a third embodiment of the invention includes an electric retractor which is identical in construction with the electric retractor employed by the first embodiment, except that the bias force-imparting means is omitted, and therefore illustration and description of the same are omitted.

The third embodiment is distinguished from the first embodiment in the manner of seatbelt protraction control. The seatbelt protraction control according to the third embodiment will be described hereinbelow.

Figure 21:
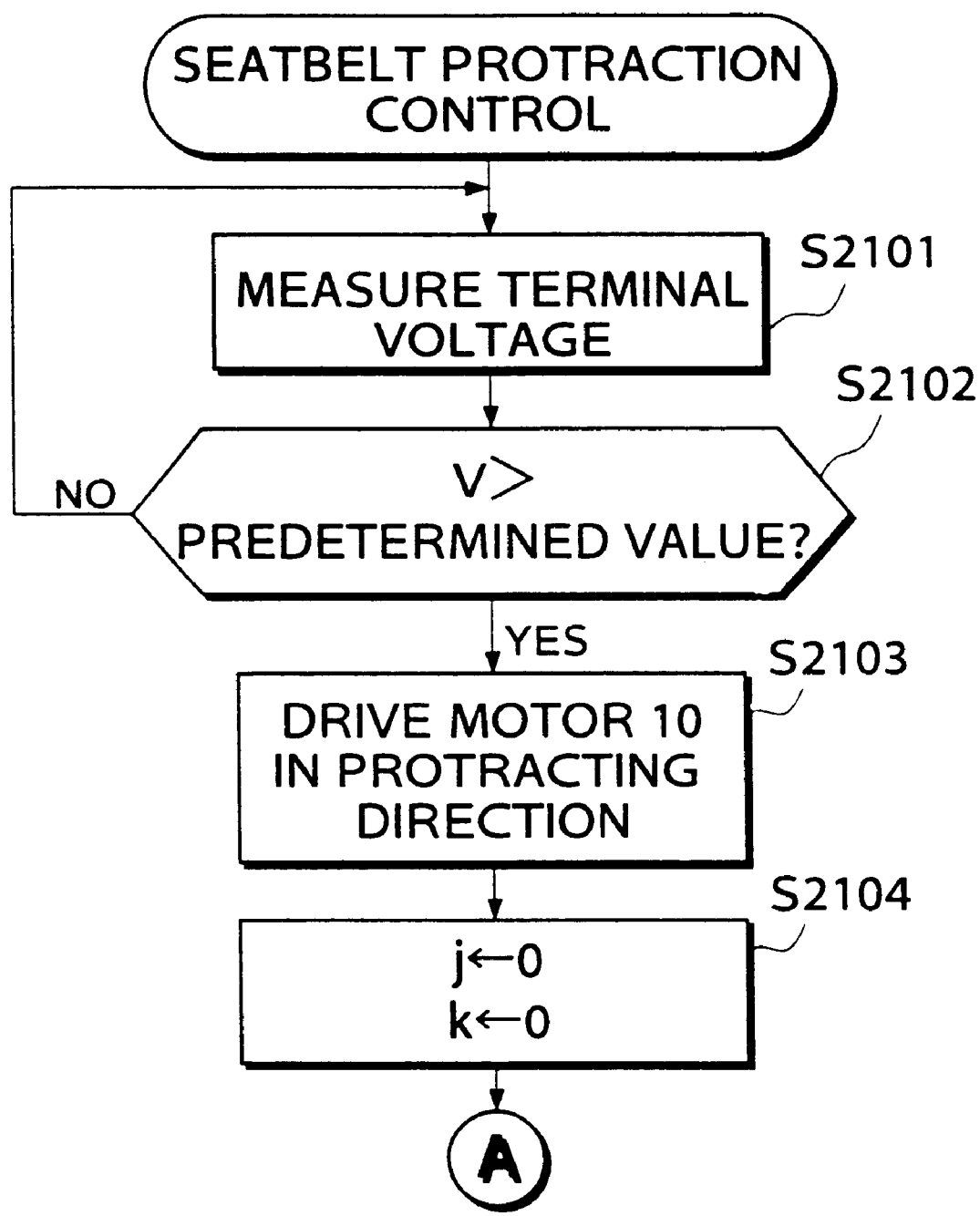
FIG. 21 is a flowchart showing seatbelt protraction control executed by the MPU 14 during protraction of the seatbelt.
Figure 22:
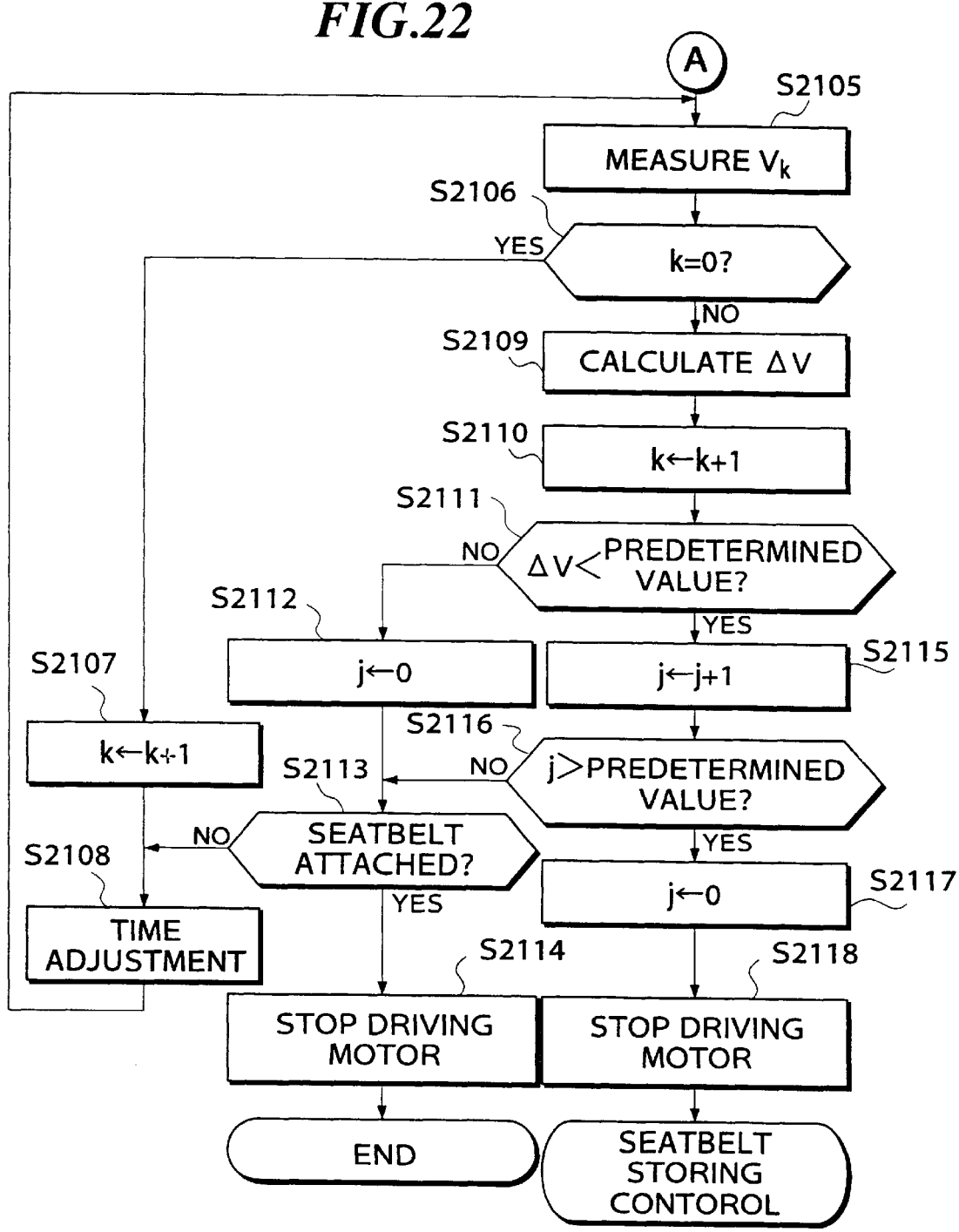
FIG. 22 is a flowchart showing a continued part of the FIG. 21 control.

FIGS. 21 and 22 are flowcharts showing the seatbelt protraction control according to the present embodiment, which is executed by the MPU 14 in protracting the seatbelt.

First, at a step S2101, the terminal voltage V across the DC motor 10 is measured by the voltage measuring circuit C2 while opposite terminals of the DC motor are open. It is determined at a step S2102 whether the measured terminal voltage V exceeds a predetermined value (e.g. 0.3 volts).

If the terminal voltage v is not higher than the predetermined value, the processing returns to the step S2101, whereas if the former exceeds the latter, the MPU 14 delivers a control signal commanding to rotate the reel shaft 3 in the seatbelt protracting direction to the DC motor driver 11 at a step S2103. Thus, retraction of the seatbelt is assisted.

Figure 23:
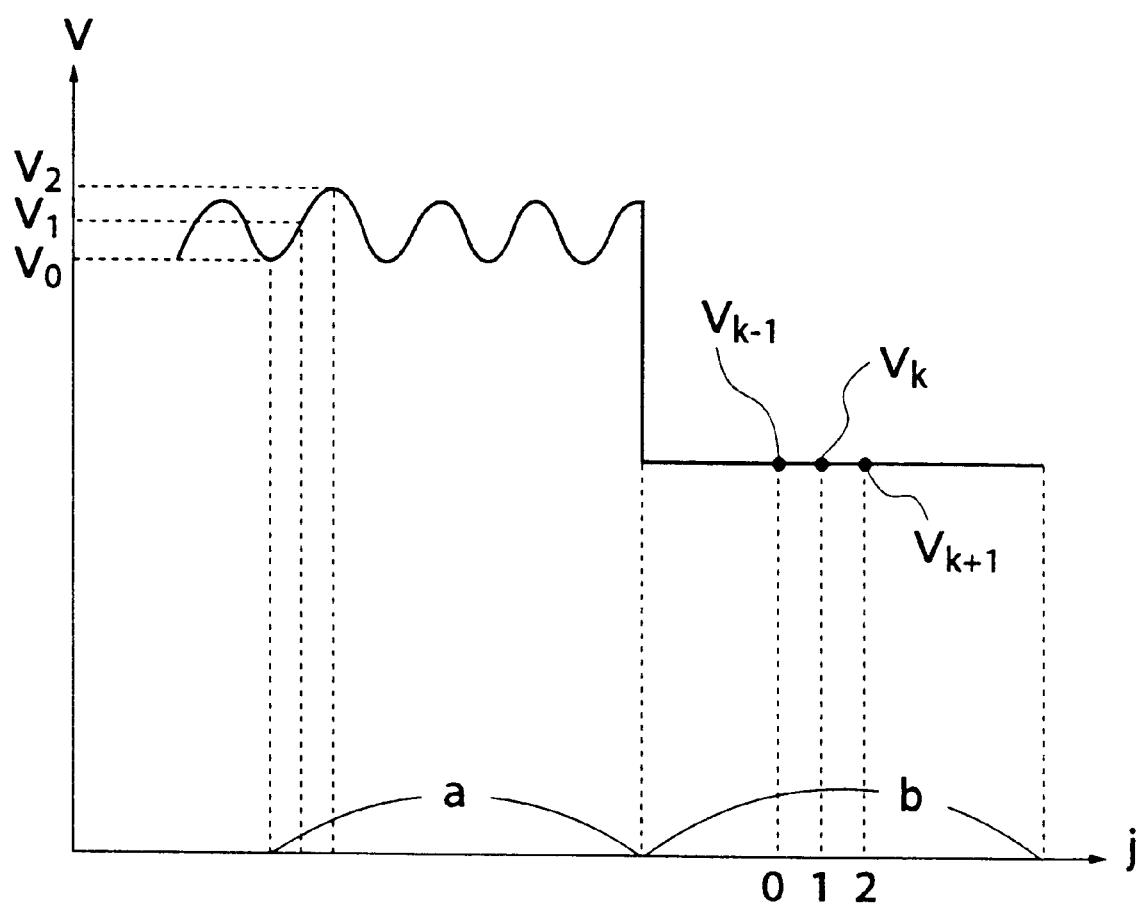
FIG. 23 is a graph showing, by way example, the relationship between terminal voltage V of a DC motor 10 and elapsed time.

FIG. 23 is a graph showing, by way of example, the relationship between the terminal voltage V of the DC motor 10 and elapsed time.

In the following description, it is assumed that Vk (k=0, 1, 2, . . . ) represents the terminal voltage V across the DC motor, and |Vk−Vk−1| represents a change amount ΔV in the terminal voltage V. It is also assumed that the unit time (time period up to time point 1 in FIG. 23) is 10 ms, for example.

In FIG. 23, over a time period a the terminal voltage Vk fluctuates in the form of a waveform. This is because the DC motor 10 drives the reel shaft 3 against the bias force of the bias force-imparting means formed of the spiral spring or the like to assist protraction of the seatbelt by the occupant. On the other hand, over a time period b in the figure, the terminal voltage V exhibits a constant value, that is, it does not fluctuate. This is because the protraction of the seatbelt by the occupant is no longer carried out and accordingly the DC motor 10 has stopped driving.

Referring back to FIG. 21, time j and a suffix counter k for the terminal voltage Vk across the DC motor 10 are reset at a step S2104, and then the terminal voltage Vk is measured by the voltage measuring circuit C2 at a step S2105.

It is then determined at a step S2106 whether the suffix counter assumes a value of 0. If it assumes 0, the count value of the suffix counter k is incremented by 1 at a step S2107. Then, a time adjustment is carried out so as to measure the terminal voltage Vk at predetermined time intervals (10 ms) at a step S2108, followed by the processing returning to the step S2105. If it is determined at the step S2106 that the suffix counter k does not assume 0, the change amount $\Delta V$ (=|Vk−Vk−1|) in the terminal voltage Vk per a predetermined time period (10 ms) at a step S2109, and the count value of the suffix counter k is incremented by 1 at a step S2110.

It is then determined at a step S2111 whether the change amount $\Delta V$ obtained at the step S2110 is smaller than a predetermined amount (e.g. 0.1 volts). If the change amount $\Delta V$ exceeds the predetermined value, that is, if the protraction of the seatbelt is being carried out by the occupant, the time j is reset at a step S2112, and then it is determined at a step S2113 that attaching of the seatbelt tongue to the buckle has been detected by the buckle connection detector 16. If attaching of the seatbelt has not been detected, the processing returns to the step S2108, whereas if attaching of the seatbelt has been detected, the MPU 14 delivers a control signal commanding to stop the driving of the DC motor 10 to the DC motor driver 11 at a step S2114, followed by terminating the present processing.

If it is determined at the step S2111 that the change amount $\Delta V$ obtained at the step S2110 is smaller than the predetermined amount, that is, the protraction of the seatbelt is not being carried out by the occupant, the time j is incremented by 1 at a step S2115, and it is determined at a step S2116 whether the time j exceeds a predetermined value (e.g. 200). If the time j does not exceed 200, the determination of the step S2113 is executed, while if the former exceeds the latter, the time j is reset at a step S2117, and a control signal commanding to stop the driving of the DC motor 10 is delivered to the DC motor driver 11 at a step S2118, followed by the processing proceeding to the seatbelt storing control which is identical with the aforedescribed seatbelt storing control employed by the first embodiment and hence not described here.

As described above, according to the present embodiment, after the assistance to protraction of the seatbelt has been started (step S2103), a determination as to whether protraction of the seatbelt is being carried out is made based upon the change amount $\Delta V$ in the terminal voltage Vk across the DC motor 10 at predetermined time intervals (10 ms) (steps S2105 to S2111). If the protraction of the seatbelt is not being carried out (the answer is YES at the step S2111), a determination as to whether attaching of the seatbelt tongue to the buckle has been detected is repeated until the time j exceeds 200, that is, until a time period (2 sec) (=10 ms×200) elapses after the above determination was first carried out (step S2113). When the time period (2 sec) has elapsed, the control signal is delivered to the DC motor driver 11 to stop the driving of the DC motor 10 (step S2118), followed by executing the seatbelt storing control. As a result, if the occupant protracts the seatbelt without the intention of attaching the seatbelt onto his body, it is possible to quickly retract the seatbelt, to thereby perform the seatbelt storing operation in a manner closer to the occupant's intention and hence provide a comfortable seatbelt attaching environment.

Although in the present embodiment, the change amount $\Delta V$ (=|Vk−Vk−1|) in the terminal voltage Vk across the DC motor 10 is used in the determination as to whether protraction of the seatbelt by the occupant is being carried out, alternatively the magnitude of the terminal voltage Vk, the magnitude of current flowing to the DC motor 10 or a change amount $\Delta i$ in the current may be used in the above determination, providing substantially the same results.

Fourth Embodiment

An automotive vehicle passenger restraint and protection apparatus according to a fourth embodiment of the invention is identical in construction with the apparatus according to the first embodiment, and illustration and description of the same are omitted. The fourth embodiment is distinguished from the first embodiment in the contents of control carried out by the MPU 14.

Figure 24:
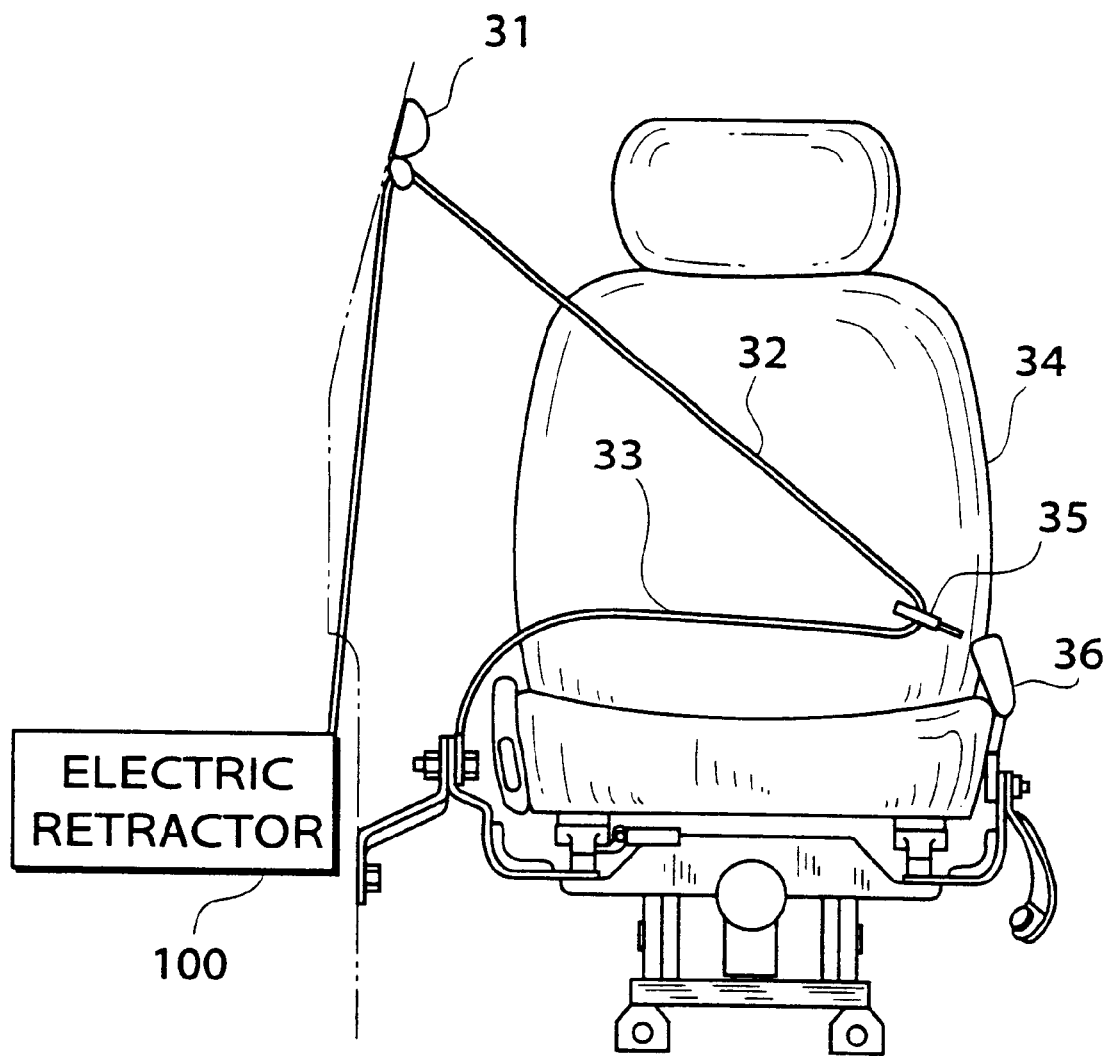
FIG. 24 is a view showing an example of a seat inside a vehicle compartment.

FIG. 24 shows an example of a seat inside a compartment of an automotive vehicle in which the automotive vehicle passenger restraint and protection apparatus is installed. The illustrated seat is a driving seat (right-side seat as viewed in the vehicle-advancing direction), but it may be an assistant driver seat (left-side seat as viewed in the vehicle-advancing direction) or a back seat.

The seat 34 has one lateral side edge-thereof provided with a buckle 36 secured to the seat for connecting with a tongue 35 of a seatbelt. At the opposite lateral side of the seat 34, one end of the seatbelt is fixed to a chassis of the vehicle by attaching means. When the tongue 35 is attached to the buckle 35, the seatbelt restrains and protects the occupant by a shoulder portion 32 and a lap portion 33 thereof. The seatbelt is retracted by the electric retractor 100 through the tongue 35 and a through portion 31 thereof.

Control of a force of the electric retractor 100 for retracting the seatbelt is carried out by controlling the driving force of the DC motor 10. When the retracting force of the electric retractor 100 is large, looseness of the shoulder portion 32 and lap portion 33 of the seatbelt can be removed, while it is small, looseness of the shoulder portion 32 can be removed.

Figure 25:
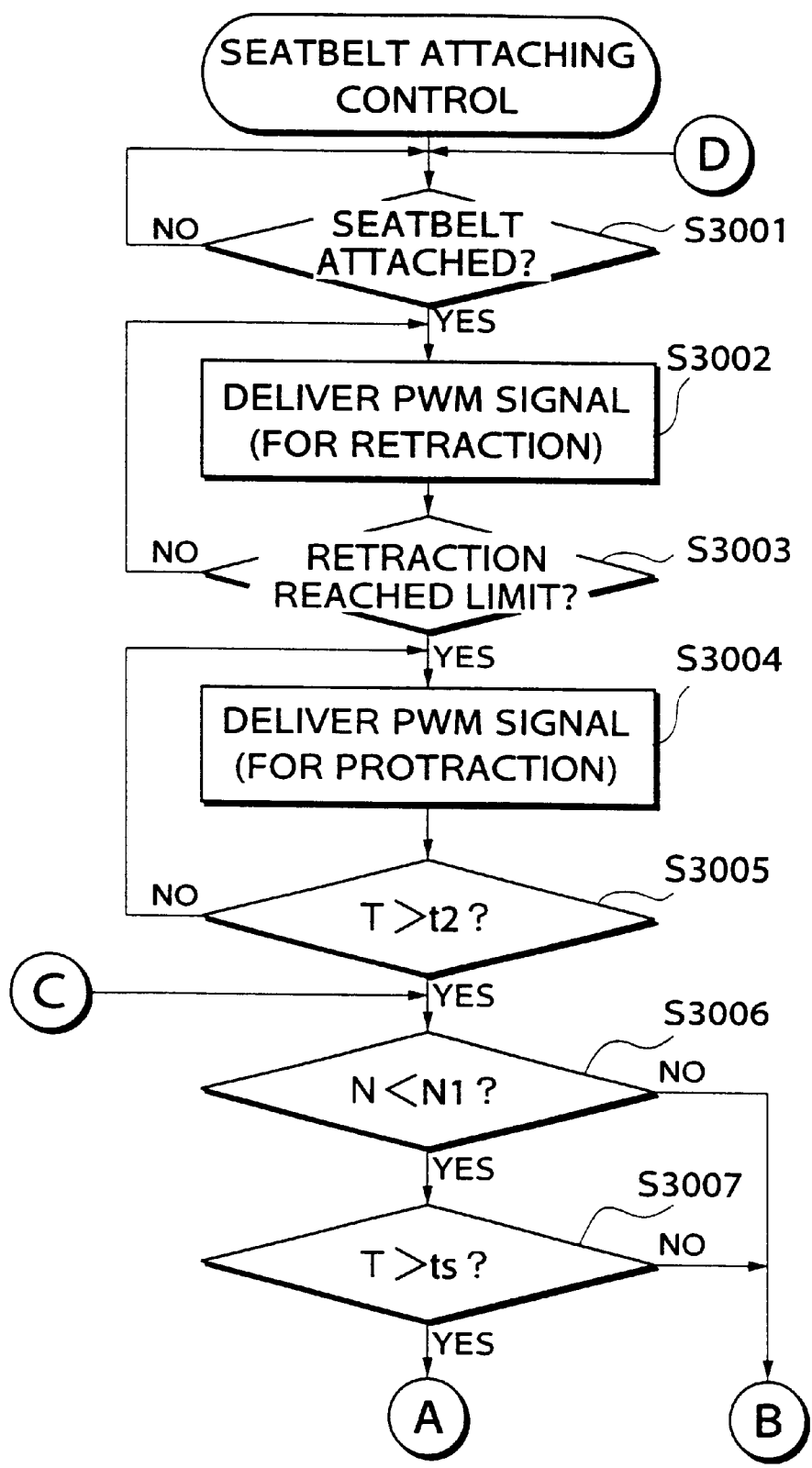
FIG. 25 is a flowchart showing seatbelt attaching control executed by the MPU 14.
Figure 26:
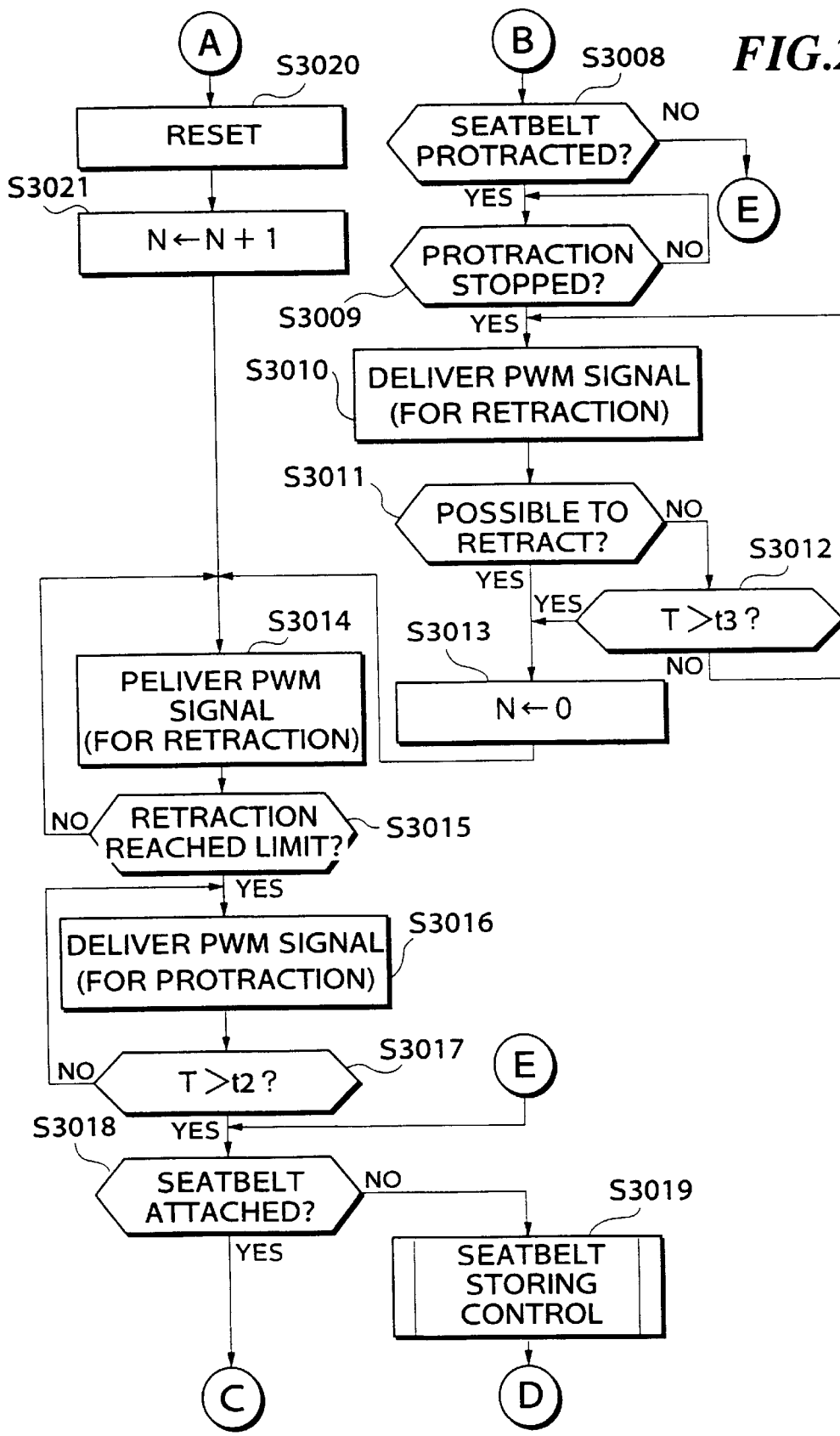
FIG. 26 is a flowchart showing a continued part of the FIG. 25 control.

FIGS. 25 and 26 are flowcharts showing seatbelt attaching control executed by the MPU 14 according to the present embodiment.

First, it is determined at a step S3001 whether attaching of the seatbelt tongue to the buckle has been detected by the buckle connection detector 16. If attaching of the seatbelt has not been detected, the same determination is repeatedly executed, whereas if it has been detected, the MPU 14 delivers a PWM signal commanding to cause current i flow to the DC motor 10 so as to rotate the DC motor in the seatbelt retracting direction at a step S3002. Thus, the seatbelt is retracted to remove looseness of the shoulder portion 32 and lap portion 33. The retracting force of the DC motor generated on this occasion is equal to the retracting force of the same obtained at a step S3014, hereinafter referred to.

Then, it is determined at a step S3003 whether the retraction of the seatbelt has reached its limit, based upon the current i flowing to the DC motor 10. If the retraction has not reached its limit, the processing returns to the step S3002 to continue the retraction of the seatbelt, whereas if the retraction has reached its limit, that is, if the seatbelt has become fit to the occupant's body, a PWM signal is delivered from the MPU 14 commanding to cause the current i to flow to the DC motor 10 to rotate the DC motor 10 in the seatbelt protracting direction so as to give a predetermined amount of looseness to the seatbelt, at a step S3004. Thus, the seatbelt is protracted. The protracting force of the DC motor generated on this occasion is equal to the protracting force of the same obtained at a step S3016, hereinafter referred to.

Then, it is determined at a step S3005 whether a predetermined time period t2 (e.g. 1 sec) has elapsed after the PWM was delivered at the step S3004, based upon the value of the timer 21, If the predetermined time period t2 has not elapsed, that is, if the predetermined amount of looseness has not yet been given, the processing returns to the step S3004, whereas if the predetermined time period t2 has elapsed, it is determined at a step S3006 whether a count value N of a counter is smaller than a predetermined value N1 (e.g. 2). The counter counts a number of times of execution of a process for removing an extra looseness of the seatbelt (seatbelt retracting process executed at the step S3014, hereinafter referred to and seatbelt protracting process executed at the step S3016, hereinafter referred to). If the count value N is smaller than the predetermined value N1, it is determined at a step S3007 whether a predetermined time period ts previously set to the timer 21 has elapsed. The predetermined time period ts is set to a value corresponding to a time period over which the occupant should impede retraction of the seatbelt to set a proper amount of looseness, and is set at a step S3020. The predetermined time period ts may be always set to a constant time period or may be set to a random time period each time it is set.

If it is determined at the step S3006 that the count value N1 exceeds the predetermined value N1 or at the step S3007 that the set predetermined time period ts has not elapsed, it is determined at a step S3008 whether protraction of the seatbelt has been made by the occupant, based upon the terminal voltage across the DC motor 10. Thus, it is possible to determine whether protraction of the seatbelt has been carried out due to movement of the occupant with the seatbelt mounted on his body, which takes place, for example, when the occupant once stops the vehicle and then slouches to look right and left ways for safety.

If no protraction of the seatbelt has been carried out, the processing proceeds to a step S3018, hereinafter referred to, whereas if protraction of the seatbelt has been carried out, it is determined at a step 93009 whether the protraction of the seatbelt by the occupant has stopped, based upon the terminal voltage across the DC motor 10. If the protraction of the seatbelt by the occupant has not stopped, the PWM signal is delivered from the MPU 14 to cause the current i to flow to the DC motor 10 so as to rotate the DC motor 10 in the seatbelt retracting direction at a step S3010. Thus, the seatbelt is retracted to remove looseness of the shoulder portion 32 of the seatbelt. The retracting force of the DC motor 10 obtained on this occasion is controlled by the MPU 14 to a smaller value than the retracting force obtained at the step S3002. This is because the retraction of the seatbelt effected at the step S3010 corresponds to protraction of the seatbelt which takes place, for example, when the occupant slouches to look right and left ways for safety, and if on such an occasion the seatbelt is retracted with the same force as the retracting force obtained at the step s3002, it gives a feeling of unnaturalness to the occupant.

Then, it is determined at a step S3011 whether the retraction of the seatbelt can still be carried out, based upon the current i flowing to the DC motor 10. If the retraction of the seatbelt can still be carried out, the count value N is cleared at a step S3013, whereas if the retraction cannot be carried out, that is, if the occupant has not yet returned from his slouching position, it is determined at a step S3012 whether a predetermined time period t3 (e.g. 5 sec) has elapsed after the first affirmative determination result at the step S3011, based upon the value of the timer 21. If the predetermined time period t3 has not elapsed, the processing returns to the step S3010, whereas if the predetermined time period t3 has elapsed,.the processing proceeds to the step S3013.

Then, the PWM signal is delivered from the MPU 14, to cause the current i to flow to the DC motor 10 to rotate the DC motor in the seatbelt retracting direction so as to remove looseness of the shoulder portion 32 and lap portion 33 occurring due to the occupant slouching or the like, at a step S3014. Thus, the seatbelt is retracted.

Then, it is determined at a step S3015 whether the retraction of the seatbelt has reached its limit, based upon the current i flowing to the DC motor 10. If the retraction has not reached its limit, the processing returns to the step S3014 to continue the retraction of the seatbelt, whereas if the retraction has reached its limit, that is, the seatbelt has become fit to the occupant's body, the PWM signal is delivered from the MPU 14 to cause the current i to flow to the DC motor 10 to rotate the DC motor in the seatbelt protracting direction so as to give a predetermined amount of looseness to the seatbelt, at a step S3016. Thus, the seatbelt is protracted.

Then, it is determined at a step S3017 whether the predetermined time period t2 has elapsed, based upon the value of the timer 21. If the predetermined time period t2 has not elapsed, that is, the predetermined amount of looseness has not yet been given to the seatbelt, and therefore the processing returns to the step S3016, whereas if the predetermined time period t2 has elapsed, it is determined at the step S3018 whether attaching of the seatbelt tongue to the buckle has been detected by the buckle connection detector 16. If attaching of the seatbelt has been detected, the processing returns to the step S3006, whereas if attaching of the seatbelt has not been detected, that is, if the seatbelt is not attached to the buckle, seatbelt storing control is executed at a step S3019 to control the DC motor 10 so as to store the seatbelt in its retracted position, followed by the processing returning to the step S3001. The seatbelt storing control is identical with the one described before with reference to FIG. 12 of the first embodiment, description of which is therefore omitted.

If it is determined at the step S3007 that the predetermined time period ts has elapsed, the time period ts is set for the next time of control at a step S3020, and the count value N is incremented by 1 at the step S3009, followed by the proceeding to the step S3014.

As described above, according to the present embodiment, after the attaching of the seatbelt (the answer is YES at the step S3001), the seatbelt is retracted to its limit and then protracted over a predetermined time period (steps S3002 to S3005), to give a predetermined amount of slackness to the occupant, and then irrespective of whether the occupant has protracted the seatbelt (the answer is YES and NO at the step S3007), the seatbelt is again retracted to its limit and then protracted over a predetermined time period (steps S3014 to S3017), to give a predetermined amount of slackness to the occupant. As a result, an extra looseness of the seatbelt can be removed to thereby properly protect the occupant.

Fifth Embodiment

Figure 27:
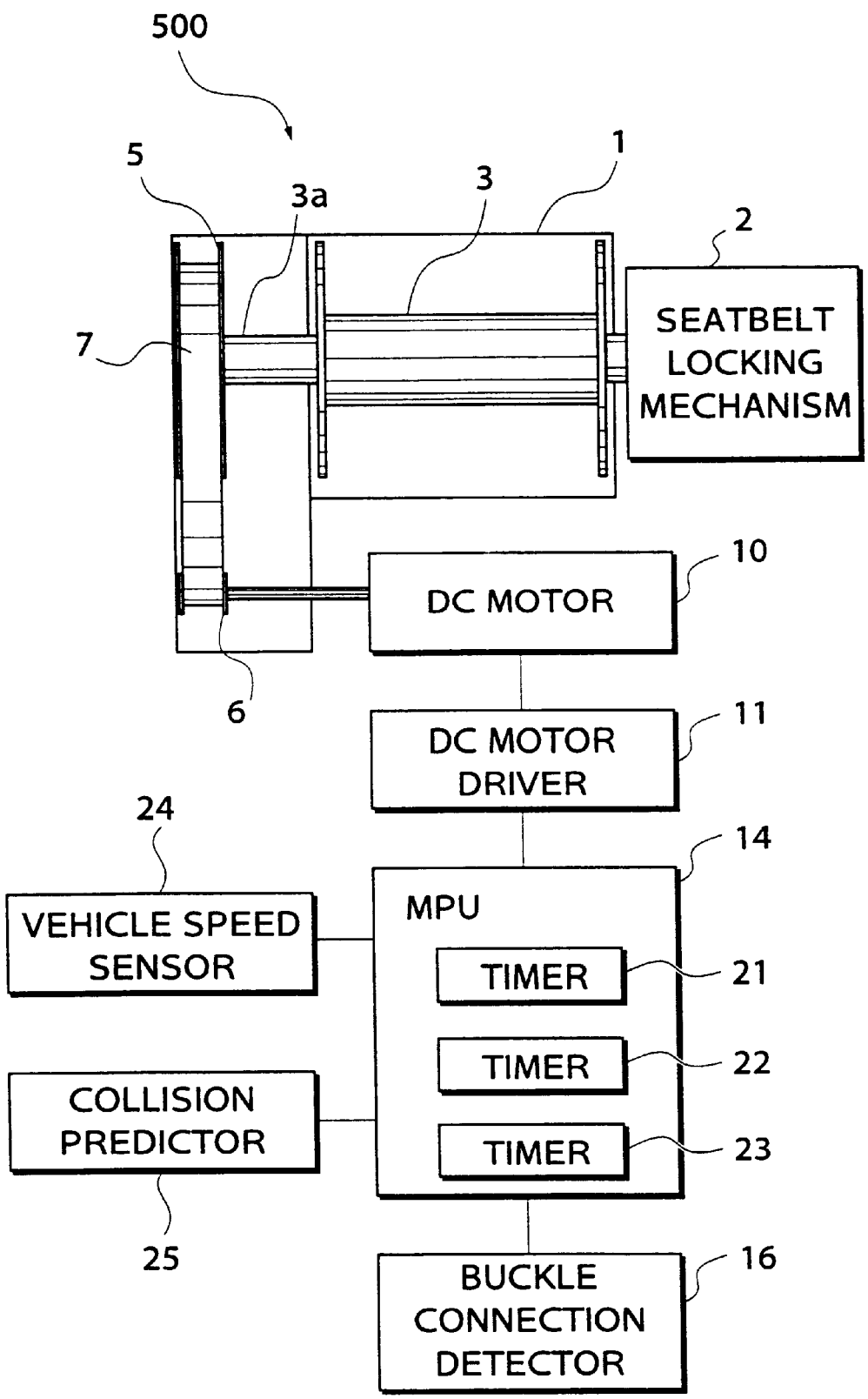
FIG. 27 is a block diagram showing the arrangement of an electric retractor 500 provided in an automotive passenger restraint and protection apparatus according to a fifth embodiment of the invention.

FIG. 27 shows the arrangement of an electric retractor 500 provided in an automotive passenger restraint and protection apparatus according to a fifth embodiment of the invention.

The electric retractor 500 includes a vehicle speed sensor 24, and a collision predictor 25 which are connected to the MPU 14, but the mode selector 18, the temperature sensor 19 and the traveling condition detector 20 in FIG. 1 are omitted. Further, the MPU 14 has timers 22 and 23 provided therein in addition to the timer 21. The electric retractor does not have bias force-imparting means as employed in the electric retractor 100.

The vehicle speed sensor 24 senses the traveling speed of the automotive vehicle and delivers an output signal indicative of the sensed traveling speed to the MPU 14. The collision predictor 25 determines whether there is a possibility of the vehicle colliding with an object lying ahead and whether the collision is unavoidable, and delivers an output signal indicative of results of the determinations to the MPU 14.

Figure 28:
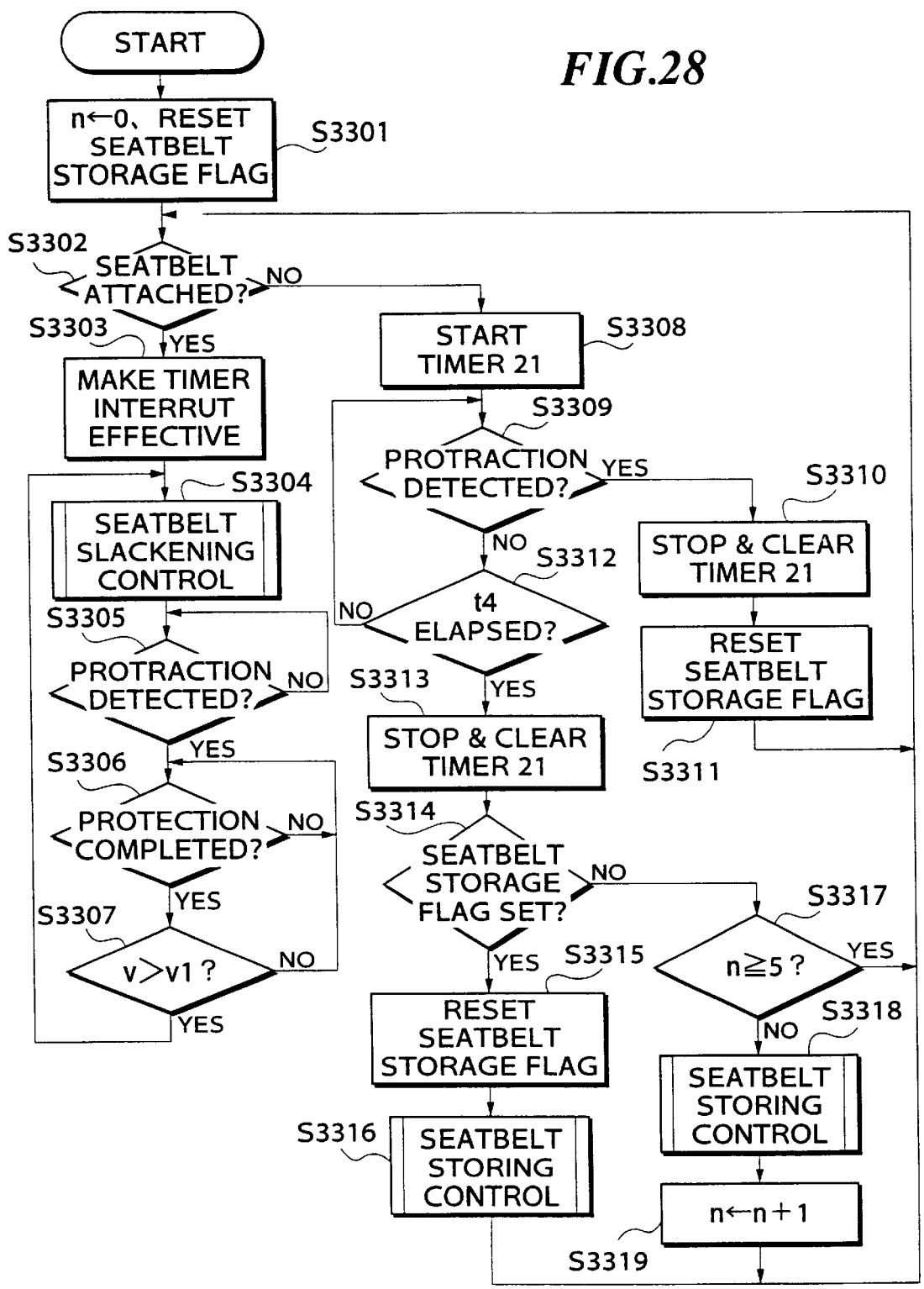
FIG. 28 is a flowchart showing a control program executed by the MPU 14.

FIG. 28 is a flowchart of a main control program executed by the MPU, which is stored in a memory, not shown, provided within the MPU 14.

First, a counter n is set to 0 and a seatbelt storage flag is reset at a step S3301, and it is determined at a step S3302 whether attaching of the seatbelt tongue to the buckle has been detected by the buckle connection detector 16.

If attaching of the seatbelt has been detected, the timer 21 is started at a step S3308, and it is determined at a step S3309 whether retraction of the seatbelt has been carried out, based upon the terminal voltage across the DC motor 10. If the retraction has been carried out, the timer 21 is stopped and cleared at a step S3310, and the seatbelt storage flag is set at a step S3311, followed by the processing returning to the step S3302. On the other hand, if the retraction of the seatbelt has not been made. it is determined at a step S3312 whether a predetermined time period t4 (e.g. 4 sec) has elapsed, based upon the value of the timer 21. If the predetermined time period t4 has not elapsed, the processing returns to the step S3309, whereas if it has elapsed, the timer 21 is stopped and cleared at a step S3313, and it is determined at a step S3314 whether the seatbelt storage flag is in the set state.

If the seatbelt storage flag is set, the same flag is reset at a step S3315, and the seatbelt storing control of FIG. 12 is executed at a step S3316, followed by the processing returning to the step S3302.

If it is determined at the step S3314 that the seatbelt storage flag is not set, it is determined at a step S3317 whether the count value of the counter n is 5 or more. If the count value is 5 or more, the processing returns to the step S3302, whereas it is less than 5, the FIG. 12 seatbelt storing control is executed at a step S3318. After completion of the seatbelt storing control, the count value of the counter n is incremented by 1 at a step S3319, and then the processing returns to the step S3302.

If it is determined at the step S3302 that attaching of the seatbelt tongue to the buckle has been detected by the buckle connection detector 16, a timer interrupt triggered in response to the value of the timer 22 is made effective at a step S3303, whereby timer interrupt processing is executed at predetermined time intervals (e.g. 0.1 sec), as described hereinafter. Then, seatbelt slackening control is executed so as to prevent the occupant from feeling a sense of oppression and give a proper amount of looseness to him.

Figure 29:
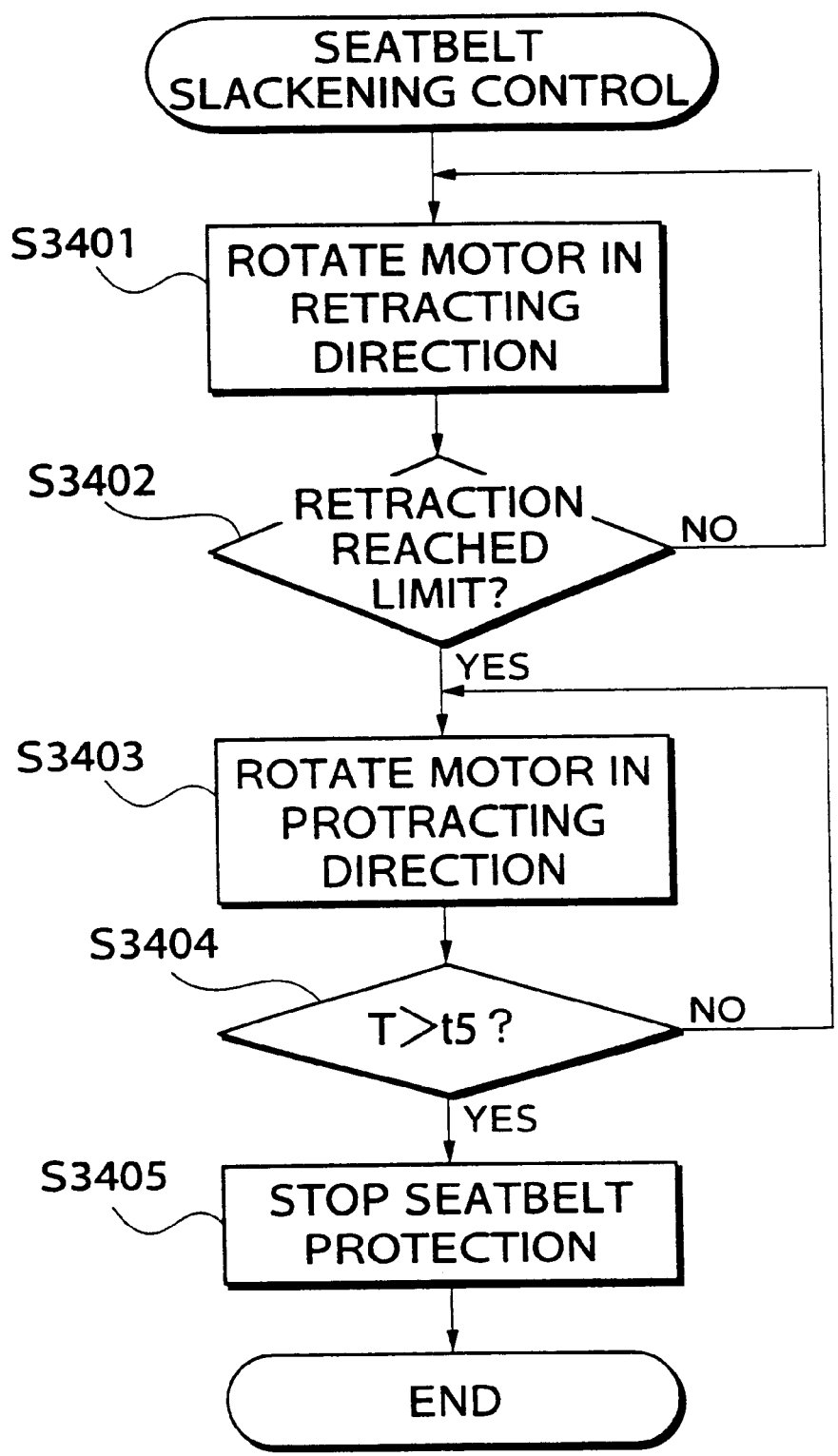
FIG. 29 is a flowchart showing seatbelt slackening control.

FIG. 29 is a flowchart of the seatbelt slackening control.

First, a PWM signal is delivered from the MPU 14 to the DC motor driver 11 to rotate the DC motor 10 in the seatbelt retracting direction at a step S3401, and it is determined at a step S3402 whether the retraction of the seatbelt has reached its limit, based upon the current flowing to the DC motor 10. Thus, an improper amount of looseness of the seatbelt can be once completely removed.

If it is determined at the step S3402 that the retraction of the seatbelt has not reached its limit, the processing returns to the step S3401, whereas if it has reached the limit, a PWM signal is delivered from the MPU 14 to the DC motor driver 11 to rotate the DC motor in the seatbelt protracting direction at a step S3403, and it is determined at a step S3404 whether a predetermined time period t5 (e.g. 1 sec) has elapsed after the protraction of the seatbelt by the DC motor 10 was started. Thus, a proper amount of looseness is given to the occupant.

If it is determined at the step S3404 that the predetermined time period t5 has not elapsed, the processing returns to the step S3403, whereas if the predetermined time period t5 has elapsed, the protraction of the seatbelt by the DC motor 10 is stopped at a step S3405, followed by terminating the present processing.

Referring again to FIG. 28, it is determined at a step S3305 whether protraction of the seatbelt has been made, based upon the terminal voltage across the DC motor 10. If protraction of the seatbelt has not been made, the same determination is repeated, whereas if protraction of the seatbelt has been made, it is determined at a step S3306 whether the protraction of the seatbelt has been completed, based upon results of a comparison between the terminal voltage across the DC motor 10 and a predetermined value (e.g. 0.3 volts). If the protraction of the seatbelt has not been completed, the same determination is repeated, whereas if it has been completed, it is determined at a step S3307 whether the vehicle speed v exceeds a predetermined value v1 (e.g. 10 km/h), based upon an output signal from the vehicle speed sensor 24.

If the vehicle speed v does not exceed the predetermined value v1, the same determination is repeated, whereas if the former exceeds the latter, the processing returns to the step S3304 to again execute the seatbelt slackening control. By virtue of this control, when the vehicle is reversed at a slow speed for parking, for example, the reel shaft is not normally rotated, and therefore it can be prevented that the seatbelt is retracted to its limit while the occupant looks backward.

Figure 30:
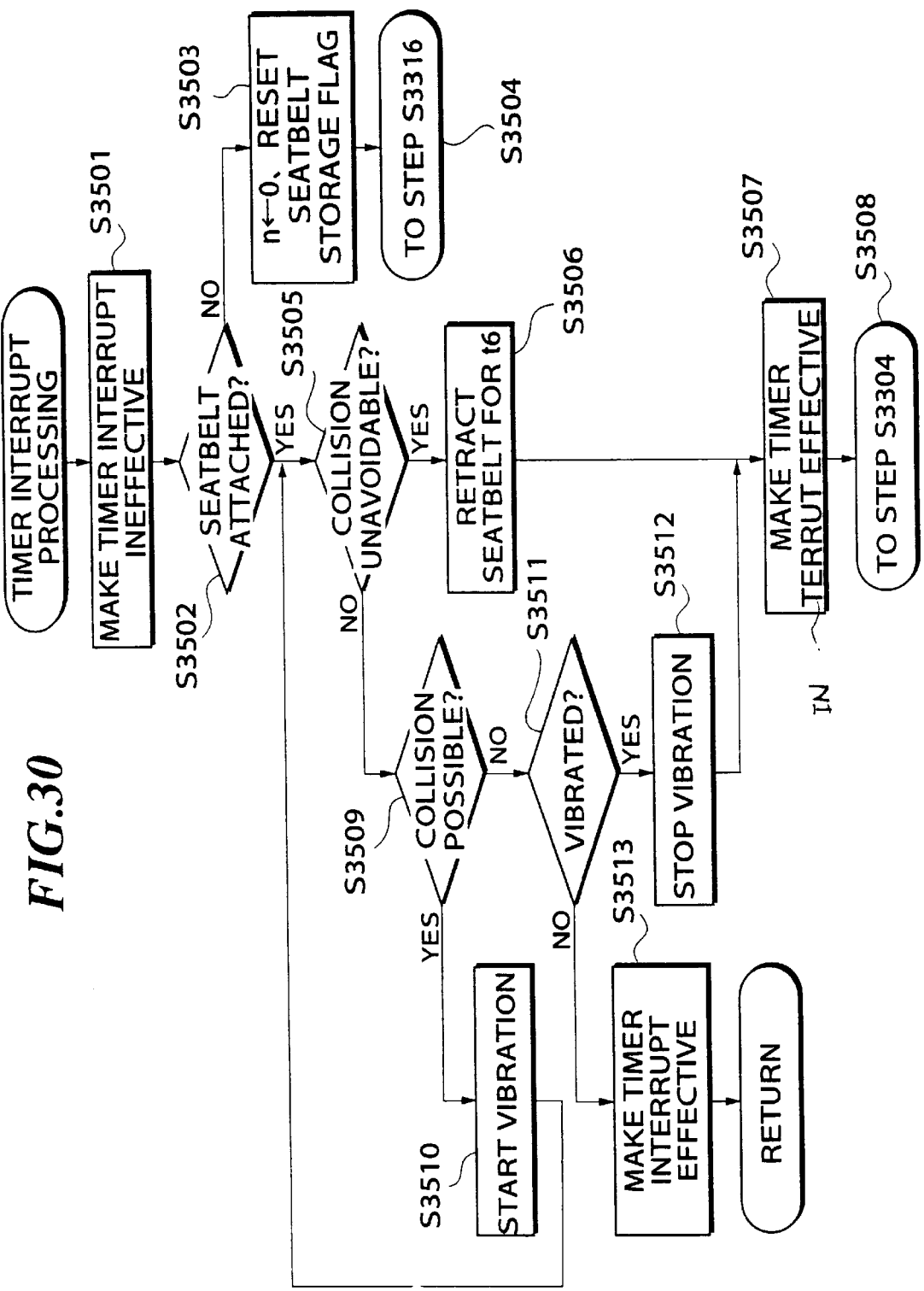
FIG. 30 is a flowchart showing timer interrupt processing.

FIG. 30 is a flowchart showing the timer interrupt processing

First, upon the start of execution of the timer interrupt processing, the timer interrupt is made ineffective at a step S3501. Then, it is determined at a step S3502 whether attaching of the seatbelt tongue to the buckle has been detected by the buckle connection detector 16. If attaching of the seatbelt has not been detected, the counter n is reset to 0 and the seatbelt storage flag is reset at a step S3503, and then the program jumps to a step S3504 to execute the seatbelt storing control of the step S3316.

On the other hand, if attaching of the seatbelt has been detected, it is determined at a step S3505 whether an output signal from the collision predictor 25 has been received, which indicates that a collision of the vehicle is unavoidable. If the output signal has been received, the PWM signal is delivered to the DC motor driver 11 over a predetermined time period t6 (e.g. 4 sec) which is measured by the timer 23, to rotate the DC motor 10 in the seatbelt retracting direction at a step S3506. Thus, the occupant can be properly protected in the event of a collision of the vehicle. Then, the timer interrupt is made effective at a step S3507, and the processing proceeds to the step S3404.

If it is determined at the step S3505 that the output signal indicative of a collision of the vehicle being unavoidable has not been received, it is determined at a step S3509 whether an output signal from the collision predictor 25 has been received, which indicates that there is a fear of a collision of the vehicle. If the output signal has been received, a PWM signal is delivered to the DC motor driver 11 to rotate the DC motor 10 alternately in the seatbelt protracting direction and in the seatbelt retracting direction to vibrate the seatbelt, and a vibration flag is set at a step S3510. The frequency of the vibration varies from 1 Hz to 10 kHz so as to provide a vibration which the occupant can easily feel as a warning. Then, the processing returns to the step S3505 while the vibration is continued.

If it is determined at the step S3509 that the output signal indicative of the fear of a collision of the vehicle has not been received, it is determined at a step S3511 whether the seatbelt has been being vibrated, from the state of the vibration flag. If the seatbelt has been being vibrated, the vibration flag is reset and the vibration is stopped at a step S3512, and then the processing proceeds to the step S3507. If the seatbelt has not been being vibrated, the timer interrupt is made effective at a step S3513, and then the program return to a step where the timer interrupt was input.

As described above, according to the present embodiment, if it is determined that the vehicle speed is below the predetermined value v1 (step S3307), the seatbelt is retracted to its limit but the seatbelt slackening control is not executed thereafter, while if the vehicle speed v exceeds the predetermined value v1, the seatbelt slackening control is executed (steps S3304, and S3401 to S3404). As a result, it can be prevented that the seatbelt is retracted to its limit while the occupant is looking backward, and a proper amount of looseness can be imparted to the occupant to thereby enable restraint and protection of the occupant in a proper manner.

Sixth Embodiment

Figure 31:
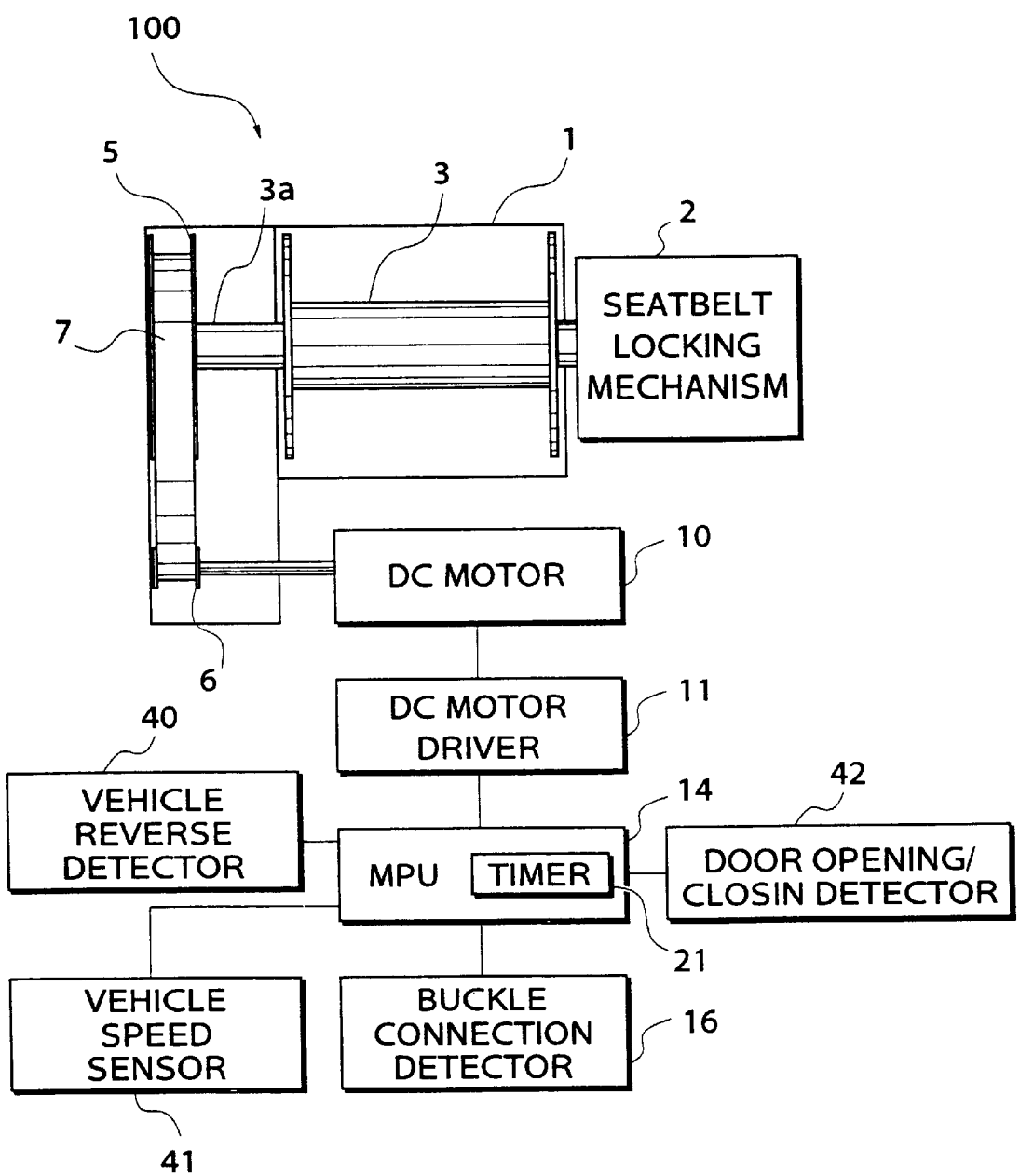
FIG. 31 is a block diagram showing the arrangement of an electric retractor provided in an automotive passenger restraint and protection apparatus according to a sixth embodiment of the invention.

FIG. 31 shows the arrangement of an electric retractor 600 provided in an automotive passenger restraint and protection apparatus according to a sixth embodiment of the invention.

The electric retractor 600 includes a vehicle reverse detector 40, a vehicle speed sensor 41, and a door opening/closing detector 42 which are connected to the MPU 14, but the mode selector 18, the temperature sensor 19 and the traveling condition detector 20 in FIG. 1 are omitted. Further, the MPU 14 is formed by a type HD6433337YF made by Hitachi, and the DC motor 10 is formed by a type DME44SA made by Japan Servo Motors. The electric retractor 600 does not have bias force-imparting means as employed in the electric retractor 100.

The vehicle reverse detector 40 detects a reverse of the automotive vehicle and generates an output signal indicative of the reverse to the MPU 14. The door opening/closing detector 42 detects opening or closing of a door of the automotive vehicle and delivers an output signal indicative of the opening or closing to the MPU 14.

The MPU 14 determines whether the seatbelt has been protracted, from the terminal voltage across the DC motor 10, determines whether retraction of the seatbelt has been completed, from the current i flowing to the DC motor 10, and calculates an amount of protraction and an amount of retraction of the seatbelt.

Figure 32:
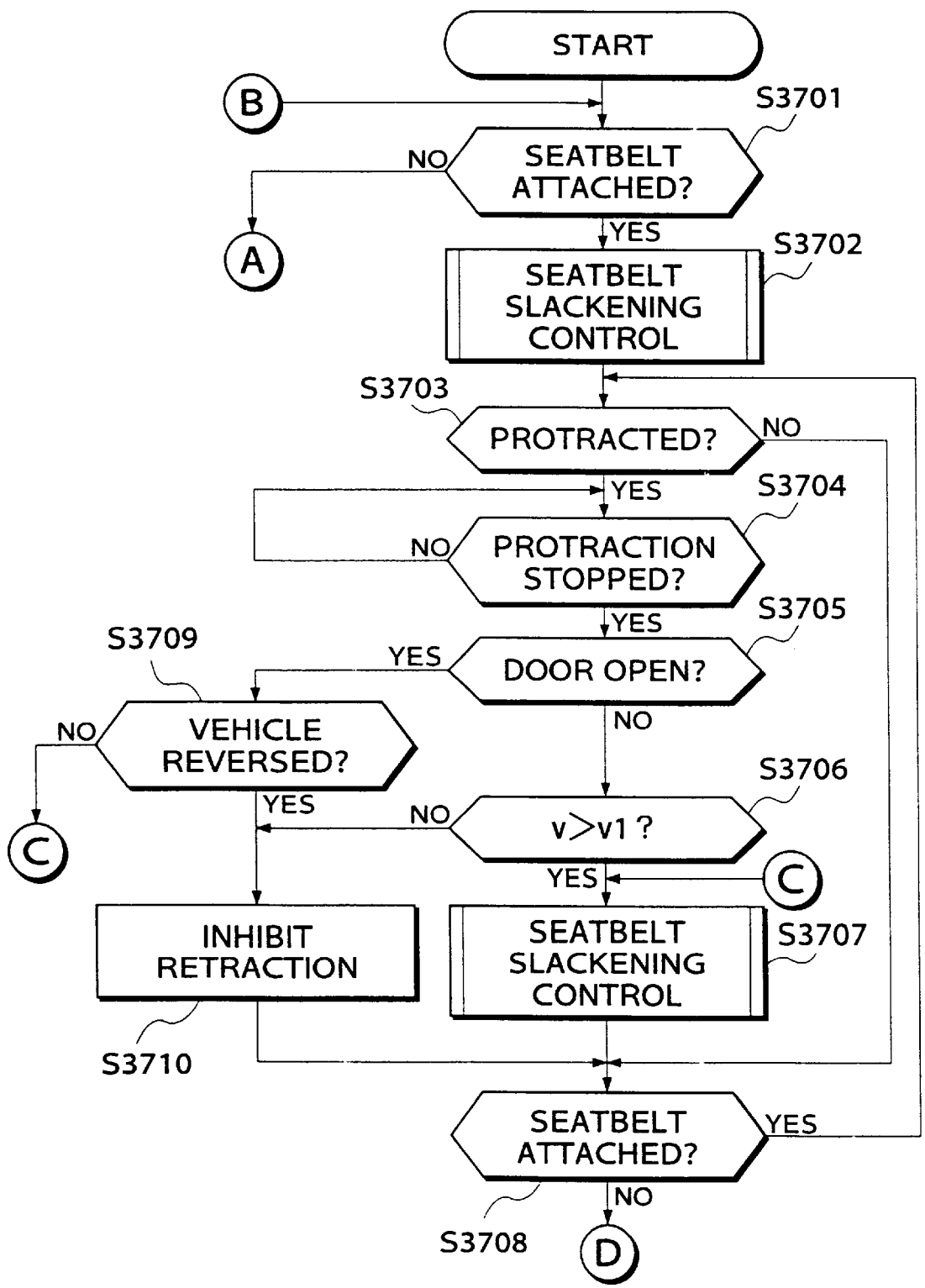
FIG. 32 is a flowchart showing control program execute by the MPU 14.
Figure 33:
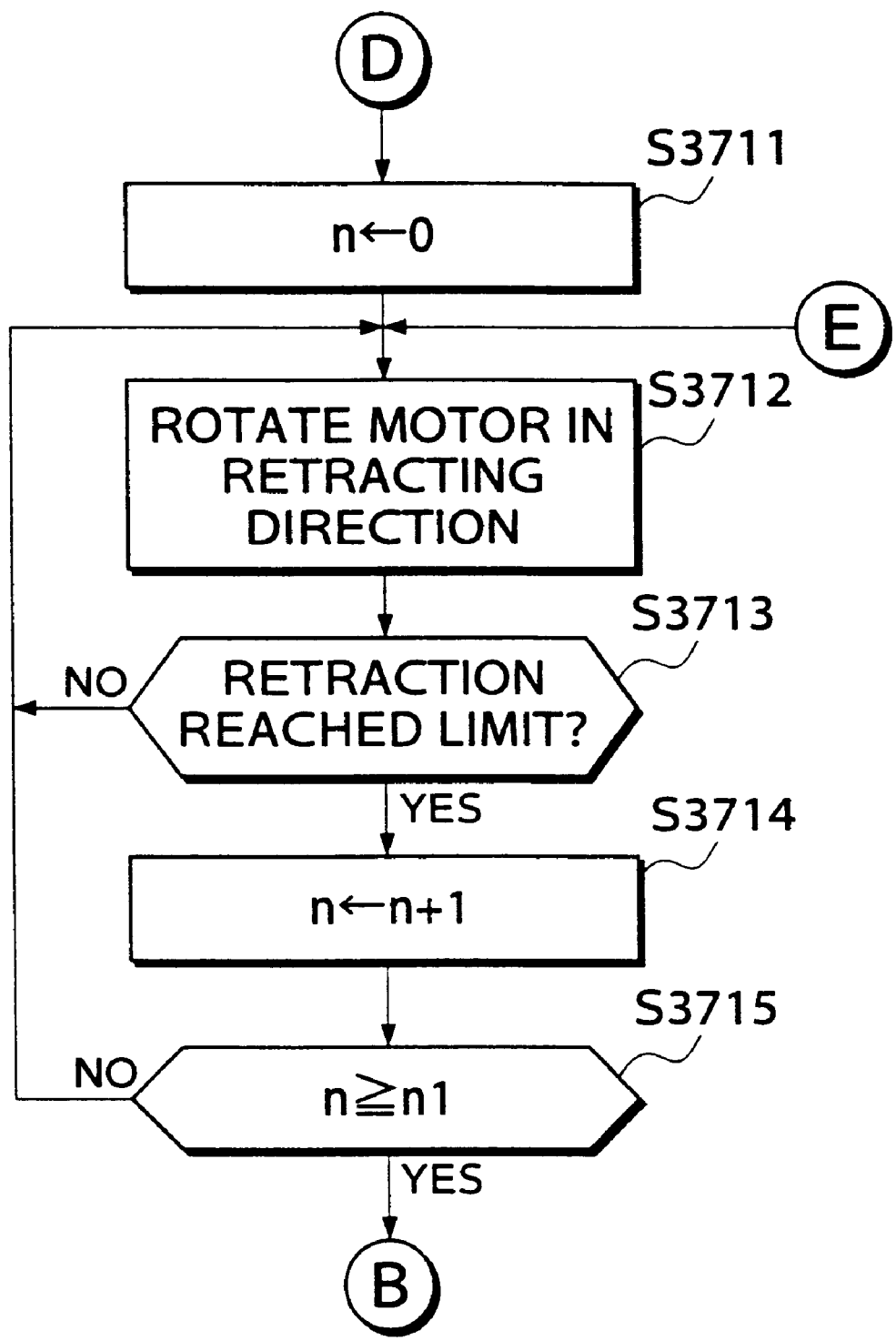
FIG. 33 is a flowchart showing a continued part of the FIG. 32 control.
Figure 34:
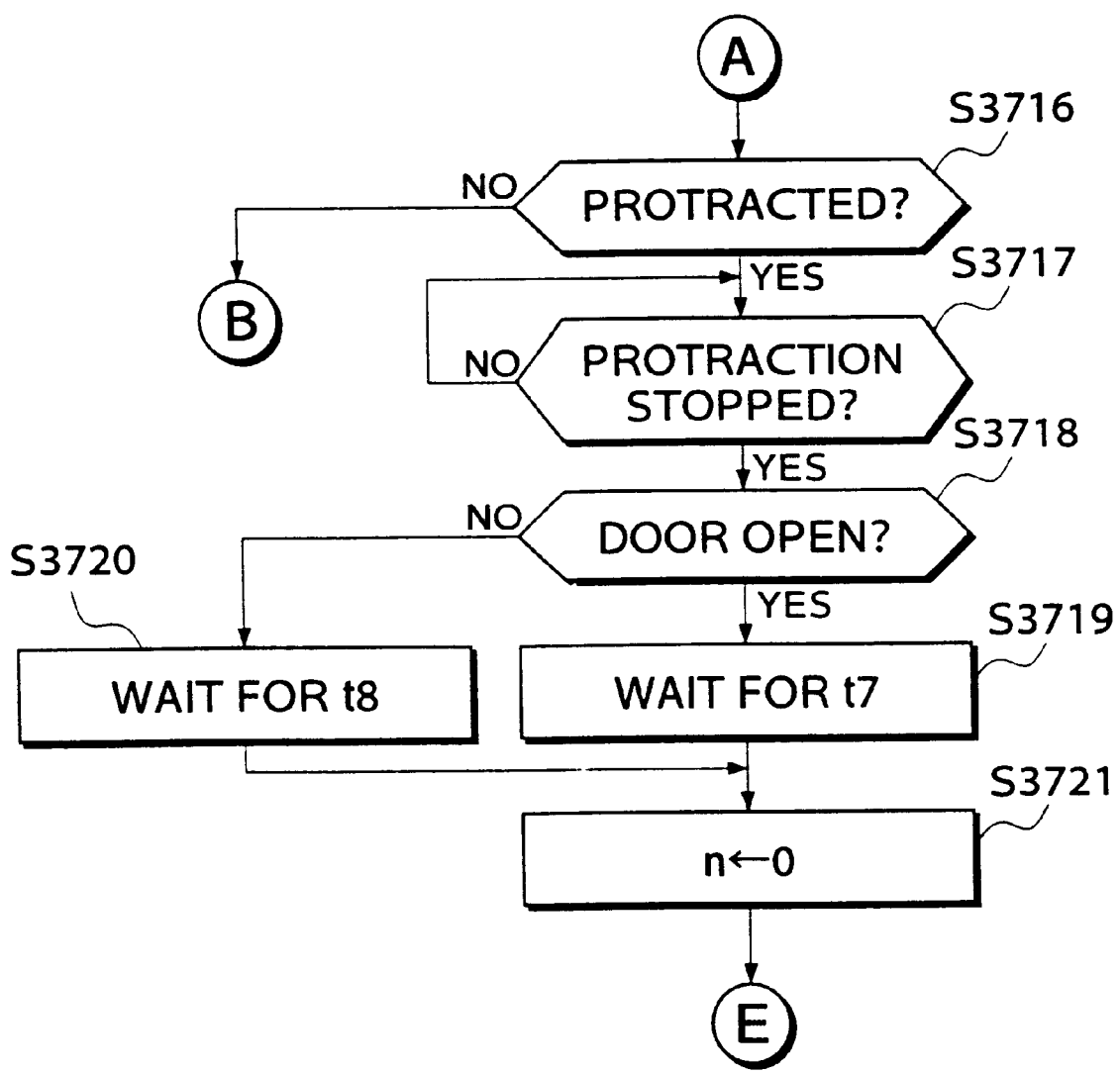
FIG. 34 is a flowchart showing a further continued part of the FIG. 32 control.

FIGS. 32 to 34 are flowcharts showing a main control program executed by the MPU 14 according to the present embodiment.

First, it is determined at a step S3701 whether attaching of the seatbelt tongue to the buckle has been detected by the buckle connection detector 16. If attaching of the seatbelt has been detected, seatbelt slackening control is executed at a step S3702.

The seatbelt slackening control is identical with that described before with reference to FIG. 29, description of which is therefore omitted.

Then, it is determined at a step S3703 whether the seatbelt has been protracted, based upon the terminal voltage across the DC motor 10. If the seatbelt has not been protracted, the processing proceeds to a step S3708, hereinafter referred to, whereas if it has been protracted, it is determined at a step S3704 whether the protraction of the seatbelt has been terminated, based upon the terminal voltage. If the protraction of the seatbelt has not been terminated, the same determination is repeated, whereas if it has been terminated, it is determined at a step S3705 whether the door is open, based upon the output signal from the door opening/closing detector 42.

If the door is closed, it is determined at a step S3706 whether the vehicle speed v of the automotive vehicle exceeds the predetermined value v1 (e.g. 10 km/h). If the former exceeds the latter, the seatbelt slackening control is executed at a step S3707, similarly to the step S3702. Then, it is determined at the step S3708 whether attaching of the seatbelt tongue to the buckle has been detected by the buckle connection detector 16.

If it is determined at the step S3705 that the door is open, it is determined at a step S3709 whether the automotive vehicle is reversing, based upon the output signal from the vehicle reverse detector 40. If the vehicle is not reversing, the processing proceeds to the step S3707. By virtue of this control, when the occupant opens the door during parking of the vehicle and protracts the seatbelt in order to fix a baggage in position with the seatbelt, for example, the seatbelt is retracted, whereby it can be prevented that the seatbelt is caught in the door.

On the other hand, if it is determined at the step S3709 that the vehicle is reversing, a PWM signal is delivered from the MPU 14 to the DC motor driver 11 to inhibit the DC motor from rotating, that is, inhibit retraction of the seatbelt, at a step S3710, and then the processing proceeds to the step S3708. Thus, when the occupant reverses the vehicle for parking with the door being open, for example, the retraction of the seatbelt is inhibited, whereby it can be prevented that the occupant is given a sense of unnaturalness, providing a comfortable seatbelt attaching environment.

If it is determined at the step S306 that the vehicle speed v is below the predetermined value v1, the processing proceeds to the step S3710. Thus, when the occupant once stops the vehicle and then slouches to look right and left ways for safety so that the seatbelt is protracted, the retraction of the seatbelt is inhibited, whereby it is possible to allow the occupant to ascertain the safety without being given a sense of unnaturalness.

If it is determined at the step S3708 that attaching of the seatbelt tongue to the buckle has been detected by the buckle connection detector 16, the processing returns to the step S3703, whereas if attaching of the seatbelt has not been detected, the count value of the counter n which counts a number of times of retraction of the seatbelt to its limit is reset to 0 at a step S3711, and the PWM signal is delivered from the MPU 14 to the DC motor driver 11 to rotate the DC motor 10 in the seatbelt retracting direction at a step S3712, followed by determining at a step S3713 whether the retraction of the seatbelt has reached its limit, based upon the current flowing to the DC motor 10. Thus, an improper amount of looseness of the seatbelt can once be completely removed.

If it is determined at the step S3713 that the retraction of the seatbelt has not reached its limit, the processing returns to the step S3712, whereas if the retraction of the seatbelt has reached its limit, the count value of the counter n is incremented by 1 at a step S3714, and then it is determined at a step S3715 whether the count value of the counter n reaches a predetermined value n1 (e.g. 3). This determination is made in view of a case that while the seatbelt is being retracted, it is caught by an arm of the occupant to stop being retracted.

If it is determined at the step S3715 that the count value of the counter n. is below the predetermined value n1, the processing returns to the step S3712, whereas if the former is equal to or larger than the latter, the processing returns to the step S3701.

If it is determined at the step S3701 that attaching of the seatbelt tongue to the buckle has not been detected, it is determined at a step S3716 whether the seatbelt is being protracted, based upon the terminal voltage across the DC motor 10. If the seatbelt is not being protracted, the processing returns to the step S3701, whereas if it is being protracted, it is determined at a step S3717 whether the protraction of the seatbelt has been terminated, based upon the terminal voltage across the DC motor 10. If the protraction of the seatbelt has not been terminated, the same determination is repeated, whereas if it has been terminated, it is determined at a step S3718 whether the door is open or closed, based upon the output signal from the door opening/closing detector 42.

If the door is open, the lapse of a predetermined time period t7 (e.g. 1 sec) as a deferment time before storing the seatbelt is waited at a step S3719, and the count value of the counter n is reset to 0 at a step S3721, followed by the program proceeding to the step S3712. On the other hand, if the door is closed, the lapse of a predetermined time period t8 (e.g. 5 sec) as a deferment time before storing the seatbelt is waited at a step S3720, and then the processing proceeds to the step S3721. The predetermined time period t7 is shorter than the predetermined time period t8. By virtue of this control, even when the occupant protracts the seatbelt without the intention of attaching it to his body and immediately then gets off the vehicle and closes the door, for example, the seatbelt can be stored in its retracted position and can be prevented from being caught in the door.

As described above, according to the present embodiment, when it is determined that then door is open, the deferment time is given before storing the seatbelt, which is shorter than the deferment time applied when the door is closed (steps S3719 and S3720). Thus, the time period from the termination of protraction of the seatbelt to the completion of retraction of the seatbelt can be made shorter when the door is open. As a result, it can be prevented that the seatbelt is caught in the door.

Although in the present embodiment, the deferment time is changed based upon results of the determination as to whether the door is open or closed (step S3720), alternatively the speed of retraction of the seatbelt, the force of retracting the seatbelt or the time interval from the start of retraction of the seatbelt to the time of termination of the retraction may be changed depending upon the results of the above determination. In this alternative case, when the door is open, the speed of retraction of the seatbelt is set to a higher value, the force of retracting the seatbelt is set to a larger value, or the time interval from the start of retraction of the seatbelt to the time of termination of the retraction is set to a shorter value.

Seventh Embodiment

Figure 35:
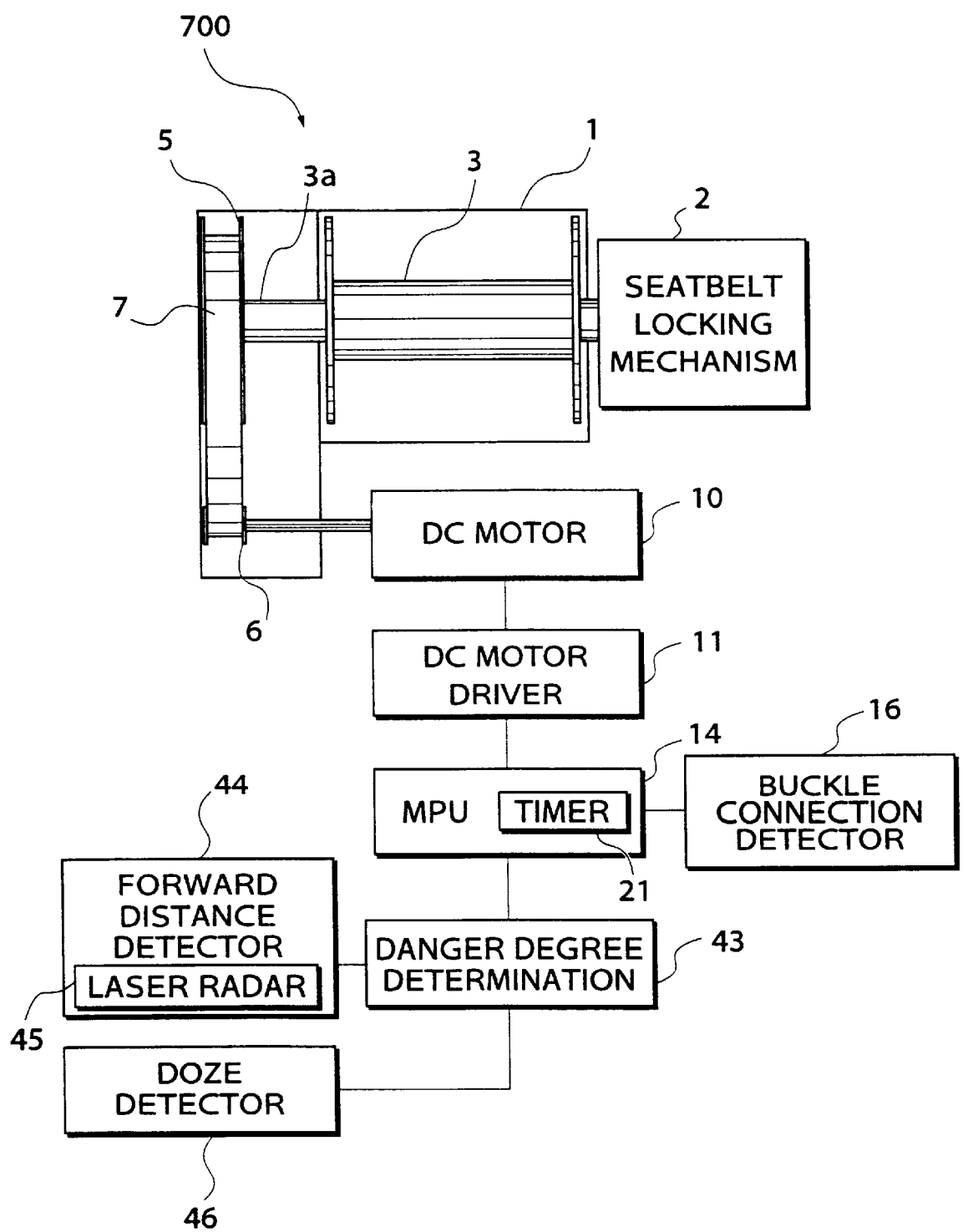
FIG. 35 is a block diagram showing the arrangement of an electric retractor 700 provided in an automotive passenger restraint and protection apparatus according to a seventh embodiment of the invention.

FIG. 35 shows the arrangement of an electric retractor 700 provided in an automotive passenger restraint and protection apparatus according to a seventh embodiment of the invention The electric retractor 700 includes a danger determining device 43, a forward distance sensor 44, and a doze detector 46 which are connected to the MPU 14, but the mode selector 18, the temperature sensor 19 and the traveling condition detector 20 in FIG. 1 are omitted. The electric retractor 700 does not have bias force-imparting means as employed in the electric retractor 100.

The forward distance sensor 44 detects the distance from the present automotive vehicle to an object or obstacle lying ahead of the vehicle, and the doze detector 46 detects whether the driver dozes at the wheel or drives asleep. The forward distance sensor 44 and the doze detector 46 are connected to the danger determining device 43 which determines a degree of danger of the automotive vehicle.

Figure 36:
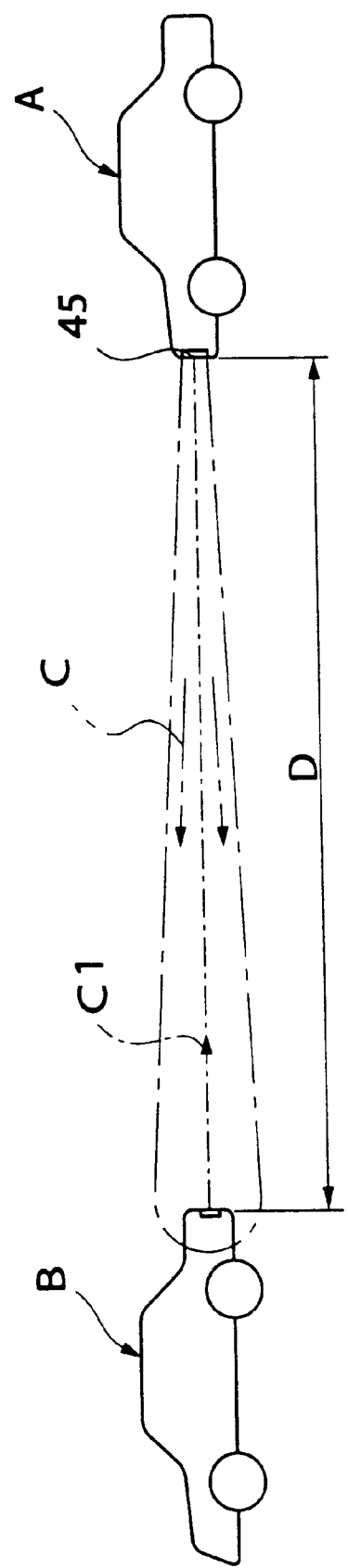
FIG. 36 is a view useful in explaining the operation of a forward distance sensor 44 in FIG. 35.

The forward distance sensor 44 is provided with a laser radar 45 which is adapted to receive and emit a laser beam. FIG. 36 is a view useful in explaining the operation of the forward distance sensor 44.

The laser radar 45 has a laser emitter which emits a laser beam forwardly of the present vehicle A, and a laser receiver which receives a laser beam. The laser beam emitted from the laser emitter is reflected on an obstacle, e.g a vehicle B running ahead of the present vehicle A, and the reflected laser beam C1 is received by the laser receiver of the laser radar 45. The forward distance sensor 44 measures time elapsed after the emission of the laser beam to the receipt of the reflected laser beam to detect the forward distance D to the obstacle from the measured time.

Referring back to FIG. 35, the doze detector 46 detects an amount of change in the steering angle of the steering arm, determines that there is a possibility that the driver is driving asleep if the detected amount of change in the steering angle continues to fall within a predetermined range of e.g. 8 degrees over a predetermined time period (e.g. 2 sec), and delivers a corresponding output signal to the danger determining device 43.

The danger determining device 43 calculates a time differentiated value of the forward distance D based on the detected forward distance D from the forward distance sensor 44, determines the relative speed with respect to the obstacle from the time differentiated value,. and determines a time period before a possible collision by dividing the detected forward distance D by the determined relative speed. Based upon the determined time period and the output signal from the doze detector 46, the danger determining device 43 judges the degree of danger.

FIG. 37 shows, by way of example, criteria of judgment employed by the danger determining device 43. A reference value of time before collision in the figure is set to 5 seconds, for example. If the time before collision is equal to or longer than 5 seconds, it is represented as "long", and if the time before collision is below 5 seconds, it is represented as "short". If the output signal from the doze detector 46 indicates a possibility of driving asleep, the possibility of doze is represented as "high", while if the output signal indicates that there is no possibility of driving asleep, the possibility of doze is represented as "low". Based upon the above criteria, the danger determining device 43 judges that the degree of danger is "zero" if the time before collision is "long" and at the same time the possibility of doze is "low", judges that the degree of danger is "low" if the time before collision is "long" and at the same time the possibility of doze is "high", judges that the degree of danger is "low" if the time before collision is "short" and at the same time the possibility of doze is "low", and judges that the degree of danger is "high" if the time before collision is "short" and at the same time the possibility of doze is "high".

FIGS. 38A, 38C and 38E are views showing how the DC motor 10 is driven when the degree of danger is determined to be "low" at the danger degree determining device 43. FIGS. 38B, 38D and 38F are views showing how the DC motor 10 is driven when the degree of danger is determined to be "high" at the danger degree determining device 43. The driving of the DC motor 10 is controlled by the PWM signal delivered from the MPU 14 to the DC motor driver 11.

The driving of the DC motor 10 is controlled by the PWM signal as follows: Provided that when the danger degree determining device 43 judges that the degree of danger is "low" (FIG. 38A), normal rotative driving and reverse rotative driving of the DC motor 10 are effected at a rate of 10 times per second, for example, when the device 43 judges that the degree of danger is "high" (FIG. 38B), normal rotative driving and reverse rotative driving of the DC motor 10 are effected at a rate of 20 times per second, for example. In this manner, as the degree of danger is higher, the frequency of normal rotative driving and reverse rotative driving of the DC motor 10 is increased so that retraction and protraction of the seatbelt are carried out more frequently to thereby enable alerting the occupant to the danger sufficiently.

As a variation, the driving of the DC motor 10 may be controlled by the PWM signal as follows: Provided that when the danger degree determining device 43 judges that the degree of danger is "low" (FIG. 38C), normal rotative driving of the DC motor 10 is effected for 10 ms, then reverse rotative driving of the same is effected for 10 ms, and then driving of the motor is waited for 30 ms, for example, when the device 43 judges that the degree of danger is "high" (FIG. 38D), normal rotative driving of the DC motor 10 is effected for 10 ms, then reverse rotative driving of the same is effected for 10 ms, then normal rotative driving of the DC motor 10 is effected for 10 ms, and then driving of the motor is waited for 10 ms, for example. In this manner, as the degree of danger is higher, the duty factor of normal rotative driving and reverse rotative driving of the DC motor 10 is increased, thereby changing the pattern of retraction and protraction of the seatbelt to thereby enable alerting the occupant to the danger sufficiently.

As another variation, the driving of the DC motor 10 may be controlled by the PWM signal as follows: Provided that when the danger degree determining device 43 judges that the degree of danger is "low" (FIG. 38E), normal rotative driving of the DC motor 10 is effected so as to fasten the seatbelt with a force of 10 N, and then reverse rotative driving of the same is effected so as to release or slacken the seatbelt with a force of 10 N, for example, when the device 43 judges that the degree of danger is "high" (FIG. 38F), normal rotative driving of the DC motor 10 is effected so as to fasten the seatbelt with a force of 20 N, and then reverse rotative driving of the same is effected so as to release the seatbelt with a force of 20 N, for example. In this manner, as the degree of danger is higher, the fastening force and releasing force of the seatbelt by normal rotative driving and reverse rotative driving of the DC motor 10 are increased, to thereby enable alerting the occupant to the danger sufficiently.

As described above, according to the present embodiment, when the danger degree determining device 43 judges that the degree of danger has changed from "low" to "high", (i) the frequency of normal rotative driving and reverse rotative driving of the DC motor 10 is increased, (ii) the duty factor of normal rotative driving and reverse rotative driving of the DC motor 10 is increased, or (iii) the fastening force and releasing force of the seatbelt by normal rotative driving and reverse rotative driving of the DC motor 10 are increased, thereby changing the degree or manner of warning given to the occupant according to the degree of danger, to thereby enable alerting the occupant to the danger sufficiently.

Although in the present embodiment, the degree of danger is divided into "zero", "low", and "high", it may be divided into a larger number of degrees. Further, although the degree of danger is determined based upon the time before collision and the possibility of doze, it may be determined based upon either the time before collision or the possibility of doze.

Further, when the danger degree determining device 43 judges that the degree of danger has changed from "low" to "high", two or all of the above manners of control (i) to (iii) of the DC motor 10 may be used in combination.

Eighth Embodiment,

An automotive passenger restraint and protection apparatus according to an eighth embodiment of the invention includes an electric retractor 800 which is identical in construction with the electric retractor 100 employed by the first embodiment, except that the bias force-imparting means is omitted, and therefore illustration and description of the same are omitted.

The eighth embodiment is distinguished from the first embodiment in the contents of control executed by the MPU 14. The contents of control according to the eighth embodiment will be described hereinbelow.

Figure 82:
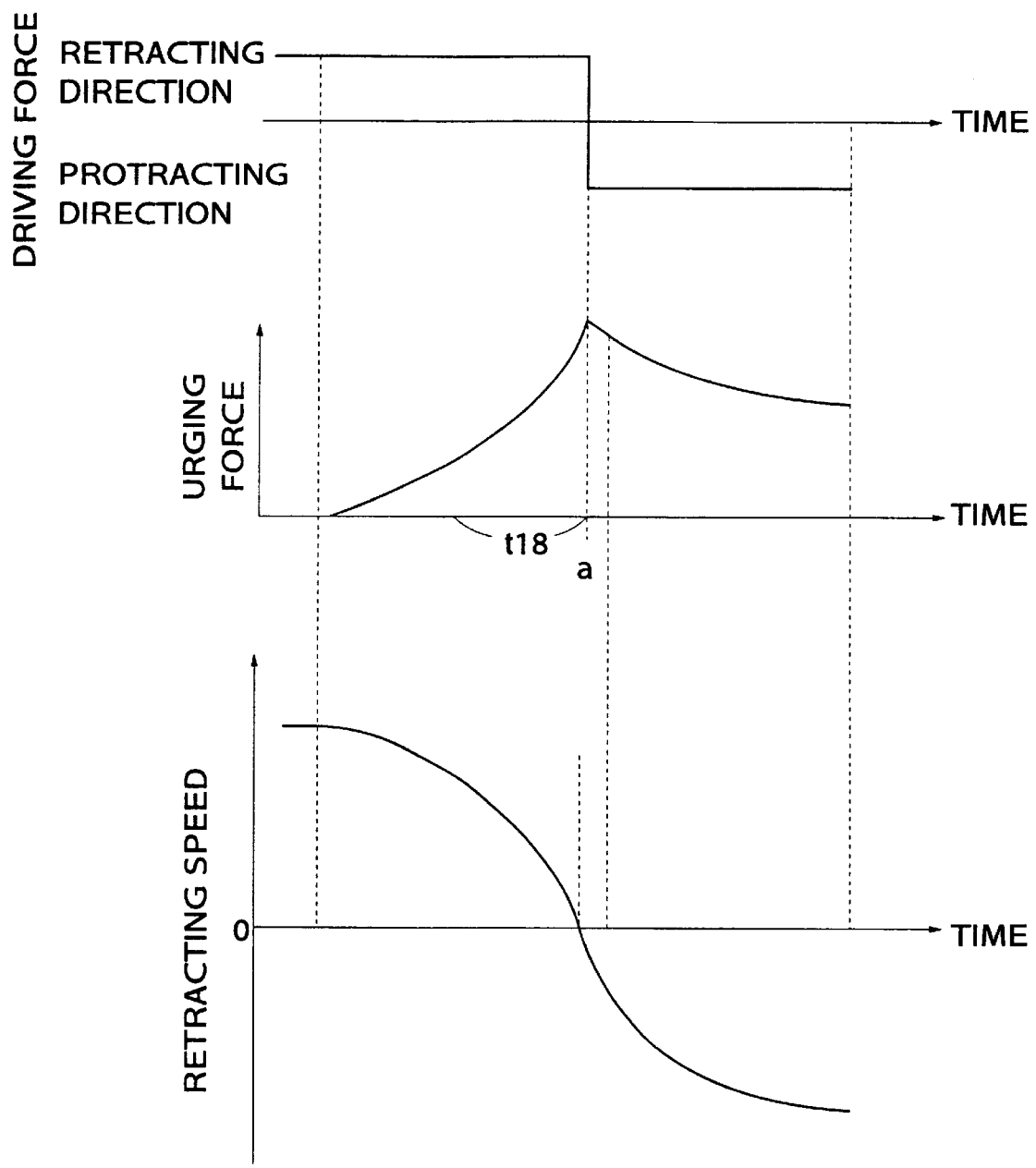
FIG. 82 is a timing chart showing an example of the relationship between driving forces of a reel shaft for retracting and protracting a seatbelt onto and from the reel shaft, an urging force which the occupant receives from the seatbelt, and the seatbelt retracting and protracting speeds of the reel shaft in an automotive passenger restraint and protection apparatus.
Figure 83:
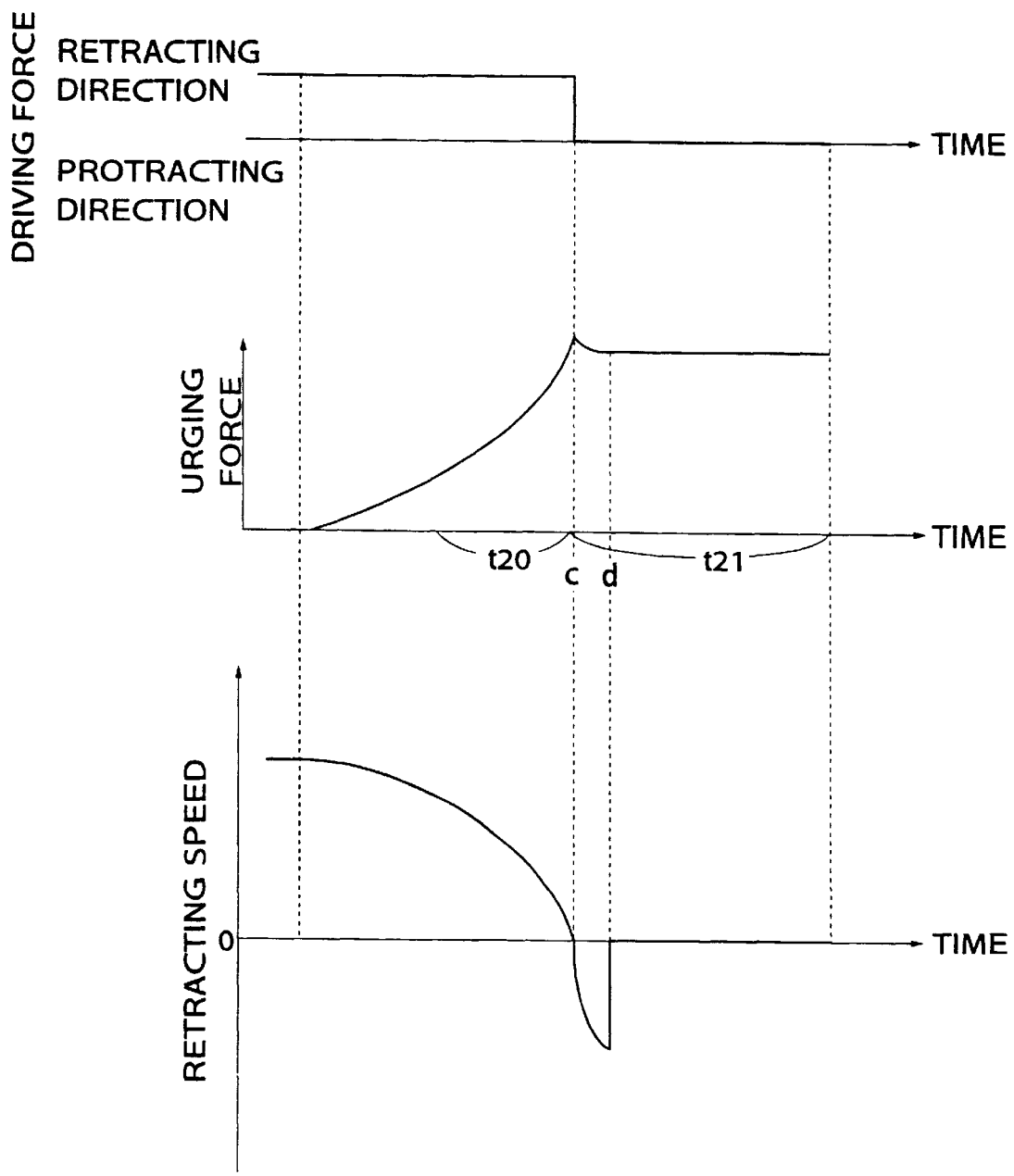
FIG. 83 is a timing chart showing another example of the relationship between driving forces of a reel shaft for retracting and protracting a seatbelt onto and from the reel shaft, an urging force which the occupant receives from the seatbelt, and the seatbelt retracting and protracting speeds of the reel shaft in a conventional automotive passenger restraint and protection apparatus.

FIG. 82 is a timing chart showing an example of the relationship between driving forces of the reel shaft 3 fog retracting and protracting the seatbelt onto and from the reel shaft 3, an urging force which the occupant receives from the seatbelt, and the seatbelt retracting and protracting speeds of the reel shaft 3 in the automotive passenger restraint and protection apparatus.

First, when attaching of the seatbelt to the occupant's body is detected, retraction or winding of the seatbelt onto the reel shaft is started by the reel shaft with a constant seatbelt retraction driving force, and this retraction is continued until the retraction of the seatbelt reaches its limit (time period t18). During this winding, the urging force which the occupant receives from the seatbelt gradually increases while the retracting speed of the seatbelt onto the reel shaft 3 gradually decreases.

Thereafter, when the retraction of the seatbelt has reached its limit (time point a), the reel shaft 3 is reversely rotated to start protracting the seatbelt with a constant seatbelt protracting driving force. The expression "the retraction of the seatbelt has reached its limit" means that the DC motor 10 ceases to rotate in the seatbelt retracting direction. This protraction is to be continued until the occupant is given a predetermined amount of looseness.

In this control, since when the retraction of the seatbelt by the reel shaft 3 reaches its limit after the attaching of the seatbelt, the reel shaft 3 is reversely rotated to protract the seatbelt, the acceleration of protraction of the seatbelt from the reel shaft 3 suddenly increases, so that the protracting motion of the seatbelt can be locked by the seatbelt locking mechanism 2.

To avoid this, a control signal for controlling the retracting and protracting speeds of the seatbelt onto and from the reel shaft 3 is sent from the MPU 14 to the DC motor driver 11.

Figure 39:
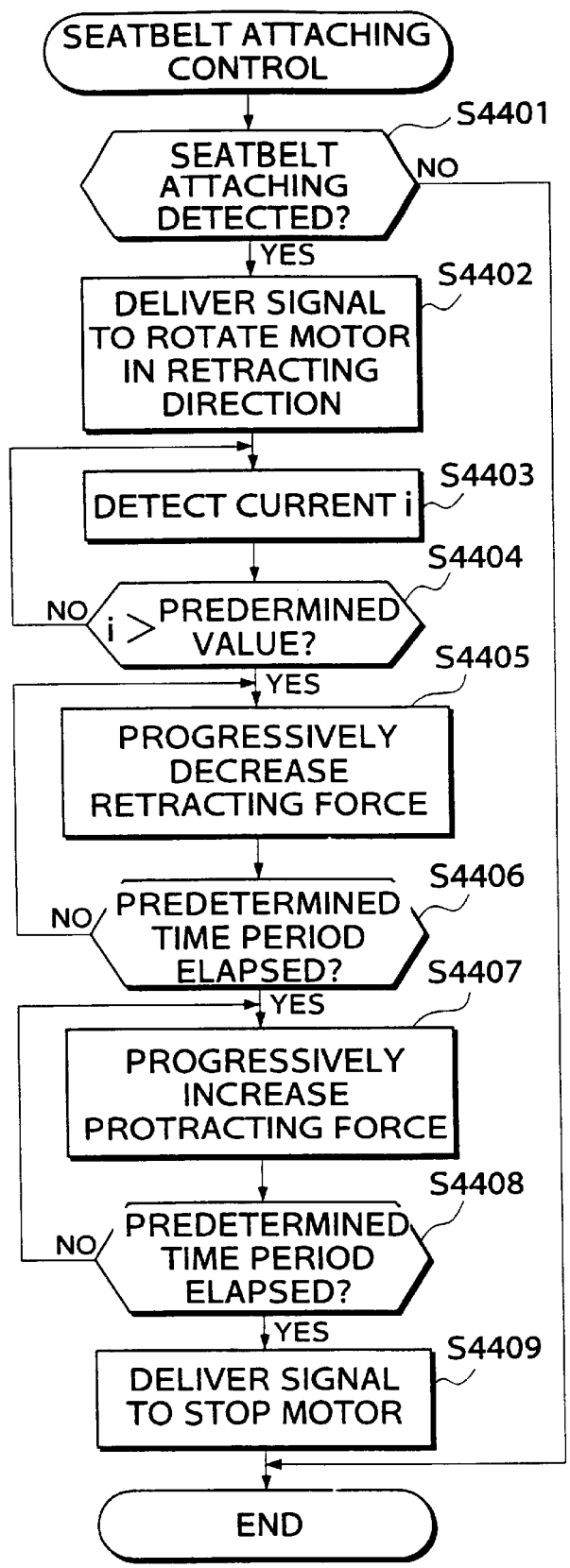
FIG. 39 is a flowchart showing seatbelt attaching control executed by the MPU 14 in attaching the seat belt.

FIG. 39 is a flowchart showing seatbelt attaching control executed by the MPU 14 according to the present embodiment in attaching the seat belt.

First, it is determined at a step S4401 whether attaching of the seatbelt tongue to the buckle has been detected by the buckle connection detector 16. If attaching of the seatbelt has not been detected, the present processing is immediately terminated, whereas if attaching of the seatbelt has been detected, a control signal is delivered from the MPU 14 to the DC motor driver 11 to rotate the reel shaft 3 in the seatbelt retracting direction at a predetermined rotational speed at a step S4402. Thus, the seatbelt is retracted so that the urging force that the occupant receives from the seatbelt progressively increases, while the speed of retraction of the seatbelt by the reel shaft 3 progressively decreases.

The MPU 14 is adapted to change the duty factor of the control signal for driving the DC motor 10 to thereby change the rotational speed of the reel shaft 3.

Then, the current i flowing to the DC motor 10 is detected from current flowing through the resistance r1 by the current detecting circuit C1 at a step S4403. It is determined at a step S4404 whether the detected current i exceeds a predetermined value (e.g. 1.0 ampere). If the former does not exceed the latter, the processing returns to the step S4403, whereas if the former exceeds the latter, a control signal is delivered from the MPU to the DC motor driver 11 to further reduce the rotational speed of the reel shaft 3 in the seatbelt retracting direction to thereby progressively decrease the driving force of the reel shaft 3 for retracting the seatbelt, at a step S4405. On this occasion, the timer 21 measures time elapsed after the above control signal starts to be delivered to the DC motor driver 11.

Then, it is determined at a step S4406 whether a predetermined time period (e.g. 3 sec) has elapsed, based upon the value of the timer 21. If the predetermined time period has not elapsed, that is, the driving force of the reel shaft 3 for retracting the seatbelt which is progressively decreasing has not yet fully decreased, the processing returns to the step S4405, whereas if the predetermined time period has elapsed, that is, the driving has fully decreased, and then the seatbelt has already become fit to the occupant's body and the retraction of the seatbelt has reached its limit, a control signal is sent from the MPU 14 to the DC motor driver 11 to increase the rotational speed of the reel shaft 3 in the seatbelt protracting direction at a step S4407, to thereby control the driving force for protracting the seatbelt by the reel shaft 3 so as to progressively increase. By this control, the seatbelt is protracted so that the urging force or oppression that the occupant receives from the seatbelt progressively decreases and the seatbelt retracting speed of the reel shaft 3 progressively increases. On this occasion, the timer 21 measures time elapsed after the above control signal starts to be delivered to the DC motor driver 11.

Then, it is determined at a step S4408 whether a predetermined time period (e.g. 2 sec) has elapsed, based upon the value of the timer 21. If the predetermined time period has not elapsed, that is, the driving force for protracting the seatbelt by the reel shaft 3 which is progressively increasing has not yet fully increased, the processing returns to the step S4407, whereas if the predetermined time period has elapsed,-that is, the driving force has fully increased to such a level that a predetermined amount of looseness is given to the occupant, a control signal is delivered from the MPU 14 to the DC motor driver 11 to stop the driving of the DC motor 10 so as to stop the seatbelt protracting driving of the reel shaft 3, at a step S4409, followed by terminating the program.

Figure 40:
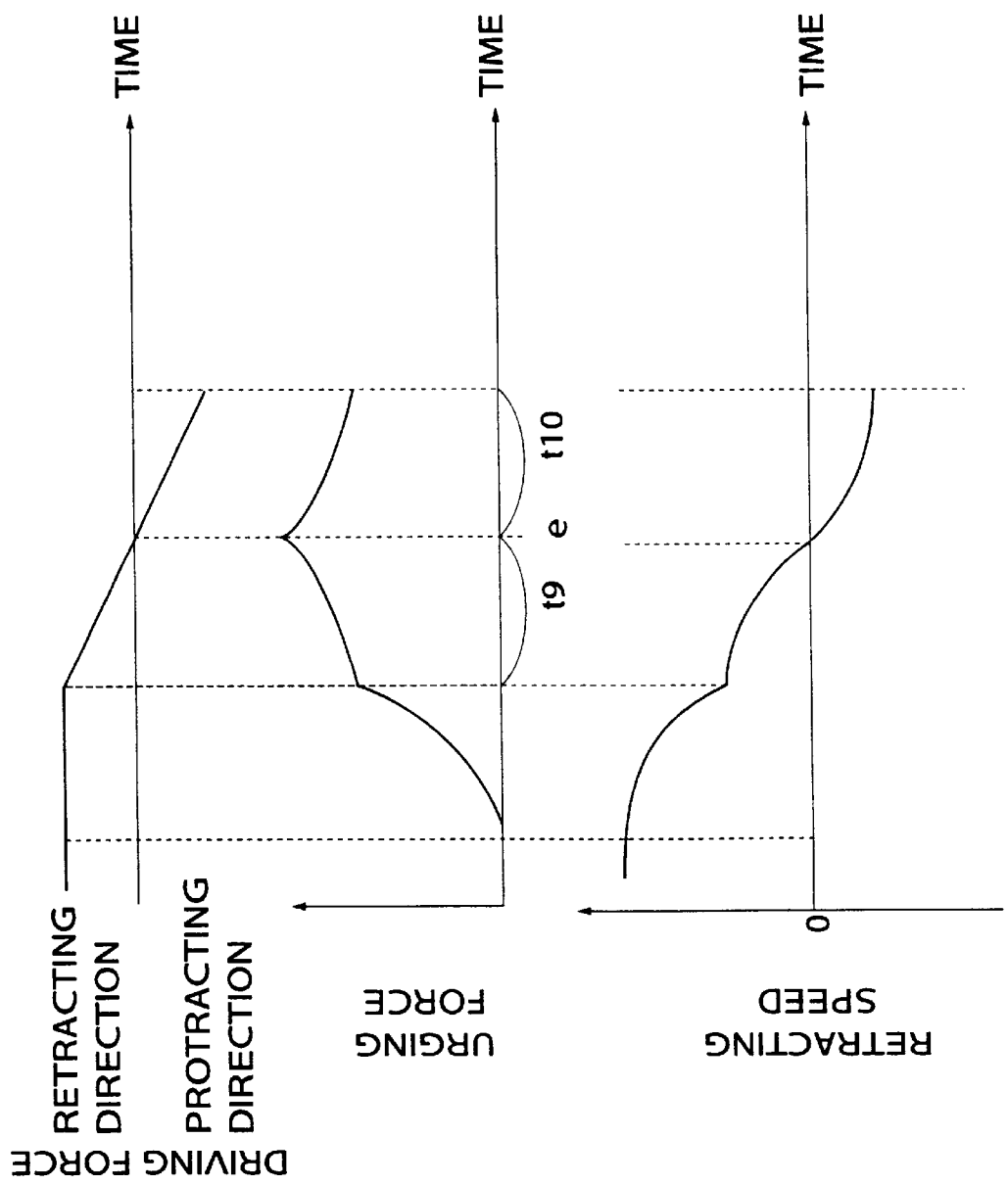
FIG. 40 is a timing chart showing an example of the relationship between driving forces of a reel shaft 3 for retracting and protracting a seatbelt onto and from the reel shaft, an urging force which the occupant receives from the seatbelt, and the seatbelt retracting and protracting speeds of the reel shaft 3.

FIG. 40 is a timing chart showing an example of the relationship between the driving forces of the reel shaft 3 for retracting and protracting the seatbelt onto and from the reel shaft, the urging force which the occupant receives from the seatbelt, and the seatbelt retracting and protracting speeds of the reel shaft 3

In the present embodiment, as shown in FIG. 40, when attaching of the seatbelt tongue to the buckle has been detected, retraction of the seatbelt by the reel shaft 3 is started with a constant magnitude of driving force, and then the urging force that the occupant receives from the seatbelt progressively increases and the seatbelt retracting speed of the reel shaft 3 progressively increases.

Subsequently, when the current i flowing to the DC motor 10 exceeds the predetermined value (1.0 ampere), the control signal is delivered to the DC motor driver 11 to further decrease the rotational speed of the reel shaft 3 in the seatbelt retracting direction to progressively decrease the driving force of the reel shaft 3 for retracting the seatbelt (time period t9). During this time period, the urging force that the occupant receives from the seatbelt progressively increases, but the rate of increase of the urging force is smaller as compared with that at the start of the retraction of the seatbelt.

Subsequently, the retraction of the seatbelt reaches its limit (time point e). Then, the control signal is delivered to the DC motor driver 11 to further decrease then rotational speed of the reel shaft 3 in the seatbelt protracting direction so that the driving force for protracting the seatbelt by the reel shaft 3 is progressively increased. When a predetermined of looseness has been given, the present processing is terminated (time period t10). During this time period, the urging force that the occupant receives from the seatbelt progressively decreases.

As described above, according to the present embodiment, when attaching of the seatbelt to the occupant has been detected, retraction of the seatbelt by the reel shaft 3 is started with a constant magnitude of driving force, and thereafter, when the current i flowing to the DC motor 10 exceeds a predetermined value (1.0 ampere), the driving force of the reel shaft 3 for retracting the seatbelt is controlled to progressively decrease, and after the retraction of the seatbelt has reached its limit, the driving force for protracting the seatbelt by the reel shaft 3 is controlled to progressively increase. Therefore, the disadvantage with the conventional passenger restraint and protection apparatus can be eliminated that the acceleration of protraction of the seatbelt suddenly increases and even exceeds a threshold value above which the seatbelt becomes locked during protraction. As a result, the seatbelt can never be locked during protraction, and therefore the occupant can be released from a state where he receives a large force of oppression, providing a comfortable seatbelt attaching environment.

Although in the present embodiment, the driving force of the reel shaft 3 for retracting the seatbelt and the driving force of the reel shaft 3 for protracting the seatbelt are controlled by changing the duty factor of the control signal for driving the DC motor 10, alternatively these driving forces may be controlled by changing the voltage of the battery Vb, or by providing a variable resistor between the battery Vb and the DC motor 10 and controlling the magnitude of current i flowing to the DC motor 10 by changing the value of the variable resistor.

Ninth Embodiment

The ninth embodiment is distinguished from the eighth embodiment described above mainly in the contents of th seatbelt attaching control executed by the MPU 14 according to the present embodiment in attaching the seatbelt to the occupant.

The present embodiment includes an electric retractor 900 which is distinguished from the electric retractor 100 of the first embodiment only in that a DC motor driver 47 is employed in place of the DC motor driver 11.

Figure 41:
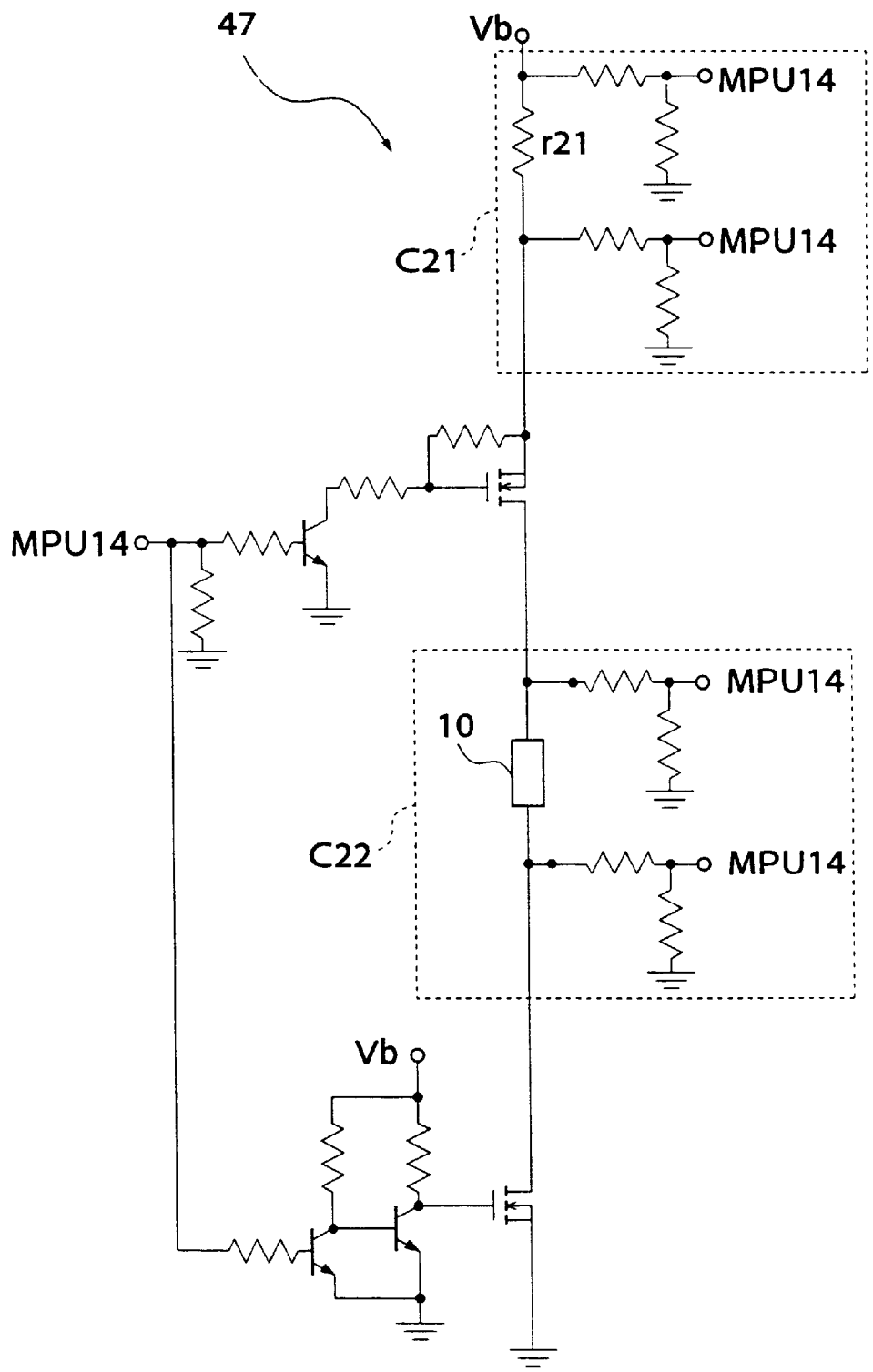
FIG. 41 is a circuit diagram showing the configuration of a DC motor driver 47.

FIG. 41 shows the circuit configuration of the DC motor driver 47. In the figure, a current detecting circuit C21 detects current i flowing to the DC motor 10, from a value of current flowing through a resistance r21, and a voltage measuring circuit C22 measures terminal voltage across the DC motor 10.

Figure 42:
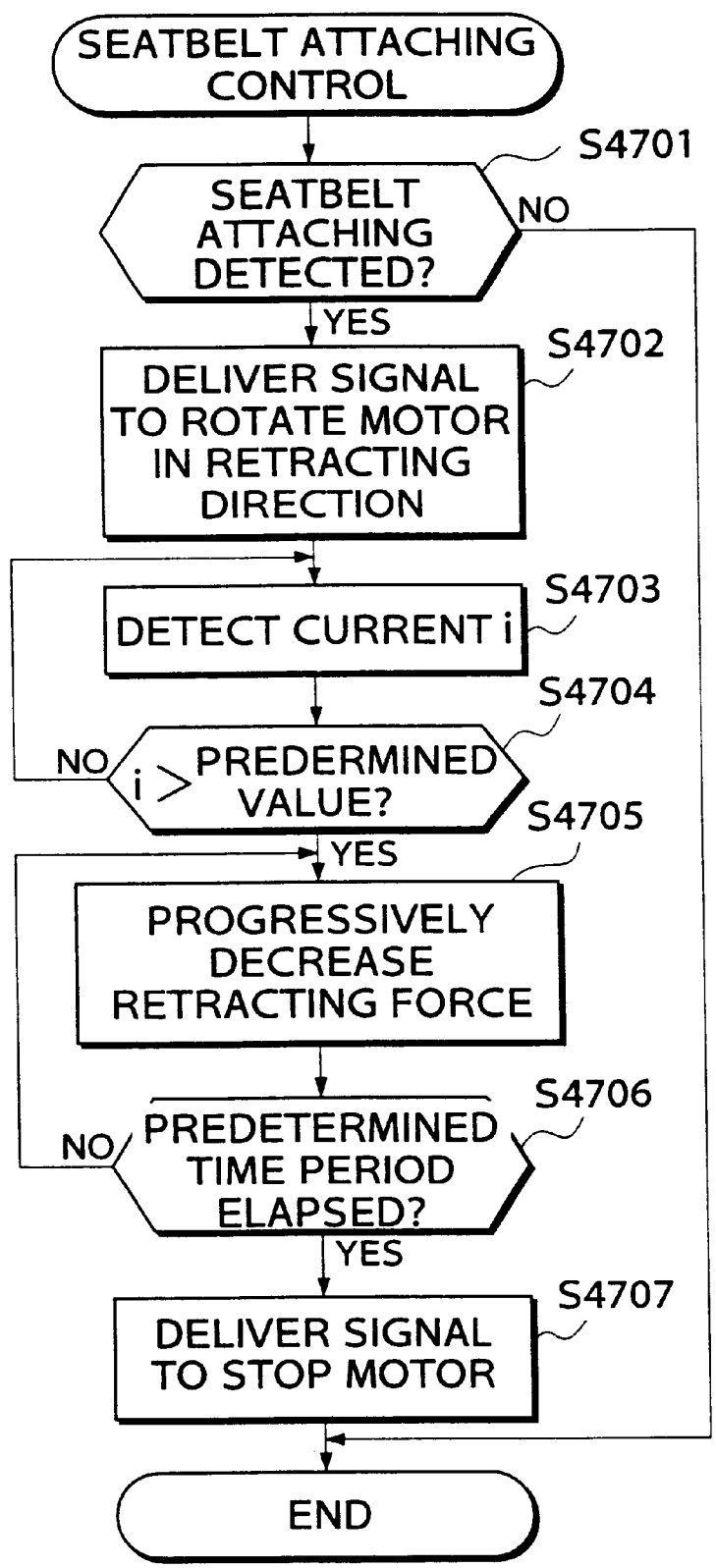
FIG. 42 is a flowchart showing seatbelt attaching control executed by the MPU 14 in attaching the seatbelt.

FIG. 42 is a flowchart showing the seatbelt attaching control executed by the MPU 14 according to the present embodiment.

First, it is determined at a step S4701 whether attaching of the seatbelt tongue to the buckle has been detected by the buckle connection detector 16. If attaching of the seatbelt has not been detected, the present processing is immediately terminated, whereas if it has been detected, a control signal commanding to rotate the reel shaft 3 in the seatbelt retracting direction at a predetermined rotational speed is delivered from the MPU 14 to the DC motor driver 47 at a step S4702. Thus, the seatbelt is retracted so that the urging force that the occupant receives from the seatbelt progressively increases and the seatbelt retracting speed of the reel shaft 3 progressively decreases.

Then, an amount of current i flowing to the DC motor 10 is detected by the current detecting circuit C21 from the value of current flowing through the resistance r21 at a step S4703, and it is determined at a step S4704 whether the detected current i exceeds a predetermined amount (e.g. 1.0 ampere). If the former does not exceed the latter, the processing returns to the step S4703, whereas if the former exceeds the latter, a control signal commanding to further decrease the rotational speed of the reel shaft 3 in the seat retracting direction is delivered from the MPU 14 to the DC motor driver 47 to thereby cause the driving force of the reel shaft 3 for retracting the seatbelt to progressively decrease at a step S4705. On this occasion, the timer 21 measures time elapsed after the control signal starts to be delivered to the DC motor driver 47.

Then, it is determined at a step S4706 whether a predetermined time period (e.g. 3 sec) has elapsed. If it has not elapsed, that is, the driving force of the reel shaft 3 for retracting the seatbelt which is progressively decreasing has not yet fully decreased, the processing returns to the step S4705, whereas if the predetermined time period has elapsed, that is, the driving has fully decreased and then the seatbelt has already become fit to the occupant's body and the retraction of the seatbelt has reached its limit, a control signal is delivered from the MPU 14 to the DC motor driver 47 to stop the driving of the DC motor 10 so as to stop the seatbelt retracting driving of the reel shaft 3, at a step S4709, followed by terminating the program.

Figure 43:
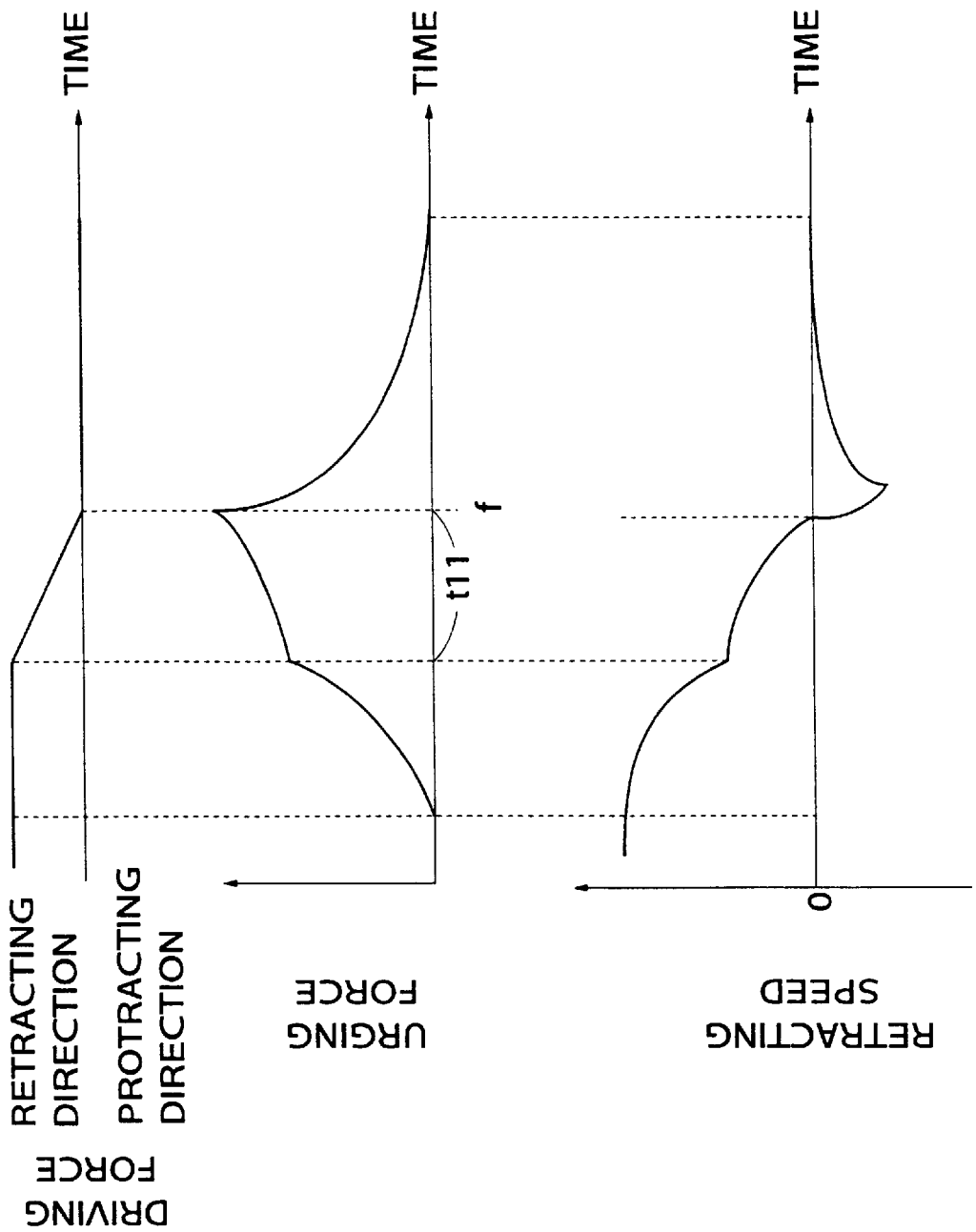
FIG. 43 is a timing chart showing an example of the relationship between the driving force of the reel shaft 3 for retracting the seatbelt, an urging force which the occupant receives from the seatbelt, and the seatbelt retracting and protracting speeds of the reel shaft 3.

FIG. 43 is a timing chart showing an example of the relationship between the driving force of the reel shaft 3 for retracting the seatbelt, the urging force which the occupant receives from the seatbelt, and the seatbelt retracting and protracting speeds of the reel shaft 3

In the present embodiment, as shown in FIG. 43, when attaching of the seatbelt tongue to the buckle has been detected, retraction of the seatbelt by the reel shaft 3 is started with a constant magnitude of driving force, and then the urging force that the occupant receives from the seatbelt progressively increases and the seatbelt retracting speed of the reel shaft 3 progressively decreases.

Subsequently, when the current i flowing to the DC motor 10 exceeds the predetermined value (1.0 ampere), the control signal is delivered to the DC motor driver 47 to further decrease the rotational speed of the reel shaft 3 in the seatbelt retracting direction to progressively decrease the driving force of the reel shaft 3 for retracting the seatbelt (time period t11). During this time period, the urging force that the occupant receives from the seatbelt progressively increases, but the rate of increase of the urging force is smaller as compared with that at the start of the retraction of the seatbelt.

Subsequently, the retraction of the seatbelt reaches its limit (time point f). Then, the control signal is delivered to the DC motor driver 11 to stop the driving of the DC motor 10. Thus, the seatbelt retraction by the reel shaft 3 is stopped, and thereafter protraction of the seatbelt is effected due to a restitution force of the occupant's body and clothes urged by the seatbelt to give a predetermined amount of looseness to the occupant. Consequently, the urging force that the occupant receives from the seatbelt progressively decreases.

As described above, according to the present embodiment, upon detection of attaching of the seatbelt to the occupant, retraction of the seatbelt is started with a constant magnitude of seatbelt driving force by the reel shaft 3, and thereafter, when the current i flowing to the DC motor 10 exceeds a predetermined amount (e.g. 1.0 ampere), the driving force of the reel shaft 3 for retracting the seatbelt is controlled to progressively decrease, and when the retraction of the seatbelt has reached its limit, a control signal is delivered to the DC motor driver 47 to stop the driving of the DC motor 10. Therefore, the disadvantage with the conventional passenger restraint and protection apparatus can be eliminated that the acceleration of protraction of the seatbelt suddenly increases and even exceeds a threshold value above which the seatbelt becomes locked during protraction. As a result, the seatbelt can never be locked during protraction, and therefore the passenger can be released from a state where he receives a large force of oppression, providing a comfortable seatbelt attaching environment.

Although in the present embodiment, the driving force of the reel shaft 3 for retracting the seatbelt and the driving force for protracting the seatbelt by the reel shaft 3 are controlled by changing the duty factor of the control signal for driving the DC motor 10, alternatively these driving forces may be controlled by changing the voltage of the battery Vb, or by controlling the magnitude of current i flowing to the DC motor 10 by changing the value of a variable resistor provided between the battery vb and the DC motor 10.

Tenth Embodiment

The tenth embodiment is distinguished from the eighth embodiment described above mainly in the contents of the seatbelt attaching control executed by the MPU 14 in attaching the seatbelt to the occupant.

The present embodiment includes an electric retractor 1000 which is identical in construction with the electric retractor 100 of the first embodiment.

Figure 44:
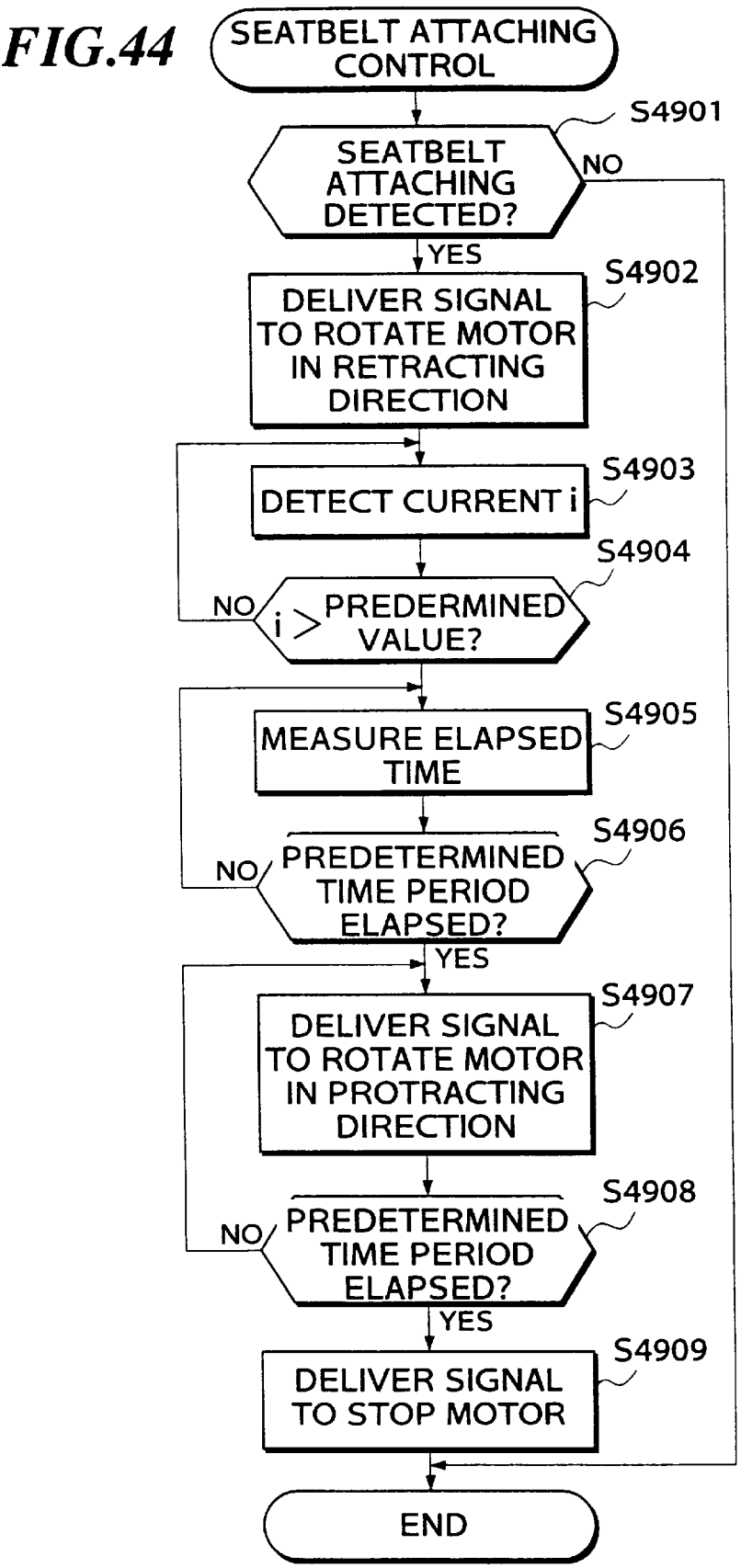
FIG. 44 is a flowchart showing seatbelt attaching control executed by the MPU 14 in attaching the seatbelt.

FIG. 44 is a flowchart showing the seatbelt attaching control executed by the MPU 14 according to the present embodiment.

First, it is determined at a step S4901 whether attaching of the seatbelt tongue to the buckle has been detected by the buckle connection detector 16. If attaching of the seatbelt has not been detected, the present processing is immediately terminated, whereas if it has been detected, a control signal commanding to rotate the reel shaft 3 in the seatbelt retracting direction at a predetermined rotational speed is delivered from the MPU 14 to the DC motor driver 11 at a step S4902. Thus, the seatbelt is retracted so that the urging force that the occupant receives from the seatbelt progressively increases and the seatbelt retracting speed of the reel shaft 3 progressively decreases.

Then, an amount of current i flowing to the DC motor 10 is detected by the current detecting circuit C1 from the value of current flowing through the resistance r21 at a step S4903, and it is determined at a step S4904 whether the detected current i exceeds a predetermined amount (e.g. 3.0 amperes). If the former does not exceed the latter, the processing returns to the step S4903, whereas if the former exceeds the latter, that is, the seatbelt has become fit to the occupant's body and the retraction of the seatbelt has reached its limit, time elapsed after the current i exceeds the predetermined amount (3.0 amperes) is measured by the timer 21 at a step S4905. Then, it is determined at a step S4906 whether the elapsed time has reached a predetermined time period (e.g. 3 sec). If the former does not exceed the latter, the processing returns to the step S4905. On this occasion, the driving force for retracting the seatbelt is held at a value assumed at the start of retraction of the seatbelt and the urging force that the occupant receives from the seatbelt has the maximum value, with the retracting speed and protracting speed being both equal to zero.

When it is determined at the step S4906 that the predetermined time period has elapsed, a control signal is delivered from the MPU 14 to the DC motor driver 11 to increase the rotational speed of the reel shaft 3 in the seatbelt protracting speed at a step S4907 to protract the seatbelt with a constant magnitude of driving force. Thus, the seatbelt is protracted so that the urging force that the occupant receives from the seatbelt progressively decreases, and the seatbelt protracting speed of the reel shaft 3 progressively increases. On this occasion, the timer 21 measures time elapsed after the control signal starts to be delivered to the DC motor driver 11.

Upon starting of the protraction of the seatbelt, the acceleration of seatbelt protraction is constant, but the acceleration applied during the retraction of the seatbelt is not then applied, and accordingly the seatbelt is not locked by the seatbelt locking mechanism 2 during protraction.

Then, it is determined at a step S4908 whether a predetermined time period (e.g. 2 sec) has elapsed, based upon the value of the timer 21. If it has not elapsed, the same determination is repeated, whereas if it has elapsed, that is, the occupant has been given a predetermined amount of looseness, a control signal is delivered to the DC motor driver 11 to stop the DC motor 10 to thereby stop the seatbelt protraction by the reel shaft 3, at a step S4909, followed by terminating the present processing.

Figure 45:
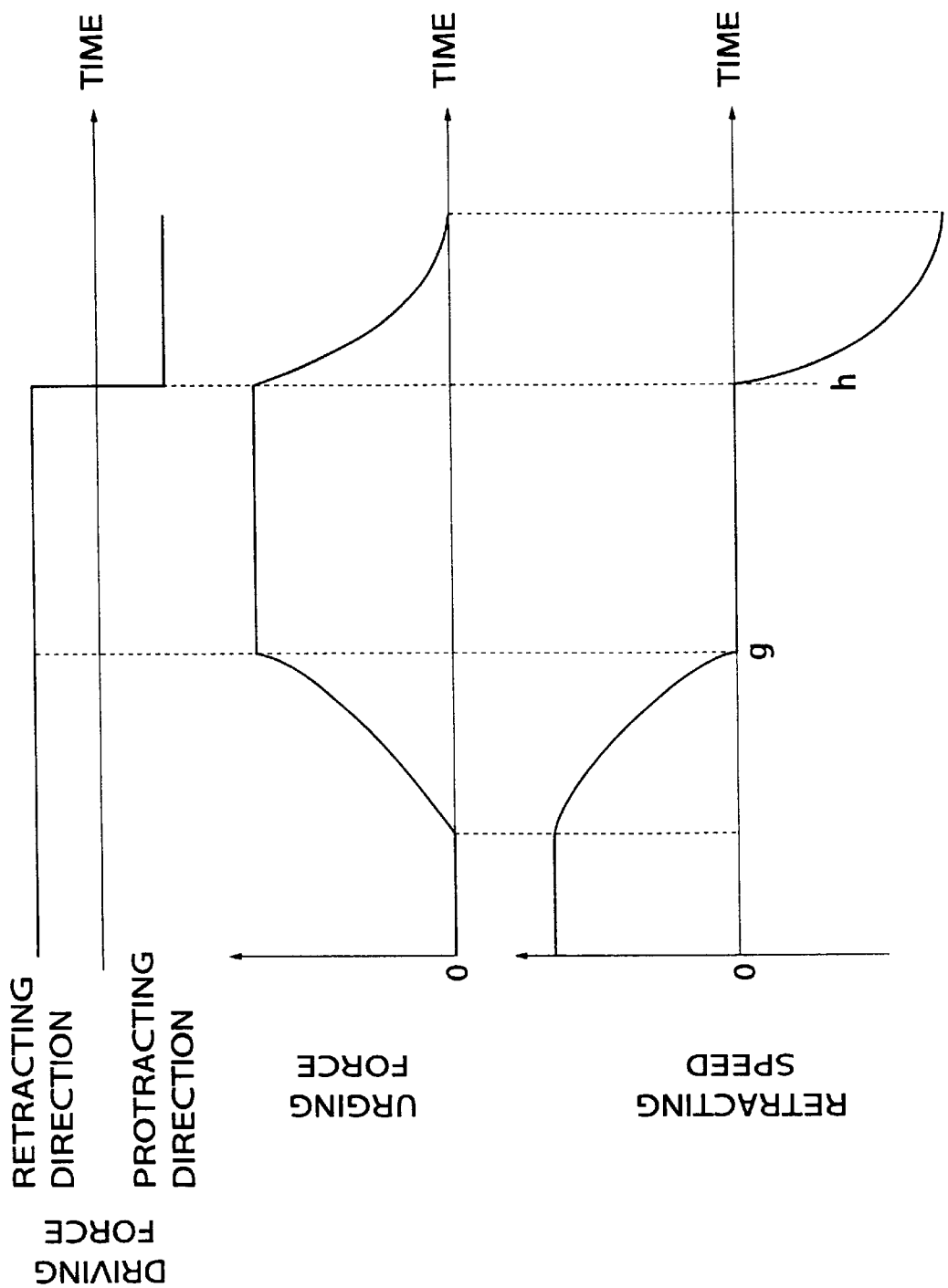
FIG. 45 is a timing chart showing an example of the relationship between the driving forces of the reel shaft 3 for retracting and protracting a seatbelt onto and from the reel shaft, the urging force which the occupant receives from the seatbelt, and the seatbelt retracting and protracting speeds of the reel shaft 3.

FIG. 45 is a timing chart showing an example of the relationship between the driving forces of the reel * shaft 3 for retracting and protracting the seatbelt onto and from the reel shaft, the urging force which the occupant receives from the seatbelt, and the seatbelt retracting and protracting speeds of the reel shaft 3.

In the the present embodiment, as shown in FIG. 45, when attaching of the seatbelt tongue to the buckle has been detected, retraction of the seatbelt by the reel shaft 3 is started with a constant magnitude of driving force, and then the urging force that the occupant receives from the seatbelt progressively increases and the seatbelt retracting speed of the reel shaft 3 progressively decreases.

Subsequently, when the current i flowing to the DC motor 10 exceeds the predetermined value (3.0 amperes), the retraction of the seatbelt reaches its limit (time point g). Over the predetermined time period (3 sec) after the retraction of the seatbelt reaches its limit, the driving force is maintained at a value assumed at the start of retraction, when the urging force that the occupant receives from the seatbelt is the maximum with the seatbelt retracting speed and seatbelt protracting speed being both zero.

After the lapse of the predetermined time period (3 sec) after the retraction of the seatbelt reaches its limit (time point h), the control signal is delivered to the DC motor driver 11 to increase the rotational speed of the reel shaft in the seatbelt protracting direction to protract the seatbelt with a constant magnitude of driving force.. When a predetermined amount of looseness has been given thereafter, the protraction control is terminated. After the lapse of the predetermined time period (3 sec) after the retraction of the seatbelt reached its limit (time point h), the urging force that the occupant receives from the seatbelt progressively decreases.

As described above, according to the present embodiment, after a predetermined time period (3 sec) has elapsed after the retraction of the seatbelt reached its limit and the seatbelt retracting speed and seatbelt protracting speed both become zero, it is controlled such that the seatbelt is protracted with a constant magnitude of driving force. Therefore, the acceleration applied during the retraction of the seatbelt is not then applied, so that the acceleration of protraction of the seatbelt does not exceed a threshold value above which the seatbelt can be locked during protraction, and accordingly the seatbelt is never locked by the seatbelt locking mechanism 2 during protraction, and therefore the occupant can be released from a state where he receives a large force of oppression, providing a comfortable seatbelt attaching environment.

Eleventh Embodiment

The eleventh embodiment is distinguished from the ninth embodiment described above mainly in the contents of th seatbelt attaching control executed by the MPU 14 in attaching the seatbelt to the occupant.

The present embodiment includes an electric retractor 1100 which is identical in construction with the electric retractor 900 of the ninth embodiment.

Figure 46:
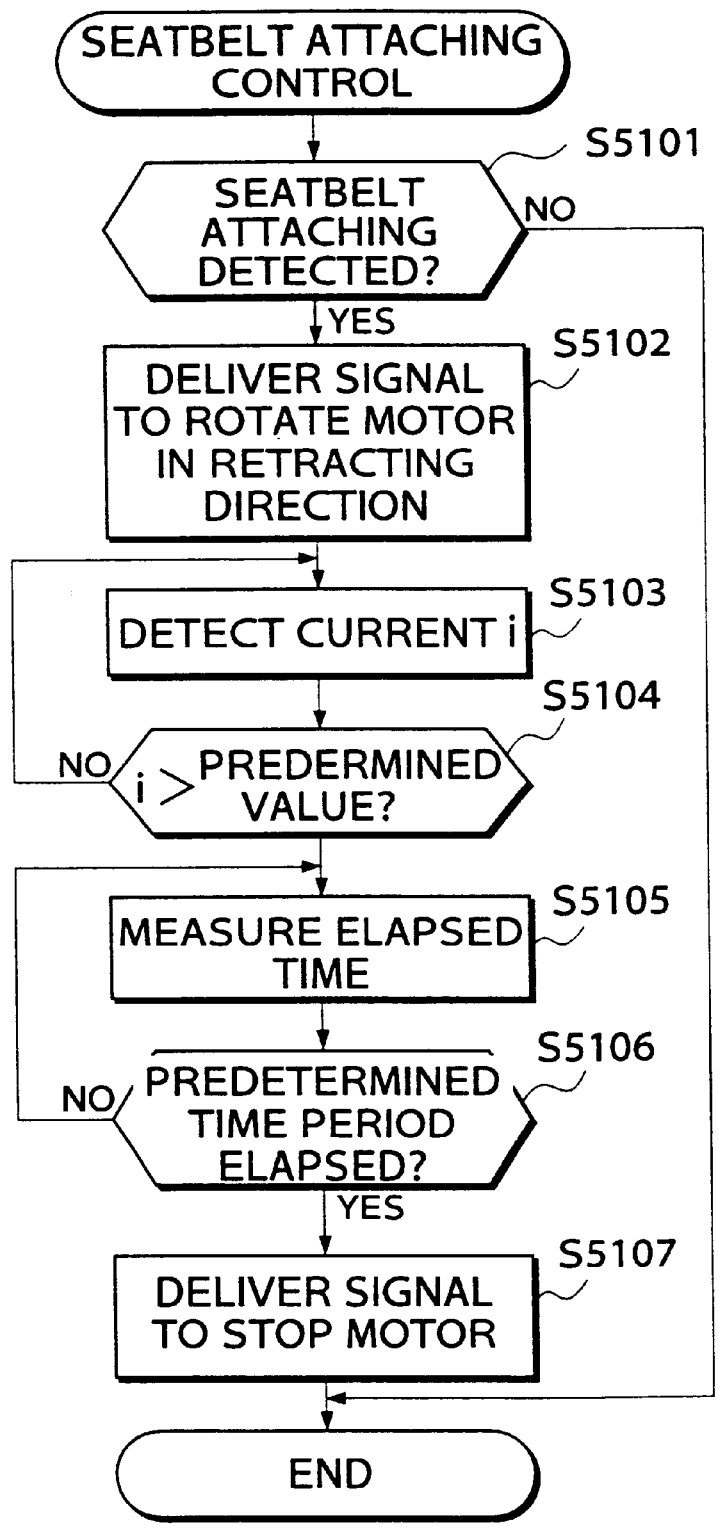
FIG. 46 is a flowchart showing seatbelt attaching control executed by the MPU 14 in attaching the seatbelt.

FIG. 46 is a flowchart showing the seatbelt attaching control executed by the MPU 14 according to the present embodiment.

First, it is determined at a step S5101 whether attaching of the seatbelt tongue to the buckle has been detected by the buckle connection detector 16. If attaching of the seatbelt has not been detected, the present processing is immediately terminated, whereas if attaching of the seatbelt has been detected, a control signal is delivered to the DC motor driver 47 to rotate the reel shaft 3 in the seatbelt retracting direction at a predetermined rotational speed at a step S5102. Thus, the seatbelt is retracted so that the urging force that the occupant receives from the seatbelt progressively increases and the seatbelt retracting speed of the reel shaft 3 progressively decreases.

Then, an amount of current i flowing to the DC motor 10 is detected by the current detecting circuit C21 from the value of current flowing through the resistance r21 at a step S5103, and it is determined at a step S5104 whether the detected current i exceeds a predetermined amount (e.g. 3.0 amperes). If the former does not exceed the latter, the processing returns to the step S5103, whereas if the former exceeds the latter, that is, the seatbelt has become fit to the occupant's body and the retraction of the seatbelt has reached its limit, time elapsed after the current i exceeds the predetermined amount (3.0 amperes) is measured by the timer 21 at a step S5105.

Then, it is determined at a step S5106 whether the elapsed time has reached a predetermined time period (e.g. 3 sec). If the former has not reached the latter, the processing returns to the step S5105. On this occasion, the driving force for retracting the seatbelt is held at a value assumed at the start of retraction of the seatbelt and the urging force that the occupant receives from the seatbelt is the maximum, with the retracting speed and protracting speed being both equal to zero.

When it is determined at the step S5106 that the predetermined time period has elapsed, a control signal is delivered from the MPU 14 to the DC motor driver 11 to stop the DC motor 10 to thereby stop the seatbelt retraction by the reel shaft 3, at a step S5107, followed by terminating the present processing.

Figure 47:
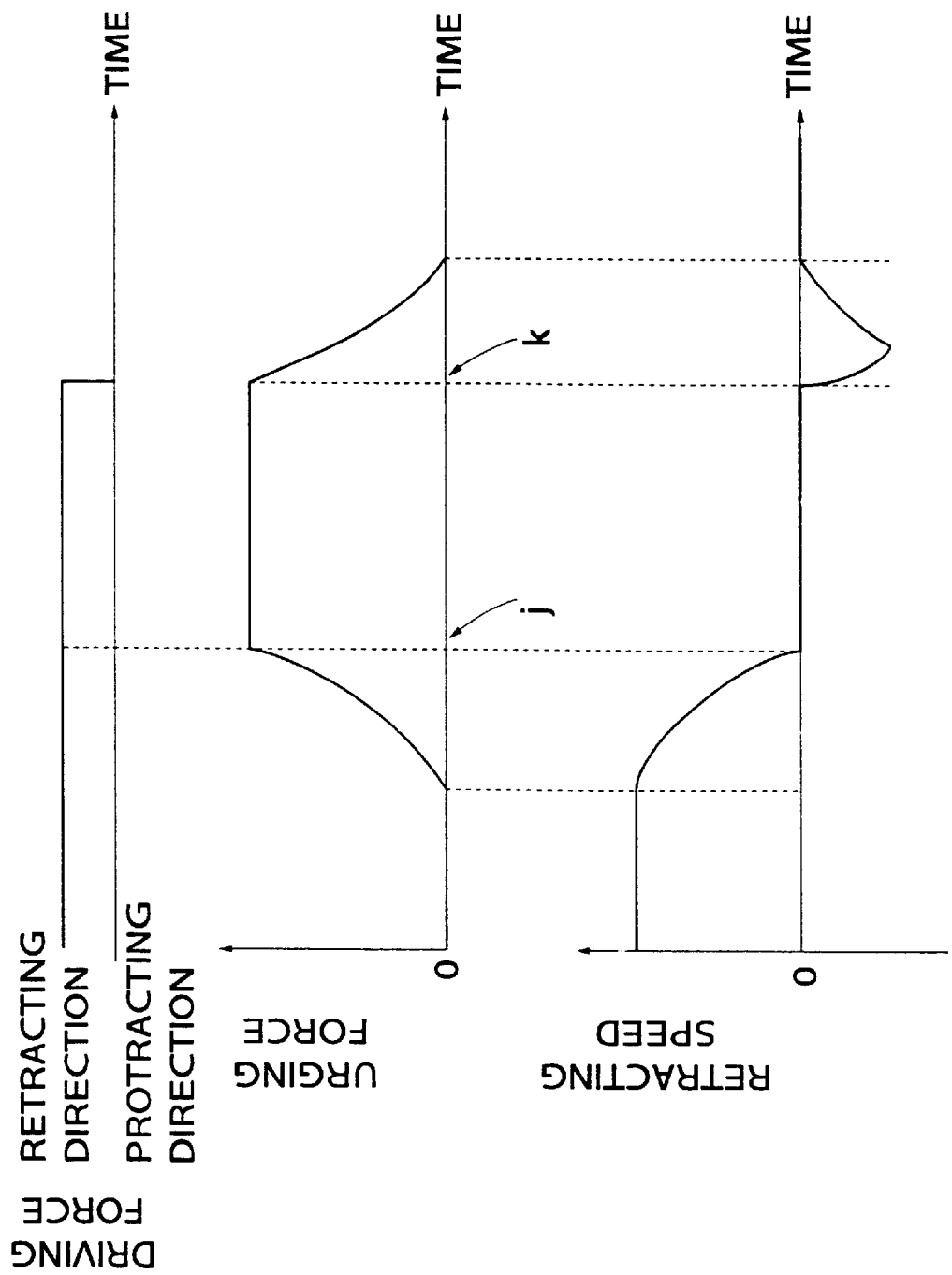
FIG. 47 is a timing chart showing an example of the relationship between the driving force of the reel shaft 3 for retracting the seatbelt, the urging force that the occupant receives from the seat belt, and the seatbelt retracting speed of the reel shaft 3.

FIG. 47 is a timing chart showing an example of the relationship between the driving force of the reel shaft 3 for retracting the seatbelt, the urging force that the occupant receives from the seat belt, and the seatbelt retracting speed of the reel shaft 3.

In the present embodiment, as shown in FIG. 47, when attaching of the seatbelt tongue to the buckle has been detected, retraction of the seatbelt by the reel shaft 3 is started with a constant magnitude of driving force, and then the urging force that the occupant receives from the seatbelt progressively increases and the seatbelt retracting speed of the reel shaft 3 progressively decreases.

Subsequently, when the current i flowing to the DC motor 10 exceeds the predetermined value (3.0 amperes), the retraction of the seatbelt reaches its limit (time point j). Over 3 seconds after the retraction of the seatbelt reaches its limit, the driving force is maintained at a value assumed at the start of retraction, when the urging force that the occupant receives from the seatbelt is the maximum with the seatbelt retracting speed and seatbelt protracting speed being both zero.

After the lapse of the predetermined time period (3 sec) after the retraction of the seatbelt reaches its limit (time point k), the control signal is delivered to the DC motor driver 11 to stop the driving by the DC motor 10. Thus, the retraction of the seatbelt by the reel shaft 3 is stopped, and thereafter protraction of the seatbelt is effected due to a restitution force of the occupant's body and clothes urged by the seatbelt to give a predetermined amount of looseness to the occupant. Consequently, the urging force that the occupant receives from the seatbelt progressively decreases.

As described above, according to the present embodiment, after a predetermined time period (3 seconds) has elapsed after the retraction of the seatbelt reached its limit and the seatbelt retracting speed and seatbelt protracting speed both become zero, a control signal commanding to stop the driving of the DC motor 10 is delivered to the DC motor driver 47. Therefore, the acceleration applied during the retraction of the seatbelt is not then applied, so that the acceleration of protraction of the seatbelt is given only by the restitution force of the occupant's body and clothes urged by the seatbelt and hence does not exceed a threshold value above which the seatbelt can be locked during protraction, and accordingly the seatbelt is never locked by the seatbelt locking mechanism 2 during protraction, and therefore the occupant can be released from a state where he receives a large force of oppression, providing a comfortable seatbelt attaching environment.

Twelfth Embodiment

The twelfth embodiment is characterized by seatbelt storing control executed by the MPU 14.

The present embodiment includes an electric retractor 1200 which is identical in construction with the electric retractor 800 of the eighth embodiment.

Figure 48:
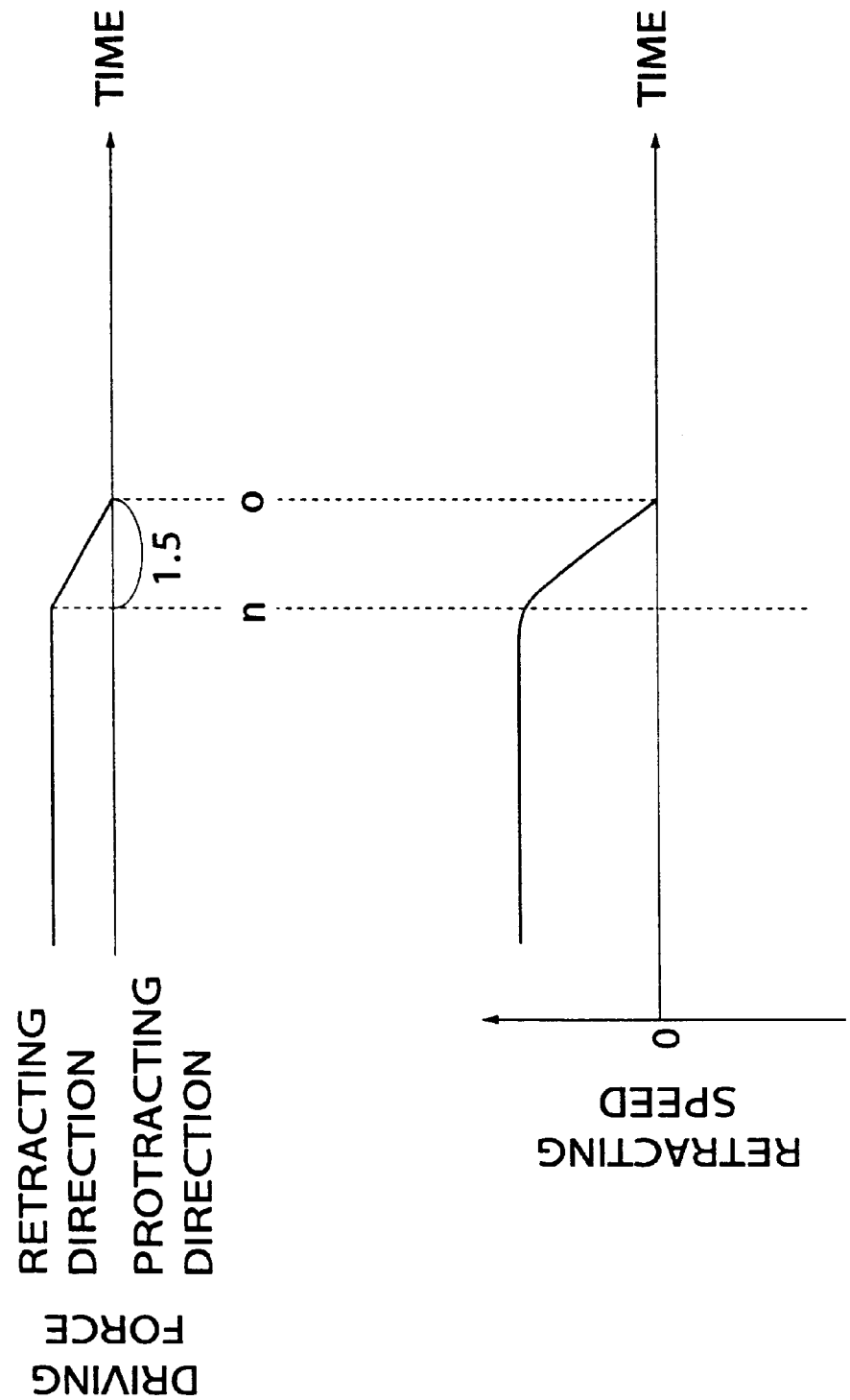
FIG. 48 is a timing chart showing the relationship between the driving force of the reel shaft 3 for retracting the seatbelt and the seatbelt retracting speed of the reel shaft 3.

FIG. 48 is a timing chart showing the relationship between the driving force of the reel shaft 3 for retracting the seatbelt and the seatbelt retracting speed of the reel shaft 3.

In the present embodiment, as shown in FIG. 48, when release of the seatbelt is detected, retraction of the seatbelt is started with a constant magnitude of driving force by the reel shaft 3. The MPU 14 determines whether the retraction of the seatbelt is just about to be terminated (time point n), based upon the terminal voltage across the DC motor 10.

If the retraction of the seatbelt is just about to be terminated (time point n), a control signal is delivered to the DC motor driver 11 to decrease the rotational speed of the reel shaft 3 in the seatbelt retracting direction so as to progressively decrease the driving force of the reel shaft 3 for retracting the seatbelt. On this occasion, the timer 21 measures time elapsed after the start of delivery of the control signal to the DC motor driver 11.

Then, it is determined whether the elapsed time has reached a predetermined time period (e.g. 1.5 sec). If the former has not reached the latter, the driving force of the reel shaft 3 for retracting the seatbelt which is progressively decreasing has not fully decreased, the measurement of the elapsed time is continued, whereas if the predetermined time period has elapsed, that is, the driving force has fully decreased (time point o), a control signal is delivered to the DC motor driver 11 to stop the driving of the DC motor 10, followed by terminating the present processing. Thus, the retraction of the seatbelt is terminated.

As described above, according to the present embodiment, immediately before the termination of retraction of the seatbelt, the driving force of the reel shaft 3 for retracting the seatbelt is controlled so as to progressively decrease. As a result, a so-called "end locking" phenomenon can be prevented that the speed of retraction of the seatbelt suddenly becomes zero upon termination of retraction of the seatbelt, causing locking of the seatbelt during subsequent protraction. Therefore, the seatbelt can never be locked during protraction.

Thirteenth Embodiment

The thirteenth embodiment of the invention is distinguished from the above described fifth embodiment in the seatbelt slackening control.

The present embodiment has an electric retractor 1300 which is identical in construction with the electric retractor 500 of the fifth embodiment, description of which is therefore omitted.

The seatbelt slackening control according to the present embodiment will be described hereinbelow.

Figure 49:
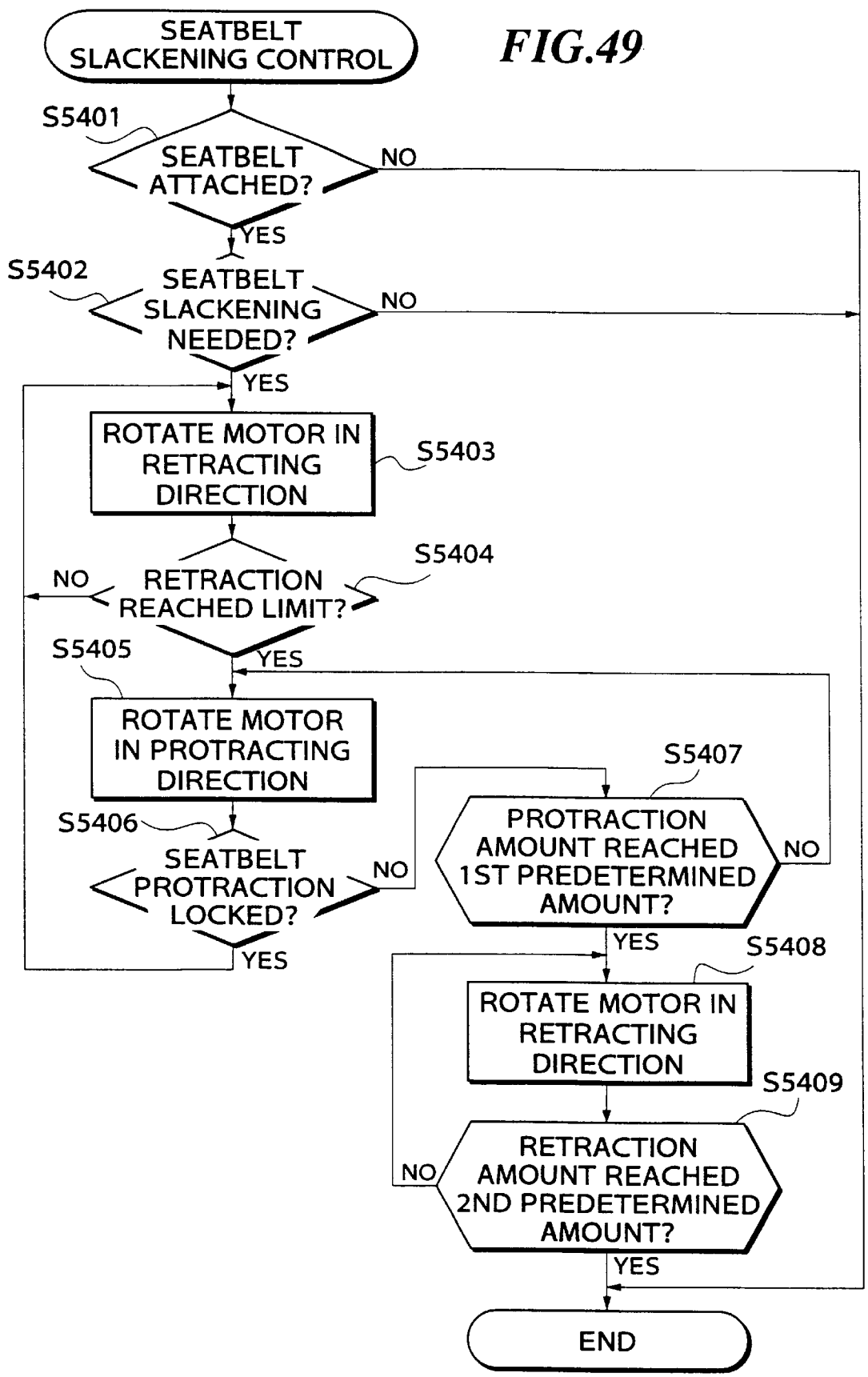
FIG. 49 is a flowchart showing seatbelt looseness imparting control.

FIG. 49 is a flowchart showing the seatbelt slackening control executed by the MPU 14 according to the present embodiment.

First, it is determined at a step S5401 whether attaching of the seatbelt tongue to the buckle has been detected by the buckle connection detector 16. If attaching of the seatbelt has not been detected, the present processing is immediately terminated, whereas if attaching of the seatbelt has been detected, it is determined at a step S5402 whether slackening of the seatbelt is needed. The slackening of the seatbelt is needed when the seatbelt has been deviated from a proper position, for example, if (i) the vehicle is braked while traveling at a predetermined speed or a higher speed and then the vehicle speed drops below a predetermined speed or the vehicle stops to be braked, (ii) the collision predictor 18 once predicts that there is a fear of collision and subsequently predicts that there is no fear of collision, or (iii) the seatbelt is protracted by the occupant and subsequently the seatbelt comes into a retractable state.

If it is determined at the step S5402 that the slackening of the seatbelt is not needed, the present processing is immediately terminated, whereas if it is determined that the slackening is needed,.a PWM signal is delivered from the MPU 14 to the DC motor driver 11 to rotate the DC motor 10 in the seatbelt retracting direction at a step S5403, and it is determined at a step S5404 whether the retraction of the seatbelt has reached its limit, based upon the current flowing to the DC motor 10. Thus, an improper amount of looseness of the seatbelt is once completely removed.

If it is determined at the step S5404 that the retraction of the seatbelt has not reached its limit, the processing returns to the step S5403, whereas if it is determined that the retraction has reached its limit, a PWM signal is delivered from the MPU 14 to the DC motor driver 11 to rotate the DC motor 10 in the seatbelt protracting direction at a step S5405, followed by determining at a step S5406 whether the seatbelt has been locked by the seatbelt locking mechanism 2 during protraction. More specifically, if an amount of fluctuation in the terminal voltage across the DC motor 10 is below a predetermined value during rotation of the DC motor in the seatbelt protracting direction, it is determined that the seatbelt has been locked during protraction. Alternatively, if the current flowing to the DC motor 10 exceeds a predetermined current amount or an amount of fluctuation in the same is below a predetermined value, it may be determined that the seatbelt has been locked during protraction.

If it is determined at the step S5406 that the seatbelt has been locked during protraction, in order to release the locked state and then give a predetermined looseness to the seatbelt again, the processing returns to the step S5403. the driving force employed for the retraction of the seatbelt executed by the step S5403 at this time is set to a larger value than the driving force employed when it is determined that slackening of the seatbelt is needed at the step S5402, in order to release the seatbelt from its locked state.

The seatbelt can be locked during protraction, for example, when the seatbelt is retracted with an increased retracting force in response to a determination that there is a fear of collision of the vehicle, and subsequently it is determined that the fear of collision has disappeared, to carry out a slackening operation, i.e. slackening of the seatbelt is determined to be needed, the increased retracting force is reduced to a smaller value so that the restitution force of the occupant's body or the like causes a slight protraction of the seatbelt, which in turn causes locking of the seatbelt. In such a case, if the seatbelt is retracted with the above-mentioned increased retracting force larger than the one before the locking of the seatbelt, the locking of the seatbelt can be released, enabling execution of the slackening operation again.

If it is determined at the step S5406 that the seatbelt has not been locked during protraction, it is determined at a step S5407 whether the amount of protraction of the seatbelt has reached a first predetermined amount (e.g. 10 cm), based upon the terminal voltage across the DC motor 10.

If the protraction amount has not reached the first predetermined amount, the processing returns to the step S5405 to continue the protraction of the seatbelt, whereas if the former has reached the latter, the PWM signal is again delivered from the MPU 14 to the DC motor driver 11 to cause rotation of the DC motor 10 in the seatbelt retracting direction for caution's sake at a step S5408, in case that locking of the seatbelt during protraction has not been properly detected.

Then, it is determined at a step S5409 whether the amount of retraction of the seatbelt has reached a second predetermined amount (e.g. 5 cm), based upon the terminal voltage across the DC motor 10. If the former has not reached the latter, the processing returns to the step S5408, whereas if the former has reached the latter, the present processing is terminated.

As described above, according to the present embodiment, when slackening of the seatbelt is needed (the answer is YES at the step S5402), the seatbelt is retracted to its limit (the answer is YES at the step S5404), and then, to give a predetermined amount of looseness, the seatbelt is protracted (step S5404), and if during the protraction the seatbelt is locked,(the answer is YES at the step S5406), the seatbelt is retracted to release the locking and give a predetermined of looseness again (step S5403), and if the seatbelt is not locked during the protraction, after the amount of protraction of the seatbelt reaches a first predetermined amount, the seatbelt is retracted by a second predetermined amount (steps S5408 and S5409). Thus, the present embodiment is constructed such that the occupant can be given a predetermined amount of looseness without fail and unnecessary locking of the seatbelt is released. As a result, the present embodiment can provide a comfortable seatbelt attaching environment and properly protect the occupant.

Fourteenth Embodiment

Figure 50:
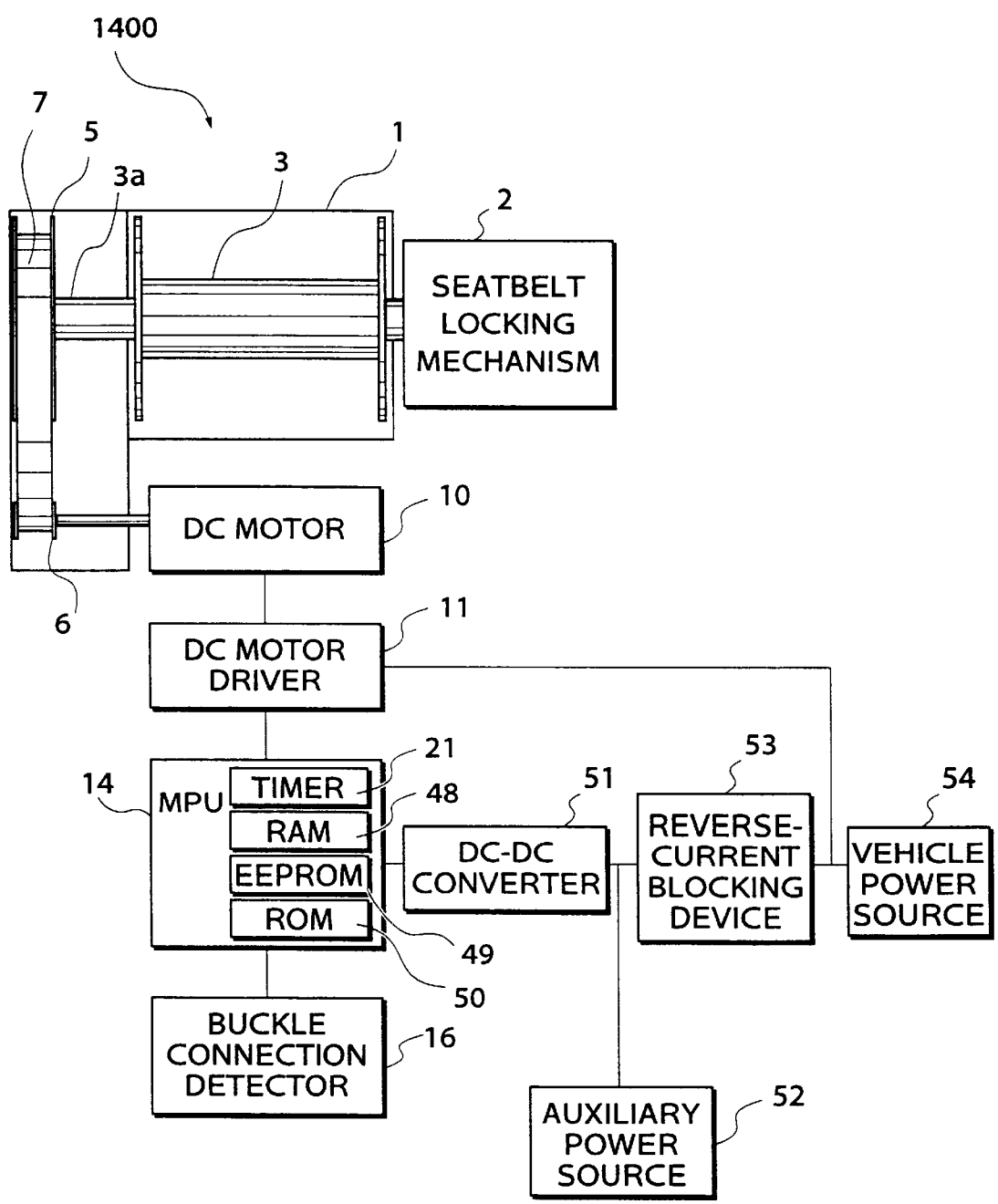
FIG. 50 is a block diagram showing the arrangement of an electric retractor 1400 provided in an automotive passenger restraint and protection apparatus according to a fourteenth embodiment of the invention.

FIG. 50 shows the arrangement of an electric retractor 1400 of an automotive vehicle restraint and protection apparatus according to a fourteenth embodiment of the invention.

The electric retractor 1400 includes a DC-DC converter 51, an auxiliary power supply 52, a reverse current blocking device 53, and a vehicle power supply 54 installed in the automotive vehicle, which are connected to the MPU 1, but the mode selector 18, the temperature sensor 19 and the traveling condition detector 20 in FIG. 1 are omitted. Further, the electric retractor 1400 does not have bias force-imparting means as employed in the electric retractor 100.

Connected to the DC motor driver 11 are the vehicle power supply 54 which is formed e.g. of a battery, for supplying supply power required for driving the DC motor 10, and the reverse-current blocking device 53 which is formed e.g. of a diode.

The auxiliary power supply 52 which is formed e.g. of a capacitor is connected to the reverse-current blocking device 53 and also connected to the MPU 14 via the DC-DC converter 51. The reverse-current blocking device 53 serves to prevent energy stored in the auxiliary power supply 52 from flowing to the vehicle power supply 54 or to the DC motor driver 11, and permits the energy to be supplied to the MPU 14 via the DC-DC converter 51. The auxiliary power supply 52 stores energy supplied from the vehicle power supply 54 and supplies the energy over a predetermined time period after stoppage of supply of the energy from the vehicle power supply 54. For example, in the event of a collision of the vehicle, the auxiliary power supply 52 supplies energy stored therein to the MPU 14 over 100 ms, for example, after the collision. The DC-DC converter 54 converts output voltage from the vehicle power supply 54 to a voltage value suitable for operation of the MPU 14, e.g. 5 volts.

The MPU 14 includes a RAM 48 and an EEPROM (nonvolatile ROM) 49 for storing a bit string indicative of a kind of control of the electric retractor, and a ROM 50. The MPU 14 determines whether the seatbelt has been protracted, based upon the sign of the terminal voltage across the DC motor 10 and determines whether retraction of the seatbelt has been terminated, based upon the current i flowing to the DC motor 10.

Except for those described above, the electric retractor 1400 is identical in construction with the electric retractor 100 of the first embodiment, description of which is therefore omitted.

Next, description will be made of a summary of operation of the electric retractor 1400 as well as details of the bit string indicative of the kind of control of the electric retractor 1400 and the terminal voltage across the DC motor 10.

Figure 51:
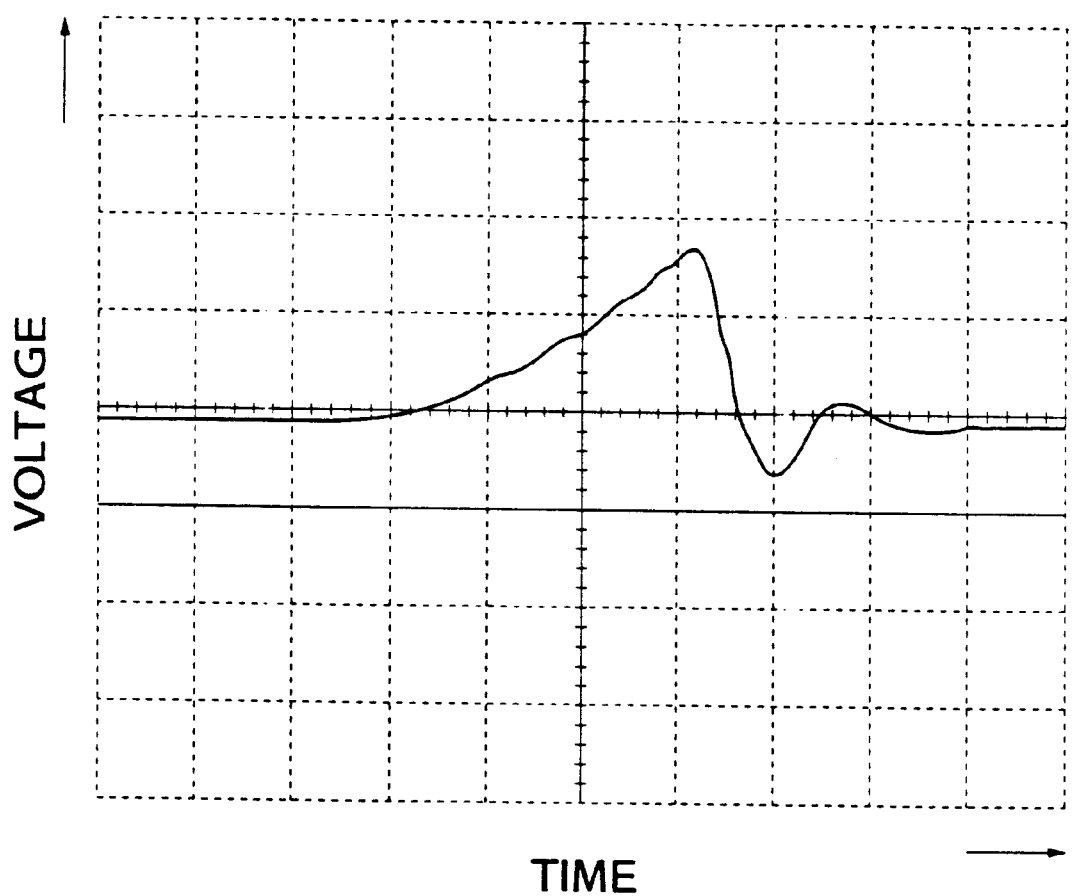
FIG. 51 is a graph showing the relationship between the terminal voltage of the DC motor 10 and elapsed time.

When the seatbelt is protracted, a potential difference is generated between the terminals of the DC motor 10, which corresponds to the protracting speed. The seatbelt locking mechanism 2 locks the seatbelt during protraction using a WSI function which locks the seatbelt during protraction when the acceleration of protraction of the seatbelt exceeds a predetermined value, or a VSI function which locks the seatbelt during protraction when acceleration applied to the vehicle exceeds a predetermined value. The seatbelt locking mechanism 2 locks the seatbelt only after the reel shaft 3 has rotated in the seatbelt protracting direction by a predetermined amount. On this occasion, the terminal voltage across the DC motor 10 rises along a gradient corresponding to the seatbelt protracting speed and suddenly drops immediately the seatbelt is locked during protraction, as shown in FIG. 51. The MPU 14 grasps a waveform of the terminal voltage across the DC motor 10 as shown in FIG. 51, and stores a value of the terminal voltage assumed from a time point 100 ms before the seatbelt is locked during protraction to a time point 100 ms after the seatbelt is locked during protraction, in the EEPROM 49 via the RAM 48 together with the kind of control of the electric retractor 1400.

The kind of control of the electric retractor 1400 includes a seatbelt attaching assisting control which is triggered when protraction of the seatbelt by the occupant in attaching the seatbelt to his body is detected, to control the DC motor 10 so as to facilitate protraction of the seatbelt, a seatbelt oppression removing control which is triggered when the seatbelt tongue is attached to the buckle, to control the DC motor 10 to retract the seatbelt, and then control the DC motor 10 so as to give a predetermined amount of looseness to the occupant after the seatbelt has become fit to the occupant's body and the retraction of the seatbelt has reached its limit, a movement control which is triggered when the occupant has moved to slightly protract after attaching the seatbelt onto his body, to control the DC motor 10 so as to facilitate the protraction of the seatbelt, and a seatbelt storing control which is triggered when the seatbelt has been protracted but not attached to the occupant or when the seatbelt tongue has been disconnected from the buckle, to control the DC motor 10 so as to store the seatbelt in the retracted position.

Figure 52:
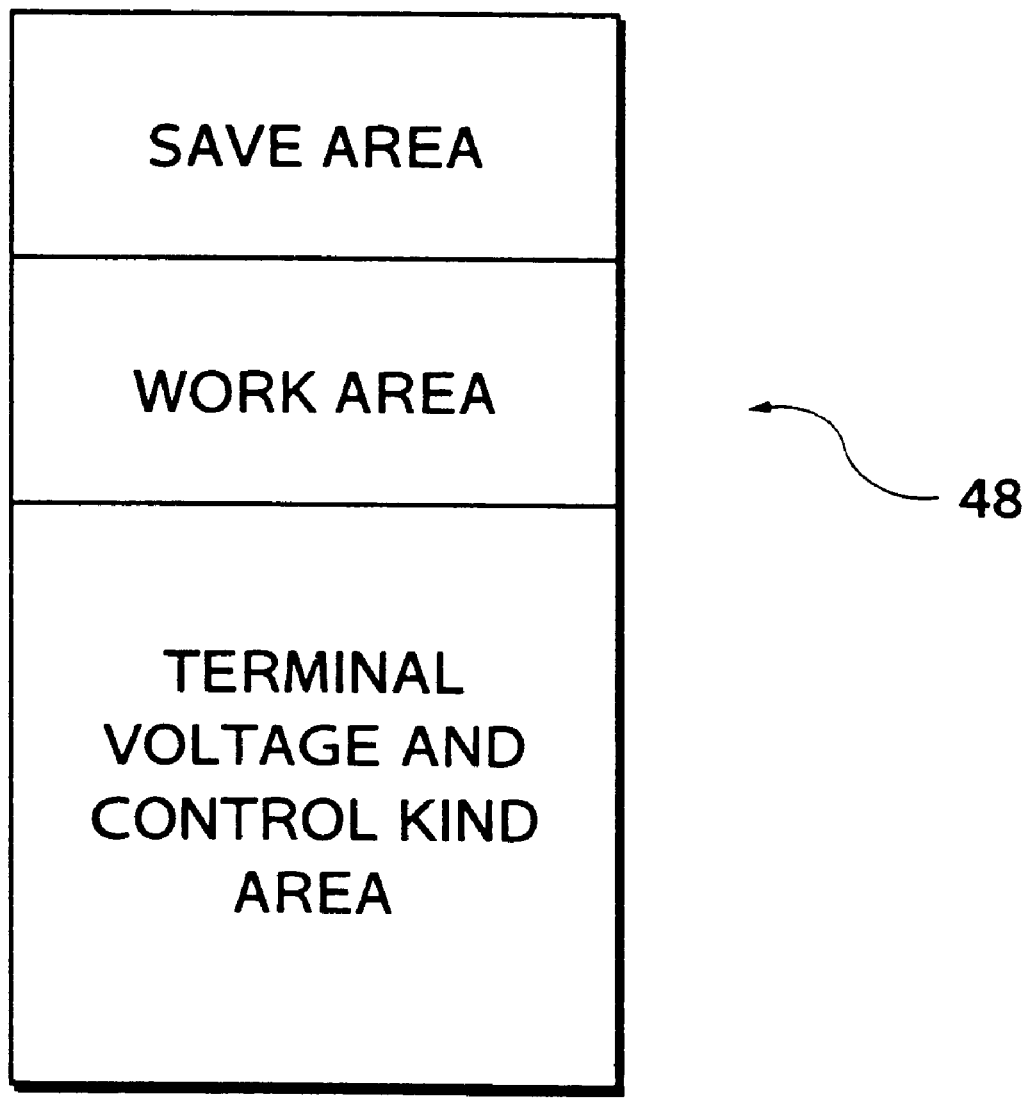
FIG. 52 is a view showing the structure of a memory map in a RAM 48.

FIG. 52 shows, by way of example, the structure of a memory map in the RAM 48. The RAM 48 has a save area for temporarily saving status of working of a control which is being executed by the MPU 14, a work area used in working control programs, and a terminal voltage and control kind area for storing values of the terminal voltage across the DC motor 10 assumed over a predetermined time period and the kind of a control of the electric retractor 100 being executed.

Figures 53, 54:
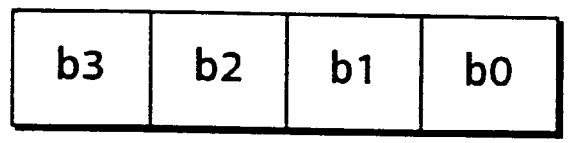
FIG. 53 is a view showing the structure of an area of the RAM 48 for storing the terminal voltage a control kind of the electric retractor.
FIG. 54 is a view showing the structure of an area of the RAM 48 for storing a control state of the electric retractor.

The terminal voltage and control kind area has areas for storing an address counter, values of the terminal voltage across the DC motor and the kind of control of the electric retractor 1400, respectively, each area consisting of 200 rows, as shown in FIG. 53. The contents stored in the areas are transferred to the EEPROM 49 and stored therein.

The area for storing the kind of control of the electric retractor 1400 is formed of a bit string of 4 bits as shown in FIG. 54. When the least significant bit b0 assumes 1, that is, the bit string is "0001", it indicates the seatbelt attaching auxiliary control, when the bit b1 assumes 1, that is, the bit string is "0010", it indicates the seatbelt oppression removing control, and when the bit b2 assumes 1, that is, the bit string is "0100", it indicates the movement control, and when the most significant bit b3 assume 1, that is, the bit string is "1000", it indicates the seatbelt storing control.

Figure 55:
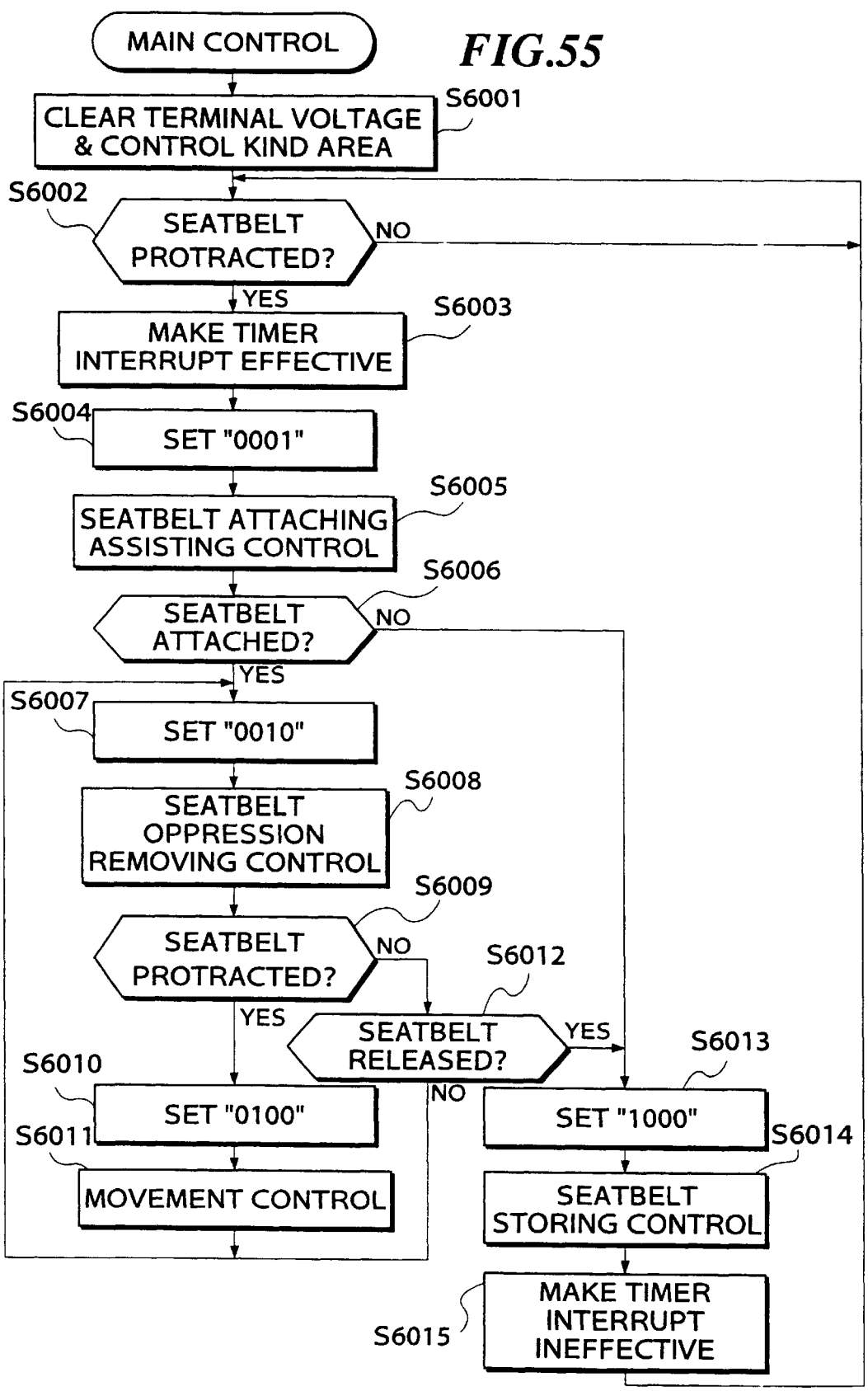
FIG. 55 is a flowchart showing main control executed by the MPU 14.

FIG. 55 is a flowchart showing a main control executed by the MPU 14 according to the present embodiment.

Figure 56:
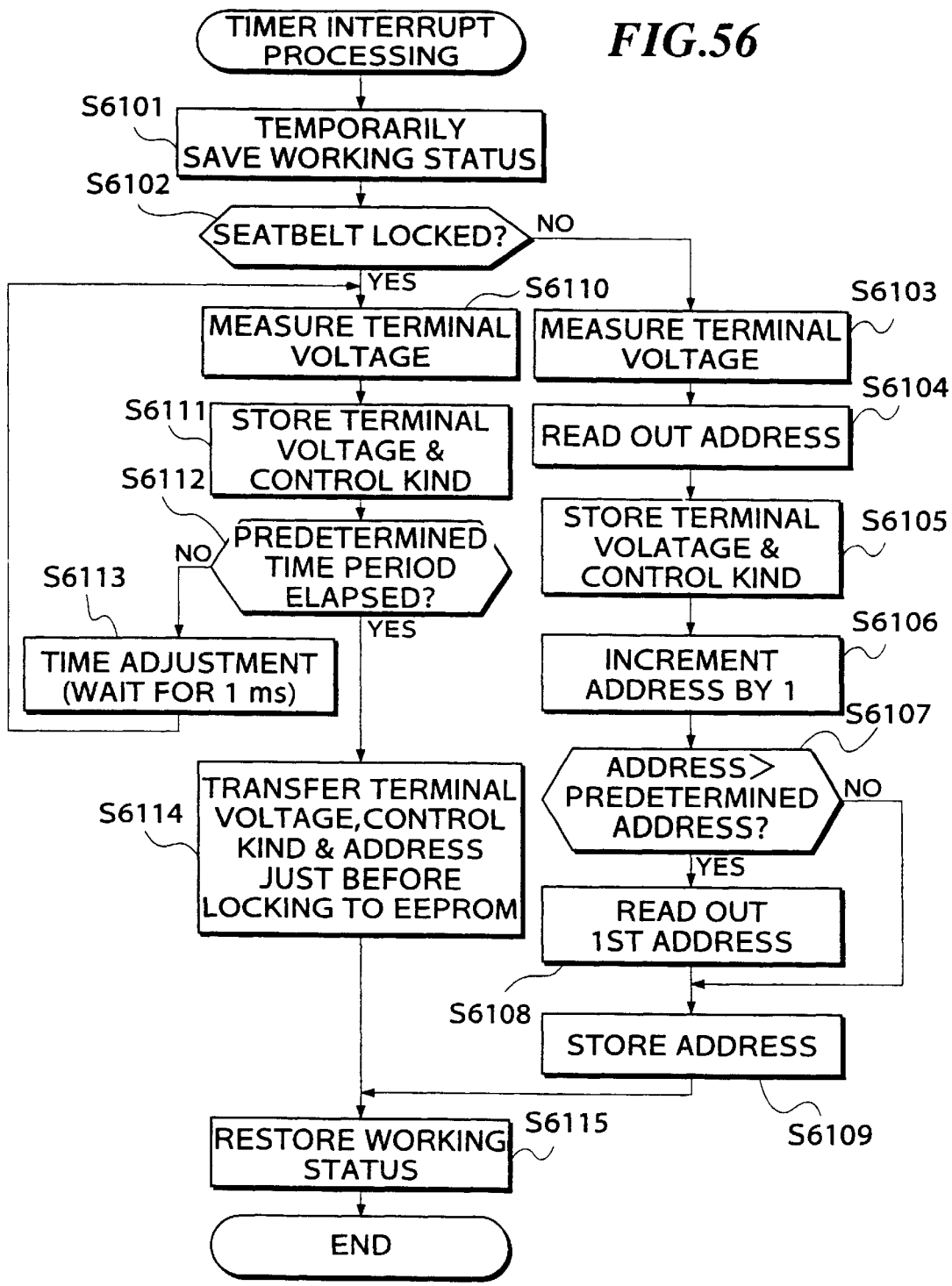
FIG. 56 is a flowchart showing timer interrupt processing executed by the MPU 14.

First, values in the terminal voltage and control kind area of the RAM 48 are cleared at a step S6001, and it is determined at a step S6002 whether the seatbelt has been protracted. If the seatbelt has not been protracted, the same determination is repeated, whereas if the seatbelt has been protracted, time interrupt processing, hereinafter described with reference to FIG. 56, is rendered effective at a step S6003.

Then, the bit string of "0001" is set into the control kind area at a step S6004, followed by executing the seatbelt attaching assisting control at a step S6005.

Then, it is determined at a step S6006 whether attaching of the seatbelt tongue to the buckle has been detected by the buckle connection detector 16. If attaching of the seatbelt has not been detected, the bit string of "1000" is set into the control kind area at a step S6013, followed by executing the seatbelt storing control at a step S6014, and rendering the timer interrupt processing ineffective at a step S6015, and then the processing returns to the step S6001.

On the other hand, if attaching of the seatbelt has been detected, the bit string of "0010" is set into the control kind area at a step S6007, followed by executing the seatbelt oppression removing control at a step S6008.

Thereafter, it is determined at a step S6009 whether the seatbelt has been protracted. If the seatbelt has been protracted, the bit string of "0100" is set into the control kind area at a step S6010, and followed by executing the movement control at a step S6011, and then the processing returns to the step S6007, whereas if the seatbelt has not been protracted, it is determined at a step S6012 whether disconnection of the seatbelt tongue from the buckle has been detected by the buckle connection detector 16.

If disconnection of the seatbelt has been detected, the processing proceeds to the step S6013, whereas if disconnection of the seatbelt has not been detected, the processing proceeds to the step S6007.

FIG. 56 is a flowchart showing the timer interrupt processing executed by the MPU 14. The present timer interrupt processing is triggered in response to a timer interrupt signal generated at time intervals of 1 ms, for example, which are counted by the timer 21.

First, the MPU 14 temporarily saves the status of working of the control being executed in the save area of the RAM 48 at a step S6101.

Then, it is determined at a step S6102 whether the seatbelt has been locked during protraction by the seatbelt locking mechanism 2, based upon the terminal voltage across the DC motor 10. If the seatbelt has not been locked during protraction, that is, there is no accident of the vehicle, the voltage measuring circuit C2 is actuated to measure the terminal voltage across the DC motor 10 at a step S6103, and an address is read out from the RAM 48 at a step S6104. In this case, an address "FF00" is read out from the RAM 48.

Then, a value of the terminal voltage across the DC motor measured at the step S6103 and the kind of control of the electric retractor 1400 previously set by the main control are stored in the terminal voltage and control kind area at the readout address location of "FF00", at a step S6105. In the example of FIG. 53, in this case, the terminal voltage is 0.5 volts and the kind of control is "0001", i.e. the seatbelt attaching assisting control.

After the storing at the step S6105, the address is incremented by 1 at a step S6106. In the FIG. 53 example, the address is shifted from "FF00" to "FF01".

Then, it is determined at a step S6107 whether the address is larger than a predetermined address, "FF99", for example. If the former is larger than the latter, for example, if the address is "FF100", the first address "FF00" is read out and set at a step S6108, to store the address "FF00" in the RAM 48 at a step S6109. On the other hand, if the address is not larger than the address "FF99", for example, if the address is "FF10", the address "FF10" is stored in the RAM 48 at the step S6109. Then, the working status of the control temporarily saved at the step S6101 is read out or restored at a step S6115, followed by terminating the present processing.

If it is determined at the step S6102 that the seatbelt has been locked during protraction, that is, the vehicle has encountered an accident, the terminal voltage across the DC motor 10 is measured by the voltage measuring circuit C2 at a step S6110, and the measured terminal voltage value and the kind of control of the electric retractor 1400 are stored in the terminal voltage and control kind area of the RAM 48 at a step S6111.

Then, it is determined at a step S6112 whether a predetermined time period (e.g. 100 ms) has elapsed after the seatbelt was locked during protraction. If the predetermined time period has not elapsed, a time adjustment is carried out so as to store the terminal voltage across the DC motor 10 and the kind of control of the electric retractor at time intervals of 1 ms, for example, at a step S6113, followed by the processing returning to the step S6110, whereas if the predetermined time period has elapsed, values of the terminal voltage and the kind of control obtained over a predetermined time period before and after the seatbelt was locked during protraction, e.g. over 100 ms, as well as the address just before the locking of the seatbelt, e.g. "FF60", are transferred to the EEPROM 49 and stored therein at a step S6114. Then, the working status of the control temporarily saved at the step S6101 is restored at the step S6115, followed by terminating the present processing.

The reason why the address just before the locking of the seatbelt is transferred to the EEPROM 49 at the step S6114 is that it is possible to accurately read out from the address just before the locking of the seatbelt the terminal voltage across the DC motor 10 and the kind of control of the electric retractor 1400 over a predetermined time period, e.g. over 100 ms. For example, if the address "FF60" is the address just before the locking of the seatbelt, the contents of the RAM at addresses from "FF60" to "FF00" and from "FF99" to "FF61" are read out from the RAM 48 so that the terminal voltage across the DC motor 10 and the kind of control of the electric retractor over the predetermined time period, i.e. 100 ms can be accurately read out.

As described above, according to the present embodiment, values of the terminal voltage across the DC motor 10 and the kind of control of the electric retractor 1400 over a predetermined time period before and after locking of the seatbelt during protraction are transferred to the EEPROM 49 and stored therein (step S6114). As a result, the contents of the RAM 48 can be accurately read out after an accident, to thereby enable accurate determination of the operative state of the automotive passenger restraint and protection apparatus and the occupant state in the event of a collision of the vehicle or a like accident.

Fifteenth Embodiment

An automotive passenger restraint and protection apparatus according to a fifteenth embodiment of the invention is distinguished from the above described fourteenth embodiment in the range of the terminal voltage across the DC motor 10 and the kind of control of the electric retractor to be stored in the EEPROM 49. More specifically, while in the fourteenth embodiment values of the terminal voltage across the DC motor 10 and the kind of control of the electric retractor 1400 obtained over a predetermined time period before and after locking of the seatbelt during protraction, e.g. 100 ms, are stored in the EEPROM 49, in the fifteenth embodiment values of the terminal voltage across the DC motor 10 and the kind of control of the electric retractor 1400 obtained after a signal indicative of a collision being unavoidable is received from the MPU 14 and until a predetermined time period (e.g. 3 sec) elapses thereafter are stored in the EEPROM 49.

Figure 57:
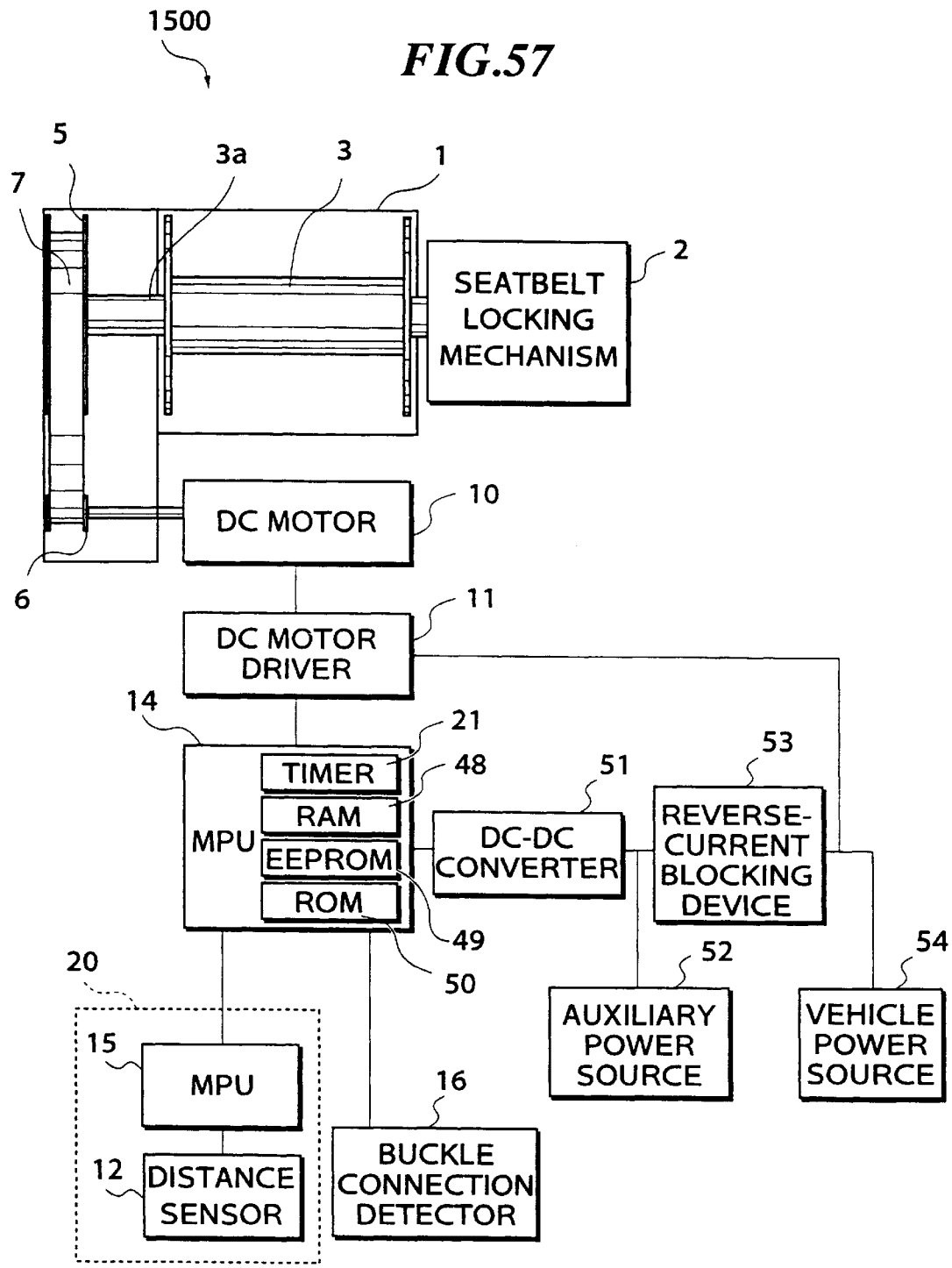
FIG. 57 is a block diagram showing the arrangement of an electric retractor 1500 provided in an automotive passenger restraint and protection apparatus according to a fifteenth embodiment of the invention.

FIG. 57 shows the arrangement of an electric retractor 1500 provided in the automotive passenger restraint and protection apparatus according to the fifteenth embodiment. The electric retractor 1500 includes a distance sensor 12 and an MPU 15 which constitute a traveling condition detector 20. Except for this, the electric retractor 1500 is identical in construction with the electric retractor 1400.

Next, description will be made of a summary of the operation of the electric retractor 1500 as well as details of a bit string indicative of the kind of control of the electric retractor 1500 and the terminal voltage across the DC motor 10.

When the signal indicative of unavoidableness of a collision is received from the MPU 15, the MPU 14 grasps a waveform of the terminal voltage across the DC motor 10 and stores values of the terminal voltage across the DC motor 10 and the kind of control of the electric retractor 1500 obtained over a predetermined time period after receipt of the control signal, for example, over a time period until 3 seconds elapse after receipt of the signal, in the EEPROM 49 via the RAM 48.

The kind of control of the electric retractor 1400 includes controls similar to those of the fourteenth embodiment, i.e. the seatbelt attaching assisting control, the seatbelt oppression removing control, the movement control, and the seatbelt storing control.

A main control executed by the MPU 14 according to the present embodiment is similar to or identical with the main control of FIG. 55 employed by the fourteenth embodiment, description of which is therefore omitted.

Figure 58:
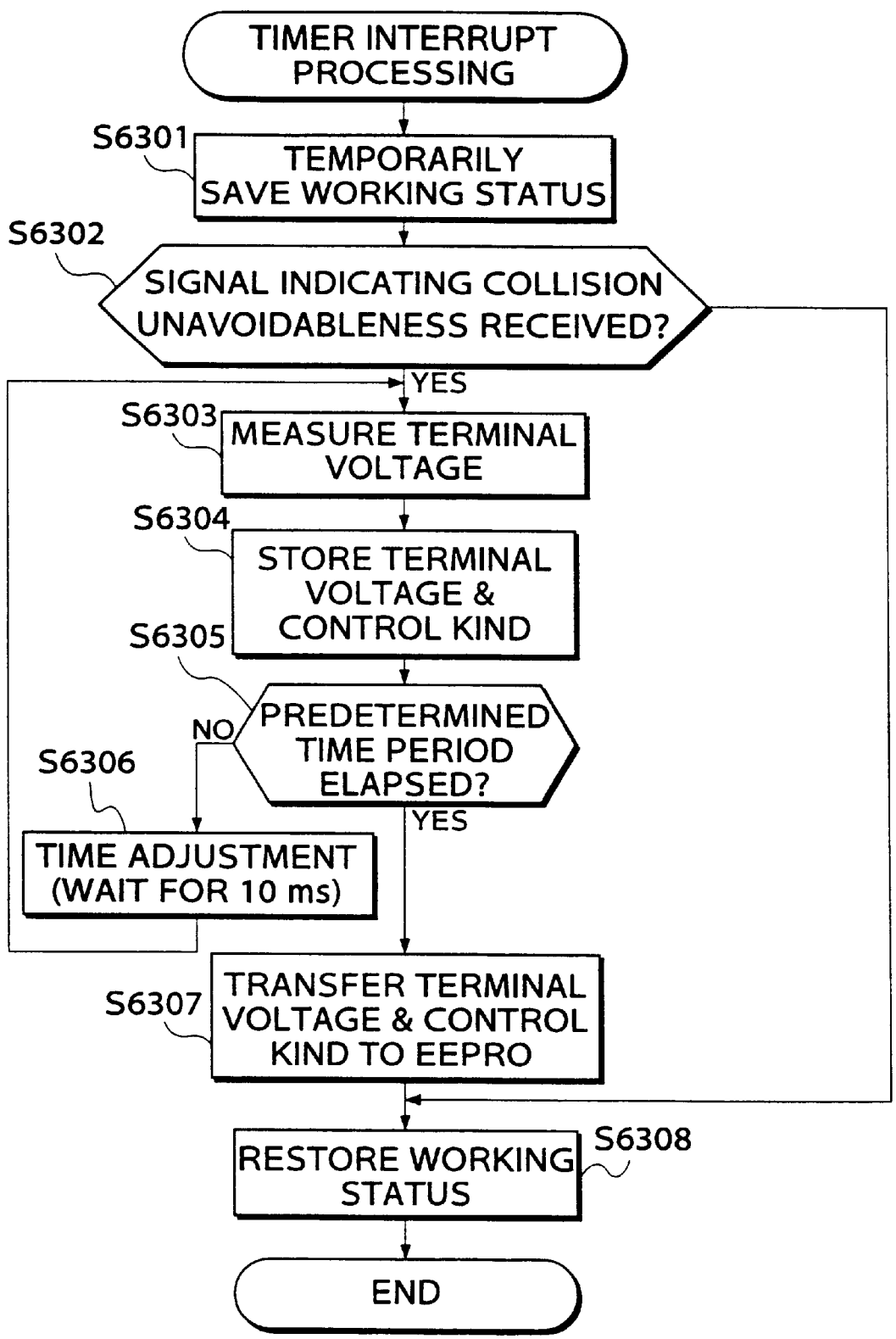
FIG. 58 is a flowchart showing timer interrupt processing executed by the MPU 14.

FIG. 58 is a flowchart showing the timer interrupt processing executed by the MPU 14. The present timer interrupt processing is triggered in response to a timer interrupt signal generated at time intervals of 10 ms, for example, which are counted by the timer 21.

First, the MPU 14 temporarily saves the status of working of the control being executed in the save area of the RAM 48 at a step S6301.

Then, it is determined at a step S6302 whether the signal indicative of unavoidableness of a collision has been received from the MPU 15. If the signal has not been received, the status of working of control temporarily saved at the step S6301 is restored at a step S6308, followed by terminating the present processing. On the other hand, if the signal has been received, the voltage measuring circuit C2 is actuated to measure the terminal voltage across the DC motor 10 at a step S6303, and the measured terminal voltage value and the kind of control of the electric retractor 1500 are stored in the terminal voltage and control kind area of the RAM 48 at a step S6304.

Then, it is determined at a step S6305 whether a predetermined time period (e.g. 3 sec) has elapsed after receipt of the signal from the MPU 15, based upon the value of the timer 21. If the predetermined time period has not elapsed, a time adjustment is carried out so as to store the terminal voltage across the DC motor 10 and the kind of control of the electric retractor at time intervals of 10 ms, at a step S6306, followed by returning to the step S6303, whereas if the predetermined time period has elapsed, values of the terminal voltage across the DC motor 10 as well the kind of control of the electric retractor 1500 obtained after the receipt of the signal indicative of collision unavoidableness and until a predetermined time period (e.g. 3 sec) elapses thereafter are transferred to the EEPROM 49 and stored therein at a step S6307. Then, the working status of control temporarily saved at the step S6301 is restored at the step S6308, followed by terminating the present processing.

As described above, according to the present embodiment, values of the terminal voltage across the DC motor and the kind of control of the electric retractor 1500 being executed obtained before a predetermined time period (e.g. 3 sec) elapses after receipt of a signal indicative of collision unavoidableness from the MPU 15 are transferred to and stored in the EEPROM 49 (step S6307). As a result, the contents of the EEPROM 49 can be accurately read out after an accident, to thereby enable accurate determination of the operative state of the automotive passenger restraint and protection apparatus and the occupant state in the event of a collision of the vehicle or a like accident.

Sixteenth Embodiment

An automotive passenger restraint and protection apparatus according to a sixteenth embodiment of the invention is distinguished from the above described fifteenth embodiment in the range of the terminal voltage across the DC motor 10 and the kind of control of the electric retractor to be stored in the EEPROM 49. More specifically, while in the fifteenth embodiment values of the terminal voltage across the DC motor 10 and the kind of control of the electric retractor 1400 obtained after a signal indicative of a collision being unavoidable is received from the MPU 15 and until a predetermined time period (e.g. 3 sec) elapses thereafter are stored in the EEPROM 49, in the sixteenth embodiment values of the terminal voltage across the DC motor 10 and the kind of control of the electric. retractor 1400 obtained over a predetermined time period (e.g. 100 ms) before and after a signal indicative of a collision being unavoidable is received from a collision sensor 55, hereinafter referred to, are stored in the EEPROM 49.

Figure 59:
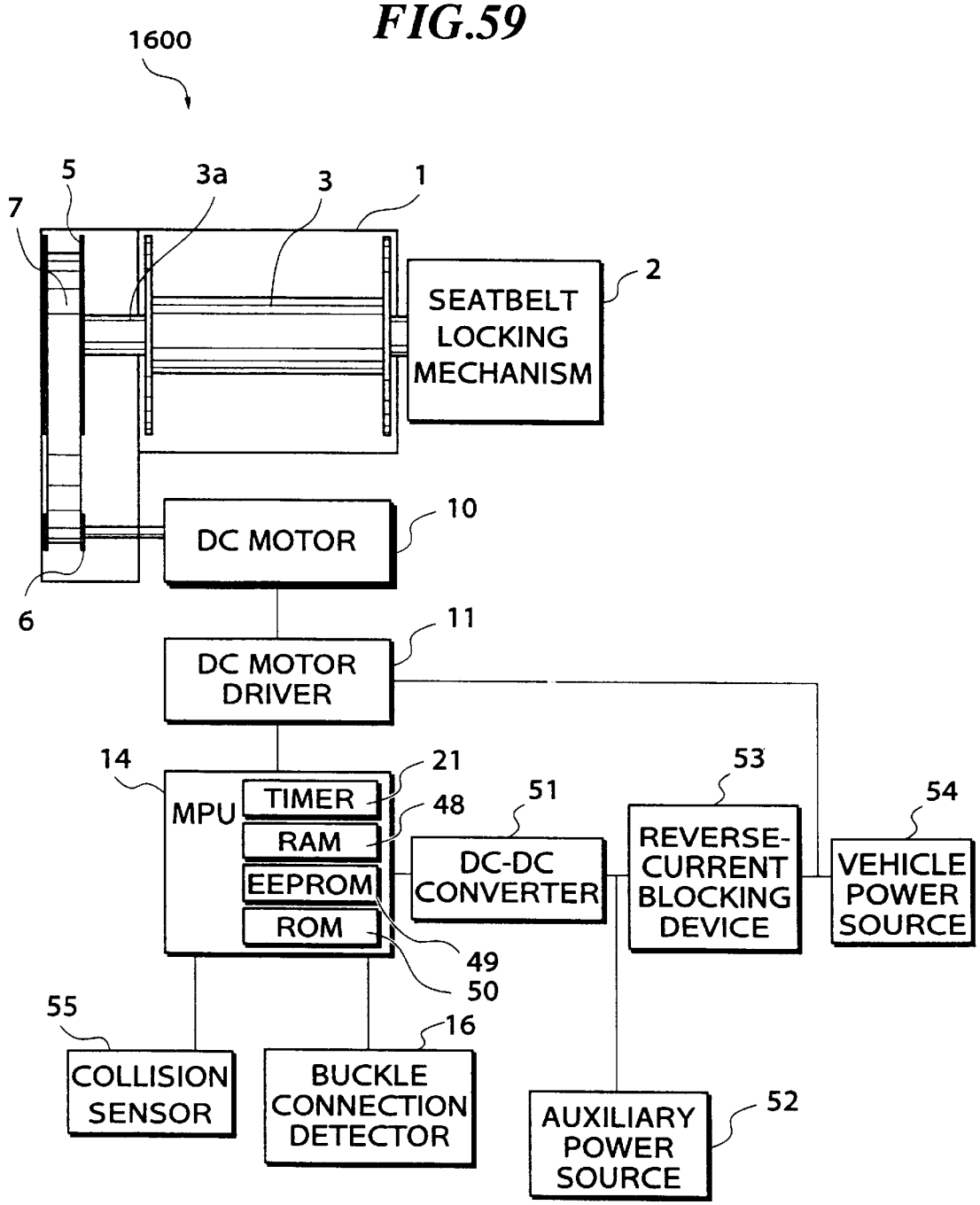
FIG. 59 is a block diagram showing the arrangement of an electric retractor 1600 provided in an automotive passenger restraint and protection apparatus according to a sixteenth embodiment of the invention.

FIG. 59 shows the arrangement of an electric retractor 1600 provided in the automotive passenger restraint and protection apparatus according to the sixteenth embodiment. The electric retractor 1600 is distinguished from the electric retractor 1500 of the fifteenth embodiment in that the traveling condition detector 20 is replaced by the collision sensor 55 which detects a collision of the vehicle and delivers an output signal indicative of the collision to the MPU 14. Except for this, the electric retractor 1600 is identical in construction with the electric retractor 1500, description of which is therefore omitted.

A main control executed by the MPU 14 according to the present embodiment is similar to or identical with the main control of FIG. 55 employed by the fourteenth embodiment, description of which is therefore omitted.

Figure 60:
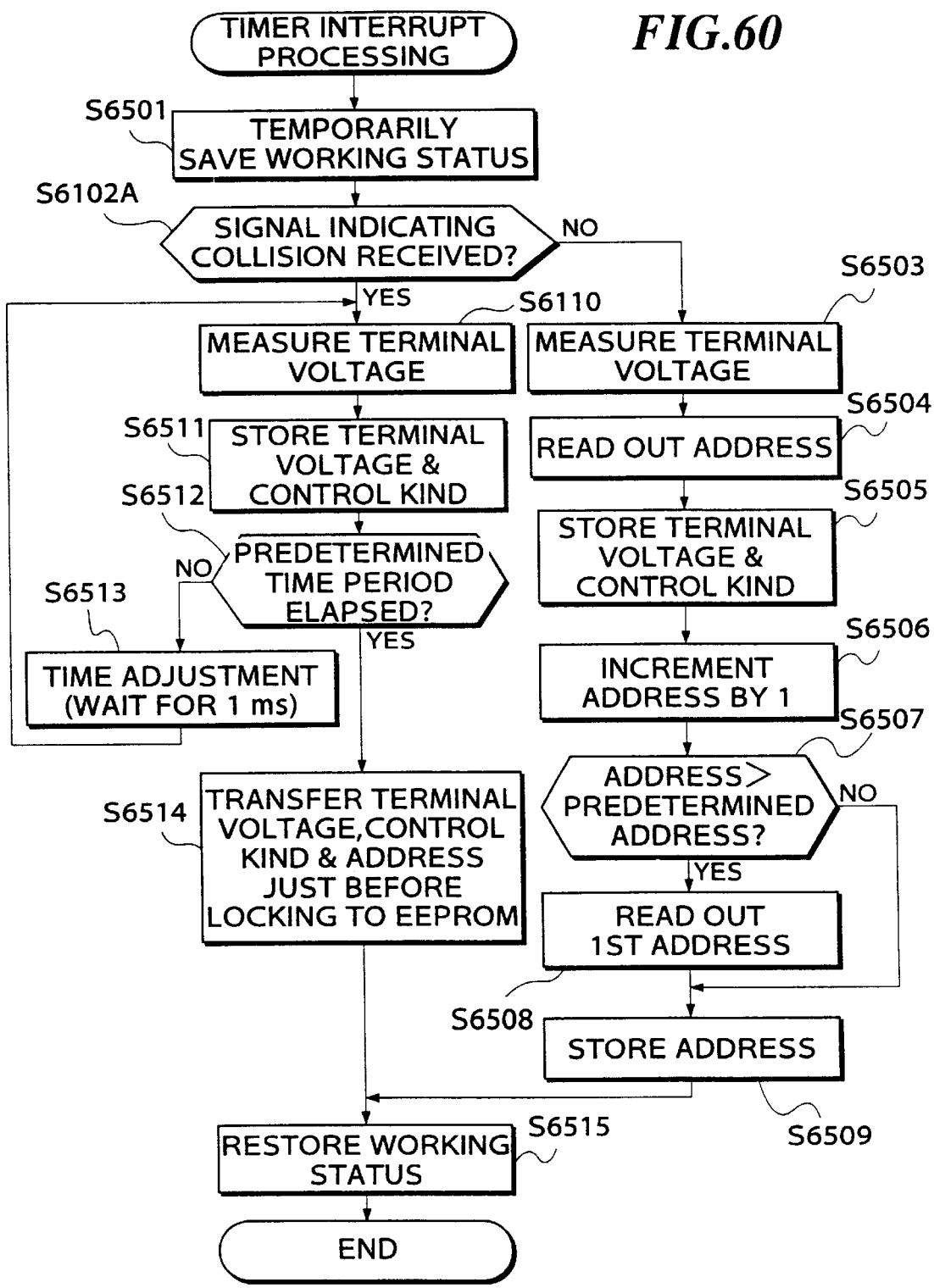
FIG. 60 is a flowchart showing timer interrupt processing executed by the MPU 14.

FIG. 60 is a flowchart showing timer interrupt processing executed by the MPU 14. The present timer interrupt processing is triggered in response to a timer interrupt signal generated at time intervals of 1 ms, for example, which are counted by the timer 21. The present time interrupt processing is distinguished from the FIG. 56 processing only in that the step S6102 is replaced by a step S6102A, and the following description only relates to the step S6102A and its related steps.

First, the MPU 14 temporarily saves the status of working of the control being executed in the save area of the RAM 48 at a step S6501.

Then, the MPU 14 determines whether the signal indicative of collision unavoidableness has been received from the collision sensor 55 at a step S6502. If the signal indicative of collision unavoidableness has not been received, the processing proceeds to a step S6503. The step S6503 to a step S6509 are identical with the steps S6103 to S6109 in FIG. 56 and therefore description of them is omitted.

If it is determined at the step S6502 that the signal indicative of collision unavoidableness has been received from the collision sensor 55, that is, if the vehicle has encountered a collision, the processing proceeds to a step S6510. The step S6510 to a step S6515 are identical with the steps S6110 to S6115 in FIG. 56 and therefore description of them is omitted.

As described above, according to the present embodiment, values of the terminal voltage across the DC motor and the kind of control of the electric retractor 1600 being executed obtained over a predetermined time period (e.g. 100 ms) before and after receipt of a signal indicative of collision unavoidableness from the collision sensor 55 are transferred to and stored in the EEPROM 49 (step S6514). As a result, the contents of the EEPROM 49 can be accurately read out after an accident, to thereby enable accurate determination of the operative state of the automotive passenger restraint and protection apparatus and the occupant state in the event of a collision of the vehicle or a like accident, for use of the same in investigating the cause of the accident.

Although in the above described fourteenth to sixteenth embodiments the terminal voltage across the DC motor 10 is stored in the EEPROM 49, current flowing to the DC motor 10 may be stored in the EEPROM 49 or a like memory, providing substantially the same results.

Seventeenth Embodiment

Figure 61:
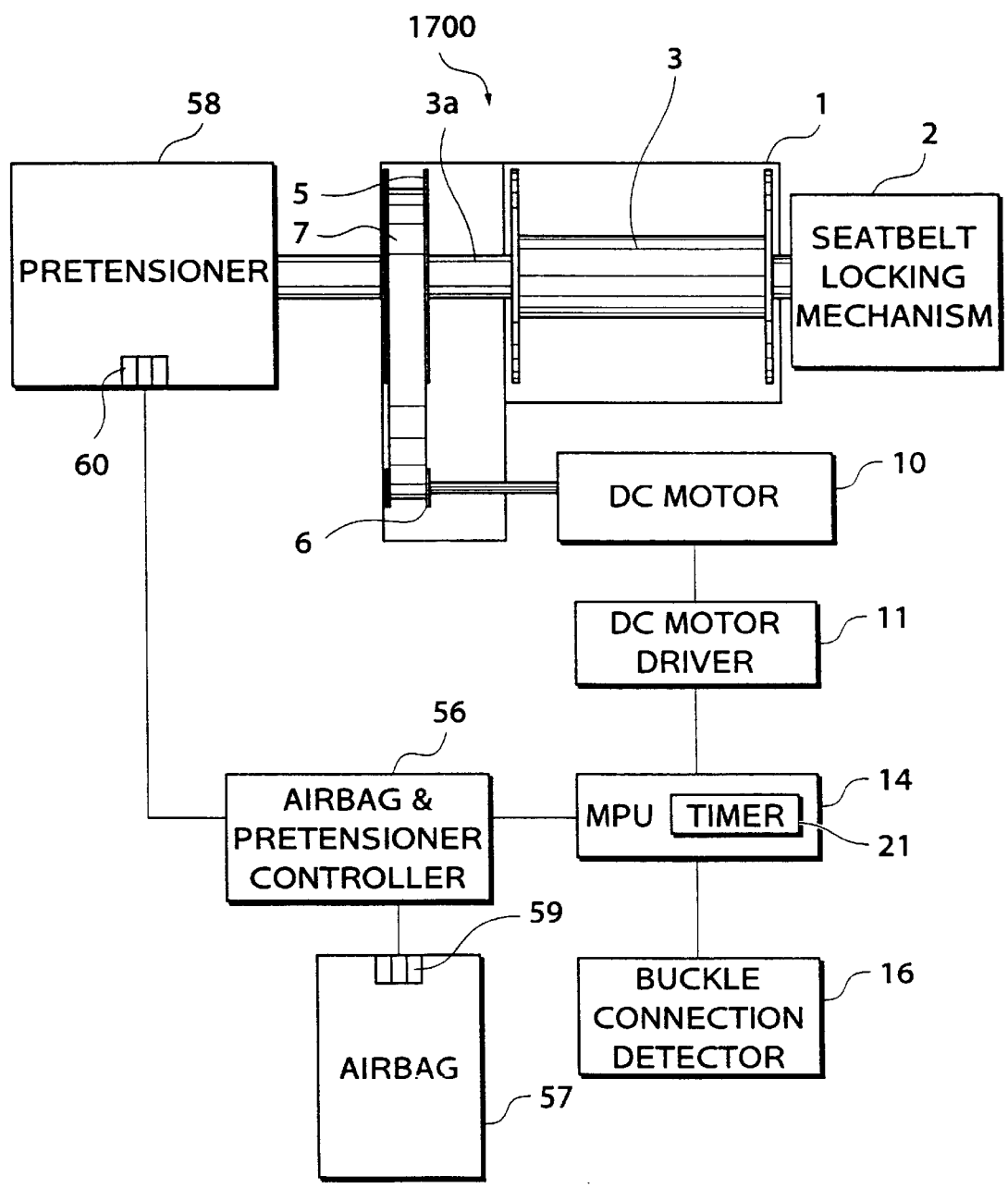
FIG. 61 is a block diagram showing the arrangement of an electric retractor 1700 provided in an automotive passenger restraint and protection apparatus according to a seventeenth embodiment of the invention.

FIG. 61 shows the arrangement of an electric retractor 1700 provided in an automotive passenger restraint and protection apparatus according to a seventeenth embodiment of the invention.

The electric retractor 1700 includes an airbag and pretensioner controller 56, an airbag 57, and a pretensioner 58, and gas generators 59 and 60, but the mode selector 18, the temperature sensor 19 and the traveling condition detector 20 in FIG. 1 are omitted. The electric retractor 1700 does not have bias force-imparting means as employed in the electric retractor 100.

In the electric retractor 1700, the airbag and pretensioner controller 56 which controls the airbag 57 and the pretensioner 58 is connected to the MPU 14, and the airbag 57 and the pretensioner 58 which operate to prevent the occupant from colliding against equipment within the vehicle compartment upon a collision of the vehicle are connected to the airbag and pretensioner controller 56.

The airbag 57 has a plurality of gas generators 59. The pretensioner 58 rapidly winds up the seatbelt to protect the occupant upon a collision of the vehicle and has a plurality of gas generators 60. The pretensioner 58 is coupled to the central shaft 3s of the reel shaft 3 via the reel shaft pulley 5.

Figure 62:
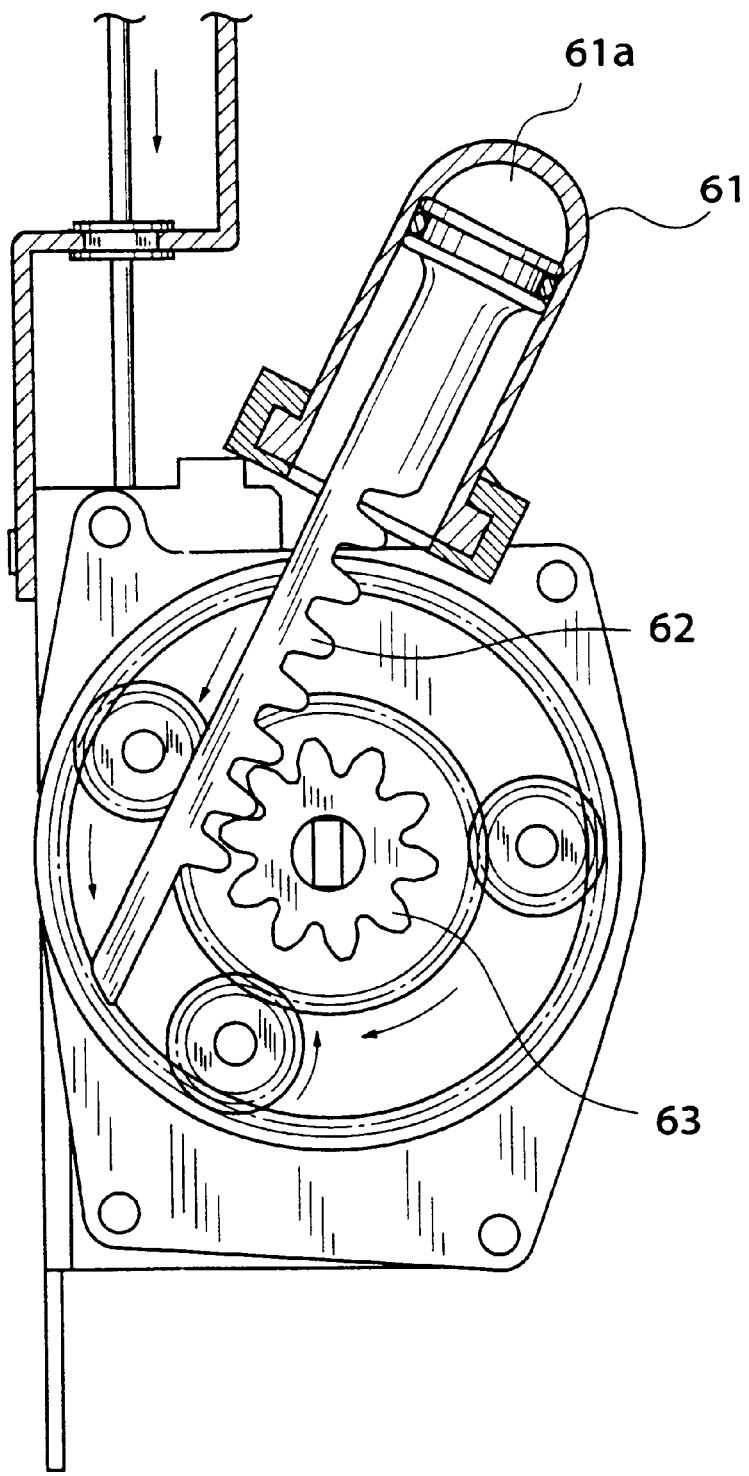
FIG. 62 is sectional view showing the construction of a pretensioner 58.

FIG. 62 shows the construction of the pretension 58. The pretensioner 58 is comprised of a gas chamber-forming member 61 defining therein a gas chamber 61a in which a gas generated from the gas generators 60, not shown in FIG. 62, is enclosed, a pinion 63 coupled to the central shaft 3a of the reel shaft 3 and has an outer periphery thereof formed with a predetermined number of outer teeth. and a rack 62 having an end portion thereof formed with inner teeth disposed in mesh with the outer teeth of the pinion 63 and the other end portion slidably fitted in the gas chamber-forming member 61 in a gas-tight manner and defining the gas chamber 61a together with the chamber 61.

When gas generated from the gas generators 60 is introduced into the gas chamber 61a, the pressure within the gas chamber 61a rises to urgingly move the rack 62 downward as viewed in FIG. 62. This causes the pinion 63 to rotate in unison with the movement of the rack 62 to cause the reel shaft 3 coupled to the pinion 63 to rotate in the seatbelt retracting direction, whereby the seatbelt is rapidly retracted upon a collision of the vehicle.

Referring again to FIG. 61, the airbag and pretensioner controller 56 receives a pressure control signal and a timing control signal from the MPU 14, and in response to these control signals, sets and changes the actuation time and expansion pressure of the airbag 57 or the actuation time of the pretensioner 58, and the force of the pretensioner 58 for retracting the seatbelt.

Except for those described above, the electric retractor 1700 is identical in construction with the electric retractor 100, description of which is therefore omitted.

Figure 63:
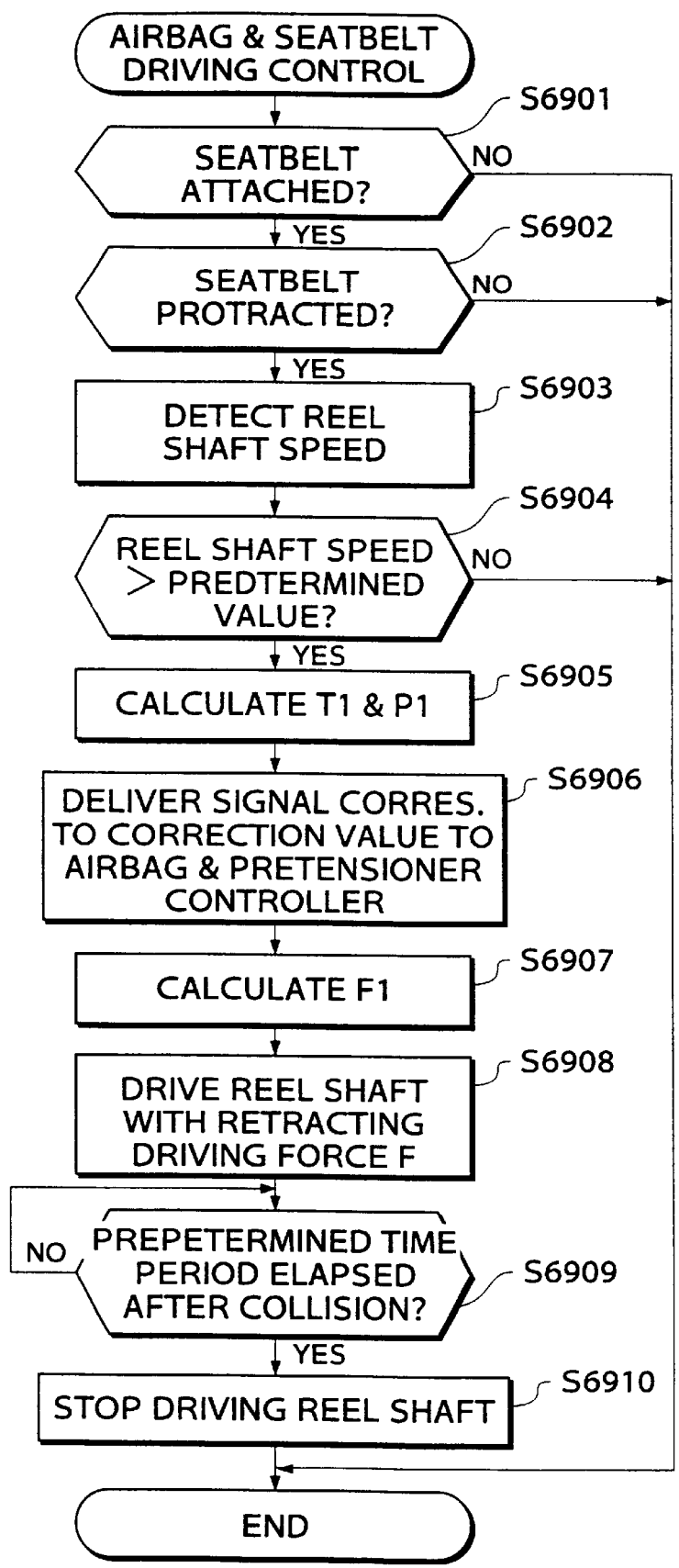
FIG. 63 is a flowchart showing airbag and seatbelt driving control executed by the MPU 14 upon collision of the automotive vehicle.

FIG. 63 is a flowchart showing airbag and seatbelt driving control executed by the MPU 14 according to the present embodiment upon a collision of the automotive vehicle.

First, it is determined at a step S6901 whether attaching of the seatbelt tongue to the buckle has been detected by the buckle connection detector 16. If attaching of the seatbelt has not been detected, the present processing is immediately terminated, whereas if attaching of the seatbelt has been detected, it is determined at a step S6902 whether the seatbelt has been protracted.

If it is determined at the step S6902 that the seatbelt has not been protracted, the present processing is immediately terminated, whereas if the seatbelt has been protracted, the rotational speed of the reel shaft 3 is detected at a step S6903. The rotational speed of the reel shaft 3 is proportional to the terminal voltage across the DC motor 10 with its terminals open, and therefore the rotational speed of the reel shaft 3 is detected based upon the terminal voltage across the DC motor 10.

Then, it is determined at a step S6904 whether the detected rotational speed of the reel shaft 3 is higher than a predetermined value (e.g. 5 revolutions per sec). If the former is not higher than the latter, it means that the occupant has moved after attaching the seatbelt onto his body, and therefore the present processing is immediately terminated. On the other hand, if the reel shaft speed is higher than the predetermined value, it means that the vehicle has collided, a correction value T1 for the actuation times of the the airbag 57 and the pretensioner 58 is calculated by the use of the following formula (5) and a correction value P1 for the expansion pressure of the airbag 57 and the seatbelt retracting force of the pretensioner 58 by the use of the following formula (6), at a step S6905. The timer 21 starts measuring time elapsed after the collision of the vehicle:

$$T1 = K2 \, (1 - K1 \times 1/v) \tag{5}$$

where K1 and K2 represent a first coefficient and a second coefficient, respectively (K1>0 and K2>0), and v represents the rotational speed of the reel shaft 3.

$$P1 = a2 \, (1 - a1 \times 1/v) \tag{6}$$

where a1 and a2 represent a first coefficient and a second coefficient, respectively (a1>0 and a2>0).

Signals indicative of the correction values T1, P1 calculated as above are delivered to the airbag and pretensioner controller 56 at a step S6906.

According to the above formulas (5) and (6), in the event of a strong collision of the vehicle, the reel shaft rotational speed v is high so that the calculated correction value T1 of the actuation times of the airbag 57 and the pretensioner 58 is large (long) and also the calculated correction value P1 of the expansion pressure of the airbag 57 and the seatbelt retracting force of the pretensioner 58 is large. On the other hand, in the event of a weak collision of the vehicle, the reel shaft rotational speed v is low so that the calculated correction value T1 of the actuation times of the airbag 57 and the pretensioner 58 is small (short) and also the calculated correction value P1 of the expansion pressure of the airbag 57 and the seatbelt retracting force of the pretensioner 58 is small.

Then, the airbag and pretentioner controller 56 calculates a desired value T of the actuation times of the airbag 57 and the pretensioner 58 by the use of the following formula (7), and actuates the gas generators 59 and 60 of the airbag 57 and the pretensioner 58 based upon the calculated desired actuation time value T.

Further, the airbag and pretensioner controller 56 calculates a desired value P of the expansion pressure of the airbag 57 and the seatbelt retracting force of the pretensioner 58, and actuates the gas generators 59 and 60 of the airbag 57 and the pretensioner 58 based upon the calculated desired value P:

$$T1 = T2 - T1 \tag{7}$$

where T2 represents a predetermined value of the actuation times of the airbag 57 and the pretensioner 58.

$$P = P2 - P1 \tag{8}$$

where P2 represents a predetermined value of the expansion pressure of the airbag 57 and the seatbelt retracting force of the pretensioner 58.

According to the above formula (7), in the event of a strong collision of the vehicle, the calculated correction value T1 of the actuation times of the airbag 57 and the pretensioner 58 is long from the above formula (5), and accordingly the calculated actuation time T of the airbag 57 and the pretensioner 58 is short. Therefore, the airbag and pretensioner controller 56 sets the igniting timing of the gas generators 59 and 60 to advanced timing. By thus controlling, even in the case where the protracting speed of the seatbelt is so high that the occupant is very likely to collide against equipment within the vehicle compartment, the airbag 57 and the pretensioner 58 are quickly actuated to properly protect the occupant. On the other hand, in the event of a weak collision of the vehicle, the calculated correction value T1 of the actuation times of the airbag 57 and the pretensioner 58 is short from the above formula (5), and accordingly the calculated actuation time T of the airbag 57 and the pretensioner 58 is long. Therefore, the airbag and pretensioner controller 56 sets the igniting timing of the gas generators 59 and 60 to relatively retarded timing. By thus controlling, in the event of a weak collision of the vehicle, the igniting timing of the gas generators can be set to a retarded value than in the conventional apparatus to thereby give an appropriate amount of impact to the occupant and hence properly protect the occupant in the event of a collision of the vehicle.

According to the above formula (8), in the event of a strong collision of the vehicle, the calculated correction value P1 of the expansion pressure of the airbag 57 and the seatbelt retracting force of the pretensioner 58 is large from the above formula (6), and accordingly the calculated desired value P of the expansion pressure and seatbelt retracting force is small. Therefore, the airbag and pretensioner controller 56 actuates only one gas generator if two gas generators are actuated in the event of a collision of the vehicle in the conventional automotive passenger restraint and protection apparatus, so as to decrease the expansion pressure of the airbag 57 and the seatbelt retracting force of the pretensioner 58 to a smaller value than in the conventional automotive passenger restraint and protection apparatus, whereby impact applied to the occupant is reduced. On the other hand, in the event of a weak collision of the vehicle, the calculated correction value P1 of the expansion pressure of the airbag 57 and the seatbelt retracting force of the pretensioner 58 is small from the above formula (6), and accordingly the calculated desired value P of the expansion pressure and seatbelt retracting force is large. Therefore, the airbag and pretensioner controller 56 actuates three gas generators so as to increase the expansion pressure of the airbag 57 and the seatbelt retracting force of the pretensioner 58 to a larger value than in the conventional automotive passenger restraint and protection apparatus. By thus controlling, in the event of a weak collision of the vehicle, the expansion pressure of the airbag and the seatbelt retracting force of the pretensioner can be set to a larger value than in the conventional apparatus to thereby give an appropriate magnitude of pressure and force to the occupant and hence properly protect the occupant in the event of a collision of the vehicle.

By virtue of the control according to the steps S6905 and S6906 and the formulas (5) to (8), even in the event that the protracting speed of the seatbelt is so high that the occupant is very likely to collide against equipment within the vehicle compartment, the airbag 57 and the pretensioner 58 quickly operate to properly protect the occupant upon a collision of the vehicle. Further, the desired value P of the expansion pressure of the airbag 57 and the seatbelt retracting force of the pretensioner 58 can be set to a smaller value than in the conventional apparatus, to thereby reduce impact applied to the occupant and hence properly protect the occupant upon a collision of the vehicle.

Further, when the protracting speed of the seatbelt is low, the igniting timing of the gas generators can be set to a retarded value than in the conventional apparatus to thereby give an appropriate amount of impact to the occupant, and the expansion pressure of the airbag and the seatbelt retracting force of the pretensioner can be set to a larger value than in the conventional apparatus, to thereby reduce impact applied to the occupant and hence properly protect the occupant upon a collision of the vehicle.

After execution of the step S6906, a correction value F1 of the driving force of the reel shaft 3 for retracting the seatbelt is calculated by the use of the following formula (9), at a step S6907:

$$F1 = b2\,(1 - b1 \times v) \tag{9}$$

where b1 and b2 represent a first coefficient and a second coefficient, respectively (b1>0 and B2>0).

According to the above formula (9), in the event of a strong collision of the vehicle, the rotational speed v of the reel shaft 3 is high, and accordingly the calculated correction value F1 of the driving force of the reel shaft 3 is small, and on the other hand, in the event of a weak collision of the vehicle, the rotational speed v of the reel shaft 3 is low, and accordingly the calculated correction value F1 is large.

Then, a desired driving force F of the reel shaft 3 is calculated from the calculated correction value F1 by the use of the following formula (10) and the airbag and pretensioner controller 56 drives the reel shaft 3 based upon the calculated driving force F, at a step S6908:

$$F = F2 = F1 \tag{10}$$

where F2 represent a predetermined value of the driving force of the reel shaft 3.

To drive the reel shaft 3 with the driving force F, the MPU 14 sets the duty factor of a control signal to be delivered to the DC motor driver 11 to set the terminal voltage across the DC motor 10.

According to the above formula (10), in the event of a strong collision of the vehicle, the calculated correction value F1 of the driving force of the reel shaft 3 for retracting the seatbelt is small from the above formula (9), and accordingly the calculated desired driving force F of the reel shaft 3 for retracting the seatbelt is large. Therefore, the EA function, which causes the reel shaft to rotate in the direction of protracting the seatbelt when a tension in excess of a prescribed value is applied to the seatbelt immediately after a collision of the automotive vehicle, can operate to protract the seatbelt without being terminated halfway, i.e. at a time point when it is desired that the same function should be still exhibited, since a substantial tension applied to the seatbelt is reduced by the large driving force F of the reel shaft 3. Thus, the EA function can effectively absorb impact applied to the occupant to thereby properly protect the occupant in the event of a strong collision of the vehicle. On the other hand, in the event of a weak collision of the vehicle, the calculated correction value F1 of the driving force of the reel shaft 3 for retracting the seatbelt is large from the above formula (9), and accordingly the calculated desired driving force F of the reel shaft 3 for retracting the seatbelt is small. Therefore, the EA function can operate to protract the seatbelt without fail, since a substantial tension applied to the seatbelt is increased by the small driving force of the reel shaft 3. Thus, the EA function can effectively absorb impact applied to the occupant to thereby properly protect the occupant in the event of a weak collision of the vehicle.

Next, it is determined at a step S6909 whether a predetermined time period (e.g. 2 sec) has elapsed after the collision, based upon the value of the timer 21. If the predetermined time period has not elapsed, the same determination is repeated, whereas if the predetermined time period has elapsed, the driving of the reel shaft 3 is stopped at a step S6910, followed by terminating the present processing. To stop the driving of the reel shaft, the MPU 14 delivers a control signal commanding to stop the driving of the DC motor 10 to the DC motor driver 11.

As described above, according to the present embodiment, the desired value T of the actuation times of the airbag 57 and the pretensioner 58, and the desired value P of the expansion pressure of the airbag 57 and the seatbelt retracting force of the pretensioner 58 are variably set according to the terminal voltage across the DC motor 10 and the rotational speed v of the reel shaft 3 (steps S6905 and S6906, and formulas (5) to (8)). As a result, even when the protracting speed of the seatbelt is so high that the occupant is very likely to collide again equipment within the vehicle compartment, as in the event of a strong collision of the vehicle, the airbag 57 and the pretensioner 58 can be quickly actuated, and further the expansion pressure of the airbag 57 and the seatbelt retracting force of the pretensioner 58 are set to a smaller value to thereby reduce impact applied to the occupant and hence properly protect the occupant in the event of a collision of the vehicle.

Further, when the retracting speed of the seatbelt is low as in the event of a weak collision of the vehicle, the igniting timing of the gas generators can be set to a retarded value than in the conventional apparatus to thereby give an appropriate amount of impact to the occupant, and further the expansion pressure of the airbag and the seatbelt retracting force of the pretensioner can be set to a larger value than in the conventional apparatus, to thereby reduce impact applied to the occupant and hence properly protect the occupant upon a collision of the vehicle.

Furthermore, the driving force F of the reel shaft 3 for retracting the seatbelt can be variably set according to the terminal voltage across the DC motor 10 or the rotational speed v of the reel shaft 3 (steps S6907 and S6908, and formulas (9) and (10)). As a result, impact applied to the occupant can be effectively absorbed to thereby properly protect the occupant in the event of a collision of the vehicle.

Although in the present embodiment the rotational speed v of the reel shaft 3 is detected from the terminal voltage of the DC motor 10 with its terminals open, this is not limitative, but alternatively the rotational speed v of the reel shaft 3 may be detected by a rotational speed sensor which may be provided on the central shaft 3a of the reel shaft 3.

Further, although in the present embodiment the rotational speed v of the reel shaft 3 is used for the above described control, alternatively a retracting speed sensor may be provided at an outlet port for the seatbelt to thereby directly detect the protracting speed of the seatbelt, providing substantially the same results.

Eighteenth Embodiment

An automotive passenger restraint and protection apparatus according to an eighteenth embodiment of the invention includes an electric retractor 1800 which is identical in construction with the electric retractor 100 except that the bias force-imparting means is omitted, description of which is therefore omitted.

A summary of control processing (fault diagnosis) executed by the MPU 14 according to the present embodiment will be first described below.

The fault diagnosis according to the present embodiment is carried out by the following two methods (a) and (b) which are executed independently of each other, and when it is determined by either one of the methods that there is a fault, it is judged that the seatbelt locking mechanism 2 is faulty:

(a) When no fault in the seatbelt locking mechanism 2 is detected, it is checked whether the seatbelt locking mechanism 2 functions normally while the reel shaft 3 is given a rotational speed in the seatbelt protracting direction at which the seatbelt can be locked during protraction, and if the mechanism 2 does not function normally, it is determined that there is a fault.

(b) When no fault in the seatbelt locking mechanism 2 is detected, it is checked whether the seatbelt locking mechanism 2 does not function while the reel shaft 3 is given a rotational speed in the seatbelt protracting direction at which the seatbelt cannot be locked during protraction, and if the mechanism 2 functions, it is determined that there is a fault.

Figure 64:
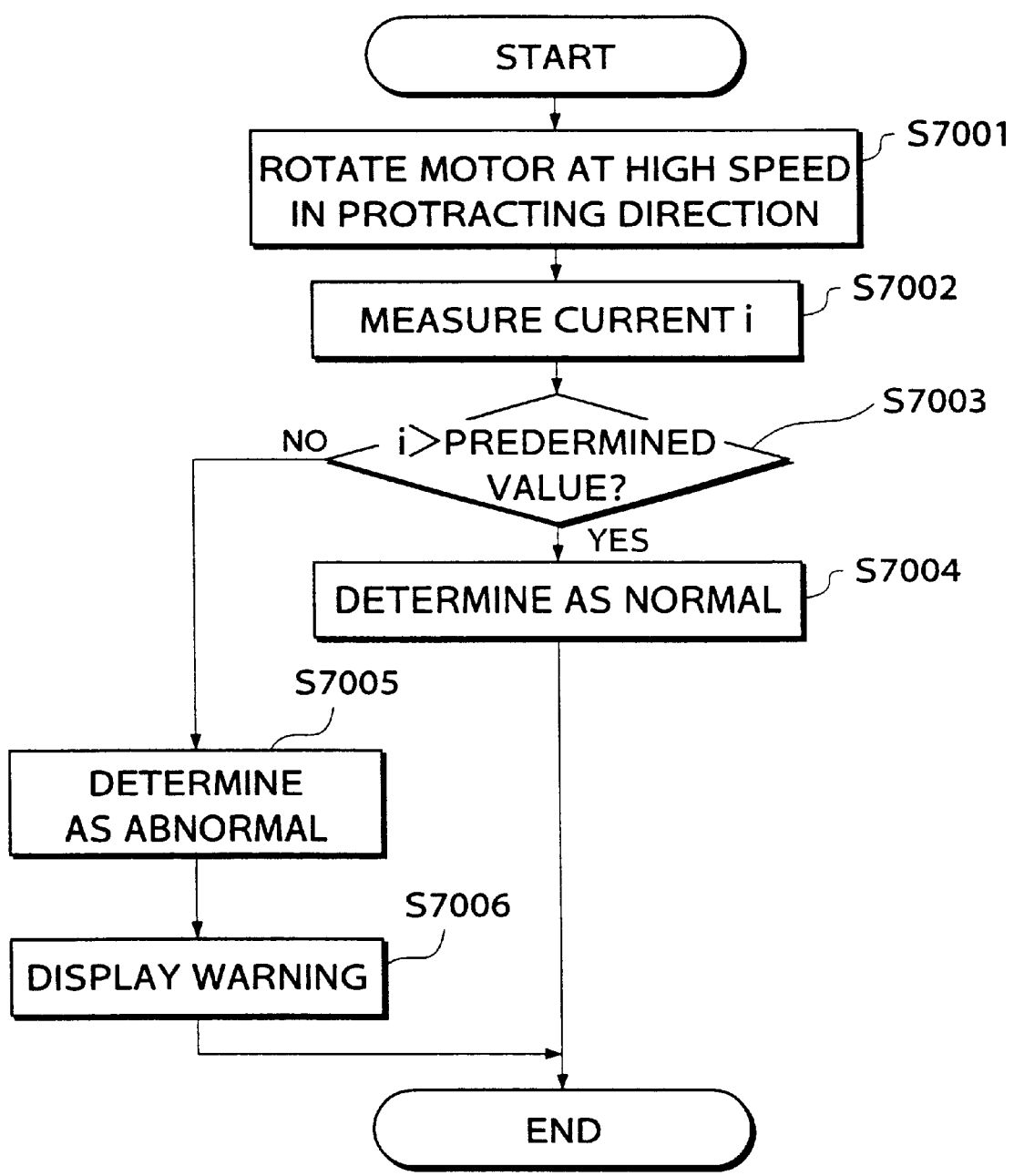
FIG. 64 is a flowchart showing a fault diagnostic program executed by the MPU 14.

Details of the control processing will now be described with reference to FIGS. 64 and 65. FIG. 64 is a flowchart showing a fault diagnostic program executed by the MPU 14, which corresponds to the method (a).

First, to quickly protract the seatbelt in attaching the seatbelt to the occupant's body, a control signal commanding to rotate the DC motor 210 in the seatbelt protracting direction at a high speed, i.e. a control signal having a duty factor required for such a high speed rotation, is delivered to the DC motor driver 11 at a step S7001. Responsive to this control signal, the DC motor driver 11 rotates the DC motor 10 at a high rotational speed in the seatbelt protracting direction. The reel shaft 3 then rotates in the seatbelt protracting direction at a high speed in unison with the rotation of the DC motor 10. If the seatbelt locking mechanism 2 is normal, it locks the reel shaft 3 to stop when the latter rotates at the above high speed.

Then, the current i flowing to the DC motor 10 is detected, based upon current flowing through the resistance r1 by the current detecting circuit C1 of the DC motor driver 11 at a step S7002. It is determined at a step S7003 whether the detected current i exceeds a predetermined value (e.g. 5 amperes).

If the detected current i exceeds the predetermined value, that is, the DC motor 10 continues to be energized for rotation with the reel shaft 3 in the locked state, it is determined at a step S7004 that the seatbelt locking mechanism 2 is functioning normally. followed by terminating the present processing.

On the other hand, if the detected current i is below the predetermined value, that is, the DC motor 10 continues to be energized for rotation with the reel shaft 3 not properly locked, it is determined at a step S7005 that the seatbelt locking mechanism 2 is functioning abnormally, and then a warning is given to the occupant by means of a display device or a warning light (not shown) to warn him of the abnormality of the seatbelt locking mechanism 2 at a step S7006, followed by terminating the present processing.

Figure 65:
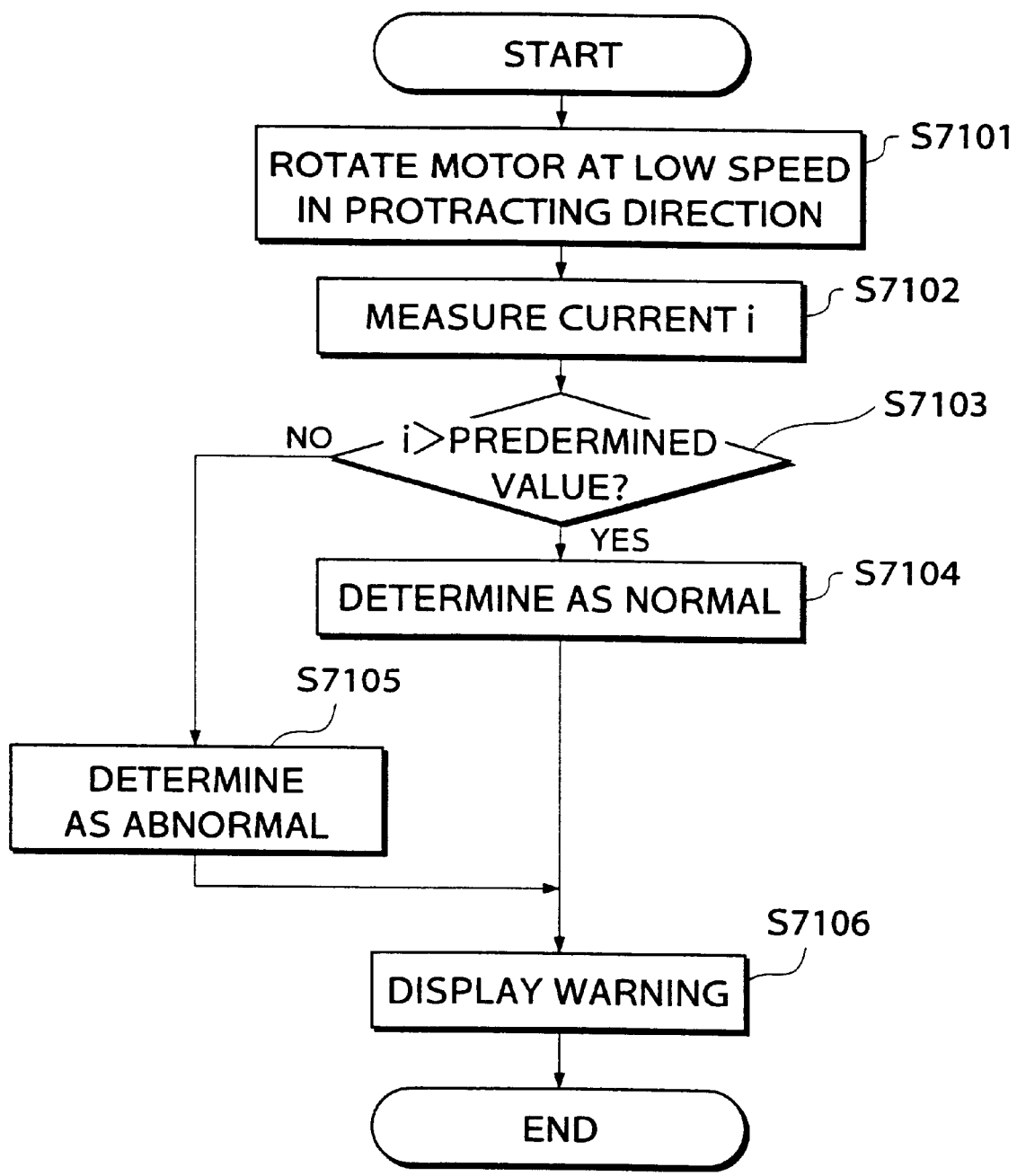
FIG. 65 is a flowchart showing a continued part of the FIG. 64 control.

FIG. 65 is a flowchart showing a fault diagnostic program executed by the MPU 14, which corresponds to the method (b).

First, to slowly protract the seatbelt to give a predetermined amount of looseness to the seatbelt after the seatbelt is attached to the occupant and made fit to his body, a control signal commanding to rotate the DC motor 210 in the seatbelt protracting direction at a low speed, i.e. a control signal having a duty factor required for such a low speed rotation, is delivered to the DC motor driver 11 at a step S7101. Responsive to this control signal, the DC motor driver 11 rotates the DC motor 10 at a low speed in the seatbelt protracting direction. The reel shaft 3 then rotates in the seatbelt protracting direction at a low speed in unison with the rotation of the DC motor 10. If the seatbelt locking mechanism 2 is normal, it does not lock the reel shaft 3 when the latter rotates at the above low speed.

Then, the current i flowing to the DC motor 10 is detected, based upon current flowing through the resistance r1 by the current detecting circuit C1 of the DC motor driver 11 at a step S7102. It is determined at a step S7103 whether the detected current i is below a predetermined value (e.g. 3 amperes).

If the detected current i is below the predetermined value, that is, the DC motor 10 continues to be energized for rotation with the reel shaft 3 in the unlocked state, it is determined at a step S7104 that the seatbelt locking mechanism 2 is functioning normally, followed by terminating the present processing.

On the other hand, if the detected current i exceeds the predetermined value, that is, the DC motor 10 continues to be energized for rotation with the reel shaft 3 in the locked state, it is determined at a step S7105 that the seatbelt locking mechanism 2 is functioning abnormally, and then a warning is given to the occupant by means of the display device or the warning light to warn him of the abnormality of the seatbelt locking mechanism 2 at a step S7106, followed by terminating the present processing.

In the present control processing (fault diagnosis), only when it is determined at both of the steps S7004 and S7104 in FIGS. 64 and 65 that the seatbelt locking mechanism 2 is functioning normally, it is finally determined that the same mechanism is normal, while when it is determined at either the step S7005 in FIG. 64 or the step S7105 in FIG. 65 that the seatbelt locking mechanism 2 is functioning abnormally, it is immediately finally determined that the same mechanism is abnormal. Alternatively, only when it is determined at both of the steps S7005 and S7105 that the seatbelt locking mechanism 2 is abnormal, it may be finally determined that the same mechanism is abnormal, to avoid frequent warning due to noise or the like.

As describe above, according to the present embodiment, a control signal commanding to rotate the DC motor 10 in the seatbelt protracting direction at a high speed is delivered to the DC motor driver 11, and based upon results of a determination as to whether current then flowing to the DC motor 10 exceeds a predetermined value, it is determined that the seatbelt locking mechanism 2 is normal or abnormal. Further, a control signal commanding to rotate the DC motor 10 in the seatbelt protracting direction at a low speed is delivered to the DC motor driver 11, and based upon results of a determination as to whether current then flowing to the DC motor 10 is below a predetermined value, it is determined that the seatbelt locking mechanism 2 is normal or abnormal. Further, the abnormality of the seatbelt locking mechanism is finally determined based upon the above two determinations. As a result, fault diagnosis of the seatbelt locking mechanism 2 can be accurately achieved.

Further, since the results of the determinations (steps S7005 and S7105) are notified via the display device or warning light (steps S7006 and S7106), it is possible to examine the cause of the fault and quickly take measures to repair the seatbelt locking mechanism.

Although in the present embodiment fault diagnosis is made based upon results of the two kinds of determinations, a plurality of kinds of control signals commanding different high rotational speeds, for example, and/or a plurality of kinds of control signals commanding different low rotational speeds, for example, may be delivered to the DC motor driver to carry out fault diagnosis based upon more than two kinds of determinations.

Nineteenth Embodiment

An automotive passenger restraint and protection apparatus according to a nineteenth embodiment of the invention includes an electric retractor 1900 which is identical in construction with the electric retractor 1800 of the above described eighteenth embodiment, description of which is therefore omitted. The present embodiment is distinguished from the eighteenth embodiment in the manner of fault diagnosis.

A summary of control processing (fault diagnosis) executed by the MPU 14 according to the present embodiment will be first described below.

The fault diagnosis according to the present embodiment is carried out by the following two methods (c) and (d) which are executed independently of each other, and when it is determined by either one of the methods that there is a fault, it is judged that the seatbelt locking mechanism 2 is faulty:

(c) When no fault in the seatbelt locking mechanism 2 is detected, it is checked whether the seatbelt locking mechanism 2 functions normally while the reel shaft 3 is given a rotational acceleration in the seatbelt protracting direction at which the seatbelt can be locked during protraction, and if the mechanism 2 does not function normally, it is determined that there is a fault.

(d) When no fault in the seatbelt locking mechanism 2 is detected, it is checked whether the seatbelt locking mechanism 2 does not function while the reel shaft 3 is given a rotational acceleration in the seatbelt protracting direction at which the seatbelt cannot be locked during protraction, and if the mechanism 2 functions, it is determined that there is a fault.

Figure 66:
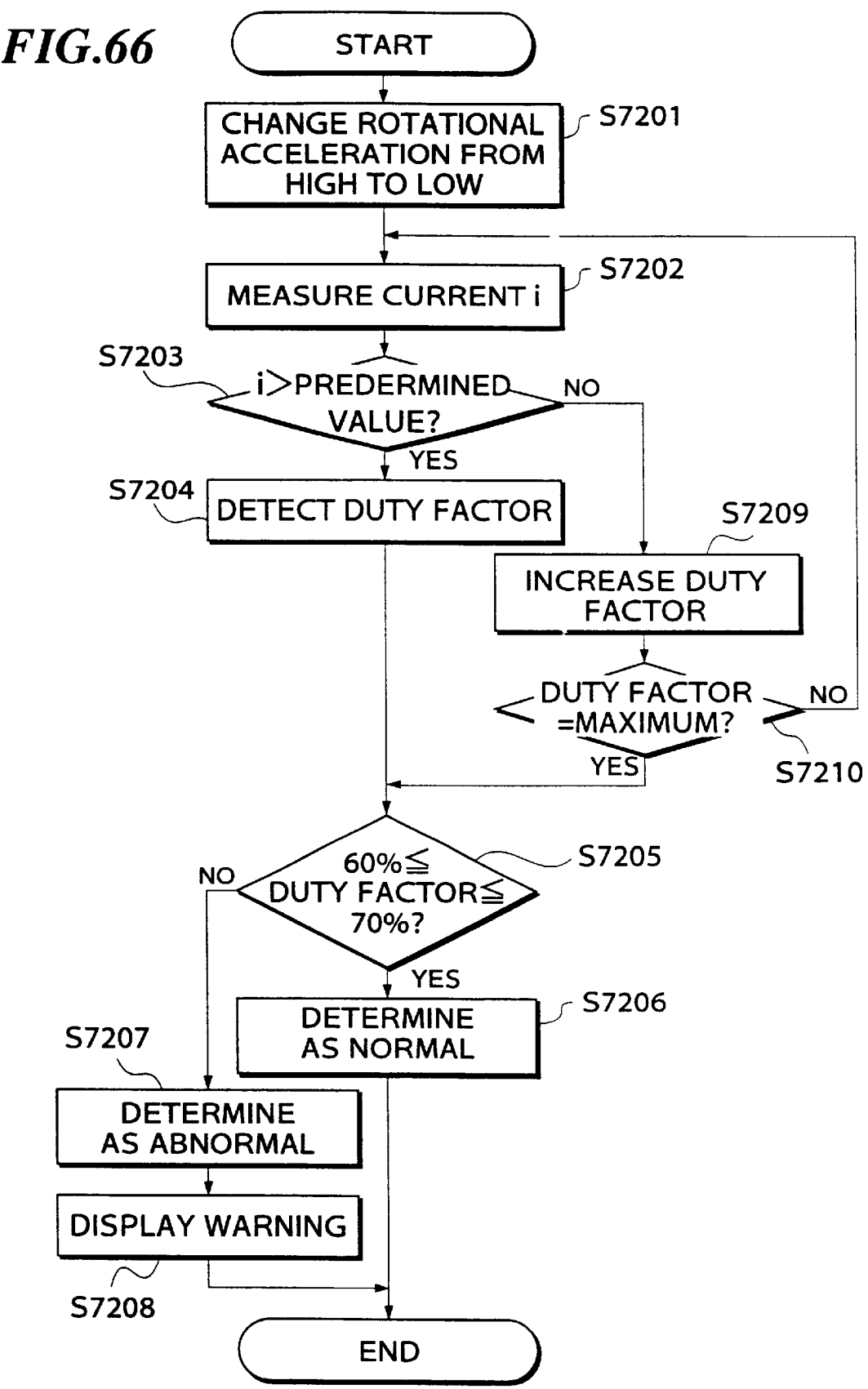
FIG. 66 is a flowchart showing a further continued part of the FIG. 64 control.

Details of the control processing will now be described with reference to FIGS. 66 and 68. FIG. 66 is a flowchart showing a fault diagnostic program executed by the MPU 14, which corresponds to the method (c).

First, to quickly protract the seatbelt in attaching the seatbelt on the occupant's body, a control signal commanding to rotate the DC motor 210 in the seatbelt protracting direction at a high rotational speed, i.e. a control signal commanding a change from a low degree of rotational acceleration to a desired high degree of rotational acceleration, is delivered to the DC motor driver 11 at a step S7201. More specifically, the MPU 14 gradually increases the duty factor of the control signal, and responsive to this control signal, the DC motor driver 11 changes the rotational acceleration of the DC motor 10 from a low degree of rotational acceleration to a high degree of rotational acceleration in the seatbelt protracting direction. The reel shaft 3 then gradually increases in rotational acceleration in the seatbelt protracting direction in unison with the rotational acceleration of the DC motor 10. If the seatbelt locking mechanism 2 is normal, it locks the reel shaft 3 when the rotational acceleration of the reel shaft changes from the low degree of rotational acceleration to the desired high degree of rotational acceleration.

Then, the current i flowing to the DC motor 10 is detected, based upon current flowing through the resistance r1 by the current detecting circuit C1 of the DC motor driver 11 at a step S7202. It is determined at a step S7203 whether the detected current i exceeds a predetermined value (e.g. 5 amperes).

If the detected current i exceeds the predetermined value, that is, the DC motor 10 continues to be energized for rotation with the reel shaft 3 in the locked state, the duty factor of the control signal delivered from the MPU 14 to the DC motor driver 11 is detected at a step S7204.

Then, it is determined at a step S7205 whether the detected duty factor falls within a range between a first predetermined value (e.g. 60%) and a second predetermined value (e.g. 70%). This is for determining whether the duty factor of the control signal is included within a range of duty factor within which the duty factor should fall in changing the rotational acceleration of the DC motor 10 from the low degree of rotational acceleration to the desired high degree of rotational acceleration when the seatbelt locking mechanism 2 functions normally.

If it is determined that the duty factor falls within the above range, it is determined at a step S7206 that the seatbelt locking mechanism 2 is normal, followed by terminating the present processing.

On the other hand, if it is determined that the duty factor does not fall within the range between the first predetermined value and the second predetermined value, it is determined at a step S7207 that the seatbelt locking mechanism 2 is abnormal, and then a warning is given to the occupant by means of a display device or a warning light (not shown) to warn him of the abnormality of the seatbelt locking mechanism 2 at a step S7208, followed by terminating the present processing.

If it is determined at the step S7203 that the detected current i is below the predetermined value, that is, the DC motor 10 continues to be energized for rotation with the reel shaft 3 in the unlocked state, the duty factor of the control signal is further increased at a step S7209. Then, it is determined at a step S7210 whether the duty factor of the control signal is the maximum, i.e. 100%, and if it is the maximum, the processing proceeds to the step S7205, whereas if it is not the maximum, the processing returns to the step S7202.

Figure 67:
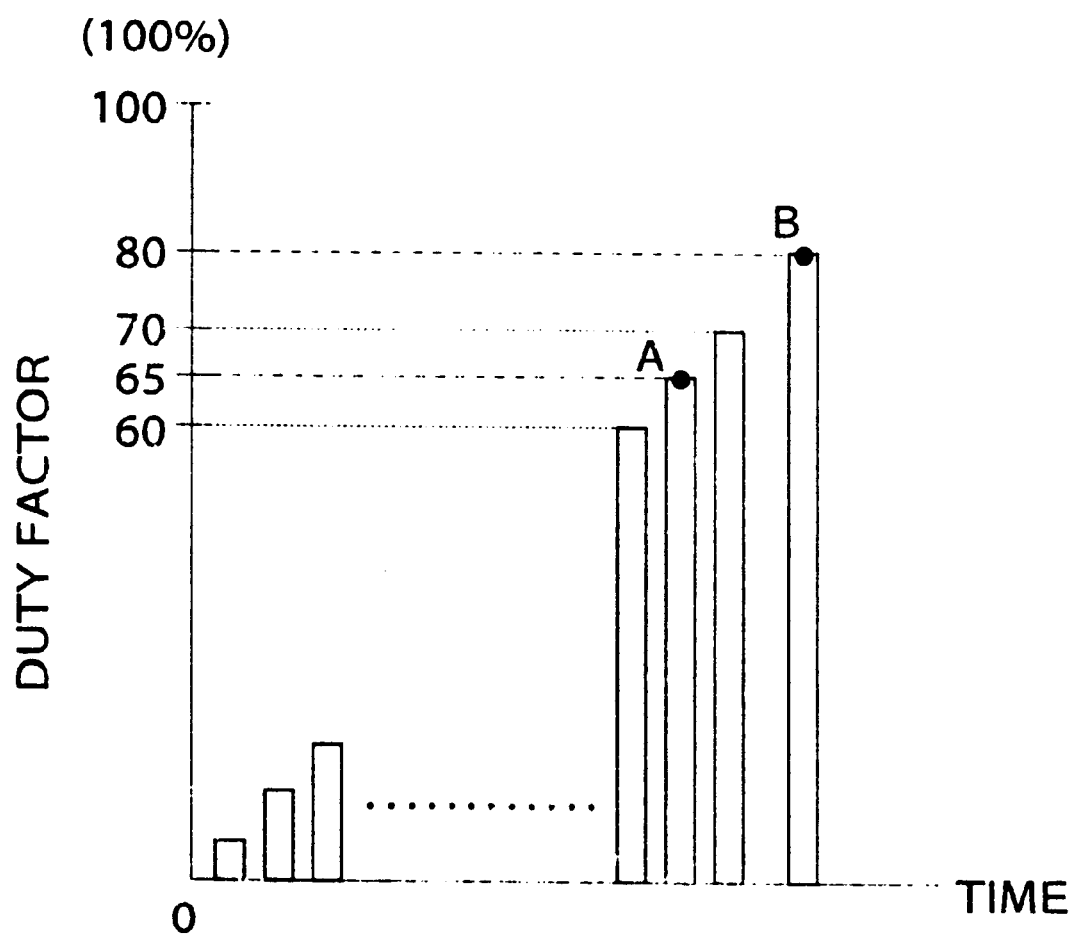
FIG. 67 is a graph showing the relationship between the duty factor of a control signal and time elapsed after outputting of the control signal.

FIG. 67 shows the relationship between the duty factor of the control signal and time elapsed after the start of delivery of the control signal.

In the figure, a point A represents a duty factor detected at the step S7204 after it is determined at the step S7203 that the detected current i exceeds the predetermined value (e.g. 5 amperes). The duty factor at the point A is 65% which falls within the range between the first and second predetermined values (60–70%) (the answer is YES at the step S7205). Therefore, in this case, it is determined that the seatbelt locking mechanism 2 is normal (step S7206).

On the other hand, a point B represents a duty factor detected at the step S7204 after it is determined at the step S7203 that the detected current i is below the predetermined value (5 amperes), then the duty factor is increased (step S7209), again the current i is detected (step S7210) and it is determined that the detected current i exceeds the predetermined value. The duty factor at the point B is 80% which falls out of the range between the first and second predetermined values. Therefore, in this case, it is determined that the seatbelt locking mechanism 2 is abnormal (step S7207).

Figure 68:
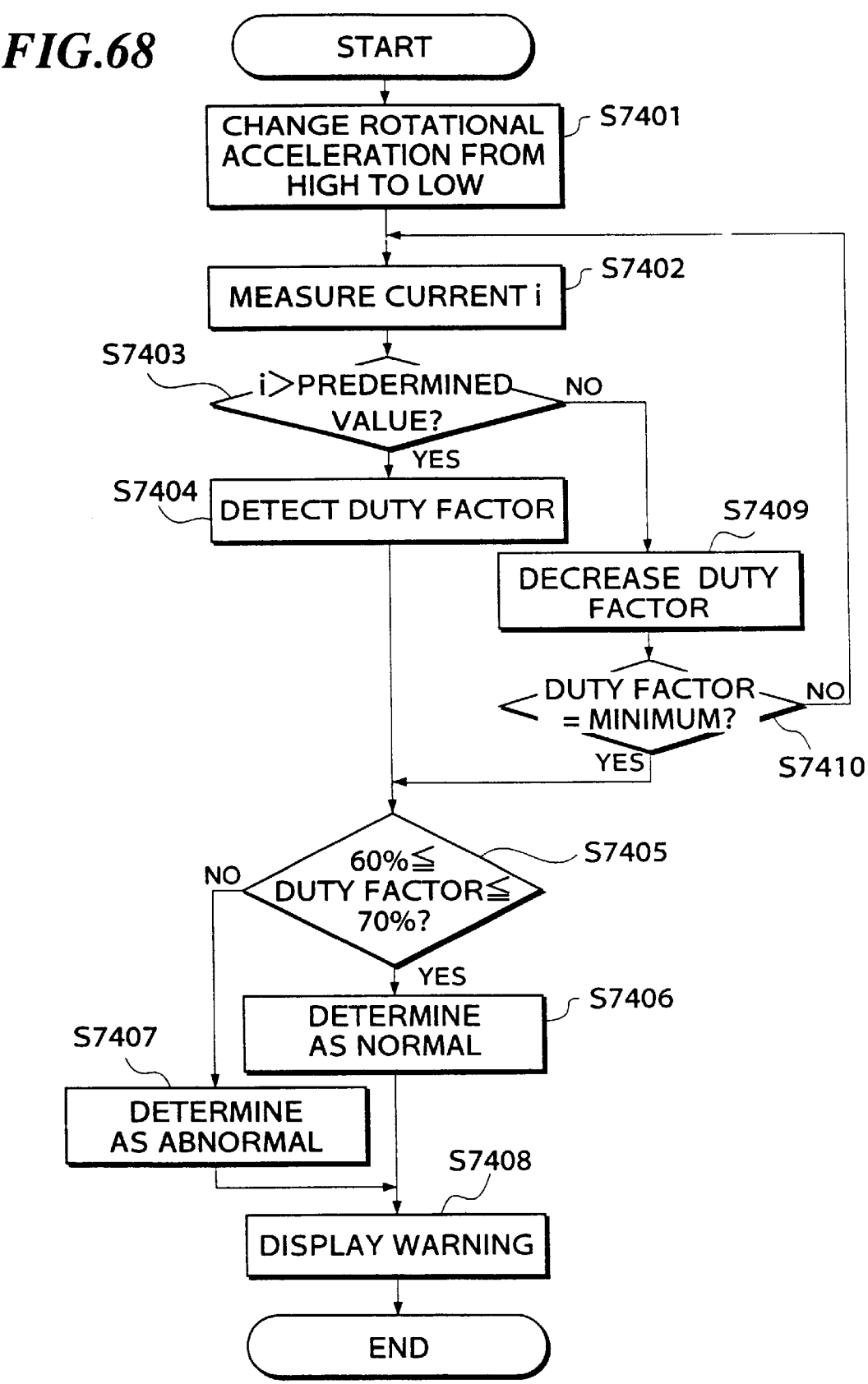
FIG. 68 is a flowchart showing a fault diagnostic program executed by the MPU 14.

FIG. 68 is a flowchart showing a fault diagnostic program executed by the MPU 14, which corresponds to the method (d).

First, to slowly protract the seatbelt to give a predetermined amount of looseness to the seatbelt after the seatbelt is attached to the occupant and made fit to his body, a control signal commanding to rotate the DC motor 210 in the seatbelt protracting direction at a low speed, i.e. a control signal commanding a change from a high degree of rotational acceleration to a desired low degree of rotational acceleration, is delivered to the DC motor driver 11 at a step S7401. More specifically, the MPU 14 gradually decreases the duty factor of the control signal, and responsive to this control signal, the DC motor driver 11 changes the rotational acceleration of the DC motor 10 from a high degree of rotational acceleration to a low degree of rotational acceleration in the seatbelt protracting direction. The reel shaft 3 then gradually decreases in rotational acceleration in the seatbelt protracting direction in unison with the rotational acceleration of the DC motor 10. If the seatbelt locking mechanism 2 is normal, it does not lock the reel shaft 3 when the rotational acceleration of the reel shaft changes from the high degree of rotational acceleration to the desired low degree of rotational acceleration.

Then, the current i flowing to the DC motor 10 is detected, based upon current flowing through the resistance r1 by the current detecting circuit C1 of the DC motor driver 11 at a step S7402. It is determined at a step S7403 whether the detected current i is below a predetermined value (e.g. 5 amperes).

If the detected current i is below the predetermined value, that is, the DC motor 10 continues to be energized for rotation with the reel shaft 3 in the unlocked state, the duty factor of the control signal delivered from the MPU 14 to the DC motor driver 11 is detected at a step S7404.

Then, it is determined at a step S7405 whether the detected duty factor falls within a range between a first predetermined value (e.g. 30%) and a second predetermined value (e.g. 40%). This is for determining whether the duty factor of the control signal is included within a range of duty factor within which the duty factor should fall in changing the rotational acceleration of the DC motor 10 from the high degree of rotational acceleration to the desired low degree of rotational acceleration when the seatbelt locking mechanism 2 functions normally.

If it is determined that the duty factor falls within the above range, it is determined at a step S7406 that the seatbelt locking mechanism 2 is normal, followed by terminating the present processing.

On the other hand, if it is determined that the duty factor does not fall within the range between the first predetermined value and the second predetermined value, it is determined at a step S7407 that the seatbelt locking mechanism 2 is abnormal, and then a warning is given to the occupant by means of the display device or the warning light to warn him of the abnormality of the seatbelt locking mechanism 2 at a step S7408, followed by terminating the present processing.

If it is determined at the step S7403 that the detected current i exceeds the predetermined value, that is, the DC motor 10 continues to be energized for rotation with the reel shaft 3 in the locked state, the duty factor of the control signal is further decreased at a step S7409. Then, it is determined at a step S7210 whether the duty factor of the control signal is the minimum, i.e. 0%, and if it is the minimum, the processing proceeds to the step S7405, whereas if it is not the minimum, the processing returns to the step S7402.

Figure 69:
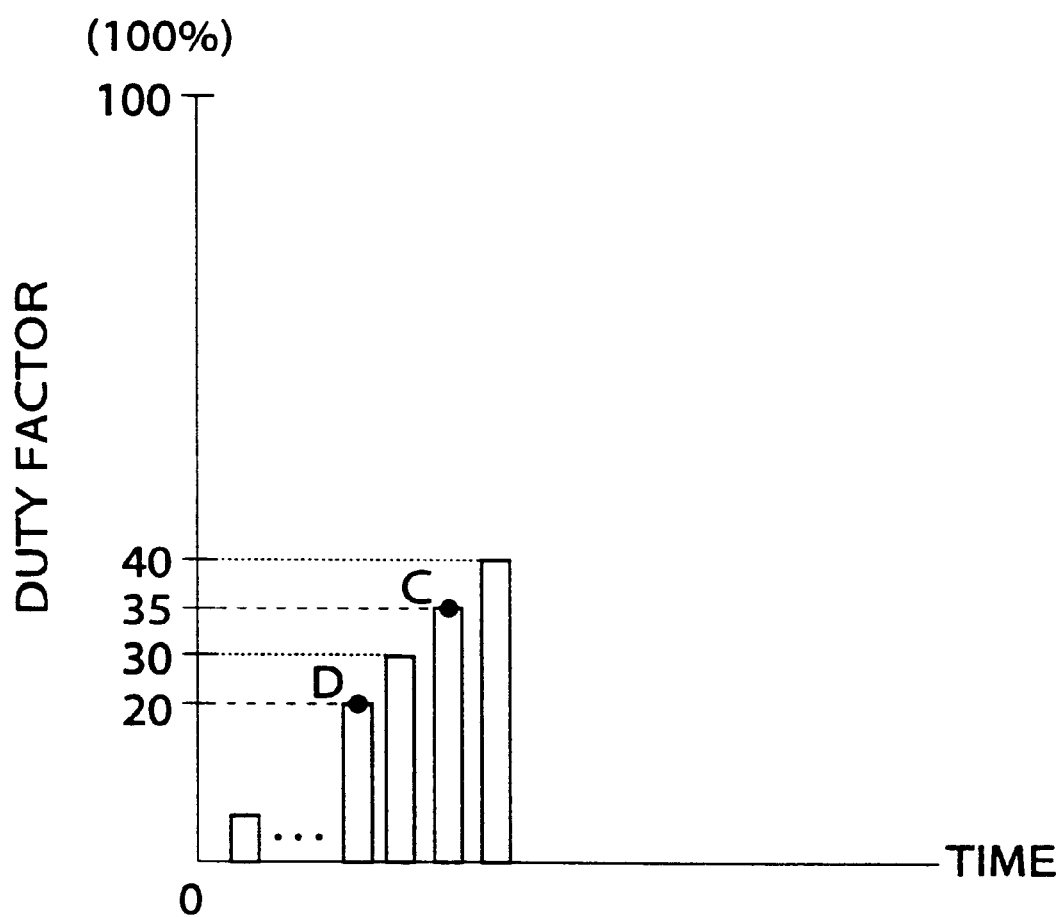
FIG. 69 is a graph showing the relationship between the duty factor of a control signal and time elapsed after outputting of the control signal.

FIG. 69 shows the relationship between the duty factor of the control signal and time elapsed after the start of delivery of the control signal.

In the figure, a point C represents a duty factor detected at the step S7404 after it is determined at the step S7403 that the detected current i is below the predetermined value (5 amperes). The duty factor at the point C is 35% which falls within the range between the first and second predetermined values (60–70%) (the answer is YES at the step S7405). Therefore, in this case, it is determined that the seatbelt locking mechanism 2 is normal (step S7406).

On the other hand, a point D represents a duty factor detected at the step S7404 after it is determined that the detected current i exceeds the predetermined value (5 amperes) (step S7403), then the duty factor is decreased (step S7409), again the current i is detected (step S7410) and it is determined that the detected current i is below the predetermined value (5 amperes). The duty factor at the point D is 20% which falls out of the range between the first and second predetermined values. Therefore, in this case, it is determined that the seatbelt locking mechanism 2 is abnormal (step S7407).

In the present control processing (fault diagnosis), only when it is determined at both of the steps S7206 and S7406 in FIGS. 66 and 68 that the seatbelt locking mechanism 2 is functioning normally, it is finally determined that the same mechanism is normal, while when it is determined at either the step S7207 in FIG. 66 or the step S7407 in FIG. 68 that the seatbelt locking mechanism 2 is functioning abnormally, it is immediately finally determined that the same mechanism is abnormal. Alternatively, only when it is determined at both of the steps S7207 and S7407 that the seatbelt locking mechanism 2 is abnormal, it may be finally determined that the same mechanism is abnormal, to avoid frequent warning due to noise or the like.

As describe above, according to the present embodiment, a control signal commanding to cause a change in the rotational acceleration in the seatbelt protracting direction from a low degree of rotational acceleration to a desired high degree of rotational acceleration is delivered to the DC motor driver 11, the duty ratio of the control signal is detected, and depending upon whether the detected duty factor falls within a range between first and second predetermined values, it is determined whether the seatbelt locking mechanism 2 is normal or abnormal. On the other hand, a control signal commanding to cause a change in the rotational acceleration in the seatbelt protracting direction from a high degree of rotational acceleration to a desired low degree of rotational acceleration is delivered to the DC motor driver 11, the duty ratio of the control signal is detected, and depending upon whether the detected duty factor falls within a range between first and second predetermined values, it is determined whether the seatbelt locking mechanism 2 is normal or abnormal. Since the fault diagnosis is made based upon results of the above two kinds of determinations, accurate fault diagnosis of the seatbelt locking mechanism can be achieved.

Further, since the results of the determinations (steps S7206, S7207, S7406, and S7407) are notified via the display device or warning light (steps S7208 and 7408), it is possible to examine the cause of the fault and quickly take measures to repair the seatbelt locking mechanism.

Although in the present embodiment fault diagnosis is made based upon results of the two kinds of determinations, a plurality of kinds of control signals commanding to cause changes in the rotational acceleration in the seatbelt protracting direction from different degrees of low rotational acceleration to different degrees of high rotational acceleration, for example, and/or a plurality of kinds of control signals commanding to cause changes in the rotational acceleration in the seatbelt protracting direction from different degrees of high rotational acceleration to different degrees of low rotational acceleration, for example, may be delivered to the DC motor driver to carry out fault diagnosis based upon more than two kinds of determinations.

Although in the above described eighteenth and nineteenth embodiments fault diagnosis of the seatbelt locking mechanism 2 is carried out based upon the current i flowing to the DC motor and the duty factors of control signals delivered to the DC motor driver 11, alternatively fault diagnosis of the seatbelt locking mechanism 2 may be carried out based upon output signals from sensors which sense whether the reel shaft 3 is rotating, whether the reel shaft pulley 5 is rotating, whether the DC motor pulley 6 is rotating, and/or whether the power transmission belt 7 is operating.

Further, fault diagnosis of the seatbelt locking mechanism 2 may be carried out by detecting acceleration applied to the vehicle during deceleration from the terminal voltage across the DC motor 10 or other parameters, and determining whether the seatbelt locking mechanism 2 operates in response to the detected acceleration. More specifically, when the acceleration applied to the vehicle exceeds a predetermined magnitude, if the seatbelt locking mechanism 2 operates, it is determined that the seatbelt locking mechanism 2 is normal, while if the seatbelt locking mechanism does not operate, it is determined that the seatbelt locking mechanism is abnormal. On the other hand, when the acceleration applied to the vehicle is below a predetermined magnitude, if the seatbelt locking mechanism operates, it is determined that the mechanism is abnormal, while if the seatbelt locking mechanism does not operate, it is determined that the mechanism is normal.

Even by thus carrying out fault diagnosis of the seatbelt locking mechanism, based upon acceleration applied to the vehicle, accurate fault diagnosis of the seatbelt locking mechanism can be achieved.

Furthermore, the acceleration applied to the vehicle may be detected by an acceleration sensor provided in the vehicle.

Although in the eighteenth and nineteenth embodiments results of the determinations as to abnormality of the seatbelt locking mechanism are notified by means of a display device or a warning light, alternatively any other type of warning device may be provided to give a warning when abnormality of the seatbelt locking mechanism is detected as a result of the fault diagnosis.

Twentieth Embodiment

An electric retractor 2000 provided in an automotive passenger restraint and protection apparatus according to a twentieth embodiment of the invention includes an A/D converter, not shown, and a PWM signal output device, not shown, which are provided in the MPU 14. The A/D converter converts the terminal voltage across the DC motor 10 and current flowing to the DC motor 10 to digital signals, and the PWM signal output device 65 delivers a PWM signal for controlling the current flowing to the DC motor to the DC motor driver 11. The terminals PI to P4 of the DC motor driver 11 in FIG. 2 are connected to the A/D converter 65.

The MPU 14 receives voltage signals from the IFs IF1 and IF2, and based upon these voltage signals, detects the current i flowing to the DC motor 10 and an amount of change $|\Delta i|$ in the current i with time. Further, the MPU 14 receives voltage signals from the IFs IF3 and IF4, and based upon these voltage, detects the terminal voltage across the DC motor 10 and an amount of change $|\Delta v|$ in the terminal voltage with time. Then, the MPU 14 causes the PWM signal output device to deliver the PWM signal based upon the detected amounts of change $|\Delta i|$ and $|\Delta v|$ to the DC motor driver 11 to control the current i flowing to the DC motor 11. The amounts of change $|\Delta i|$ and $|\Delta v|$ are parameters representative of a driving state and stopped state of the DC motor 10.

Except for those described above, the electric retractor 2000 is identical in construction with the electric retractor 100, description of which is therefore omitted.

Figure 70:
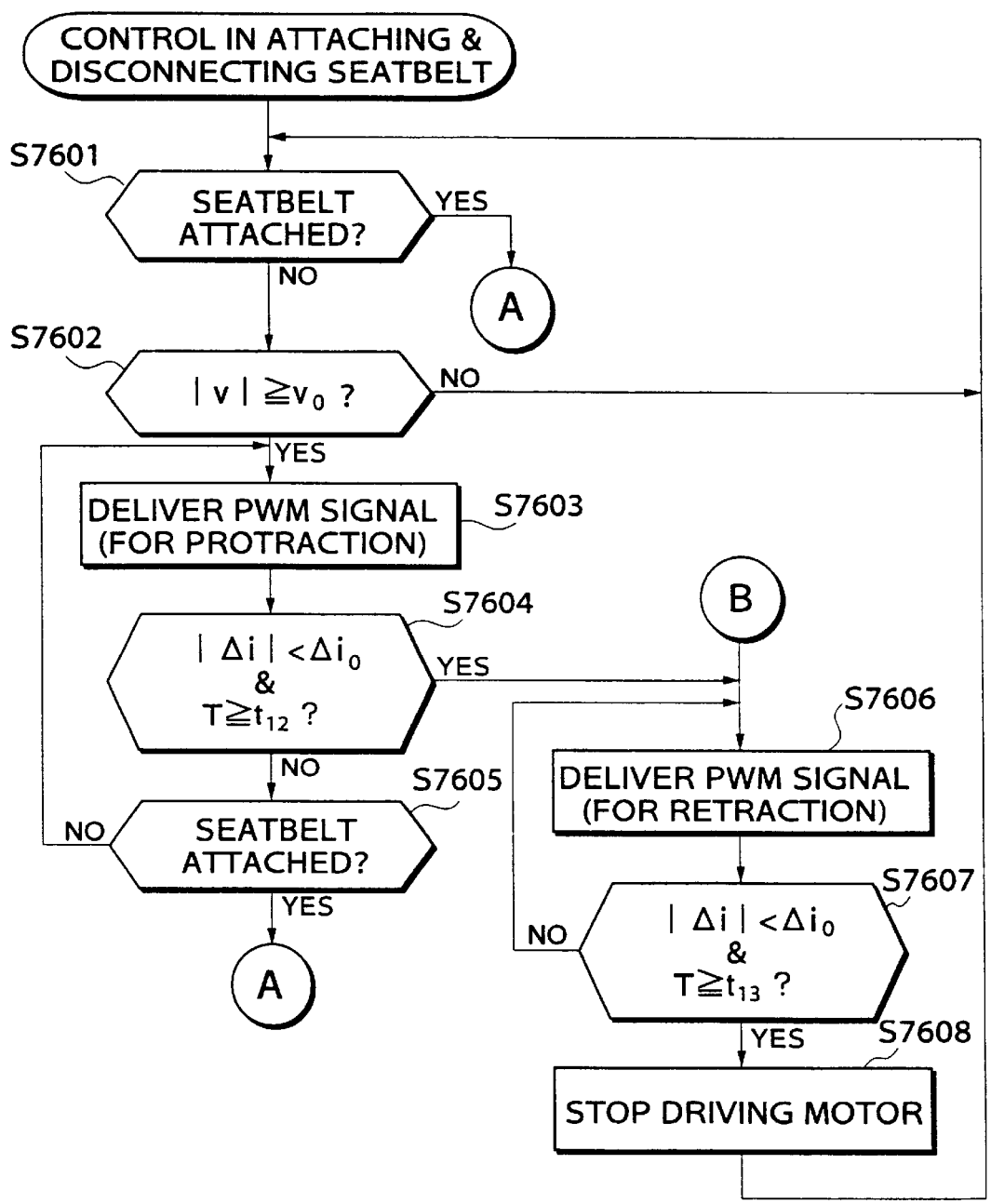
FIG. 70 is a flowchart showing a control program executed by the MPU 14 in attaching and disconnecting the seatbelt.
Figure 71:
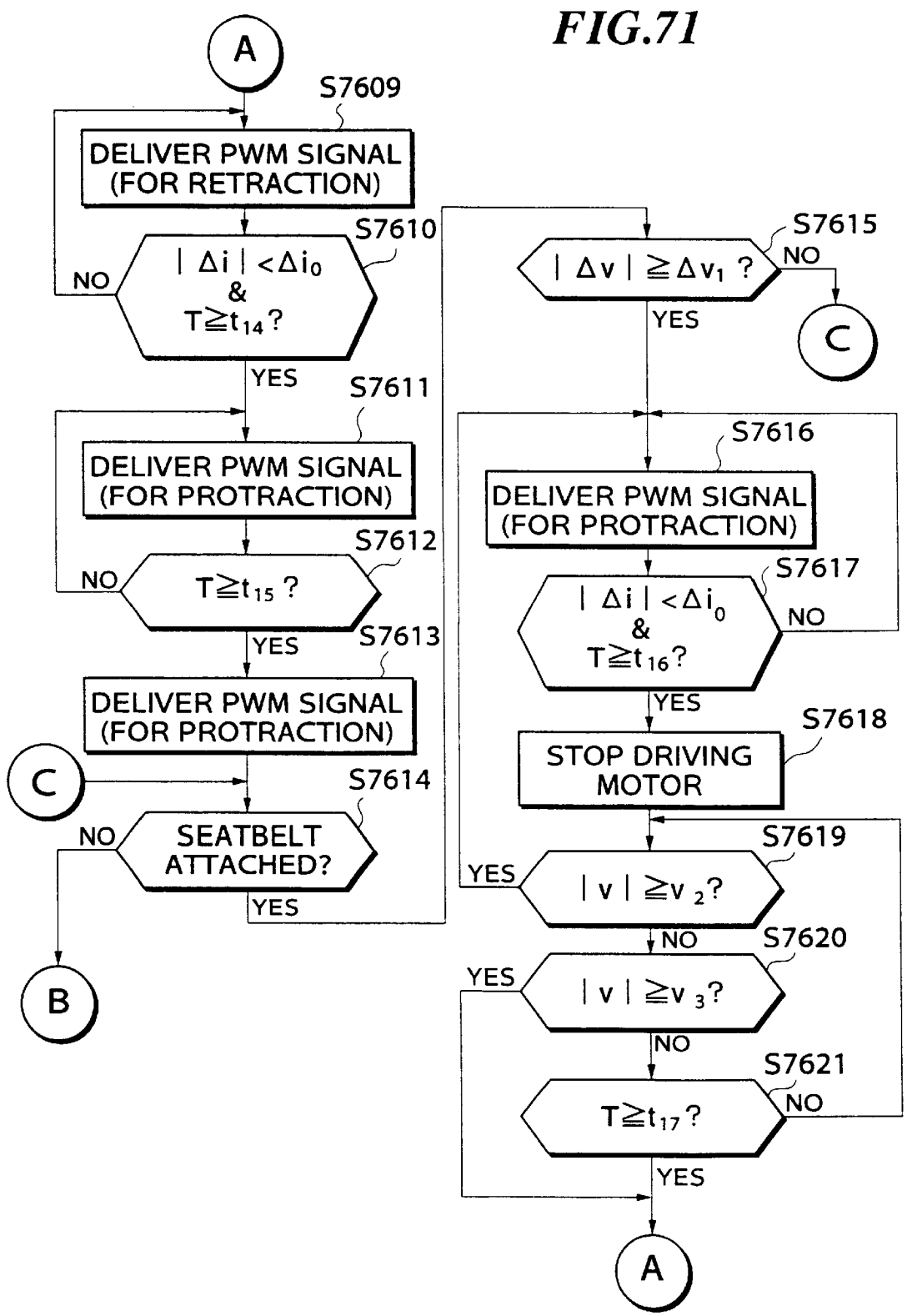
FIG. 71 is a flowchart showing a continued part of the FIG. 70 program.

FIGS. 70 and 71 are flowcharts showing a control program executed by the MPU 14 according to the present embodiment in attaching and disconnecting the seatbelt.

First, it is determined at a step S7601 whether attaching of the seatbelt tongue to the buckle has been detected by the buckle connection detector 16. If attaching of the seatbelt has not been detected, it is determined at a step S7602 whether the magnitude $|v|$ of the terminal voltage across the DC motor 10 exceeds a predetermined value v0 (e.g. 0.3 volts) as taken with the sign corresponding to the seatbelt protracting direction.

If the magnitude $|v|$ of the terminal voltage is below the predetermined value v0, the processing returns to the step S7601, whereas if the former exceeds the latter, the PWM signal is delivered from the PWM signal output device to cause the current i to flow to the DC motor 10 so as to facilitate protraction of the seatbelt, at a step S7603. The amount of current i which is caused to flow to the DC motor at the step S7603 is merely for facilitating protraction of the seatbelt, that is, for assisting the protraction of the seatbelt, but is not sufficient to cause rotation of the reel shaft 3 for itself. Then, the reel shaft 3 is rotated due to the seatbelt protraction assistance by the current i and the occupant's seatbelt protracting motion. Delivery of the PWM signal carried out at a step S7616, hereinafter referred to, is also for facilitating protraction of the seatbelt.

Then, it is determined at a step S7604 whether the amount of change $|\Delta i|$ in the current i is below a predetermined value $\Delta i0$ e.g. 5 amperes/sec) and at the same time the former has been continuously below the latter over a predetermined time period t12 (e.g. 3 sec). This determination is for determining whether the occupant has been continuously protracting the seatbelt or has stopped protracting the seatbelt after once protracting the same.

If it is determined at the step S7604 that the amount of change $|\Delta i|$ in the current i exceeds the predetermined value $\Delta i0$ or the former has not been continuously below the latter over the predetermined time period t12 (the answer is NO at the step S7604), it is determined at a step S7605 whether attaching of the seatbelt tongue to the buckle has been detected by the buckle connection detector 16. If attaching of the seatbelt has not been detected, the processing returns to the step S7603, whereas if attaching of the seatbelt has been detected, the processing proceeds to a step S7609, hereinafter referred to.

If it is determined at the step S7604 that the amount of change $|\Delta i|$ in the current i is below the predetermined value $\Delta i0$ and at the same time the former has been continuously below the latter over the predetermined time period t12 (the answer is YES at the step S7604), the PWM signal output device is caused to deliver the PWM signal to the DC motor driver 11 to cause the current i to flow to the DC motor 10 so as to rotate the DC motor 10 in the seatbelt retracting direction in order to store the seatbelt which has been protracted, in its retracted position, at a step S7606.

Then, it is determined at a step S7607 whether the amount of change $|\Delta i|$ in the current i is below the predetermined value $\Delta i0$ and at the same time the former has been continuously below the latter over a predetermined time period t13 (e.g. 2 sec). If the amount of change $|\Delta i|$ in the current i exceeds the predetermined value $\Delta i0$ or the former has not been continuously below the latter over the predetermined time period t13 (the answer is NO at the step S7607), the processing returns to the step S7606, whereas if the amount of change $|\Delta i|$ in the current i is below the predetermined value $\Delta i0$ and at the same time the former has been continuously below the latter over the predetermined time period t13 (the answer is YES at the step S7607), it is judged that the retraction of the seatbelt has reached its limit, and then the PWM signal output device is caused to deliver a PWM signal commanding not to permit the current i to flow to the DC motor 10, to the DC motor driver 11, to thereby stop the driving of the DC motor 10, at a step S7608, followed by the processing returning to the step S7601.

If it is determined at the step S7601 that the attaching of the seatbelt tongue to the buckle has been detected, the PWM signal output device is caused to deliver a PWM signal commanding to permit the current i to flow to the DC motor 10, to the DC motor driver 11, to thereby rotate the DC motor 10 in the seatbelt retracting direction, at the step S7609.

Then, it is determined at a step S7610 whether the amount of change $|\Delta i|$ in the current i is below the predetermined value $\Delta i0$ and at the same time the former has been continuously below the latter over a predetermined time period t14 (e.g. 0.1 sec). If the amount of change $|\Delta i|$ in the current i exceeds the predetermined value $\Delta i0$ or the former has not been continuously below the latter over the predetermined time period t14 (the answer is NO at the step S7610), the processing returns to the step S7609, whereas if the amount of change $|\Delta i|$ in the current i is below the predetermined value $\Delta i0$ and at the same time the former has been continuously below the latter over the predetermined time period t14 (the answer is YES at the step S7610), it is judged that the seatbelt has become fit to the occupant and thus the retraction of the seatbelt has reached its limit, and then the PWM signal output device is caused to deliver a PWM signal commanding to permit the current i to flow to the DC motor 10, to the DC motor driver 11, to rotate the DC motor 10 in the seatbelt protracting direction so as to give a predetermined amount of looseness to the occupant, at a step S7611. The amount of current i which is permitted to flow at the step S7611 is sufficient to rotate the reel shaft 3 for itself.

Then, it is determined at a step S7612 whether a predetermined time period t15 (e.g. 1 sec) has elapsed after the PWM signal was delivered at the step S7611, based upon the value of the timer 21. If the predetermined time period t15 has not elapsed, the processing returns to the step S7611, whereas if it has elapsed, then a predetermined amount of looseness has been given to the occupant, and then the PWM signal output device is caused to deliver a PWM signal to the DC motor driver 11 to permit the current i to flow to the DC motor 10 so as to rotate the DC motor 10 in the seatbelt protracting direction in order to stop the retraction of the seatbelt by the bias force of the bias force-imparting means formed e.g. of a spiral spring acting upon the seatbelt in the retracting direction, at a step S7613.

Then, it is determined at a step S7614 whether attaching of the seatbelt tongue to the buckle has been detected by the buckle connection detector 16. If attaching of the seatbelt has not been detected, the processing returns to the step S7606, whereas attaching of the seatbelt has been detected, it is determined at a step S7615 whether the amount of change $|\Delta v|$ in the terminal voltage across the DC motor 10 exceeds a predetermined value $\Delta v1$ (e.g. 10 volts/sec).

If the amount of change $|\Delta v|$ in the terminal voltage across the DC motor 10 does not exceed the predetermined value $\Delta v1$, the processing returns to the step S7614, whereas if the former exceeds the latter, it is judged that protraction of the seatbelt has been made by the occupant after attaching the seatbelt to his body, and then the PWM signal output device is caused to deliver a PWM signal to the DC motor driver 11 to permit the current i to flow to the DC motor 10 so as to facilitate protraction of the seatbelt, at a step S7616.

Then, it is determined at a step S7617 whether the amount of change $|\Delta i|$ in the current i is below the predetermined value $\Delta i0$ and at the same time the former has been continuously below the latter over a predetermined time period t16 (e.g. 0.3 sec). If the amount of change $|\Delta i|$ in the current i exceeds the predetermined value $\Delta i0$ or the former has not been continuously below the latter over the predetermined time period t16 (the answer is NO at the step S7617), the processing returns to the step S7616, whereas if the amount of change $|\Delta i|$ in the current i is below the predetermined value $\Delta i0$ and at the same time the former has been continuously below the latter over the predetermined time period t16 (the answer is YES at the step S7617), it is judged that the protraction of the seatbelt by the occupant has ceased, and then the PWM signal output device is caused to deliver a PWM signal commanding not to permit the current i to flow to the DC motor 10, to the DC motor driver 11, to stop the driving of the DC motor 10, at a step S7618.

Then, it is determined at a step S7619 whether the magnitude $|v|$ of the terminal voltage across the DC motor 10 exceeds a predetermined value v2 (e.g. 0.3 volts) as taken with the sign corresponding to the seatbelt protracting direction.

If the magnitude |v| of the terminal voltage exceeds the predetermined value v2, it is judged that protraction of the seatbelt has been again carried out by the occupant, and then the processing returns to the step S7616 in order to assist the protraction of the seatbelt, whereas if the magnitude |v| of the terminal voltage does not exceed the predetermined value v2, it is determined at a step S7620 whether retraction of the seatbelt due to the bias force of the bias force-imparting means is being carried out, that is, whether the magnitude |v| of the terminal voltage across the DC motor 10 exceeds a predetermined value v3 (e.g. 0.1 volts) as taken with the sign corresponding to the seatbelt retracting direction.

If the magnitude of the terminal voltage across the DC motor 10 exceeds the predetermined value v3, the processing returns to the step S7609, whereas if the former does not exceed the latter, it is determined at a step S7621 whether a predetermined time period t17 (e.g. 1 sec) has elapsed after the driving of the DC motor 10 was stopped at the step S7618. If the predetermined time period t17 has not elapsed, the processing returns to the step S7619, whereas if the predetermined time period t17 has elapsed, the processing returns to the step S7609.

As described above, according to the present embodiment, the current i flowing to the DC motor 10 is controlled based upon results of the detection by the buckle connection detector 16, the amount of change |Δi| in the current i with time, and the amount of change |Δv| in the terminal voltage v with time. Therefore, an expensive displacement detecting device is not required to control the driving of the DC motor 10. As a result, the manufacturing cost can be reduced, and the construction of the automotive passenger restraint and protection apparatus can be simplified.

Further, the MPU 14 can directly detect the amount of change |Δi| in the current i with time and the amount of change |Δv| in the terminal voltage v with time, and hence can achieve more accurate control of the DC motor.

Twenty-First Embodiment

An automotive passenger restraint and protection apparatus according to a twenty-first embodiment of the invention includes an electric retractor 2100 which is identical in construction with the electric retractor 2000 except that the IFs IF3 and IF4 of the DC motor driver 11 (FIG. 2) do not have capacitors C3, description of which is therefore omitted.

Figure 72:
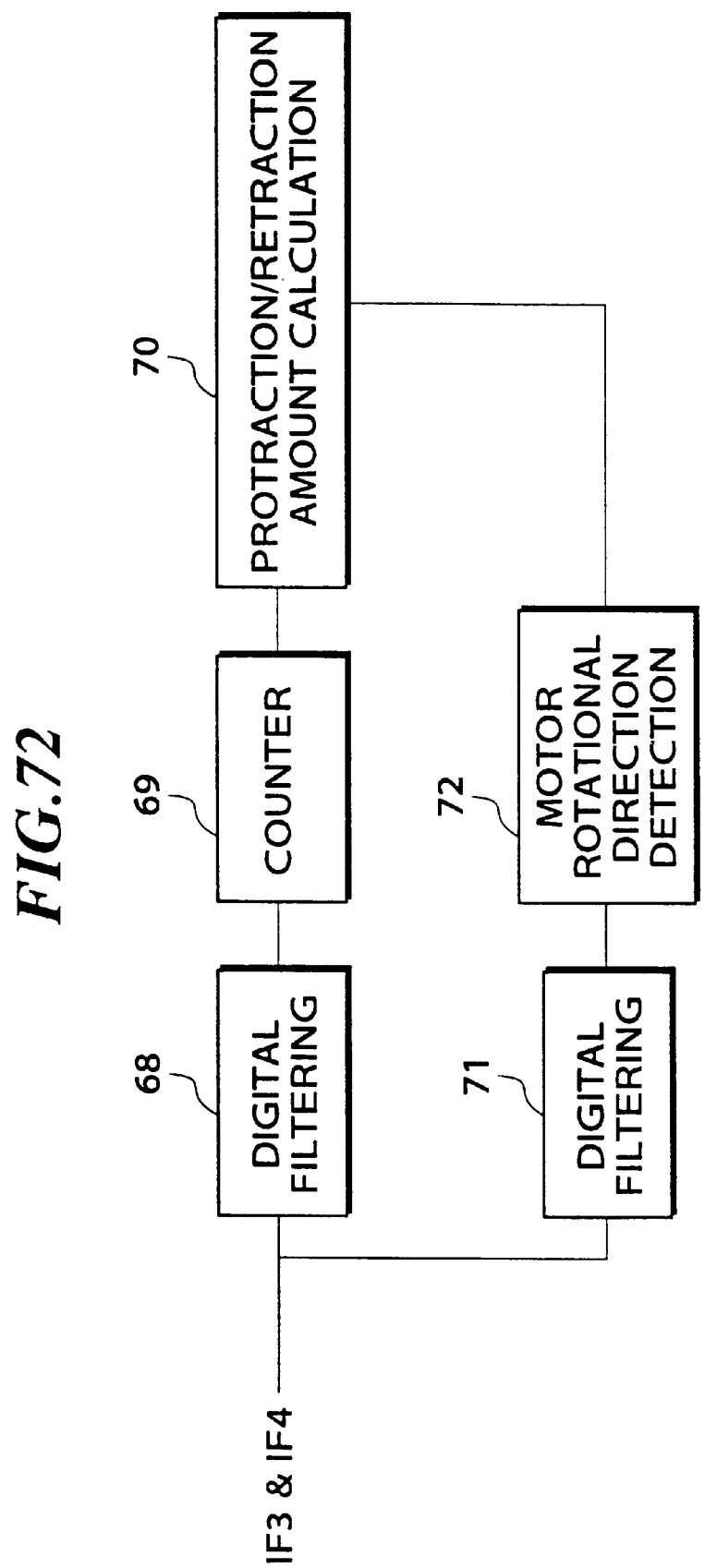
FIG. 72 is a block diagram showing contents of arithmetic processing executed by the MPU 14 provided in an electric retractor 2100.

FIG. 72 is a block diagram showing contents of arithmetic processing executed by the MPU 14 according to the present embodiment provided in the electric retractor 2100.

The MPU 14 is comprised of a digital filtering block (high-pass filter) 68 for extracting only pulsating components from voltage signals from the IFs IF3 and IF4, a counting block 69 for counting a number of times the extracted pulsating components rises a predetermined voltage v0 (e.g. 1 volt) from a level below the predetermined voltage, a protraction/retraction amount calculating block 70 for calculating an amount of protraction or retraction of the seatbelt, based upon a count value obtained by the counting block 69, a digital filtering block (low-pass filter) 71 for removing only pulsating components from the voltage signals from the IFs IF3 and IF4, and a motor rotational direction detecting block 72 for detecting whether the rotational direction of the DC motor 10 is in the seatbelt protracting direction or in the seatbelt retracting direction, based upon the sign of the voltage signals with pulsating components removed therefrom.

Next, the operation of these blocks of the electric retractor 2100 for calculating the protraction amount or the retraction amount of the seatbelt will be described.

When the seatbelt has been protracted by the occupant or retracted by the bias force-imparting means formed e.g. of a spiral spring, the reel shaft 3 is rotated, and the rotation is transmitted through the reel shaft pulley 5, the DC motor pulley 6, and the power transmission belt 7 to the rotary shaft of the DC motor 10 to rotate the same, whereby an electromotive force is generated. The A/D converter samples the resulting voltage signals from the IFs IF3 and IF4 every predetermined time period.

In the digital filtering block 68, the voltage signal from the IF IF4 is subtracted from the voltage signal from the IF IF3, and the resulting difference voltage is subjected to high-pass filtering to extract only pulsating components therefrom. The counting block counts the number of times the extracted pulsating components rises above the predetermined value v0 from a level below the same, and a signal indicative of the count value is delivered to the protraction/retraction amount calculating block 70.

On the other hand, in the digital filtering block 71, the voltage signal from the IF IF4 is subtracted from the voltage signal from the IF IF3, and the resulting difference voltage is subjected to low-pass filtering to remove only pulsating components therefrom. The resulting voltage signal free of pulsating components is delivered to the motor rotational direction detecting block 72, which in turn detects whether the rotational direction of the DC motor 10 is in the seatbelt protracting direction or in the seatbelt retracting direction, based upon the sign of the voltage signals free of pulsating components, and delivers a signal indicative of results of the detection to the protraction/retraction amount calculating block 70.

In the protraction/retraction amount calculating block 70, the count value from the counting block 69 is multiplied by a predetermined value (e.g. 10 cm/1 count), and the amount of protraction or retraction of the seatbelt is calculated based upon the resulting product and the signal indicative of the detected rotational direction of the DC motor 10 from the motor rotational direction detecting block 72.

As described above, according to the present embodiment, the amount of protraction or retraction of the seatbelt is calculated based upon a count value indicative of the number of times the pulsating components of the voltage difference signal obtained by subtracting the voltage signal from the IF IF4 from the voltage signal from the IF IF3 (i.e. terminal voltage across the DC motor 10) rise above the predetermined voltage v0 from a level below the same and the rotational direction of the DC motor 10 detected based upon the sign of the voltage signals free of pulsating components from the IFs IF3 and IF4. As a result, the amount of protraction or retraction of the seatbelt can be detected with ease and with high accuracy.

Although in the present embodiment the number of times the pulsating components of the voltage signals from the IFs IF3 and IF4 rise above the predetermined voltage v0 from a level below the same is counted, a number of times the pulsating components drop below a predetermined voltage v1 (e.g. −1 volt) from a level above the same may be counted, and a signal indicative of the counted number of times may be delivered to the protraction/retraction amount calculating block 70, providing substantially the same results.

Although in the present embodiment the amount of protraction or retraction of the seatbelt is calculated, a count value per unit time (e.g. 2 counts/1 sec) may be multiplied by a predetermined value (e.g. 10 cm/1 count) to obtain a product indicative of the seatbelt protracting or retracting speed (10 cm/1 count×2 counts/1 sec=20 cm/1 sec), and thus the seatbelt protracting or retracting speed may also be detected.

Twenty-Second Embodiment

A twenty-second embodiment of the invention is identical with the above described twenty-first embodiment except for the contents of arithmetic processing executed by the MPU 14, and therefore only description of the arithmetic processing according to the present embodiment will be described hereinbelow.

Figure 73:
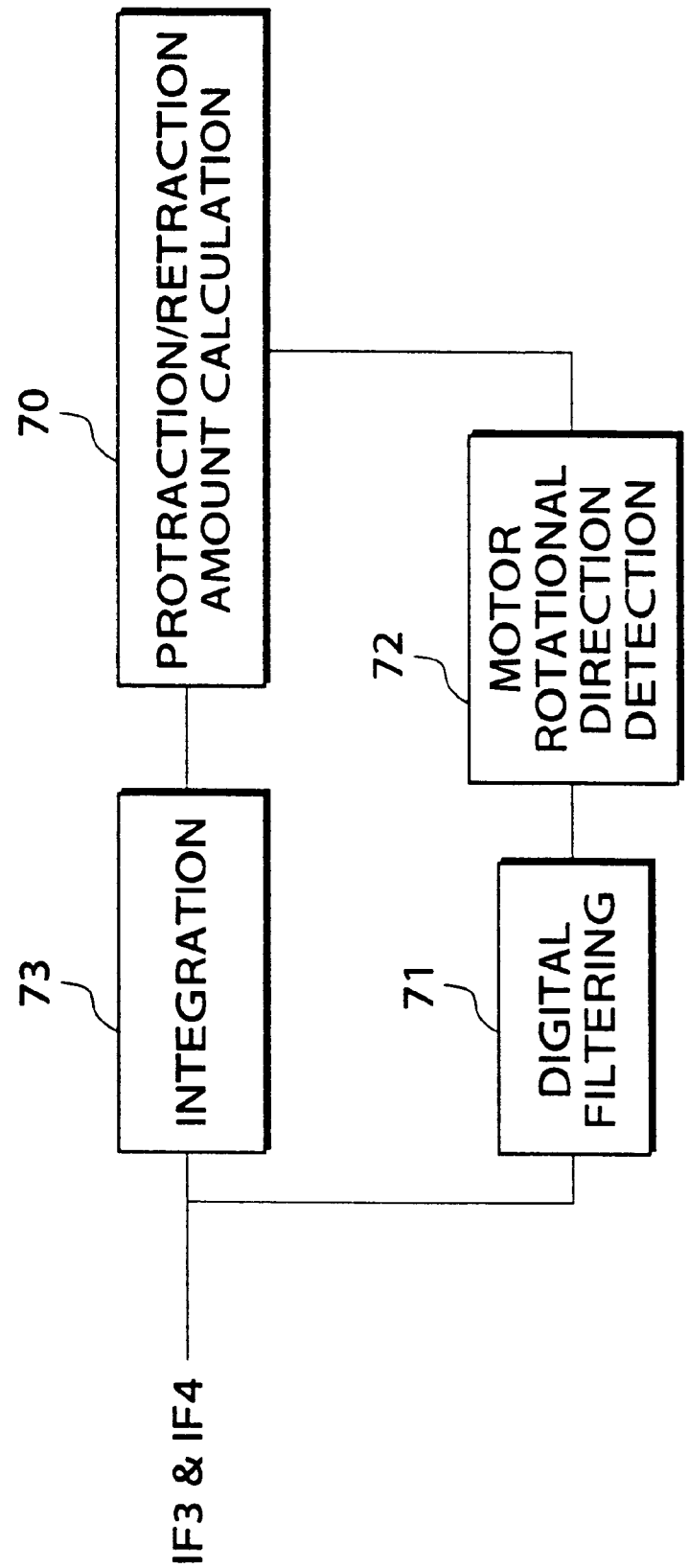
FIG. 73 is a is a block diagram showing contents of arithmetic processing executed by the MPU 14.

FIG. 73 shows the contents of the arithmetic processing executed by the MPU 14 according to the present embodiment.

The MPU 14 is comprised of an integrating block 73 for time-integrating the terminal voltage across the DC motor 10, a protraction/retraction amount calculating block 70 for calculating the amount of protraction or retraction of the seatbelt, from an output from the integrating block 73, a digital filtering block 71 for removing only pulsating components from the voltage signals from the IFs IF3 and IF4, and a motor rotational direction detecting block 72 for detecting whether the rotational direction of the DC motor 10 is in the seatbelt protracting direction or in the seatbelt retracting direction, based upon the sign of the voltage signals with pulsating components removed therefrom.

Next, the operation of these blocks of the electric retractor according to the present embodiment for calculating the protraction amount or the retraction amount of the seatbelt will be described.

In the integrating block 73, the voltage signal from the IF IF4 is subtracted from the voltage signal from the IF IF3, and the resulting voltage difference signal is subjected to time-integration. The resulting integral value is proportional to the amount of protraction or retraction of the seatbelt, because the DC motor 10 generates an electromotive force of a magnitude proportional to the rotational speed thereof and hence a value obtained by time-integrating the terminal voltage across the DC motor 10 (e.i. the difference voltage obtained by subtracting the voltage signal from the IF IF4 from the voltage signal from the IF IF3) is proportional to the amount of protraction or retraction of the seatbelt. Thereafter, the integrating block 73 delivers the integral value to the protraction/retraction amount calculating block 70.

The processing by the digital filtering block 71 is identical with the processing described above with respect to the twenty-first embodiment, description of which is therefore omitted.

In the protraction/retraction amount calculating block 70, the integral value from the integrating block 73 is multiplied by a predetermined value, and the amount of protraction or retraction of the seatbelt is calculated based upon the resulting product and a signal indicative of the detected rotational direction of the DC motor 10 from the motor rotational direction detecting block 72.

As described above, according to the present embodiment, the terminal voltage across the DC motor 10 is time-integrated to obtain an integral value, and the amount of protraction or retraction of the seatbelt is calculated based upon the integral value and the rotational direction of the DC motor 10 detected based upon the sign of the voltage difference signal obtained by subtracting the voltage signal from the IF IF4 from the voltage signal from the IF IF3 (i.e. terminal voltage across the DC motor 10) and having pulsating components thereof removed. As a result, the amount of protraction or retraction of the seatbelt can be detected with ease and with high accuracy.

Twenty-Third Embodiment

A twenty-third embodiment of the invention is identical with the above described twenty-first embodiment except for the contents of arithmetic processing executed by the MPU 14, and therefore only description of the arithmetic processing according to the present embodiment will be described hereinbelow.

Figure 74:
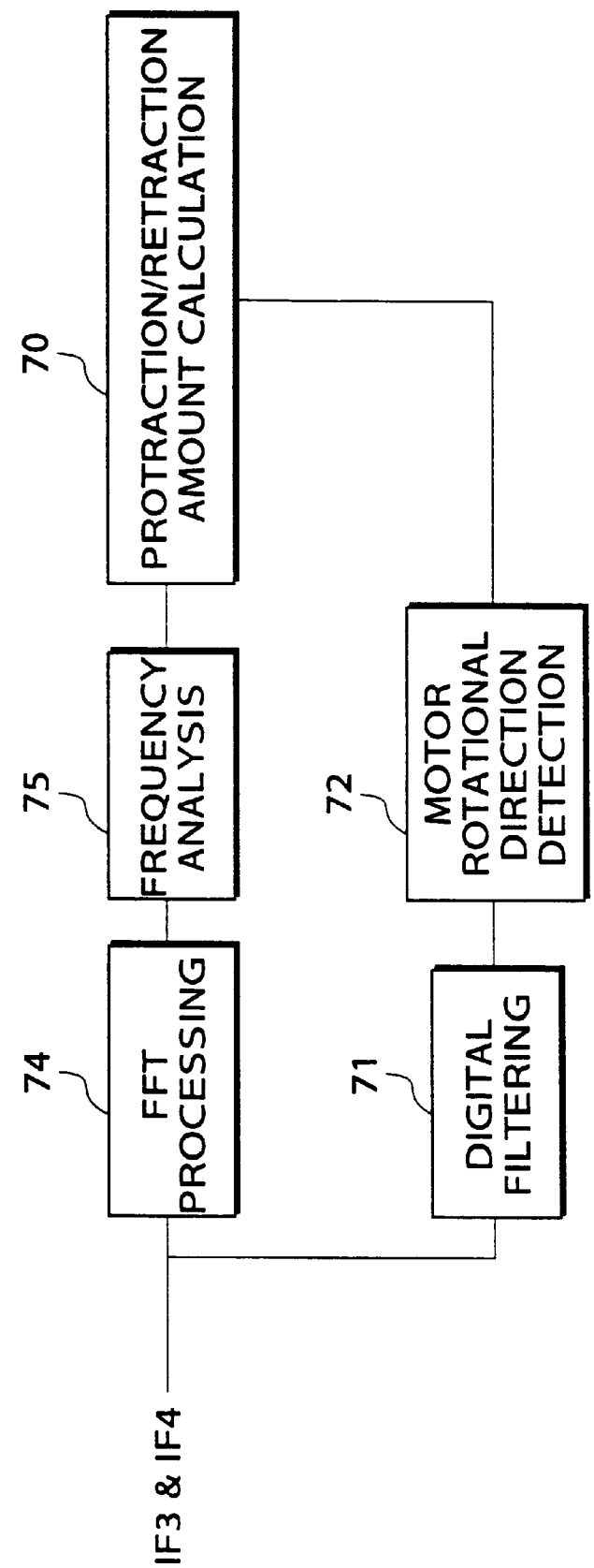
FIG. 74 is a is a block diagram showing contents of arithmetic processing executed by the MPU 14.

FIG. 74 shows the contents of the arithmetic processing executed by the MPU 14 according to the present embodiment.

The MPU 14 is comprised of an FFT processing block 74 for subjecting the voltage difference signal obtained by subtracting the voltage signal from the IF IF4 from the voltage signal from the IF IF3 to fast Fourier transform (FFT) to thereby obtain a frequency spectrum, a frequency analysis block 75 for calculating a frequency component of pulsating components of the terminal voltage across the DC motor 10 from the frequency spectrum, a protraction/retraction amount calculating block 70 for calculating an amount of protraction or retraction of the seatbelt, from an output from the frequency analysis block 75, a digital filtering block for removing only pulsating components from the voltage signals from the IFs IF3 and IF4, and a motor rotational direction detecting block 72 for detecting whether the rotational direction of the DC motor 10 is in the seatbelt protracting direction or in the seatbelt retracting direction, based upon the sign of the voltage signals with pulsating components removed therefrom.

Next, the operation of these blocks of the electric retractor according to the present embodiment for calculating the protraction amount or the retraction amount of the seatbelt will be described.

In the FFT processing block 74, the voltage difference signal obtained by subtracting the voltage signal from the interface circuit IF4 from the voltage signal from the interface circuit IF3 is subjected to fast Fourier transform (FFT) to thereby obtain a frequency spectrum. In the frequency analysis block 75, a frequency component of pulsating components of the terminal voltage across the DC motor 10 is calculated from the frequency spectrum. The calculated frequency components are proportional to the protracting or retracting speed of the seatbelt. The calculated frequency component is delivered to the protraction/retraction amount calculating block 70.

The processing by the digital filtering block 71 is identical with the processing described above with respect to the twenty-first embodiment, description of which is omitted.

In the protraction/retraction amount calculating block 70, the frequency component from the frequency analysis block 75 is multiplied by a predetermined value, and the amount of protraction or retraction of the seatbelt is calculated based upon the resulting product and a signal indicative of the detected rotational direction of the DC motor 10 from the motor rotational direction detecting block 72.

As described above, according to the present embodiment, the voltage difference signal obtained by subtracting the voltage signal from the IF IF4 from the voltage signal from the IF IF3 is subjected to fast Fourier transform (FFT) to thereby obtain a frequency spectrum, from which a frequency component of pulsating components of the terminal voltage across the DC motor 10 is calculated, and the amount of protraction or retraction of the seatbelt is calculated based upon the calculated frequency component and the rotational direction of the DC motor 10 detected based upon the sign of the voltage difference signal obtained by subtracting the voltage signal from the interface circuit IF4 from the voltage signal from the IF IF3 (i.e. terminal voltage across the DC motor 10) and having pulsating components thereof removed. As a result, the amount of protraction or retraction of the seatbelt can be detected with ease and with high accuracy.

The seatbelt protraction/retraction amount calculating processes of the twenty-first to twenty-third embodiments may be used in suitable combination to thereby calculate the amount of protraction or retraction of the seatbelt with more ease and higher accuracy.

Twenty-Fourth Embodiment

Figure 75:
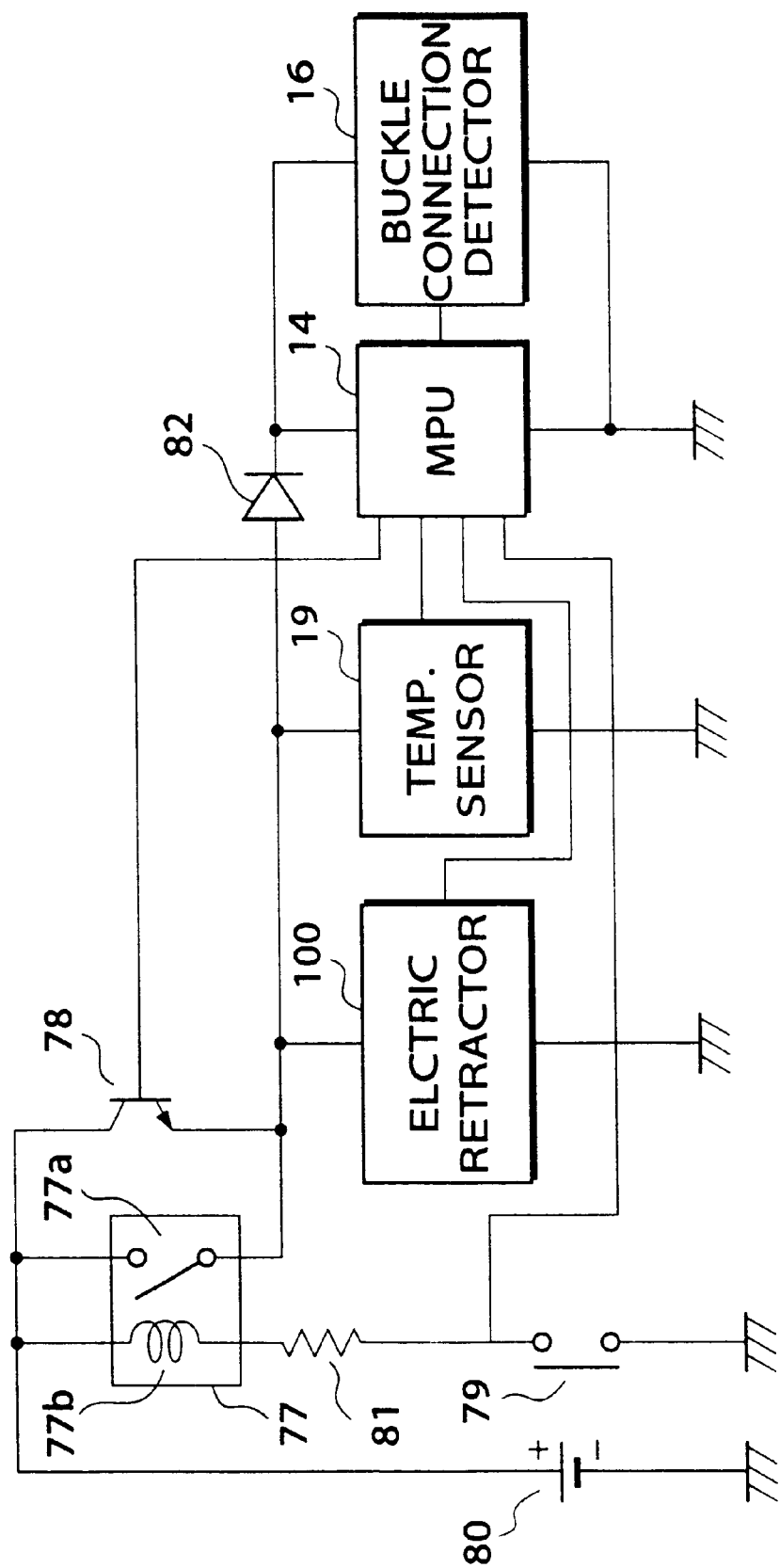
FIG. 75 is a circuit diagram showing the construction of an automotive passenger restraint and protection apparatus according to a twenty-fourth embodiment of the invention.

FIG. 75 shows the construction of an automotive passenger restraint and protection apparatus according to a twenty-fourth embodiment of the invention. The apparatus according to the present embodiment is provided with the electric retractor 100 as employed in the first embodiment.

Connected to a supply voltage input terminal of the electric retractor 100 are one of contacts 77a of a relay 77, an emitter of a transistor 78, a supply voltage input terminal of the temperature sensor 19 which detects temperature in the vicinity of the DC motor 10 or the temperature of the DC motor 10 itself, and an anode of a diode 82.

The other contact of the relay 77, one end of a coil 77b of the relay 77, and a collector of the transistor 78 are connected to a positive terminal of a battery 80, with the other end of the coil 77b of the relay 77 being connected to one end of a resistance 81.

The other end of the resistance 81 is connected to one end of an ignition switch 79 for starting the engine of the vehicle, with the other end of the ignition switch 79 being grounded. A negative terminal of the battery 80 is grounded.

The diode 82 has a cathode thereof connected to the MPU 14 as well as to the buckle connector detector 16.

Connected to the MPU 14 are the electric retractor 100, buckle connection detector 16, temperature sensor 19, ignition switch 79, and a base of the transistor 78 such that the MPU 14 monitors and controls the electric retractor 100, temperature sensor 19, ignition switch 79 and transistor 78.

The electric retractor 100 may be replaced by any other electric retractor such as the electric retractor 300 in FIG. 14.

The control operation of the automotive passenger restraint and protection apparatus according to the present embodiment constructed as above will now be described with reference to FIG. 75.

First, when the ignition switch 79 is off, no current flows from the battery 80 to the coil 77b of the relay 77 with the contacts 77a being open, whereby no supply voltage is delivered from the battery 80 to the electric retractor 100, MPU 14, and buckle connection detector 16.

Thereafter, when the ignition switch 79 is turned on, current flows from the battery 80 to the coil 77b of the relay 77 to close the contacts 77a, whereby supply voltage is delivered from the battery 80 to the electric retractor 100, MPU 14, and buckle connection detector 16. Then, the MPU 14 detects voltage applied to the ignition switch 79 to thereby monitor on and off states of the ignition switch 79.

The temperature sensor 19 delivers a signal indicative of the detected temperature in the vicinity of the DC motor 10 or the temperature of the DC motor 10 itself to the MPU 14, and the buckle connection detector 16 detects whether the seatbelt tongue has been attached to the buckle or released from the buckle, and delivers a signal indicative of results of the detection to the MPU 14.

Upon receiving a signal indicating that the seatbelt tongue has been released from the buckle, the MPU 14 delivers a control signal to the DC motor driver 11 so as to apply supply voltage V which is expressed by the following formula (11) to the DC motor 11 over a predetermined time period (e.g. 3 sec):

$$V = VB - k \times T \times r \quad (11)$$

where VB represents the output voltage from the battery 80 (initial value=12 volts), k a control coefficient (e.g. 2.7), T time elapsed after release from the buckle, and r a temperature coefficient.

Figure 76:
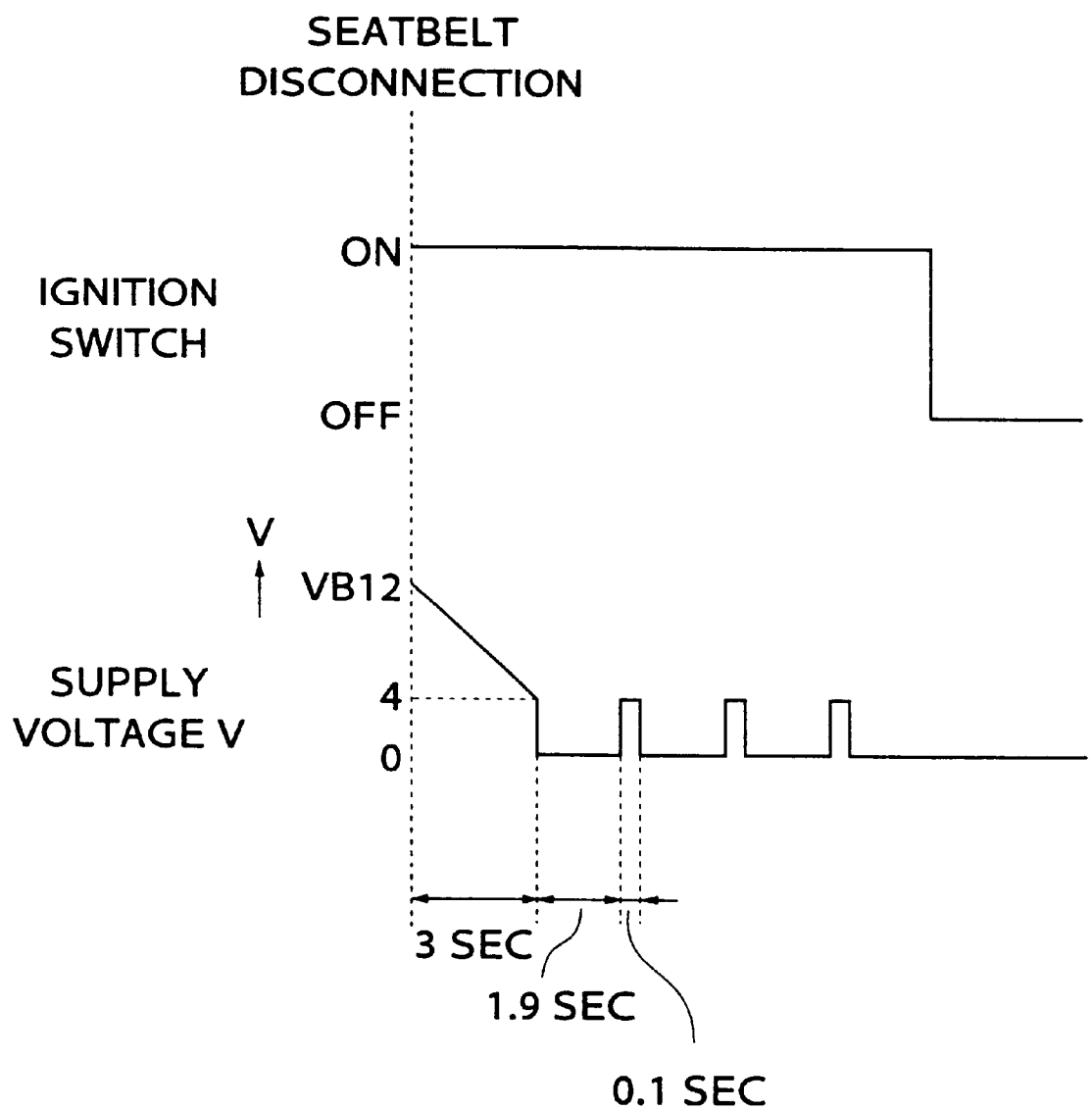
FIG. 76 is a timing chart showing the relationship between ON/OFF states of an ignition switch 79 and supply voltage supplied to the DC motor 10 after release of a tongue of the seatbelt from a buckle.

FIG. 76 is a timing chart showing the relationship between ON/OFF states of the ignition switch 79 and supply voltage supplied to the DC motor 10 after release of the seatbelt tongue from the buckle. As is learned from the formula (11), the supply voltage V is progressively decreased as time elapses after release of the seatbelt tongue from the buckle, as shown in FIG. 76.

Thereafter, the MPU 14 delivers to the DC motor driver 11 a control signal having a cycle of 2 seconds, for example, in such a manner as to inhibit the supply voltage V from being applied to the DC motor 10 for a predetermined time period (e.g. 1.9 sec), and upon the lapse of the predetermined time period, allow supply voltage V of 4 volts to be applied to the DC motor 10 for a predetermined time period (e.g. 0.1 sec), and then again inhibit the supply voltage V from being applied to the DC motor for the above-mentioned predetermined time period (e.g. 1.9 sec). The delivery of the control signal is continued until the ignition switch 79 is turned off. By this control, the supply voltage V applied to the DC motor 10 changes as shown in FIG. 76, in such a manner that first the supply voltage V is 0 volts for 1.9 seconds, then rises to and is held at 4 volts for 0.1 seconds, and again drops to and is held at 0 volts for 1.9 seconds. In this way, the supply voltage is applied to the DC motor 10 in a manner changing in a cycle of 2 seconds, for example.

According to the above described control by the MPU 14, the seatbelt is slowly retracted, to eliminate the disadvantage with the conventional apparatus that since supply voltage of a predetermined value continues to be applied to the DC motor 10, in storing the seatbelt, the seatbelt is suddenly retracted by the DC motor 10 such that the seatbelt tongue can be hit against the side window pane.

Next, when the ignition switch 79 is turned off, supply of current from the battery 80 to the coil 77b of the relay 77 is stopped, whereby the contacts 77a of the relay 77 are opened with a time lag of 10 ms, for example, and accordingly the delivery of supply voltage from the battery 80 to the electric retractor 100, MPU 14, and buckle connection detector 16 is stopped.

As described above, according to the present embodiment, the MPU 14 controls the application of the supply voltage to the DC motor 10 in such a cyclic manner that the supply voltage V is progressively decreased from a rate value of 12 volts, for example, for a first predetermined time period (e.g. 3 seconds) as time elapses after release of the seatbelt tongue from the buckle, then is decreased to and held at a predetermined low level (e.g. 0 volts) for a second predetermined time period (e.g. 1.9 seconds), and then increased to and held at a predetermined high level (e.g. 4 volts) for a third predetermined time period (e.g. 0.1 seconds), and thereafter the same cyclic control of the supply voltage is repeated with a cycle of 2 seconds, for example. As a result, the seatbelt can be slowly brought into a retracted position, while eliminating the above-mentioned disadvantage with the conventional apparatus.

Twenty-Fifth Embodiment

An automotive passenger restraint and protection apparatus according to a twenty-fifth embodiment is identical in construction with the apparatus according to the above described twenty-fourth embodiment, description of which is therefore omitted.

The present embodiment is distinguished from the twenty-fourth embodiment in the manner of control executed by the MPU 14 in supplying the supply voltage to the electric retractor 100.

The control operation of the present embodiment will now be described only with respect to those which are different from the manner of control of the twenty-fourth embodiment.

Upon receiving a signal indicating that the seatbelt tongue has been released from the buckle, the MPU 14 delivers an ON/OFF control signal having a reference frequency of 20 kHz and a duty factor D expressed by the following formula (12) to the DC motor driver 11 over a predetermined time period (e.g. 3 sec) so as to apply a predetermined supply voltage V to the DC motor 11:

$$D = 100 - a \times T \times r \qquad (12)$$

where a represent a control coefficient (e.g. 23.3).

Thus, the predetermined supply voltage is applied to the DC motor in an on-off manner with a frequency corresponding to the duty factor determined by the above formula (12).

Figure 77:
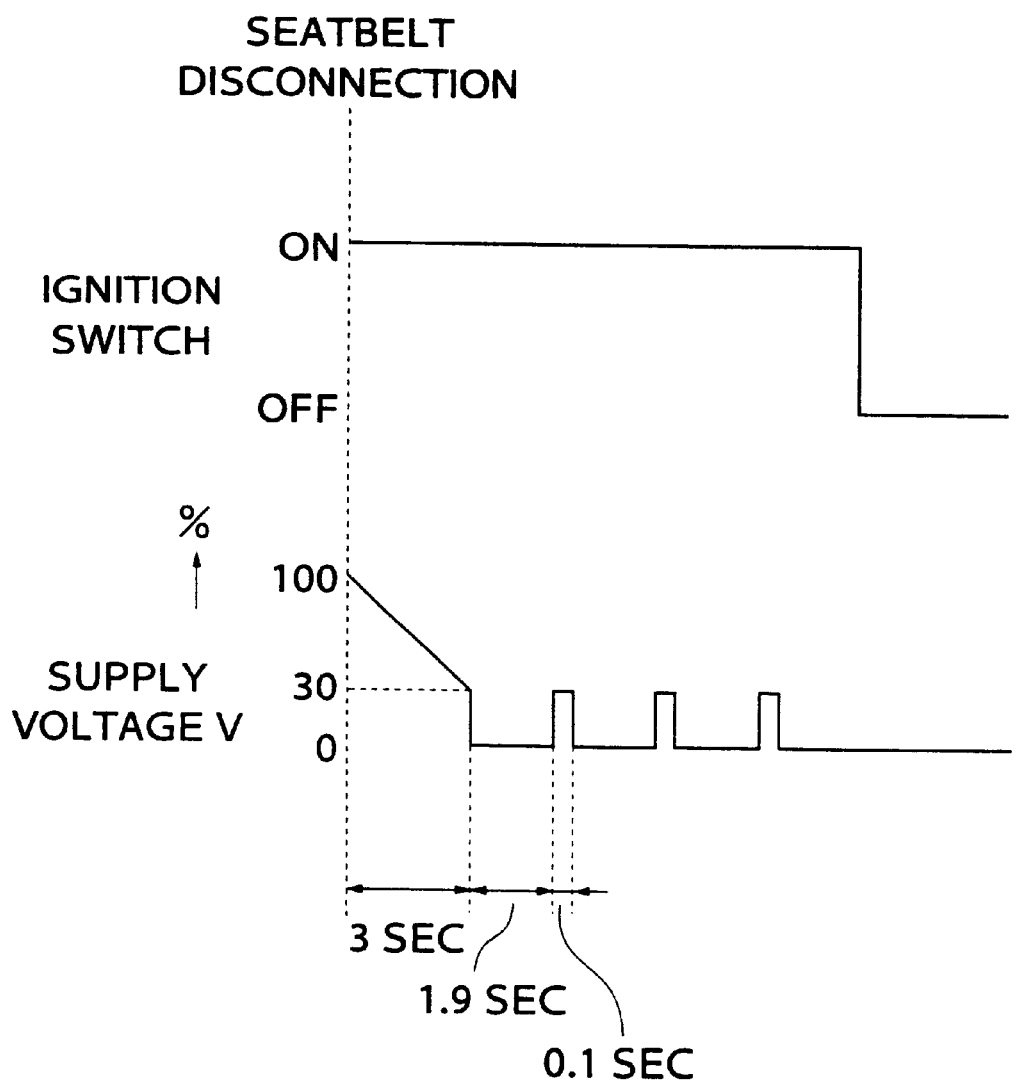
FIG. 77 is a timing chart showing the relationship between ON/OFF states of the ignition switch 79 and the duty factor of a control signal delivered to the DC motor driver 11 after release of the seatbelt tongue from the buckle.
Figure 77A:
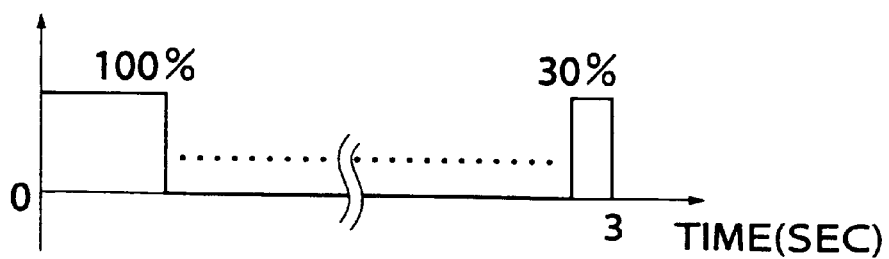
FIG. 77A is a graph showing a change in the duty factor of the control signal supplied to the DC motor driver 11 after release of the seatbelt tongue from the buckle to the time 3 seconds elapses.

FIG. 77 is a timing chart showing the relationship between ON/OFF states of the ignition switch 79 and the duty factor of the ON-OFF control signal delivered to the DC motor driver 11 after release of the seatbelt tongue from the buckle, and FIG. 77A is a graph showing a change in the duty factor of the control signal supplied to the DC motor driver 11 after release of the seatbelt tongue from the buckle to the time the predetermined time period (3 sec) elapses.

As shown in FIG. 77A, the duty factor of the ON/OFF control signal delivered to the DC motor driver 11 is progressively decreased with elapsed time T after release of the seatbelt tongue from the buckle according to the formula (12).

Thereafter, as shown in FIG. 77, the MPU 14 sets and holds the duty factor to and at 0% for 1.9 seconds, and then sets and holds the duty factor to and at 30% for 0.1 seconds, followed by again setting and holding the duty factor to and at 0% for 1.9 seconds. In this way, the ON/OFF control signal is delivered to the DC motor driver 11 with the duty factor cyclically changing in a cycle of 2 seconds.

By the above control of the duty factor, supply voltage which gradually decreases in response to the ON-OFF control signal having a duty factor progressively decreased from 100% to 30% with the lapse of time for a first predetermined time period (3 sec) after release of the seatbelt from the buckle, and then, no supply voltage is applied to the DC motor 10 for a second predetermined time period (1.9 seconds), then the supply voltage is applied to the DC motor 10 at a voltage corresponding to the duty factor of 30% of the ON/OFF control signal for a third predetermined time period (0.1 seconds), and then again no supply voltage is applied to the DC motor 10 for the second predetermined time period (1.9 seconds), and thereafter the same cyclic control of the supply voltage is repeated.

According to the above described control by the MPU 14, the seatbelt is slowly retracted, so that the aforementioned disadvantage with the conventional apparatus can be eliminated.

As described above, according to the present embodiment, the MPU 14 controls the duty factor of the ON/OFF control signal delivered to the DC motor driver 11 in such a cyclic manner that the supply voltage V of a predetermined value is applied to the DC motor 10 in an on-off manner with a frequency corresponding to the duty factor of the control signal which is progressively decreased for a first predetermined time period (e.g. 3 seconds) as time elapses after release of the seatbelt tongue from the buckle, then set to and held at a predetermined low duty factor (e.g. 0%) for a second predetermined time period (e.g. 1.9 seconds), and then set to and held at a predetermined high duty ratio (e.g. 30%) for a third predetermined time period (e.g. 0.1 seconds), and thereafter the same cyclic control of the duty factor is repeated with a cycle of 2 seconds, for example. As a result, the seatbelt can be slowly brought into a retracted position, while eliminating the above-mentioned disadvantage with the conventional apparatus.

Twenty-Sixth Embodiment

An automotive passenger restraint and protection apparatus according to a twenty-sixth embodiment is identical in construction with the apparatus according to the above described twenty-fourth embodiment, description of which is therefore omitted.

The present embodiment is distinguished from the twenty-fourth embodiment in the timing of supplying the supply voltage to the electric retractor 100.

The control operation of the present embodiment will now be described only with respect to those which are different from the manner of control of the twenty-fourth embodiment.

In the present embodiment, even after turning-off of the ignition switch, supply of the supply voltage to the electric retractor, the DC motor driver 11, etc. is continued for a predetermined time period within which retraction of the seatbelt can be completed by the electric retractor, after release of the seatbelt from the buckle, to thereby carry out retraction of the seatbelt by the electric motor when the seatbelt is released from the occupant after turning-off of the ignition switch. This can prevent the seatbelt tongue from being caught in the door.

Simultaneously upon turning-off of the ignition switch 79, the MPU 14 delivers a high-level signal to the base of the transistor 78 to turn the same on, whereby supply voltage from the battery 80 is supplied via the transistor 78 to the electric retractor 100, MPU 14, buckle connection detector 16, and temperature sensor 17.

Then, upon receiving a signal indicating that the seatbelt tongue has been released from the buckle, the MPU 14 carries out the control of application of the supply voltage to the DC motor 10 in the same manner as described with respect to the twenty-fourth embodiment and with reference to FIG. 76, that is, by progressively decreasing the supply voltage applied to the DC motor for a predetermined time period (e.g. 3 seconds) after release of the seatbelt tongue from the buckle and then carrying out the above described cyclic control of the supply voltage applied to the DC motor 10.

When the predetermined time period within which the retraction of the seatbelt can be completed by the electric retractor 100 has elapsed after the MPU 14 delivered the high-level signal to the base of the transistor 78, the MPU 14 delivers a low-level signal to the base of the transistor 78 to turn the same off, whereby the supply of the supply voltage to the electric retractor 100, DC motor driver 11, etc. is stopped. Thus, the battery can be prevented from being wastefully consumed and deteriorated.

As described above, according to the present embodiment, also after the ignition switch is turned off, the supply voltage is delivered to the electric retractor, DC motor driver, etc. so that after release of the seatbelt from the occupant, the retraction of the seatbelt is carried out by the electric retractor to thereby prevent the seatbelt tongue from being caught in the door to be damaged. Further, on this occasion, the control of application of the supply voltage to the DC motor in the same manner as described with respect to the twenty-fourth embodiment by progressively decreasing the supply voltage applied to the DC motor for a predetermined time period after release of the seatbelt tongue from the buckle and then carrying out the cyclic control of the supply voltage applied to the DC motor, the same results as those obtained by the twenty-fourth embodiment as mentioned above can be obtained.

Twenty-Seventh Embodiment

An automotive passenger restraint and protection apparatus according to a twenty-seventh embodiment of the invention includes an electric retraction 2700 which is identical in construction with the electric retractor, description of which is therefore omitted.

The MPU 14 is required to detect whether the rotative driving of the DC motor 10 is stopped in order to ascertain that the seatbelt has been wound up and completely retracted in its proper retracted position as well as that the seatbelt has become fit to the occupant's body. Further, protracting of the seatbelt by the occupant is made against the bias force of the spiral spring provided inside the pulley 5 for the reel shaft which acts upon the seatbelt in the seatbelt retracting direction. The MPU 14 is also required to detect whether the rotative driving of the DC motor 10 is stopped in order to ascertain that the protracting of the seatbelt by the occupant is not being carried out.

As a manner of determining the stoppage of the DC motor 10, it is employed to detect whether the value of current flowing to the DC motor 10 exceeds a predetermined value, and determine that the rotative driving of the DC motor 10 is stopped if the detected current value exceeds the predetermined value.

Further, as a manner of more exactly determining the stoppage of the DC motor 10, it is employed to vary the above-mentioned predetermined value in response to environmental conditions under which the DC motor 10 is operated.

The contents of this manner will be described hereinbelow.

Figure 78:
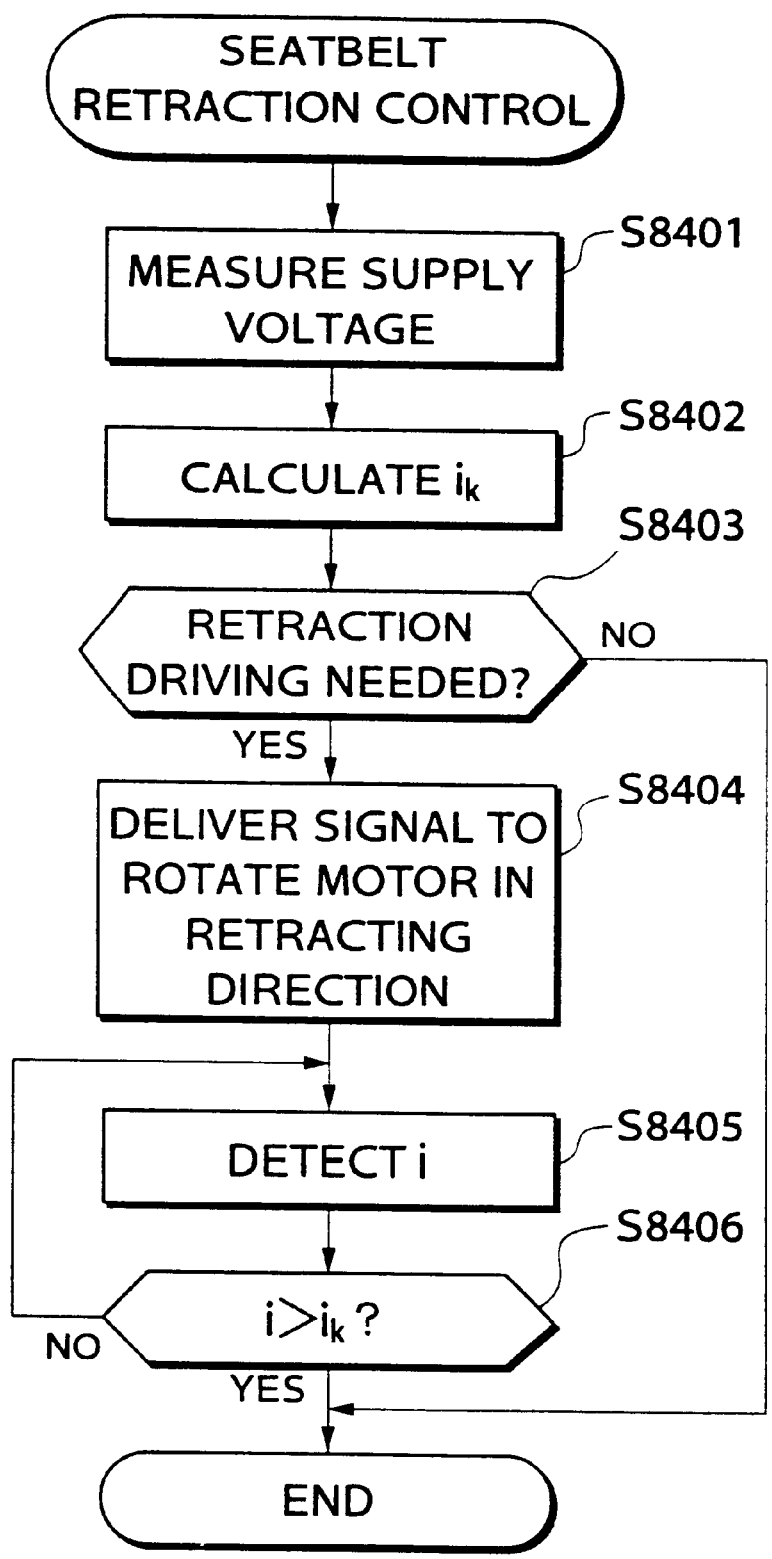
FIG. 78 is a flowchart showing seatbelt retraction control executed by the MPU 14 according to a twenty-seventh embodiment of the invention.

FIG. 78 is a flowchart showing seatbelt retraction control executed by the MPU 14 according to the present embodiment.

First, when the DC motor 10 is not rotatively driven, that is, neither protraction of the seatbelt nor retraction of the same is being carried out, supply voltage applied to the DC motor 10 is measured at a step S8401, and then, based upon the measured supply voltage, a value ik of current that should flow to the DC motor 10 when the DC motor 10 has been stopped is calculated at a step S8402. The current value ik is used as a threshold value for determining whether the DC motor 10 has shifted from a rotatively driven state to a stopped state. A reference value of the supply voltage to be applied to the DC motor 10 and a reference value of the threshold current value ik are stored in a memory within the MPU 14. If the supply voltage measured at the step S8401 is higher than the reference value of the supply voltage, the threshold current value ik is calculated to a value larger than the reference value thereof, whereas if the supply voltage measured at the step S8401 is lower than the reference value of the supply voltage, the threshold current value ik is calculated to a value smaller than the reference value thereof.

Then, it is determined at a step S8403 whether driving of the DC motor 10 for retracting the seatbelt is required. If the driving is not required, the present processing is immediately terminated, whereas if the driving is required, a control signal is delivered to the DC motor driver 11 to rotate the reel shaft 3 in the seatbelt retracting direction at a step S8404, whereby the seatbelt is retracted.

Then, current i flowing to the DC motor 10 is detected from current flowing through the resistance r1 by the current detecting circuit C1 at a step S8405, and then it is determined at a step S8406 whether the detected current i is larger than the threshold current value ik. If the detected current i exceeds the threshold current value ik, that is, if the seatbelt has not been retracted to its limit and has not become completely fit to the occupant's body and accordingly the DC motor 10 has not shifted from a rotatively driven state to a stopped state, the processing returns to the step S8405, whereas if the detected current i exceeds the threshold current value ik, that is, if the seatbelt has been retracted to its limit and has become completely fit to the occupant's body and accordingly the DC motor 10 has shifted from a rotatively driven state to a stopped state, the present processing is terminated.

As described above, according to the present embodiment, even when the supply voltage applied to the DC motor 10 varies due to environmental conditions under which the DC motor 10 is operated, the supply voltage is measured (step S8401). Based upon the measured supply voltage, the threshold current value ik for determining whether the DC motor 10 has shifted from a rotatively driven state to a stopped state is calculated (step S8402), and thereafter, it is determined whether the current i flowing to the DC motor 10 is larger than the calculated threshold current value ik. Since the threshold current value ik is set based upon the supply voltage detected when the DC motor is not rotatively driven, the determination as to whether the DC motor is actually stopped can be made with accuracy irrespective of environmental conditions under which the DC motor is operated. The threshold current value ik may be set based upon the ambient temperature in the vicinity of the DC motor or the temperature of the DC motor itself instead of or together with the supply voltage.

Twenty-Eighth Embodiment

An automotive passenger restraint and protection apparatus according to a twenty-eighth embodiment of the invention includes an electric retractor which is identical in construction with the electric retractor 100, description of which is therefore omitted.

Figure 79:
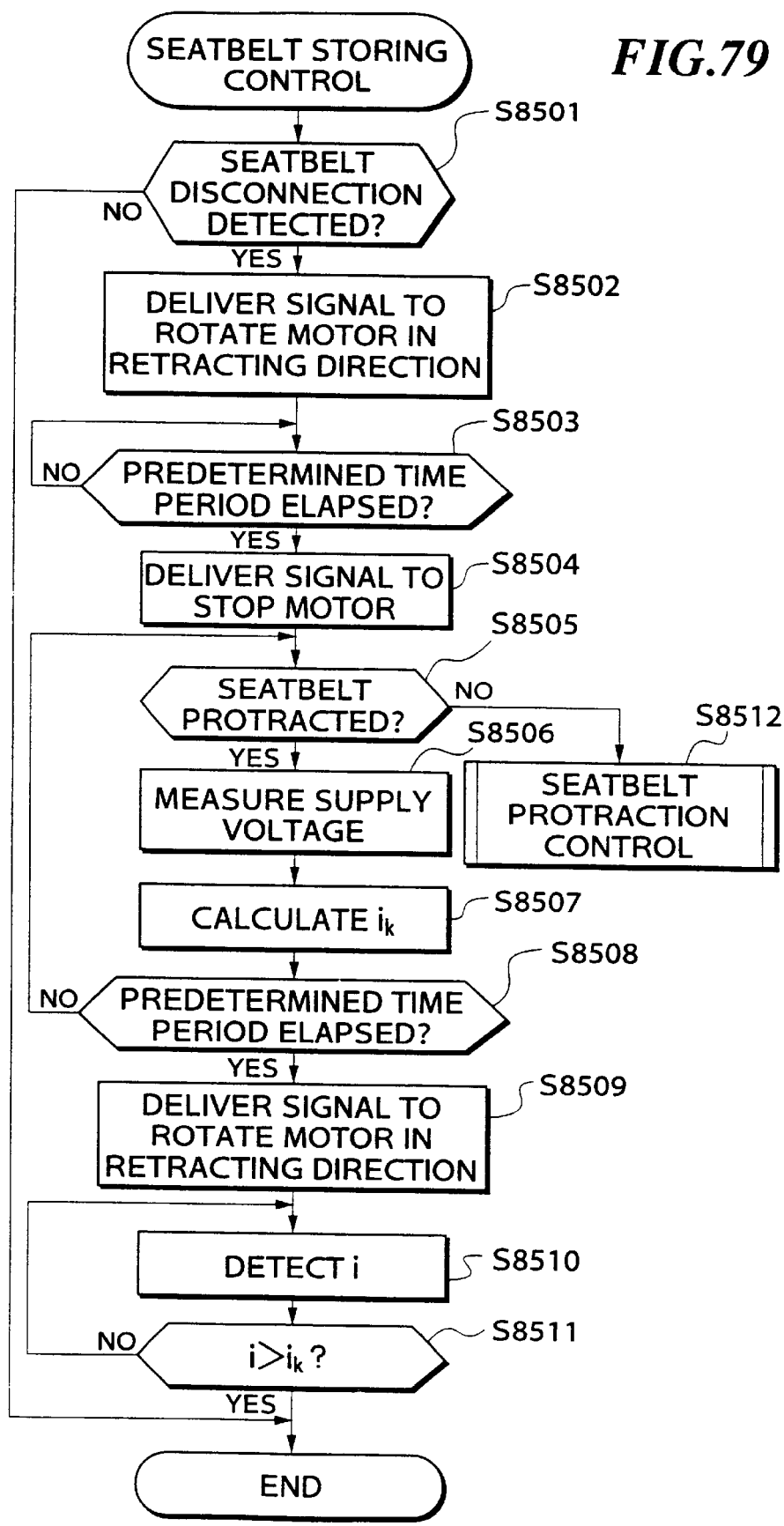
FIG. 79 is a flowchart showing seatbelt storing control executed by the MPU 14 in retracting the seatbelt, according to a twenty-eighth embodiment of the invention.

FIG. 79 is a flowchart showing seatbelt storing control executed by the MPU 14 in retracting the seatbelt, according to the present embodiment.

First, it is determined at a step S8501 whether attaching of the seatbelt tongue to the buckle has been detected by the buckle connection detector 16. If attaching of the seatbelt has not been detected, the present processing is immediately terminated, whereas if attaching of the seatbelt has been detected, a control signal is delivered to the DC motor driver 11 to rotate the DC motor 10 so as to cause rotation of the reel shaft 3 in the seatbelt retracting direction at a step S8502, whereby the seatbelt is retracted. On this occasion, the timer 21 measures time elapsed after the control signal starts to be delivered to the DC motor driver 11.

Then, it is determined at a step S8503 whether a predetermined time period (e.g. 3 sec) has elapsed after the control signal started to be delivered to the DC motor driver 11. If the predetermined time period has elapsed, a control signal is delivered to the DC motor driver 11 to stop the driving of the DC motor 10, whereby the DC motor 10 is stopped to stop the retraction of the seatbelt by the reel shaft 3 in the seatbelt retracting direction. It is assumed that on this occasion the seatbelt is not locked by the seatbelt locking mechanism 2. Further, on this occasion, the timer 21 measures time elapsed after the control signal for stopping the driving of the DC motor 10 starts to be delivered to the DC motor driver 11.

Then, it is determined at a step S8505 whether protraction of the seatbelt has been made. If protraction of the seatbelt has not been made, the seatbelt protraction control of FIGS. 21 and 22, described before, is executed, followed by terminating the present processing.

If protraction of the seatbelt has not been made, the supply voltage applied to the DC motor 10 is measured at a step S8506. Then, based upon the measured supply voltage, the threshold current value ik is calculated at a step S8507. Then, it is determined at a step S8508 whether a predetermined time period (e.g. 10 sec) has elapsed after the control signal for stopping the driving of the DC motor 10 started to be delivered to the DC motor driver 11. If the predetermined time period has not elapsed, the processing returns to the step S8505, whereas if it has elapsed, a control signal is delivered to the DC motor driver 11 to again drive the DC motor 10 to cause rotation of the reel shaft 3 in the seatbelt retracting direction at a step S8509, whereby the seatbelt is retracted.

Then, the current i flowing to the DC motor 10 is detected from current flowing through the resistance r1 by the current detecting circuit C1 at a step S8510, and then it is determined at a step S8511 whether the detected current i is larger than the threshold current value ik. If the detected current i is below the threshold current value ik, that is, if the seatbelt has not been retracted to its limit and has not completely become fit to the occupant's body so that the DC motor 10 has not shifted from a rotatively driven state to a stopped state, the processing returns to the step S8510, whereas if the detected current i exceeds the threshold current value ik, that is, if the DC motor 10 has shifted from the rotatively driven state to a stopped state, the present processing is terminated.

As described above, according to the present embodiment, even when the supply voltage applied to the DC motor 10 varies due to environmental conditions under which the DC motor 10 is operated, the supply voltage is measured (step S8506), and based upon the measured supply voltage, the threshold current value ik for determining whether the DC motor 10 has shifted from a rotatively driven state to a stopped state is calculated(step S8507), and thereafter, it is determined whether the current i flowing to the DC motor 10 is larger than the calculated threshold current value ik. Since the threshold current value ik is set based upon the supply voltage detected when the DC motor is not rotatively driven, the determination as to whether the DC motor is actually stopped can be made with accuracy irrespective of environmental conditions under which the DC motor is operated. The threshold current value ik may be set based upon the ambient temperature in the vicinity of the DC motor or the temperature of the DC motor itself instead of or together with the supply voltage.

Twenty-Ninth Embodiment

An automotive passenger restraint and protection apparatus according to a twenty-ninth embodiment of the invention includes an electric retractor which is identical in construction with the electric retractor, description of which is therefore-omitted.

Figure 80:
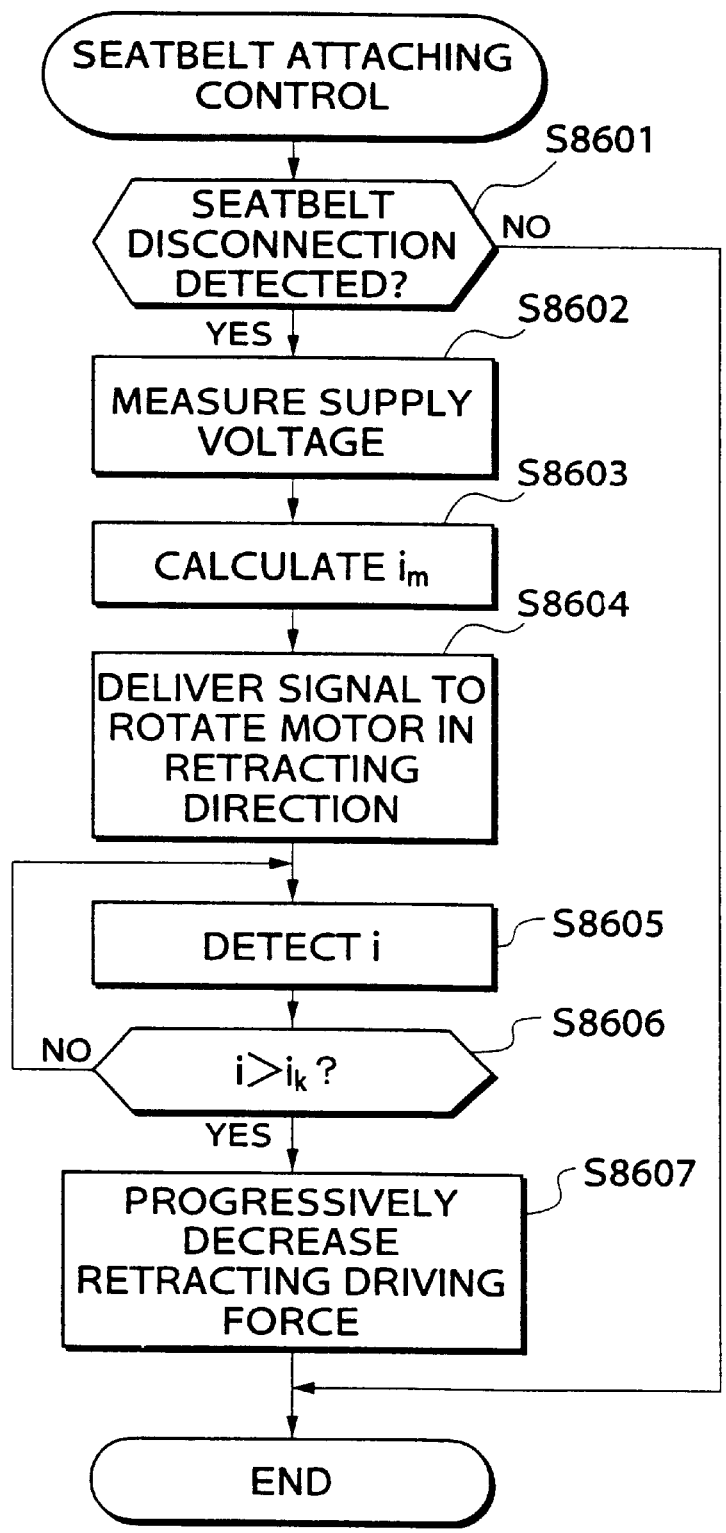
FIG. 80 is a flowchart showing seatbelt retraction control executed by the MPU 14 in attaching the seatbelt, according to a twenty-ninth embodiment of the invention.

FIG. 80 is a flowchart showing seatbelt retraction control executed by the MPU 14 in attaching the seatbelt, according to the present embodiment.

First, it is determined at a step S8601 whether attaching of the seatbelt tongue to the buckle has been detected by the buckle connection detector 16. If attaching of the seatbelt has not been detected, the present processing is immediately terminated, whereas if attaching of the seatbelt has been detected, the supply voltage applied to the DC motor 10 is measured at a step S8602, and based upon the measured supply voltage, a threshold current value im for determining whether the driving force of the reel shaft 3 for retracting the seatbelt is to be progressively decreased from a rotatively driven state is calculated at a step S8603. A reference value of the threshold current value im as well as the reference value of the supply voltage to be applied to the DC motor 10 are stored in the memory within the MPU 14. If the supply voltage measured at the step S8602 is higher than the reference value of the supply voltage, the threshold current value im is calculated to a value larger than the reference value thereof, whereas if the supply voltage measured at the step S8602 is lower than the reference value of the supply voltage, the threshold current value im is calculated to a value smaller than the reference value thereof.

Then, a control signal is delivered to the DC motor driver 11 to drive the DC motor 10 to cause rotation of the reel shaft 3 at a predetermined rotational speed in the seatbelt retracting direction at a step S8604, whereby the seatbelt is retracted so that the urging force that the occupant receives from the seatbelt progressively increases and accordingly the seatbelt retracting speed of the reel shaft 3 progressively decreases.

Then, the current i flowing to the DC motor 10 is detected from current flowing through the resistance r1 by the current detecting circuit C1 at a step S8605, and then it is determined at a step S8606 whether the detected current i is larger than the threshold current value im. If the detected current i is below the threshold current value im, the processing returns to the step S8605, whereas if the detected current i exceeds the threshold current value im, a control signal is delivered to the DC motor driver 11 to further decrease the rotational speed of the reel shaft 3 in the seatbelt retracting direction so as to progressively decrease the driving force of the reel shaft 3 for retracting the seatbelt at a step S8607, followed by terminating the present processing.

As described above, according to the present embodiment, even when the supply voltage applied to the DC motor 10 varies due to environmental conditions under which the DC motor 10 is operated, the supply voltage is measured (step S8602). Based upon the measured supply voltage, the threshold current value im for determining whether the driving force of the reel shaft 3 for retracting the seatbelt is to be progressively decreased from a current value is calculated (step S8603). and thereafter, it is determined whether the current i actually flowing to the DC motor 10 is larger than the calculated threshold current value im. Since the threshold current value im is set based upon the supply voltage detected when the DC motor is not rotatively driven, the determination as to whether the DC motor is actually stopped can be made with accuracy irrespective of environmental conditions under which the DC motor is operated. The threshold current value im may be set based upon the ambient temperature in the vicinity of the DC motor or the temperature of the DC motor itself instead of or together with the supply voltage.

Although in the twenty-seventh to twenty-ninth embodiments described above, the current i flowing through the resistance r1 is detected from current flowing through the resistance r1, this is not limitative, but any other suitable method may be used to detect the current i.

Thirtieth Embodiment

An automotive passenger restraint and protection apparatus according to a thirtieth embodiment of the invention includes an electric retractor 3000 which is an improved version of the electric retractor 100 and includes each one pair of reel shaft pulleys, motor pulleys, power transmission belts, DC motors, and DC motor drivers.

Figure 81:
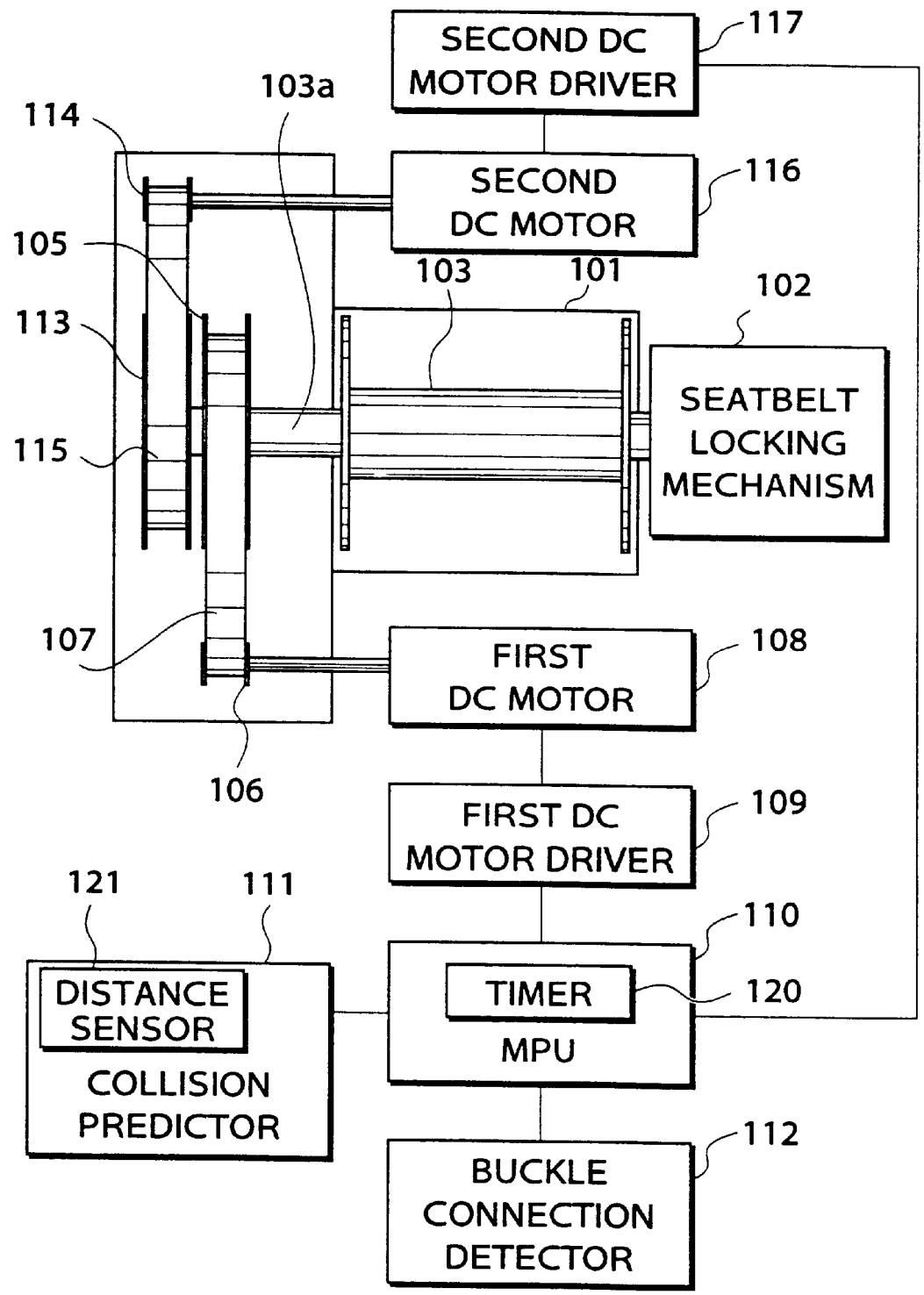
FIG. 81 is a block diagram showing the arrangement of an electric retractor 3000 provided in an automotive passenger restraint and protection apparatus according to a thirtieth embodiment of the invention.

FIG. 81 shows the arrangement of the electric retractor 3000.

The seatbelt retractor 3000 has a frame 101 in which is rotatably mounted a reel shaft (takeup shaft) 103 for retracting and protracting a seatbelt. Secured to an end of the reel shaft 103 is a known seatbelt locking mechanism 102 which is adapted to lock or stop the seatbelt from being protracted when a predetermined or higher degree of deceleration is applied to an automotive vehicle in which the present apparatus is installed or when the seatbelt is protracted at a predetermined or higher degree of acceleration.

The reel shaft 103 has a central shaft 103a coupled to a central shaft of a first reel shaft pulley 105 and a central shaft of a second reel shaft pulley 113. The first reel shaft pulley 105 is coupled to a first DC motor pulley 106 via a first power transmission belt 107. The second reel shaft pulley 113 is coupled to a second DC motor pulley 114 via a second power transmission belt 115.

The first reel shaft pulley 105 and the first DC motor pulley 106 each have an outer periphery thereof formed with a predetermined number of outer teeth, while the first power transmission belt 107 has an inner periphery thereof formed with a predetermined number of inner teeth which are in mesh with the outer teeth of the first reel shaft pulley 105 and the first DC motor pulley 106.

Similarly, the second reel shaft pulley 113 and the second DC motor pulley 114 each have an outer periphery thereof formed with a predetermined number of outer teeth, while the second power transmission belt 115 has an inner periphery thereof formed with a predetermined number of inner teeth which are in mesh with the outer teeth of the second reel shaft pulley 113 and the second DC motor pulley 115.

The first DC motor pulley 106 has a central shaft thereof coupled to a first DC motor 108, and the second DC motor pulley 114 has a central shaft thereof coupled to a second DC motor 116 such that the rotation of the first DC motor 108 is transmitted to the reel shaft 103 via the first DC motor pulley 106, and the rotation of the second DC motor 116 is transmitted to the reel shaft 103 via the second DC motor pulley 114.

The first and second DC motors 108, 116 are each fixed to the frame 101 at at least two points, and are connected to an MPU (Micro Processing Unit) 110 via respective first and second DC motor drivers 109, 117. The first and second DC motor drivers 109, 117 control the first and second DC motors 108, 116, respectively, based upon PWM signals from the MPU 110.

The first and second DC motor drivers 109, 117 both have a construction which is identical with the construction of the DC motor driver 11 shown in FIG. 2, description of which is therefore omitted.

The MPU 110 has a built-in timer 120 for measuring time. Connected to the MPU 110 are a buckle connection detector 162 which detects whether the seatbelt has been attached to the buckle or disconnected therefrom and delivers a signal indicative of results of the detection to the MPU 110, and a collision predictor 111 which predicts a possible collision of the vehicle.

The collision predictor 111 has a distance sensor 121 provided therein, which detects the distance between the present automotive vehicle and an object lying ahead of the vehicle, and delivers a signal indicative of the detected distance to the collision predictor 111. The collision predictor 111 calculates a collision unavoidableness distance dd (m) by the use of the following formula (14), and when the calculated distance dd is larger than the distance indicated by the signal from the collision sensor 121, the collision predictor 111 delivers a signal indicative of a collision being unavoidable to the MPU 110:

$$dd = Vr \times td \tag{14}$$

where Vr represents relative speed (m/sec), and td response delay of the driver e.g. 0.5 to 2 sec).

Next, control processing executed by the MPU 110 will be described.

First, when the first DC motor 108 is energized or rotatively driven while the second DC motor 116 is kept deenergized in a non-driven state, the reel shaft 103 is rotated by the rotating first DC motor 108 and the second DC motor 116 is caused to rotate in unison with the rotation of the reel shaft 103. On this occasion, since the gear ratio between the first reel shaft pulley 105 and the first DC motor pulley 106 is set to the same value as the gear ratio between the second reel shaft pulley 113 and the second DC motor pulley 114. the rotational speed of the first DC motor 108 which is rotatively driven is the same as the second DC motor 116 which is not energized for rotation.

While the first DC motor 108 is energized to be rotatively driven and the second DC motor 116 is not energized for rotation but merely rotated in unison with the rotation of the reel shaft 103, if the seatbelt is protracted by the occupant, the MPU 110 compares the DC motor terminal voltage or pulsating components contained therein between the first DC motor 108 and the second DC motor 116, and if the compared terminal voltage or pulsating components are equal between the first and second DC motors, the MPU 110 determines that the electric retractor 3000 is normal, but if they are not equal, the MPU 110 determines that there is an abnormality in the electric retractor 3000. The gear ratio between the first reel shaft pulley 105 and the first DC motor pulley 106 may be set to a different value from the gear ratio between the second reel shaft pulley 113 and the second DC motor pulley 114. In this case, by using a correction coefficient or the like dependent upon the difference in gear ratio, the same fault diagnosis as above can be carried out.

Alternatively, it may be determined that a driving system associated with the first DC motor 108 is abnormal if the terminal voltage across the first DC motor 108 or current flowing to the first DC motor 108 is below a predetermined value (e.g. 5 volts or 3 amperes) even when a PWM signal is delivered from the MPU 110 to the first DC motor driver 109. A driving system associated with the second DC motor 116 may be diagnosed as to abnormality in a similar manner to the above.

Further alternatively, a PWM signal may be delivered to the first DC motor driver 109 to rotatively drive the first DC motor 108 with a predetermined driving force, and it may be determined whether the terminal voltage across the second DC motor 116 which is then not energized or rotatively driven or pulsating components therein show a value corresponding to the predetermined driving force, to thereby determine abnormality based upon results of the determination. In addition to this fault diagnosis, conversely the first DC motor 108 may be kept deenergized in a non-driven state and the second DC motor 116 energized to be rotatively driven, and then the same determination as above may be carried out, to thereby achieve fault diagnosis with higher reliability.

Next, when the signal indicative of collision unavoidableness is delivered from the collision predictor 111 to the MPU 110, the MPU 110 delivers a PWM signal to both of the first and second DC motor drivers 109, 117 to rotatively drive the first and second DC motors 108, 116 to retract the seatbelt with a large retracting force.

Assuming that the maximum value of the driving force for retracting the seatbelt that is required when the signal indicative of a collision being unavoidable from the collision predictor 111 is received by the MPU 110 is 100, the maximum value of the driving force of each of the first and second DC motors may set to 70. Then, the maximum value of the combined driving force of the first and second DC motors 108 and 116 exceeds 100, and therefore, then the respective driving forces of the first and second DC motors 108, 116 have only to be adjusted so that the maximum value of the combined driving force becomes equal to 100. The first and second DC motors 108, 116 can be designed compact in size and light in weight and manufactured at a low cost.

Further, for example, if the first DC motor 108 has a degraded driving force due to aging change or the like, the ratio of driving force between the first and second DC motors 108, 116 may be changed by adjusting the pulse width of at least one of PWM signals delivered to the respective DC motor drivers 109, 117 by the MPU 110 so that the ratio of driving force of the second DC motor 116 is larger than that of the first DC motor 108, whereby the driving force of the first DC motor 108 can be utilized to the fullest extent. For example, if the maximum value of driving force of the first DC motor 108 has decreased to 30, the driving force of the second DC motor 116 is set to the maximum value of 70 when the signal indicative of a collision being unavoidable from the collision predictor 111 is received, to thereby enable securing a driving force required for retracting the seatbelt.

As described above, according to the present embodiment, when the driving force of the first DC motor 108 has a degraded driving force, for example, the ratio of driving force between the first and second DC motors 108, 116 by adjusting the pulse width of at least one of PWM signals for the first and second DC motors delivered to the respective DC motor drivers by the MPU 110 such that the ratio of driving force of the second DC motor 116 becomes larger, to thereby enable utilizing the driving force of the first DC motor 108 to the fullest extent and hence fully exhibiting the driving force for retracting the seatbelt that is possessed by the first and second DC motors.

When the driving force of the first DC motor 108 alone, for example, is sufficient to retract the seatbelt, the second DC motor 116 may be kept from being driven but used as a sensor for sensing the amount of protraction or retraction of the seatbelt.

What is claimed is:

1. An automotive passenger restraint and protection apparatus for an automotive vehicle, having a seatbelt, for restraining an occupant of the automotive vehicle by the seatbelt to protect the occupant, comprising:

an electric retractor having driving means, which comprises a DC motor, for retracting and protracting the seatbelt;

control means for controlling said driving means; and detecting means for detecting protraction of the seatbelt by the occupant based upon terminal voltage across the DC motor;

wherein when the protraction of said seatbelt is detected by said detecting means, said control means controls said driving means so as to protract the seatbelt.

2. An automotive passenger restraint and protection apparatus as claimed in claim 1, further comprising a power supply, and supply means for supplying supply voltage from said power supply to said driving means, and wherein said control means controls a driving operation of said driving means by controlling a magnitude of said supply voltage or a degree of modulation of pulse width thereof.

3. An automotive passenger restraint and protection apparatus as claimed in claim 1, including seatbelt locking means for locking the seatbelt from being protracted when the seatbelt is protracted at a predetermined or high degree of acceleration, and wherein said control means controls said driving means to thereby control speed of protraction or retraction of the seatbelt at least one of conditions is satisfied that said driving means stops retracting driving of the seatbelt, said driving means starts protracting driving of the seatbelt from a stopped state of the seatbelt, and said driving means shifts from the retracting driving of the seatbelt to protracting driving of the seatbelt.

4. An automotive passenger restraint and protection apparatus as claimed in claim 1, including seatbelt locking means for locking the seatbelt from being protracted when the seatbelt is at a predetermined or high degree of acceleration, and wherein when the seatbelt is locked from being protracted by said seatbelt locking means, said control means controls said driving means to retract the seatbelt to a limit thereof and then protract the seatbelt for a predetermined time period.

5. An automotive passenger restraint and protection apparatus as claimed in claim 4, wherein when the seatbelt has been retracted to said limit thereof by said driving means, said control means controls said driving means to protract the seatbelt by a first predetermined amount and then again retract the seatbelt by a second predetermined amount smaller than said first predetermined amount.

6. An automotive passenger restraint and protection apparatus as claimed in claim 4, including acceleration detecting means for detecting acceleration of protraction of the seatbelt when the seatbelt is protracted, and abnormality diagnosis means for carrying out diagnosis as to abnormality of said seatbelt locking means by making a determination as to whether said seatbelt locking means has operated in response to the acceleration detected by said acceleration detecting means, and determining abnormality of said seatbelt locking means, based upon results of said determination.

7. An automotive passenger restraint and protection apparatus for an automotive vehicle, having a seatbelt, for restraining an occupant of the automotive vehicle by the seatbelt to protect the occupant, comprising:

an electric retractor having driving means for retracting and protracting the seatbelt;

control means for controlling said driving means;

seatbelt attaching detecting means for detecting whether the seatbelt is attached to the occupant or disconnected from the occupant; and retraction limit detecting means for detecting whether the seatbelt has been retracted to a limit thereof;

wherein said control means controls said driving means in a manner such that when said seatbelt attaching detecting means detects that the seatbelt has become attached to the occupant from a state in which it is disconnected from the occupant, the seatbelt is retracted, and when said retraction limit detecting means subsequently detects that the seatbelt has been retracted to said limit thereof, the seatbelt is stopped from being retracted, and then the seatbelt is protracted for a predetermined time period.

8. An automotive passenger restraint and protection apparatus for an automotive vehicle, having a seatbelt, for restraining an occupant of the automotive vehicle by the seatbelt to protect the occupant, comprising:

a reel shaft having the seatbelt wound thereon;

a motor for rotating said reel shaft in a direction of protracting or retracting the seatbelt;

change amount detecting means-for detecting an amount of change in at least one of terminal voltage across said motor and current flowing to said motor;

seatbelt attaching detecting means for detecting attaching of the seatbelt-to the occupant or disconnection of the seatbelt from the occupant; and control means for controlling said motor, based upon results of detections by said change amount detecting means and said seatbelt attaching detecting means.

9. A seatbelt protraction and retraction amount-detecting device for an automotive passenger restraint and protection apparatus having a seatbelt, and a motor for rotating protracting or retracting the seatbelt, comprising:

motor rotational direction detecting means for detecting rotational direction of the motor;

voltage detecting means for detecting terminal voltage across the motor; and protraction/retraction amount calculating means for calculating an amount of protraction or an amount of retraction of the seatbelt, based upon at least one of a number of times pulsating components of the terminal voltage detected by said voltage detecting means rises above a first predetermined value from a value below said first predetermined value, a number of times said pulsating components drops below a second predetermined value from a value above said second predetermined value, a frequency component obtained by frequency analysis of the pulsating components, and results of time integration of the detected terminal voltage, and the rotational direction of said motor detected by said motor rotational direction detecting means.

10. An automotive passenger restraint and protection apparatus for an automotive vehicle, having a seatbelt, for restraining an occupant of the automotive vehicle by the seatbelt to protect the occupant, comprising:

an electric retractor having driving means for retracting and protracting the seatbelt;

control means for controlling said driving means;

seatbelt attaching detecting means for detecting attaching of the seatbelt to the occupant or disconnection of the seatbelt from the occupant;

protraction stoppage detecting means for detecting stoppage of protraction of the seatbelt; and vehicle speed detecting means for detecting traveling speed of the automotive vehicle;

wherein said control means inhibits said driving means from retracting the seatbelt if the traveling speed of the automotive vehicle detected by said vehicle speed detecting means is lower than a predetermined value when the stoppage of protraction of the seatbelt is detected by the protraction stoppage detecting means after the attaching of the seatbelt to the occupant is detected by said seatbelt attaching means.

* * * * *